United States Patent
Kamada et al.

[11] Patent Number: 5,772,550
[45] Date of Patent: Jun. 30, 1998

[54] AUTOMATIC TRANSMISSION CONTROL SYSTEM

[75] Inventors: Shinya Kamada; Koichi Yamamoto; Tomoo Sawazaki; Hiroshi Shinozuka; Kazushi Kurokawa; Takamichi Teraoka; Masakazu Hombo; Naotaka Hirami; Yasunori Kanda; Akinobu Aoki; Tatsuhiko Iwasaki; Takeyoshi Kawa, all of Hiroshima, Japan

[73] Assignee: Mazda Motor Corporation, Hiroshima, Japan

[21] Appl. No.: 626,067

[22] Filed: Apr. 1, 1996

[30] Foreign Application Priority Data

Mar. 31, 1995 [JP] Japan .................................. 7-100005
Feb. 27, 1996 [JP] Japan .................................. 8-069080

[51] Int. Cl.$^6$ .................................................. F16H 61/00
[52] U.S. Cl. .................................................. 475/120
[58] Field of Search ................................. 475/120, 123, 475/127

[56] References Cited

U.S. PATENT DOCUMENTS

| | | | |
|---|---|---|---|
| 3,823,621 | 7/1974 | Kubo et al. | 475/120 |
| 3,956,947 | 5/1976 | Leising et al. | 475/120 |
| 4,754,403 | 6/1988 | Hiramatsu | 475/120 |
| 5,184,528 | 2/1993 | Mochizuki . | |
| 5,311,795 | 5/1994 | Yoshimura et al. . | |
| 5,361,651 | 11/1994 | Wakahara . | |
| 5,375,483 | 12/1994 | Kim et al. | 475/120 |
| 5,397,284 | 3/1995 | Matsumoto et al. . | |

FOREIGN PATENT DOCUMENTS 621643  3/1994  Japan .

*Primary Examiner*—Dirk Wright
*Attorney, Agent, or Firm*—Sixbey, Friedman, Leedom & Ferguson, PC; Gerald J. Ferguson, Jr.; Donald R. Studebaker

[57] ABSTRACT

A control system for an automatic transmission having a transmission gear mechanism and a plurality of friction coupling elements which are selectively locked and unlocked with hydraulic oil to change power transmission paths to place the automatic transmission into desired available gears, a first one of the friction coupling elements having a locking pressure chamber and an unlocking pressure chamber and being locked when operating oil is supplied into only the locking pressure chamber and unlocking when operating oil is coincidentally supplied into the locking pressure chamber and the unlocking pressure chamber, and a second one of the friction coupling elements having a locking/unlocking pressure chamber in communication, with the unlocking pressure chamber of the first friction coupling element and being locked only when operation oil is supplied into the locking/unlocking pressure chamber. The control system includes a transition level control for controlling a pressure level of transitional pressure of operating oil increasing in pressure level while being supplied to the locking/unlocking pressure chamber of the second friction coupling element during a first specified gear shift with a first friction coupling element and the second friction coupling element are simultaneously unlocked and locked, respectively, and decreasing while being discharged from the locking/unlocking pressure chamber of the second friction coupling element during a second specific gear shift wherein the first friction coupling element and the second friction coupling element are simultaneously locked and unlocked, respectively, and a transitional duration control for controlling a duration time of the transitional pressure during any one of the first and second specific gear shifts.

18 Claims, 111 Drawing Sheets

FIG. 3B

TABLE I

|  | FWDC | 2-4B | 3-4C | LRVB | RVC | OWC |
|---|---|---|---|---|---|---|
| 1ST GEAR | O |  |  | (O) |  | O |
| 2ND GEAR | O | O |  |  |  |  |
| 3RD GEAR | O |  | O |  |  |  |
| 4TH GEAR |  | O | O |  |  |  |
| REVERSE GEAR |  |  |  | O | O |  |

TABLE II

| RANGE | D (S) | | | | L | R |
|---|---|---|---|---|---|---|
| GEAR |  |  |  |  |  |  |
| 1ST SV | X | X | X | O | O | O |
| 2ND SV | X | X | X | X | O | O |
| 1ST DSV | X | O | O | O | O | O |
| 2ND DSV | X | X | O | O | X | O |
| 3RD DSV | O | O | O | X | O | O |

FIG. 8 *PRIOR ART*

- R RANGE -

2ND GEAR

4TH GEAR

1ST GEAR (L RANGE)

FIG. 18 REVERSE GEAR

|  | OUTPUT PRESSURE (Kg/cm²) | | | | |
|---|---|---|---|---|---|
|  | 0.2 | 0.4 | 0.6 | 0.8 | 1.0 |
| SOURCE PRESSURE (Kg/cm²) 0.4 | 49 % | | | | |
| 0.6 | 47 % | .. % | | | |
| 0.8 | 75 % | .. % | .. % | | |
| 1.0 | 81 % | .. % | .. % | .. % | |
| 1.2 | 18 % | .. % | .. % | .. % | |

|  | OUTPUT/SOURCE (%) | | | | |
|---|---|---|---|---|---|
|  | 10 % | 30 % | 50 % | 70 % | 90 % |
| SOURCE PRESSURE (Kg/cm²) 0.4 | .. % | .. % | 47 % | .. % | .. % |
| 0.6 | .. % | .. % | 48 % | .. % | .. % |
| 0.8 | .. % | .. % | 50 % | .. % | .. % |
| 1.0 | .. % | .. % | 52 % | .. % | .. % |
| 1.2 | .. % | .. % | 53 % | .. % | .. % |

AUTOMATIC TRANSMISSION CONTROL SYSTEM

BACKGROUND OF THE INVENTION

1. Field of the invention

This invention relates to a control system for an automatic transmission for vehicles.

2. Description of Related Art

Typically, an automatic transmission for use with an automobile has a torque converter and a transmission gear mechanism driven by the torque converter. Such a transmission gear mechanism includes a plurality of friction coupling elements, such as clutches and brakes, which are selectively locked and unlocked to place automatically the automatic transmission into desired gears according to driving conditions. Selectively locking and unlocking these friction coupling elements is performed by means of hydraulic control circuit. Some of this type of automatic transmission are provided with a friction coupling element of a type comprising a band brake which is equipped with a servo cylinder.

Band brake type friction coupling element has a servo cylinder chamber divided by a spring loaded piston into two chambers, namely a servo apply pressure chamber and a servo release pressure chamber. The friction coupling element locks when only the servo apply pressure chamber is filled with hydraulic oil pressure, and unlocks or is released when both servo apply pressure chamber and servo release pressure chamber are not supplied with hydraulic pressure, when both servo apply pressure chamber and servo release pressure chamber are filled with hydraulic oil pressure, or when only the servo release pressure chamber is filled with hydraulic oil pressure. Further, the spring loaded piston is ordinary urged in a direction where it applies force so as to release the friction coupling element.

In an automatic transmission of this kind, some of the available gears necessitate coincidentally locking one friction coupling element and unlocking another friction coupling element. For example, if the automatic transmission has the band brake type 2-4 brake used as the one frictional coupling element which is locked in second and fourth gears and a 3-4 clutch with a single pressure chamber provided used as the other friction coupling element which is locked in third and fourth gears, the 2-4 brake and 3-4 clutch must be coincidentally unlocked and locked, respectively, during a second to third gear shift, and locked and unlock ed, respectively, during a third to second gear shift.

Consequently, operating pressure must be coincidentally supplied to and discharged from pressure chambers of these friction coupling elements. Typically, in order to perform the coincident supply and discharge of hydraulic pressure, the hydraulic control circuit has pressure lines branching off from an upstream pressure line and leading to these two friction coupling elements and a single pressure controlling element, such as a duty solenoid valve, installed to the upstream pressure line in close proximity to a junction. Such a hydraulic control circuit is known from, for instance, Japanese Patent Publication No. 6-21643.

Hydraulic control circuit that the Japanese Patent Publication No. 6-21643 describes is that schematically shown in FIG. 2. A 2-3 shift valve is installed to an upstream pressure line at a juncture between a pressure line leading to a servo release pressure chamber of a 2-4 brake referred to as a first friction coupling element and a pressure line leading to a pressure chamber of a 3-4 clutch referred to as a second friction coupling element. This upstream pressure line is joined together to a pressure line leading to a servo apply pressure chamber of the 2-4 brake. Further, upstream from the juncture, a 1-2 shift valve and a pressure control valve are installed into the pressure line in order from the juncture. During a third to second down-shift, while the 2-4 shift valve discharges operating pressure from both servo release pressure chamber of the 2-4 brake and pressure chamber of the 3-4 clutch to lock the 2-4 brake and unlock the 3-4 clutch, the pressure control valve controls operating pressure in the servo apply pressure chamber of the 2-4 brake through the 1-2 shift valve so as to regulate the operating pressure during discharge, thereby indirectly controlling what is called "transitional pressure" of the operating pressure being discharged from the pressure chamber of the 3-4 clutch. The term "transitional pressure" used herein shall mean and refer to pressure of a certain duration of unchanging in level while it descends or ascends.

With the conventional hydraulic control circuit, as shown in FIG. 2, the transitional pressure is controlled during a 3-2 gear shift so as to allow the 3-4 clutch to slip. While this results in a smooth increase in turbine speed following the down-shift and a smooth gear shift to the second gear, nevertheless, constraints must be imposed on the hydraulic control circuit. Because operating pressure from the 2-4 brake and 3-4 clutch is discharged through the drain port of the 2-3 shift valve, it is difficult to control the speed of discharging the operating pressure, which makes it hard to control the duration time of transitional pressure. Generally, in the hydraulic control circuit, the duration time of transitional pressure tends to be shorted, allowing the 2-4 brake to lock abruptly during an increase in turbine speed following the slippage of the 3-4 clutch, i.e. in the inertia phase. This causes a heavy shift shock during, in particular, a torque demand 3-2 shift down. The same problem occurs also during a 2-3 gear shift during acceleration due to a difficulty of controlling the speed of charging operating pressure to the 2-4 brake and 3-4 clutch, an occurrence of a heavy shift shock is encountered due to a short duration time of transitional pressure in the inertia phase.

In order to solve the above problem, an orifice may be provided in an oil path leading to the 2-4 brake and 3-4 clutch or at the drain port of the 2-3 shift valve. However, this orifice provides an adverse effect to discharge of operating pressure during gear shifts other than these 3-2 down-shift and 2-3 up-shift. Although this effect can be eliminated by a bypass path to discharge the operating pressure to bypass the orifice during gear shifts other than the 3-2 down-shift and 2-3 up-shift, the utilization of such a bypass path makes the hydraulic control circuit to be complicate in structure. ip. While this results in a smooth increase in turbine speed following the downshfit and a smooth gear shift to the second gear, nevertheless, constraints must be imposed on the hydraulic control circuit. Because operating pressure from the 2-4 be and 3-4 clutch is discharged through the drain port of the 2-3 shift valve, it is difficult to control the speed of discharging the operating pressure, which makes it hard to control the duration time of transitional pressure. Generally, in the hydraulic control circuit, the duration time of transitional pressure tends to be shorted, allowing the 2-4 brake to lock abruptly during an increase in turbine speed following the slippage of the 3-4 clutch, i.e. in the inertia phase. This causes a heavy shift shock during, in particular, a torque demand 3-2 shift down. The same problem occurs also during a 2-3 gear shift during acceleration due to a difficulty of controlling the speed of charging operating pressure to the 2-4 brake and 3-4 clutch, an occurrence of a heavy shift shock is encountered due to a short duration time of transitional pressure in the inertia phase.

In order to solve the above problem, an orifice may be provided in an oil path leading to the 2-4 brake and 3-4 clutch or at the drain port of the 2-3 shift valve. However, this orifice provides an adverse effect to discharge of operating pressure during gear shifts other than these 3-2 down-shift and 2-3 up-shift. Although this effect can be eliminated by a bypass path to discharge the operating pressure to bypass the orifice during gear shifts other than the 3-2 down-shift and 2-3 up-shift, the utilization of such a bypass path makes the hydraulic control circuit to be complicate in structure. where the first friction coupling element and the second friction coupling element are simultaneously unlocked and locked, respectively, and decreasing while being discharged from the locking/unlocking pressure chamber of the second friction coupling element during a second specific gear shift where the first friction coupling element and the second friction coupling element are simultaneously locked and unlocked, respectively, and transitional duration control means for controlling a duration time of the transitional pressure during any one of the first and second specific gear shift.

According to another aspect of the invention, the control system for an automatic transmission of this type comprises first operating oil charge/discharge means for charging operating oil to and discharging operating oil from the first pressure chamber of the first friction coupling means, second operating oil charge/discharge means for coincidentally charging operating oil to and coincidentally discharging operating oil from the second pressure chamber of the first friction coupling element and the pressure chamber of the second friction coupling element, and control means for controlling a pressure level of operating oil in the pressure chamber of the second friction coupling element and a time period for which the operating oil is held at a controlled pressure level so that the second friction coupling element is allowed to cause a specified amount of slippage during the and second specific gear shifts The transitional level control means comprises pressure regulator valve such as a duty solenoid valve for controlling a pressure level of the operating oil in the locking or first pressure chamber of the first friction coupling element so as to control a pressure level of operating oil in the locking/ unlocking pressure chamber of the second friction coupling element following a change in pressure level of the operating oil in the unlocking or second pressure chamber of the first friction coupling element corresponding to the controlled pressure level of the operating oil in the locking pressure chamber during the first and second specific gear shifts. Further, the transitional duration control means comprises oil flow control means such as duty solenoid valve for controlling an amount of flow of the operating oil supplied to and discharged from the unlocking pressure chamber of the first friction coupling element and said locking/ unlocking pressure chamber of the second friction coupling element. The transitional duration control means may include an orifice disposed in an upstream oil path from which oil paths leading to the unlocking pressure chamber of the first friction coupling element and the locking/unlocking pressure chamber of the second friction coupling element, respectively branches off of.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 3(B) is tables showing the relation between operations of the friction coupling elements and valves for the respective gears;

FIG. 118 is a time chart showing changes in various factors during R - N shift;

FIG. 119 is a time chart showing operation of failure control prevention during R - N shift;

FIG. 120 is a flowchart illustrating a control sequence in a deceleration mode for the first duty solenoid valve (DSV) during lockup control;

FIG. 121 is a time chart showing changes in various factors during lockup control;

FIG. 122 is a flowchart illustrating a deceleration slip mode prevention control sequence;

FIG. 123 is a characteristic diagram of target slippage in lockup control;

FIG. 124 is a flowchart of the calculation of a feedback control valve in the lockup control;

FIG. 125 is a coefficient map used in the calculation of a feedback control valve in the lockup control;

FIG. 126 is a flowchart illustrating a control sequence for determining a gear upon providing a shift instruction during a 1 - 3 or 1 - 4 jump shift;

FIG. 127 is a time chart showing changes in various factors during a 1 -3 or 1 4 jump shift;

FIG. 128 is a flowchart illustrating a control sequence for determining a gear upon providing a shift instruction during a 2 - 4 jump shift;

FIG. 129 is a time chart showing changes in various factors during a 2 - 4 jump shift;

Figure 130:
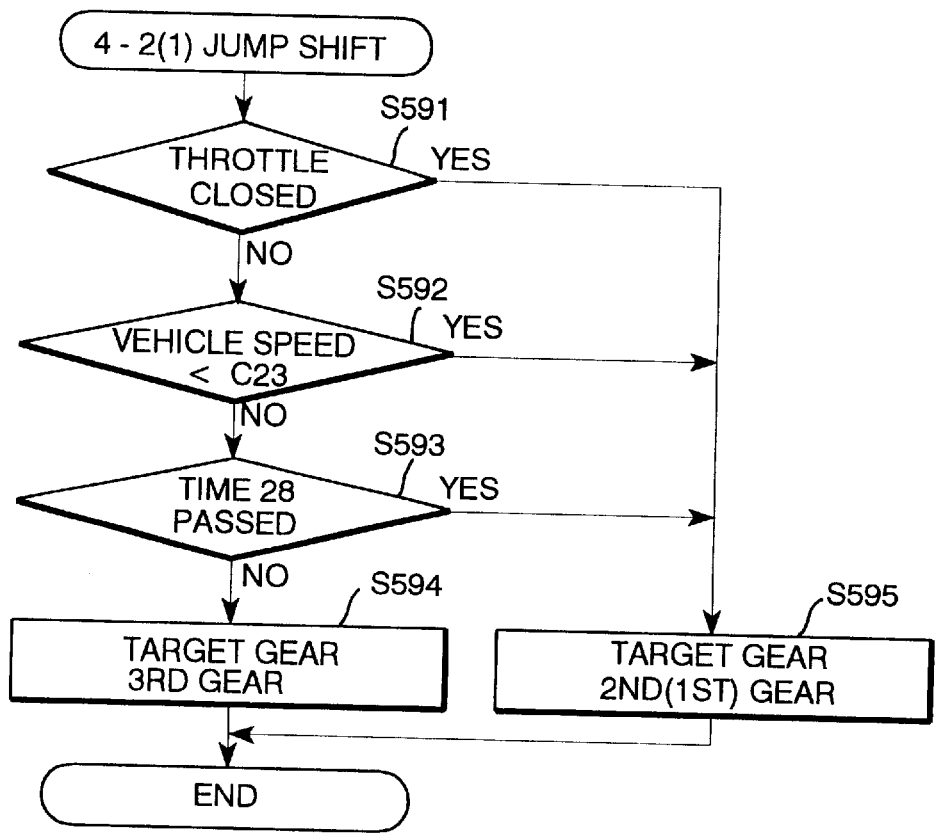
Figure 131:
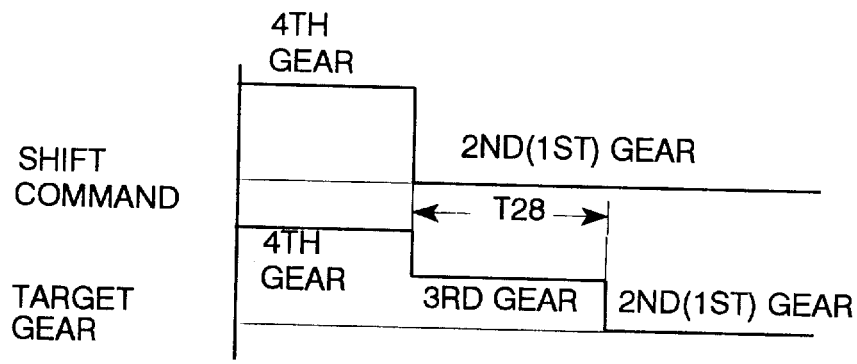
Figure 132:
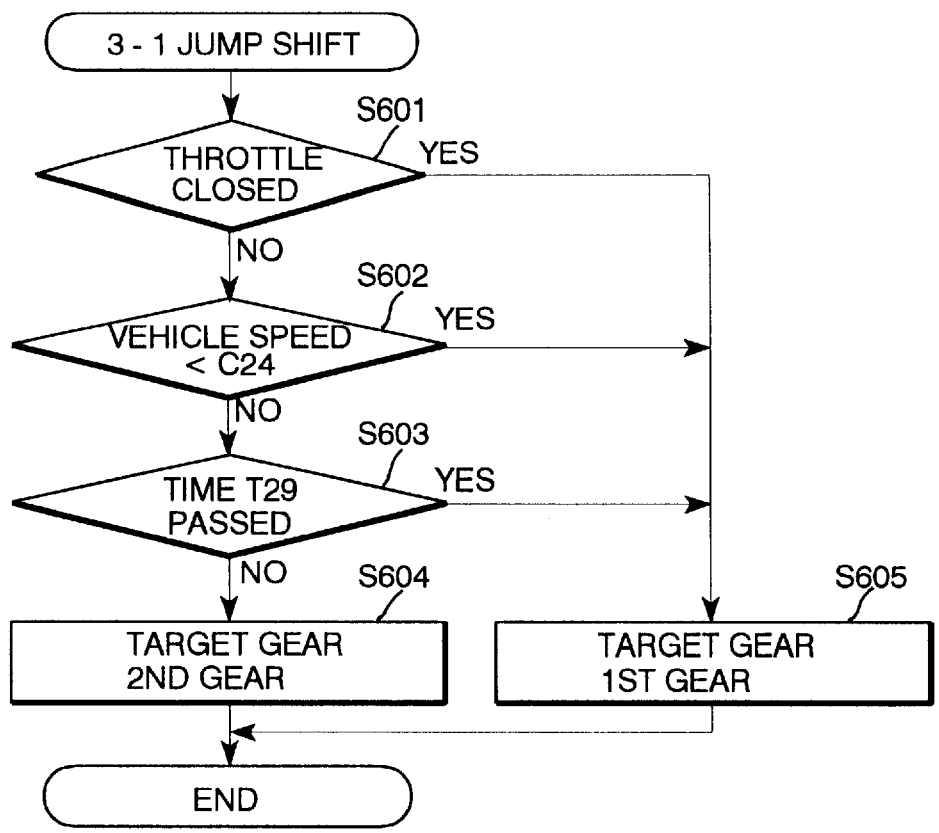
Figure 133:
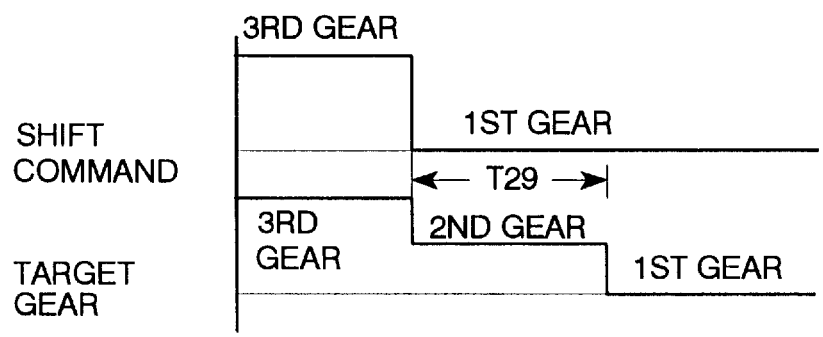
Figure 134:
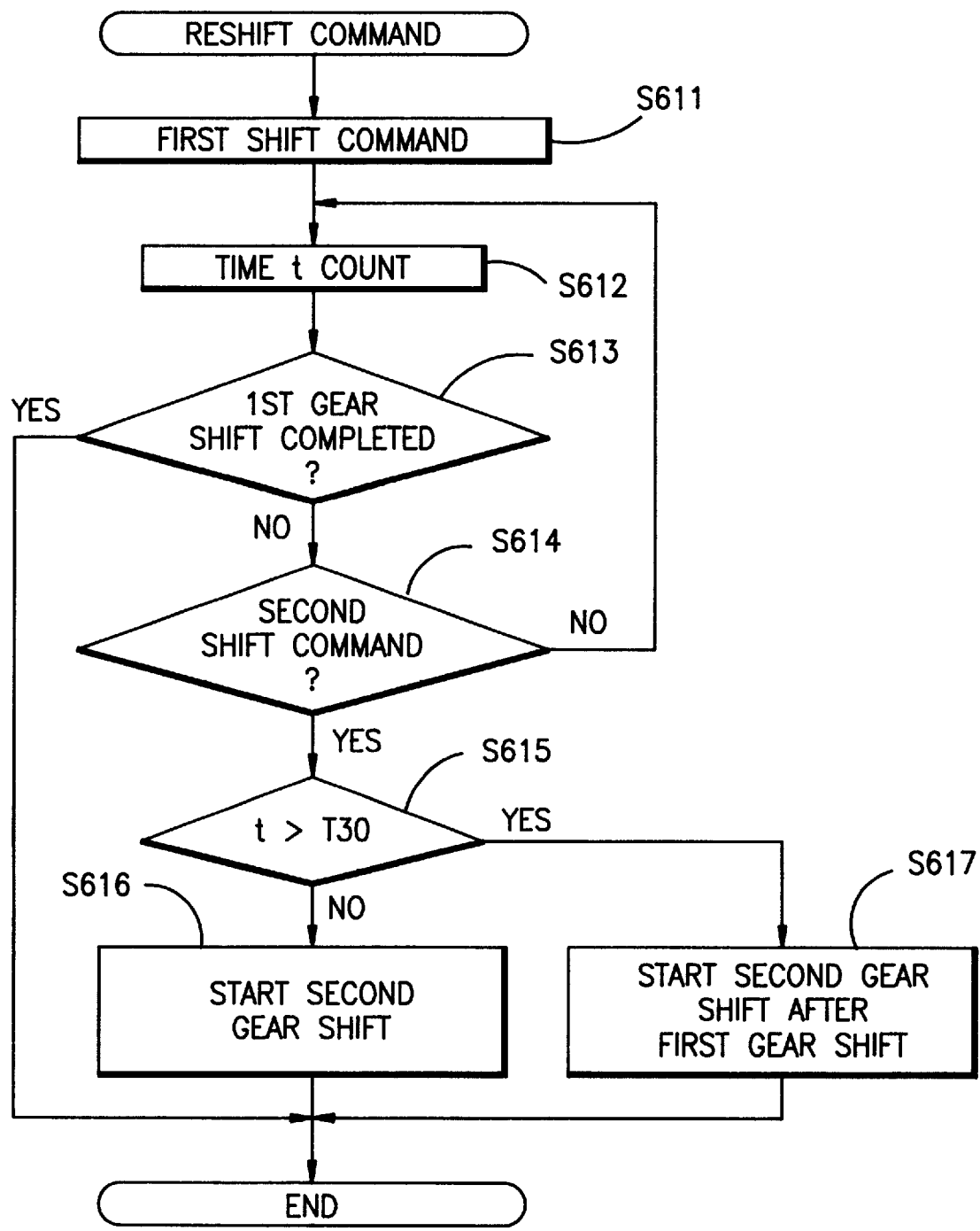
Figure 135:
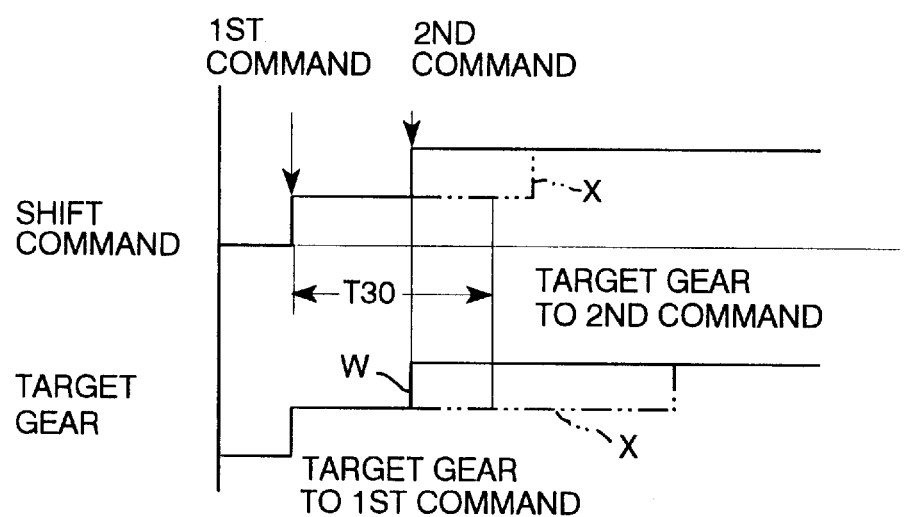
Figure 136:
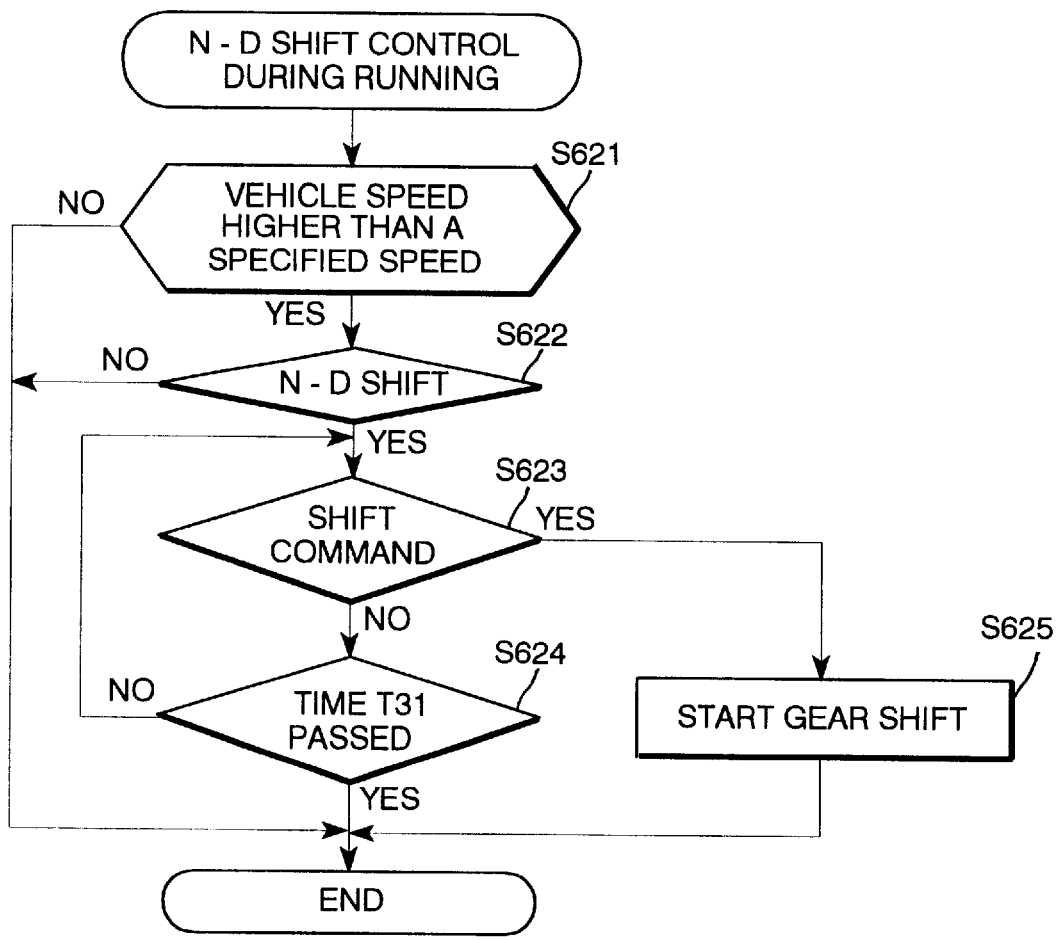
Figure 137:
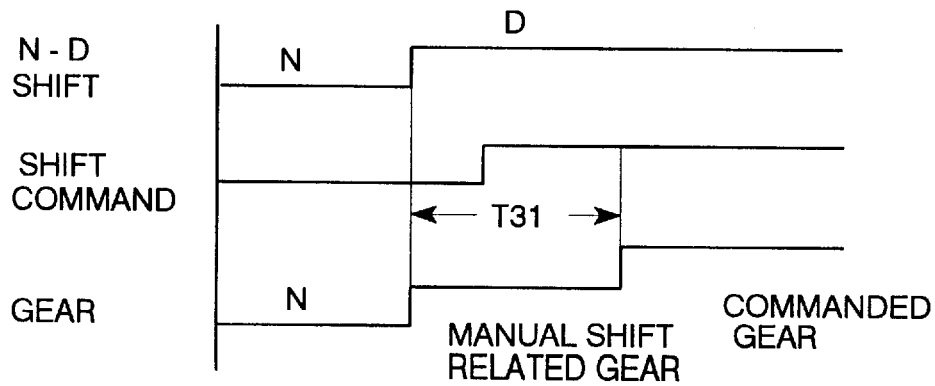
Figure 138:
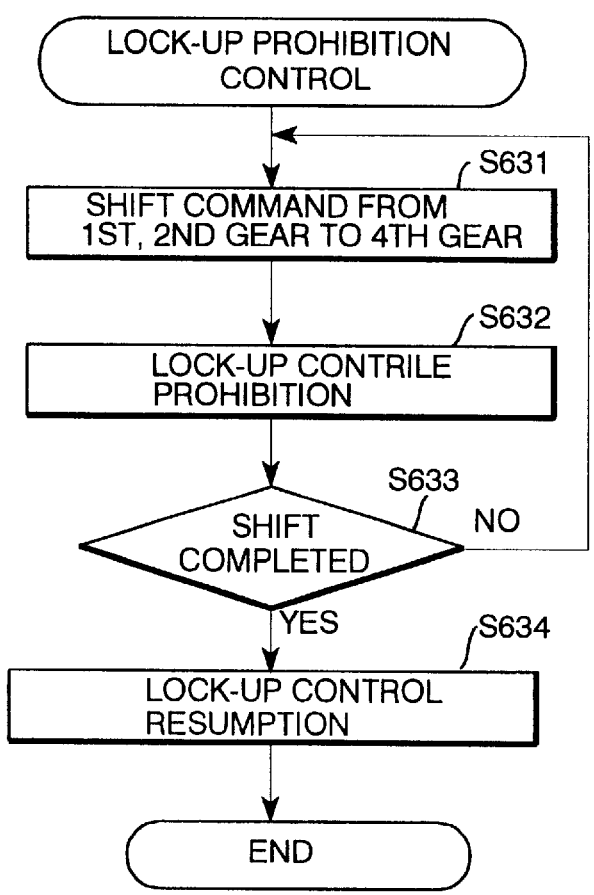
Figure 139:
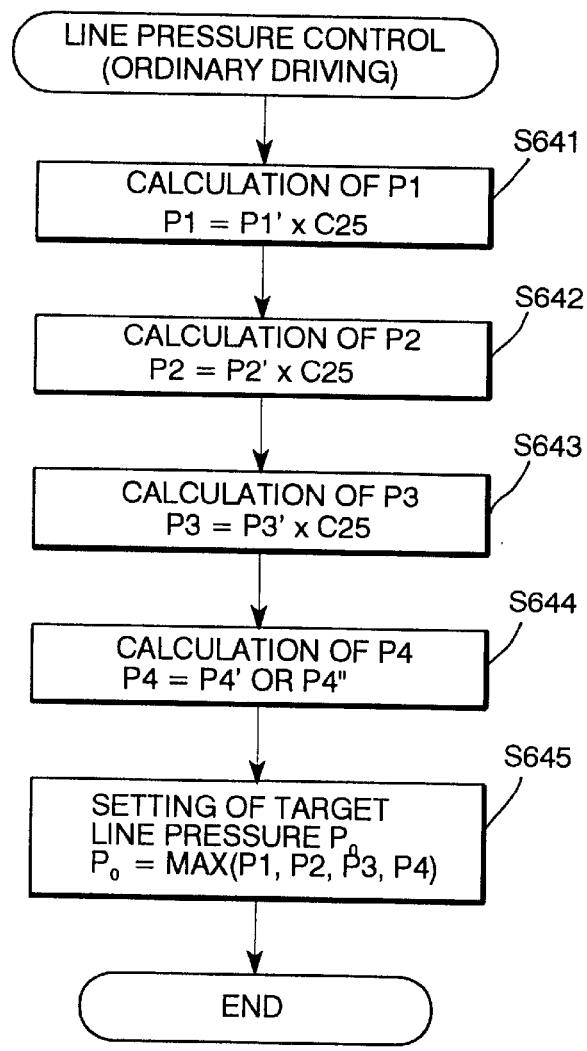
Figure 140:
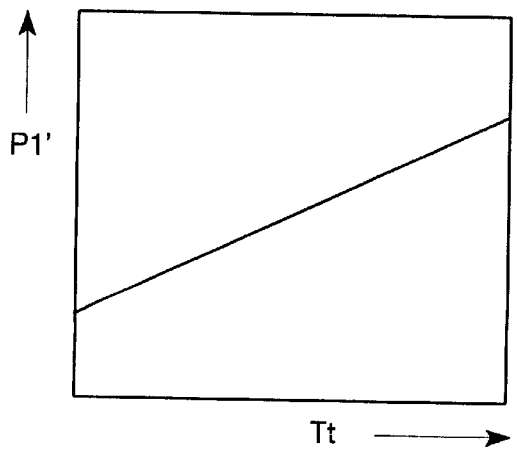
Figure 141:
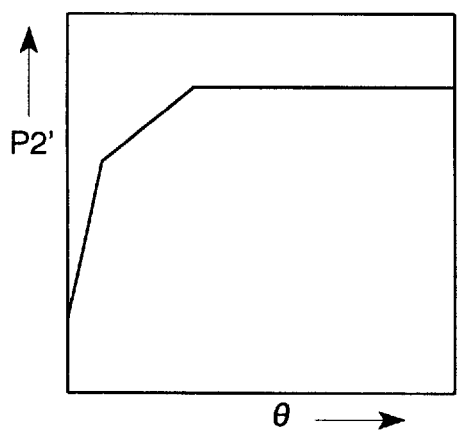
Figure 142:
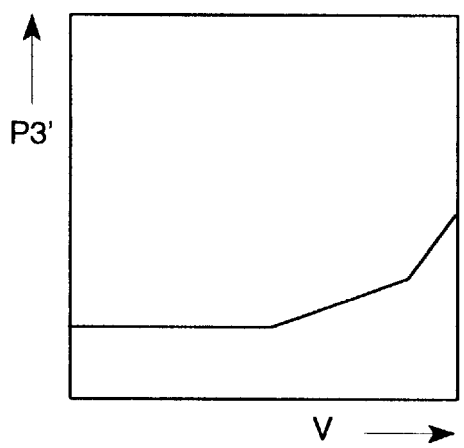
Figure 143:
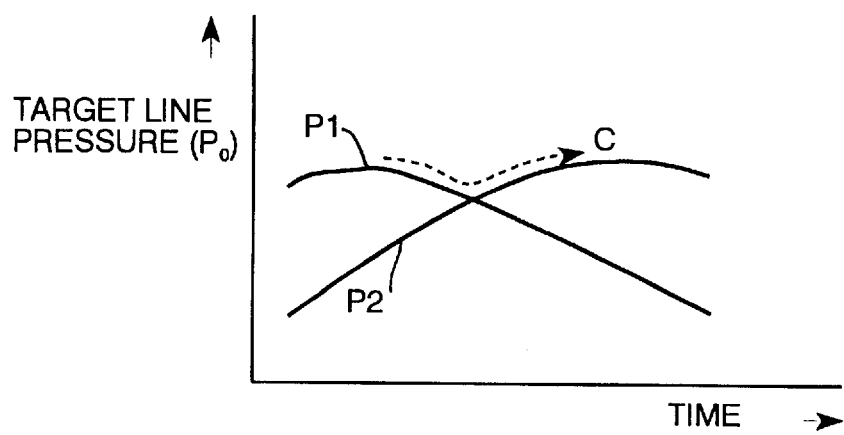
Figure 144:
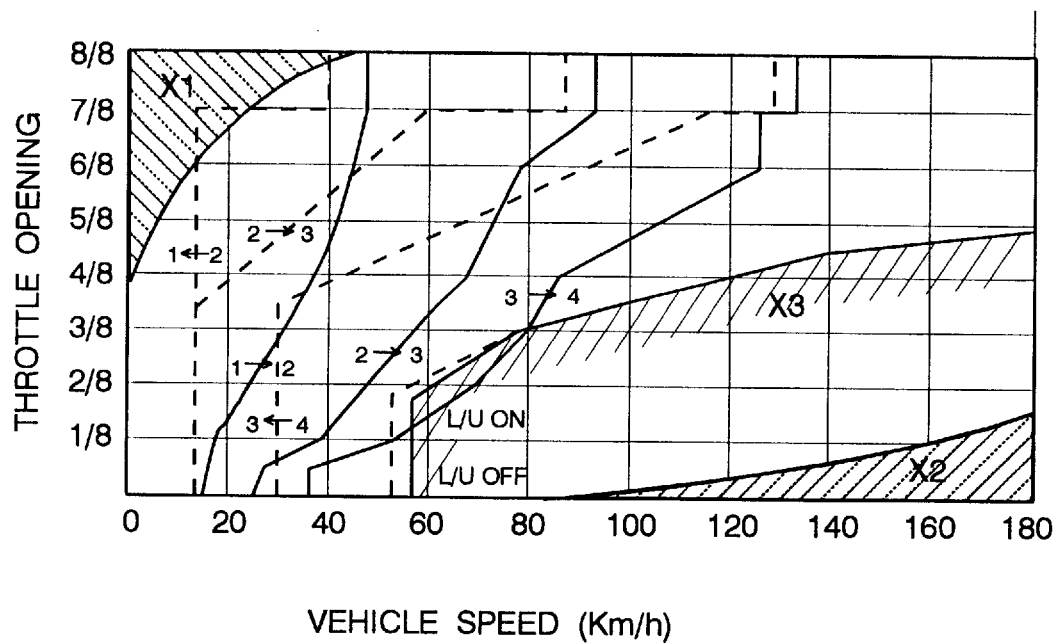
Figure 145:
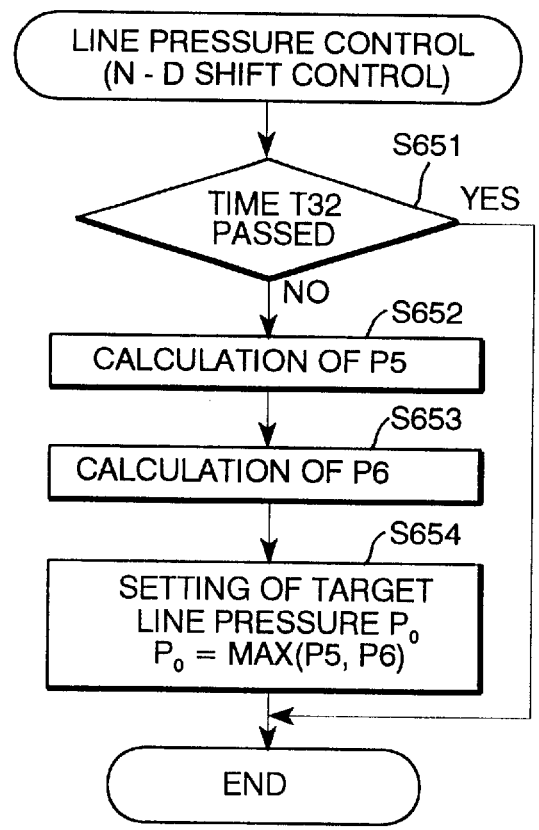
Figure 146:
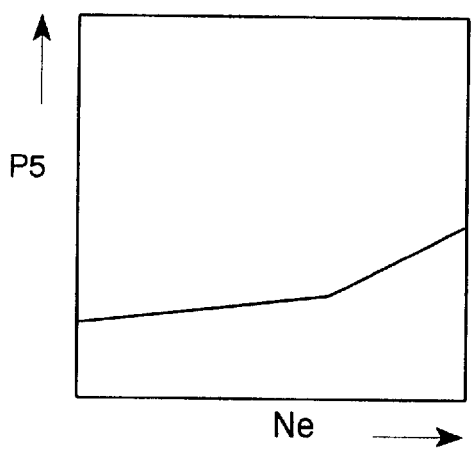
Figure 147:
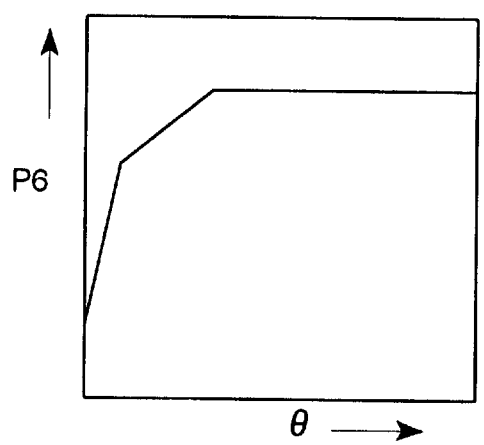
Figure 148:
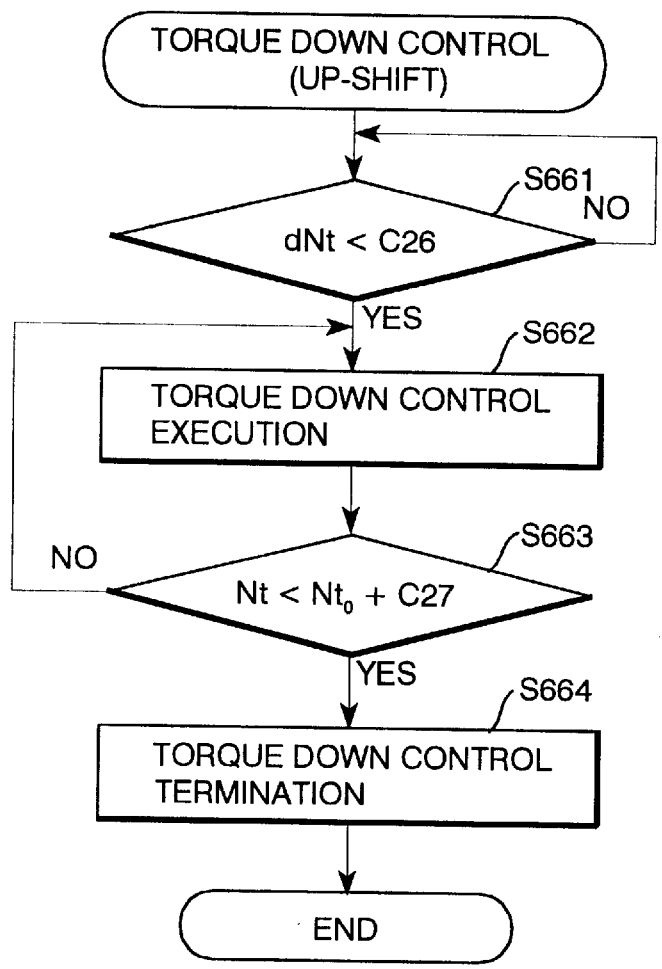
Figure 149:
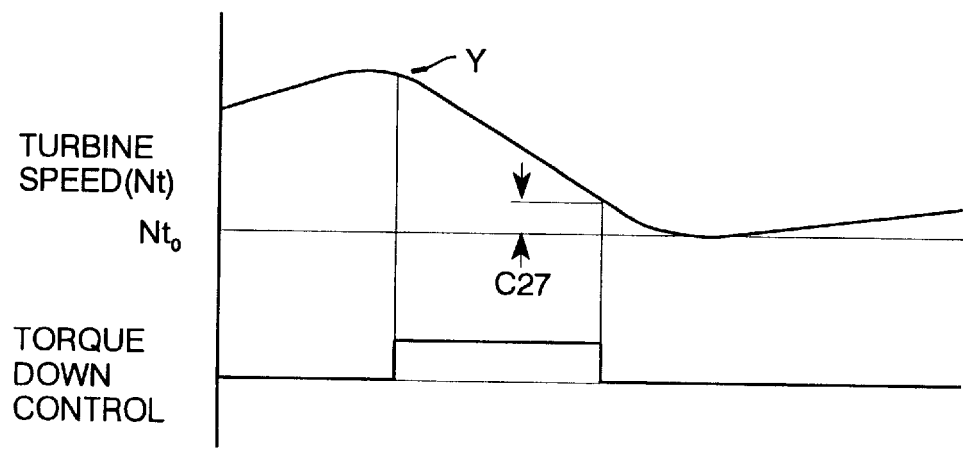
Figure 150:
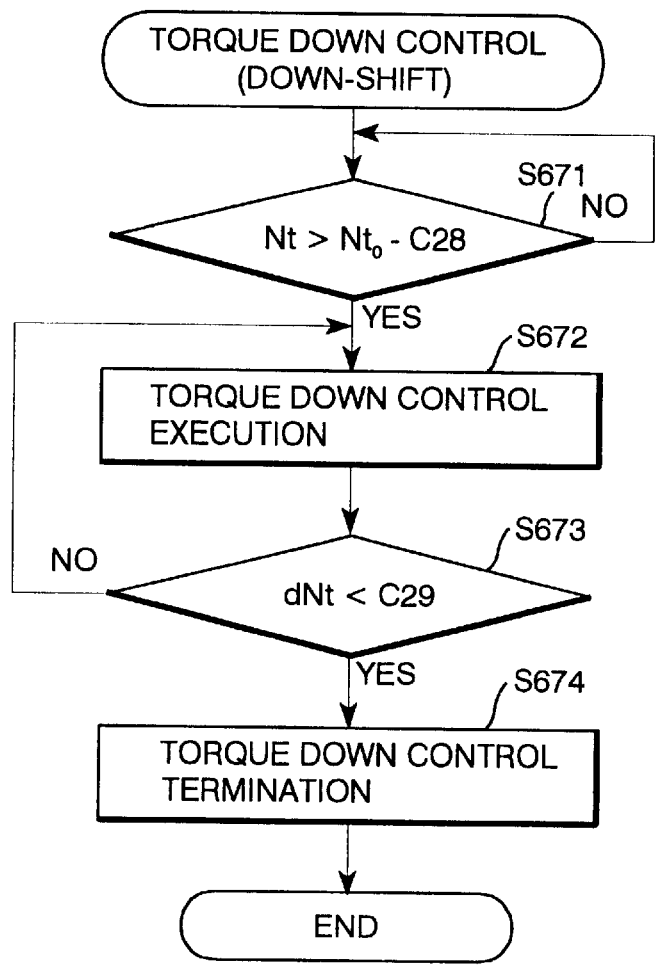
Figure 151:
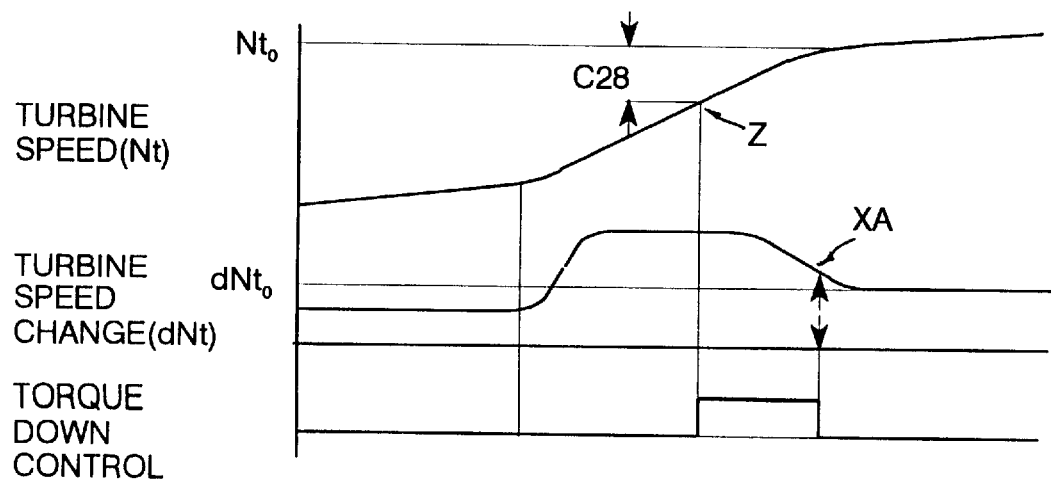

FIG. 130 is a flowchart illustrating a control sequence for determining a gear upon providing a shift instruction during a 4 - 2 or 4 - 1 jump shift;

FIG. 131 is a time chart showing changes in various factors during a 2 - 4 jump shift;

FIG. 131 is a flowchart illustrating a control sequence for determining a gear upon providing a shift instruction during a 3 - 1 jump shift;

FIG. 132 is a time chart showing changes in various factors during a 3 - 1 jump shift;

FIG. 133 is a flowchart illustrating a control sequence for a shift upon re-shift;

FIG. 134 is a time chart showing changes in various factors during a re-shift;

FIG. 135 is a flowchart illustrating a control sequence for an N - D range shift during running;

FIG. 136 is a time chart showing changes in various factors during an N - D range shift;

FIG. 137 is a time chart showing changes in various factors during a N - D range shift during running;

FIG. 138 is a flowchart illustrating a control sequence for lockup prohibition;

FIG. 139 is a flowchart illustrating a control sequence for line pressure during ordinary driving;

FIG. 140 is a diagram illustrating a map of hydraulic pressure with respect to turbine torque used in the line pressure control;

FIG. 141 is a diagram illustrating a map of hydraulic pressure with respect to throttle opening used in the line pressure control;

FIG. 142 is a diagram illustrating a map of hydraulic pressure with respect to vehicle speed used in the line pressure control;

FIG. 143 is an explanatory view of line pressure control;

FIG. 144 is an explanatory view of line pressure control regions;

FIG. 145 is a flowchart illustrating a line pressure control sequence during an N D manual shift;

FIG. 146 shows a map of hydraulic pressure with respect to engine speed used in the manual shift;

FIG. 147 shows a map of hydraulic pressure with respect to throttle opening used in the manual shift;

FIG. 148 is a flowchart illustrating a torque dow control sequence for up-shifts;

FIG. 149 is a time chart showing changes in various factors used in the torque down control;

FIG. 150 is a flowchart illustrating a torque down control sequence during down-shift; and FIG. 151 is a time chart showing changes in various factors during t he torque down control.

DETAILED DESCRIPTION OF THE EMBODIMENTS

It is to be noted that the term "front" used in the following description shall means and refer to a side close to the engine and the term "rear" used in the following description shall mean and refers to a side remote from the engine.

Mechanical Structure

Figure 3A:
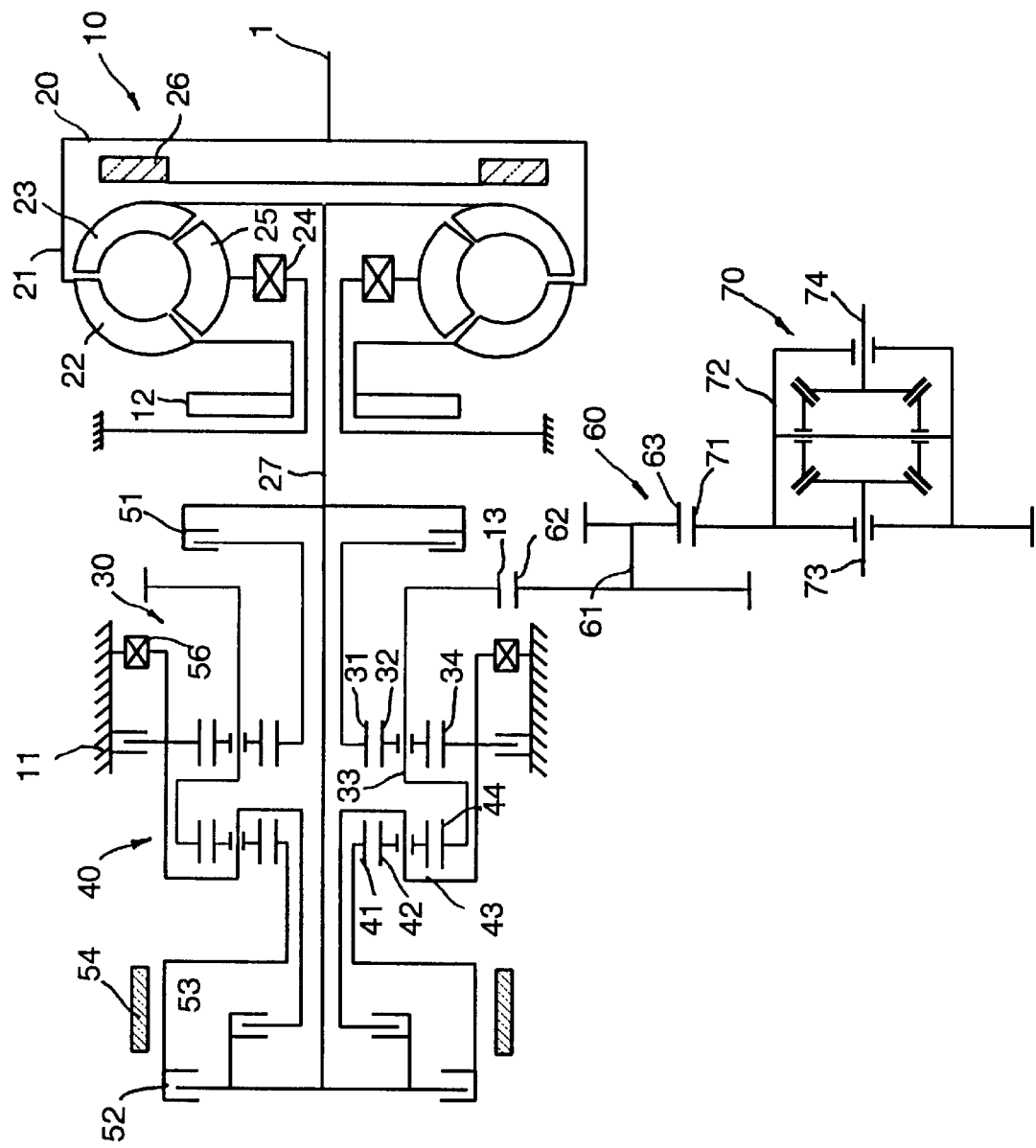
FIG. 3(A) is a schematic illustration showing an overall structure of an automatic transmission with which the control system of the invention cooperates.

Referring now to the drawings in detail, and in particular, to FIG. 3(A), an automatic transmission 10 equipped with a control system in accordance with an embodiment of the present invention has, as its essential components, a torque converter 20 and a transmission gear mechanism which consists of a first planetary gear set 30 and a second planetary gear set 40 arranged coaxially with each other in a direction from the front to the back. In this instance, These first planetary gear set 30 and second planetary gear set 40 change a power transmission path by selectively coupling and uncoupling various friction coupling elements 51 - 55, such as clutches and brakes, and a one-way clutch 56 to place the automatic transmission into desired gears, namely first (1st) to fourth (4th) gears in a drive (D) range, the first (1st) to third (3rd) gears in a second speed (S) range, the first (1st) and the second (2nd) gears in a low speed (L) range, and a reverse gear in a reverse (R) range.

Torque converter 20, which multiplies engine torque, has a pump 22 and a turbine 23, respectively, and a stator 25. The pump 22 is placed within and secured to a converter casing 21 secured to an engine output shaft 1. The turbine 23 is placed within the converter casing 21 facing the pump 22, and is driven by means of a special lightweight oil discharged from the pump 22. The stator 25 is inserted between the pump 22 and turbine 23 and mounted on a transmission casing 11 through a one-way clutch 24 and functions to multiply engine torque. The torque converter 20 thus structured performs transmission of turbine rotation to the first planetary gear set 30 and second planetary gear set 40 through a turbine shaft 27. The torque converter 20 is equipped with a lockup clutch 26 placed between the converter casing 21 and turbine 23 for mechanically coupling the pump 22, and hence the pump shaft 12, and the turbine 23 together when it is activated. Behind the torque converter 20 there is provided an oil pump 12 driven by the engine output shaft 1 through the converter casing 21.

First planetary gear set 30 is comprised of a sun gear 31, a plurality of pinion gears 32 in mesh with the sun gear 31, a pinion carrier 33 for carrying the pinion gears 32, and a ring gear 34 in mesh with the pinion gears 32. Similarly, the second planetary gear set 40 is comprised of a sun gear 41, a plurality of cylindrical pinion gears 42 in mesh with the sun gear 41, a pinion carrier 43 for carrying the pinion gears 42, and a ring gear 44 in mesh with the pinion gears 32. The automatic transmission further includes a forward clutch (FWC) 51 disposed between the turbine shaft 27 and the sun gear 31 of the first planetary gear set 30, a reverse clutch (RVC) 52 disposed between the turbine shaft 2 7 and the sun gear 41 of the second planetary gear set 40, a 3-4 clutch (3-4C) 53 disposed between the turbine shaft 27 and the sun gear 41 of the second planetary gear set 40, and a 2-4 brake (2-4B) 54 for locking the sun gear 41 of the second planetary gear set 40. Further, a low-reverse brake (LRB) 55 and a one-way clutch (OWC) 56 are disposed in parallel with each other between the transmission casing 11 and the ring gear 34 of the first planetary gear set first planetary gear set and the pinion carrier 43 of the second planetary gear set 40 which are connected to each other. An transmission output gear 13 is connected to the pinion carrier 33 of the first planetary gear set 30 and the ring gear 44 of the second planetary gear set 40.

Intermediate transmission mechanism 60 includes an idle shaft 61 on which first and second intermediate gears 62 and 63 are mounted. The first intermediate gear 62 is in mesh with the transmission output gear 13, and the second intermediate gear 63 is in mesh with an input gear 71 of a transfer 70. The differential 70 to which rotation of the transmission output gear 13 is transmitted through a differential casing 72 drives right and left wheel axles 73 and 74.

Frictional coupling elements 51–55, such as brakes and clutches and the one-way clutch 56, are selectively activated so as to place the automatic transmission 10 into available gears as indicated in Table I in FIG. 3(B). In the Table I, a friction coupling element indicated by a circle in parentheses is activated only in the low speed range.

Figure 1:
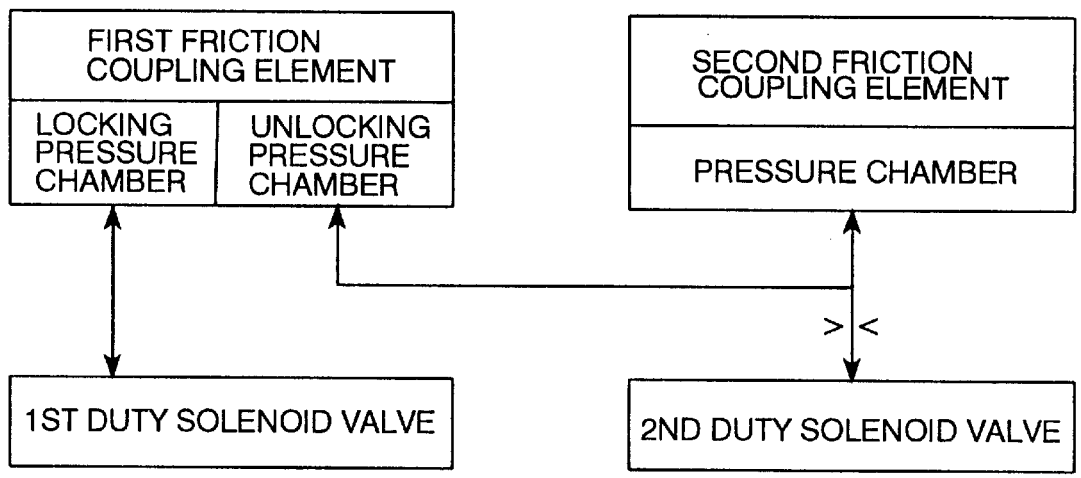
FIG. 1 is a schematic illustration showing an essential concept of an automatic transmission control system of the invention.
Figure 2:
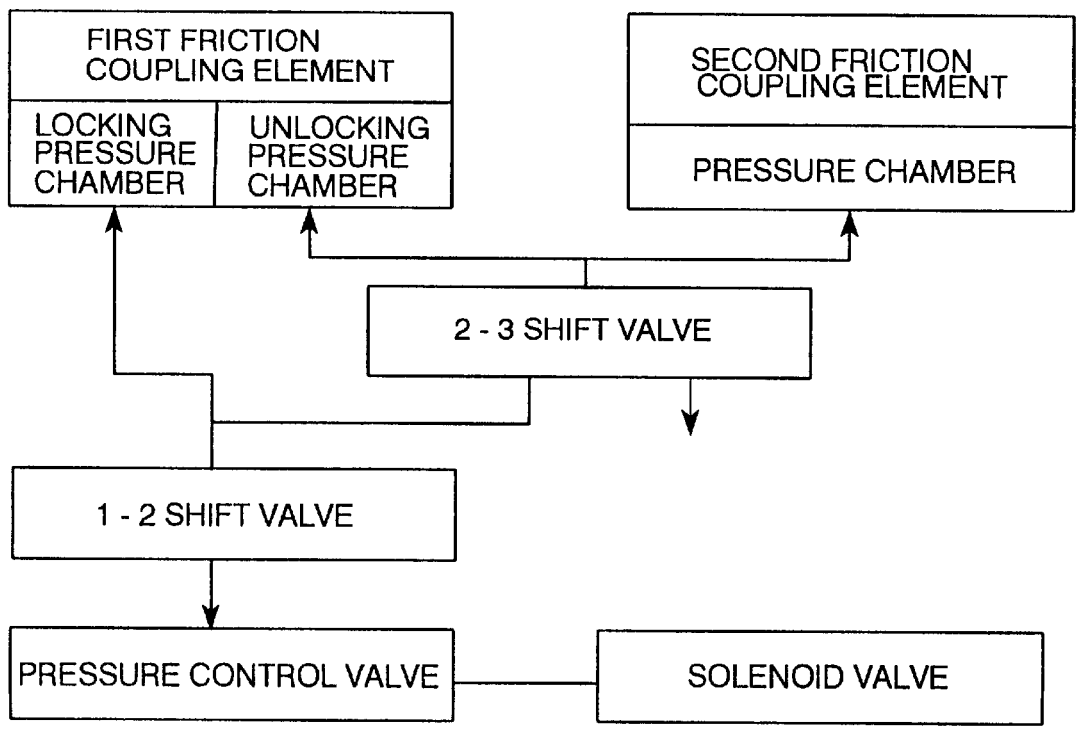
FIG. 2 is a schematic illustration showing an essential concept of a conventional automatic transmission control system of the invention.

Transmission gear mechanism of the automatic transmission 10 is shown in detail in FIG. 2. As seen in FIG. 2, the automatic transmission 10 is equipped with a turbine speed sensor 305 secured to the transmission casing 11. This speed sensor 305 provides a speed signal which in turn is utilized in the transmission control as will be described later. The speed sensor 305 is located with its end facing a spline-formed outer surface of a drum 51a of the forward clutch 51 which is rotatable integrally with the turbine shaft 27. For example, the speed sensor 305 is of a type detecting the speed of turbine shaft 27 based on a periodic change in a magnetic field caused by the axial splines of the clutch drum 51a.

Figure 5:
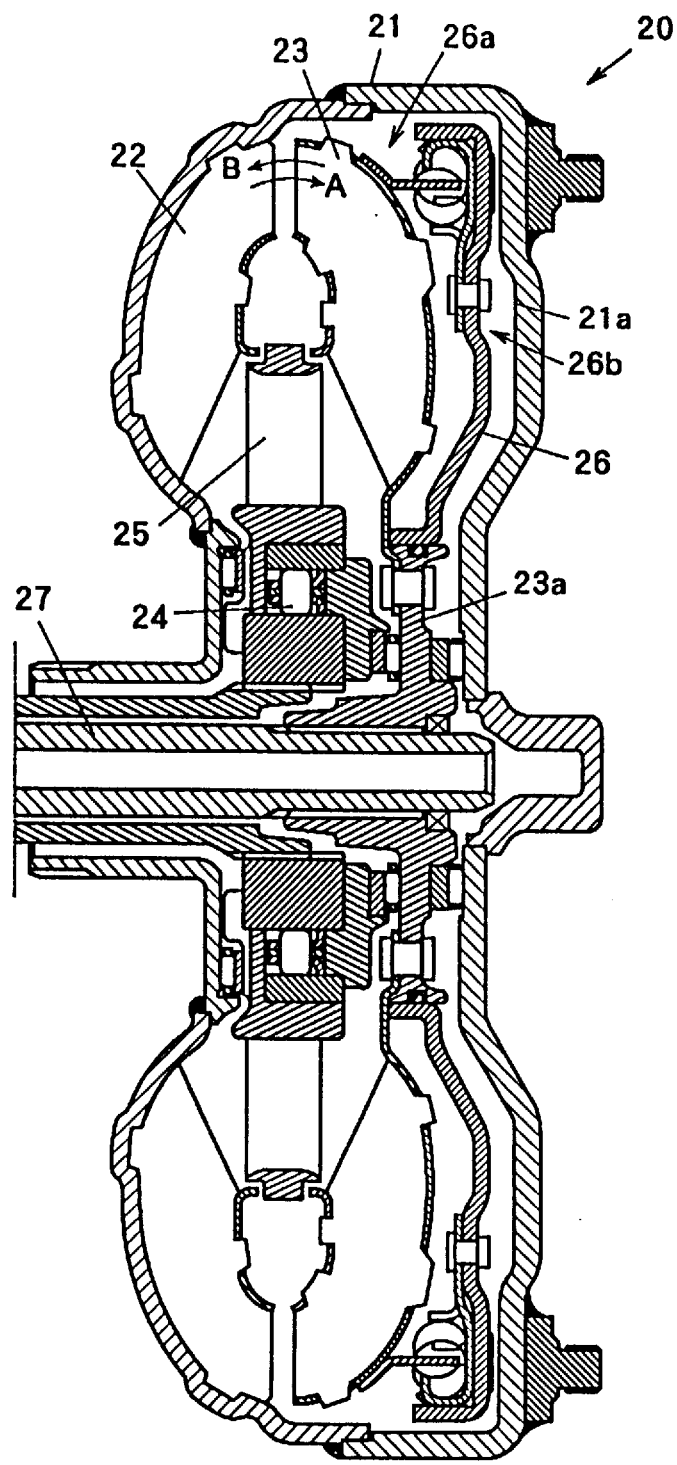
FIG. 5 is a cross-sectional view of a torque converter.

As shown in detail in FIG. 5, the torque converter 20 is of the type having a number of vanes or fins spaced at equal angular intervals. Specifically, a rear half of converter casing 21 fastened to the engine output shaft 1 is equipped with vanes spaced at equal intervals and is used as the pump 22. A torus member, located facing to the pump 22 on one side of the converter casing remote from the engine is equipped with vanes spaced at equal intervals. A number of vanes spaced at equal intervals are supported by the transmission casing 11 through a one-way clutch 24, which is used as the stator 25 rotatable in one direction only. Converter casing 21 incorporates a lockup clutch 26 rotatable integrally with and slidable axially with respect to the turbine 23 in the interior thereof. This lockup clutch 26 faces the front side surface 21a of the converter casing 21 and, when locked to the front side surface 21a, mechanically couples the turbine shaft 27 and the engine output shaft 1 directly together.

During rotation, the pump 22 discharge oil with centrifugal force in a direction opposite to pump rotation. The oil stream is redirected by the stator and enters the turbine 23 in a radial direction as shown in an arrow A in FIG. 5, Thus, the turbine is rotated by the oil stream. In this instance, when the ratio of turbine speed Nt to pump speed Np, namely the speed ratio e(=N+/Np) of the torque converter 20, is below a specified ratio, the one-way clutch is locked to hold the stator 25 so as to exert reaction force on the oil, thereby transferring multiplied or increased torque to the turbine 23. The lockup clutch 26 is urged, on one hand, in a direction in which the lockup clutch 26 is locked by hydraulic pressure in a rear pressure chamber (TC/R) 26a within the converter casing 21 and, on the other hand, in the opposite direction in which the lockup clutch 26 is allowed to slip or released by hydraulic pressure in a front pressure chamber (TC/F) 26b within the converter casing 21. The release pressure in the front pressure chamber (TC/F) 26b is regulated to control slippage of the lockup clutch.

Hydraulic Control Circuit

The following description will be directed to a hydraulic control circuit for supplying or charging operating pressure to and releasing operating pressure from pressure chambers of the respective friction coupling elements 51 - 55. One of the friction coupling elements 51 - 55, namely the 2-4 brake (2-4B) 54 including a band brake, has a brake apply pressure chamber (S/A) 54a and a brake release pressure chamber (S/R) 54b. The 2-4 brake (2-4B) 54 is coupled or locked when the operating pressure is supplied only to the brake apply pressure chamber 54a and is uncoupled or released when the operating pressure is not supplied to the brake apply pressure chamber 54a nor to the brake release pressure chamber 54b, when the operating pressure is supplied to both pressure chambers 54a and 54b, or when the operating pressure is supplied only to the brake release pressure chamber 54a. Each of the remaining friction coupling elements has a single hydraulic pressure chamber and is locked only when operating pressure is supplied to the hydraulic pressure chambers.

Figure 7:
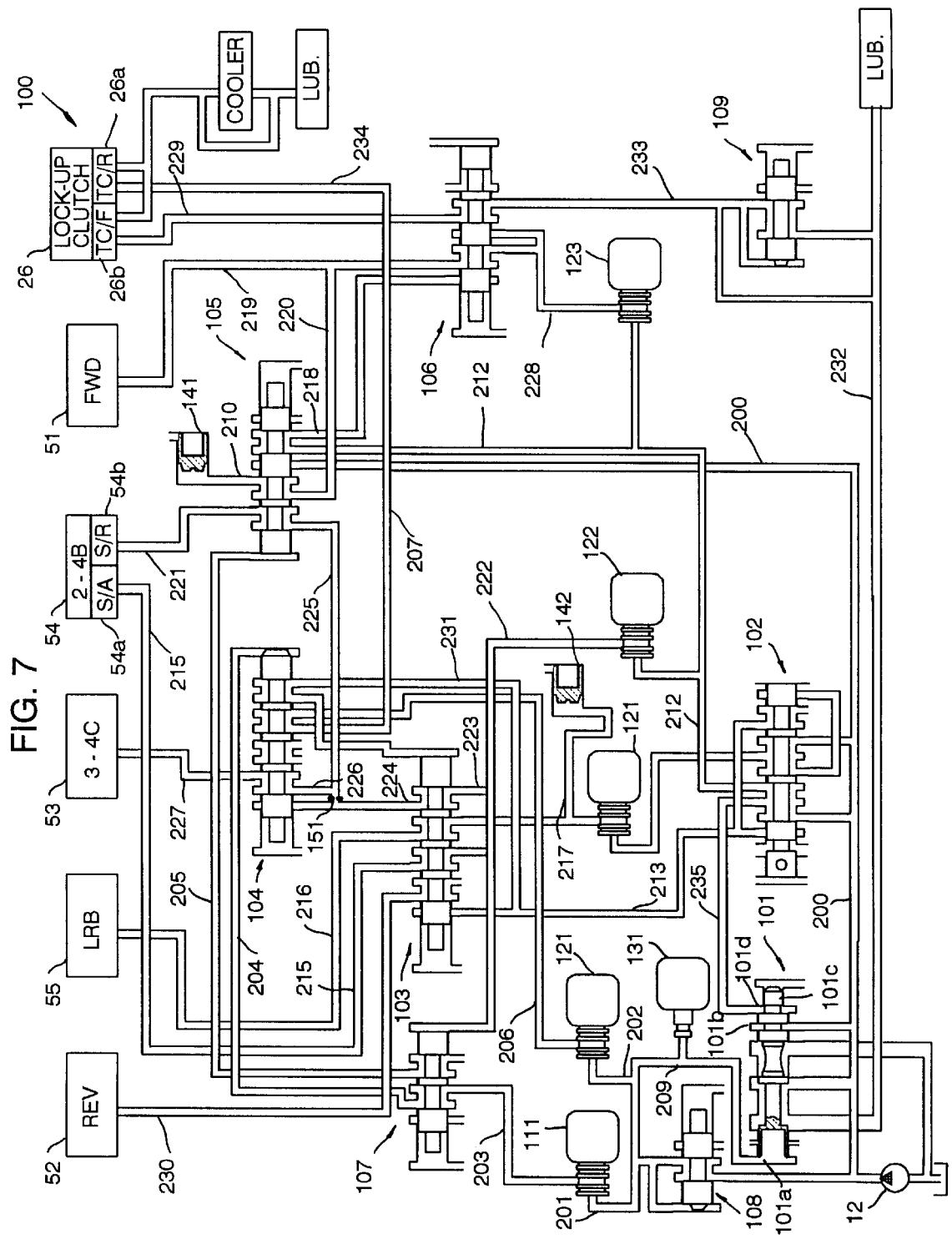
FIG. 7 is a hydraulic circuit of a transmission control system.

(1) Overall Structure:

As shown in FIG. 7, a hydraulic pressure control circuit 100 includes as its essential elements a regulator valve 101 for generating line pressure, a manual shift valve 102 for changing operating ranges of the automatic transmission 10 according to range selections by means of the shift lever, a low-reverse valve 103 for selectively opening and closing oil pressure paths leading to the friction coupling elements 51 55 according to gears selected, a bypass valve 104, a 3-4 shift valve 105 and a lockup control valve 106. The control circuit 100 further includes first and second ON-OFF solenoid valves 111 and 112 (which are hereafter referred to simply as first and second solenoid valves and labeled SV in the drawings for simplicity) for actuating these valves 103 - 106, a solenoid relay valve 107 (which is hereafter referred to simply as a relay valve and labeled SRV in the drawings) for changing destination friction coupling elements to which operating pressure is supplied from the first solenoid valve 1011, and first to third duty solenoid valves 121 - 123 (which are labeled DSV in the drawings) for controlling operating pressure charge or discharge for the first to third duty solenoid valves 121 - 123. These solenoid valves 1011 and 1012 and duty solenoid valves 121 -123 are of a three-way type which provides communication oil passages upstream or downstream therefrom or drains oil from the downstream oil passage. Since the valves shut the upstream oil passages during draining oil from the downstream oil passage, there occurs no drainage of oil from the upstream oil passage with a result of decreasing driving loss of the oil pump 12. Specifically, each of the solenoid valves 111 and 112 opens its downstream oil passage when it is ON. Each of the duty solenoid valves 121 - 123 provides complete communication between the upstream and downstream oil passages when it operates at a duty rate of 0% (which is a ratio of a time for which the valve keeps opened relative to a time of one ON-OFF period) but shuts down the upstream oil passage at a duty rate of 100% so as to drain the oil from the downstream oil passage. At duty rates between 0% and 100%, the duty solenoid valves 121 - 123 develops operating pressure on the downstream side on the basis of operating pressure on the upstream side as an initial pressure.

Regulator valve 101 regulates the pressure of operating oil discharged from the oil pump 12 to develop a predetermined level of line pressure which is delivered to the manual shift valve 102 through a main pressure line 200 and also to a solenoid reducing valve 108 (which is hereafter referred simply to as a reducing valve) and the 3-4 shift valve 105. The line pressure is reduced by the reducing valve 108 to a predetermined level and then, delivered to the first and second solenoid valves 111 and 112 through pressure lines 201 and 202, respectively.

When the first solenoid valve 11 assumes ON, the predetermined level o f operating pressure is further delivered to a relay valve 107 through a pressure line 203. If the relay valve 207 has placed its spool in the right end position as viewed in the figure, the operating pressure at a predetermined level is supplied to the bypass valve 104 at its control port as pilot pressure through a pressure line 204, forcing the spool to the left end position. On the other hand, if the relay valve 107 has placed its spool in the left end position as viewed in the figure, the operating pressure at the predetermined level is supplied to the 3-4 shift valve 105 at its control port as pilot pressure through a pressure line 205, forcing the spool to the right end position. When the second solenoid valve 112 assumes ON, the operating pressure at a predetermined level regulated by the reducing valve 108 is delivered to the bypass valve 104 through a pressure line 206. At this time , if the bypass valve 104 has placed its spool in the right end position as viewed in the figure, the operating pressure at the predetermined level is supplied to the lockup control valve 106 at its control port as a pilot pressure through a pressure line 207, forcing the spool to the left end position. On the other hand, if the bypass valve 104 has placed its spool in the left end position as viewed in the figure, the operating pressure is supplied to the low-reverse shift valve 103 at its control port as a pilot pressure through a pressure line 208, forcing th e spool to the left end position.

Further, the predetermined level of operating pressure from the reducing valve 108 is also delivered to the regulator valve 101 at its regulation port as a through a pressure line 209. In the pressure line 209 there is a linear solenoid valve 131 which regulate the predetermined level of operating pressure according, for instance, to engine load or engine throttle opening. In this way, the line pressure is regulated by the regulator valve 101 according to engine throttle opening. In this instance, the 3-4 shift valve 105 brings the main pressure line 200 into communication with a first accumulator 141 through a pressure line 210 when having placed its spool to the right end position as viewed in the figure.

Line pressure delivered to the manual shift valve 102 through the main pressure line 200 is directed to first and second output pressure lines 211 and 212 in a forward speed range, such as the drive (D) range, the second speed (S) range and the low speed (L) range, to the first and third output pressure lines 211 and 213 in the reverse (R) range, or to the third output pressure line 213 in the neutral (N) range. The first output pressure line 211 leads to the first duty solenoid valve 121 so as to charge the line pressure as control source pressure. The first duty solenoid valve 121 leads at its downstream to the low-reverse valve 103 through a pressure line 214 and further, if the low-reverse valve 103 has placed its spool in the right end position, to the brake apply pressure chamber 54a of the 2-4 brake (2-4B) 54 through a pressure line or brake apply pressure line 215. On the other hand, if the low-reverse valve 103 has placed its spool in the left end position, the first duty solenoid valve 121 leads to the low-reverse brake (LRB) 55 through a pressure line or brake pressure line 216. A pressure line 217 branches of f from the pressure line 214 and leads to a second accumulator 142.

Second output pressure line 212 leads to the second duty solenoid valve 122 and the third duty solenoid valve 123 so as to deliver for them the line pressure as control source pressure. The second output pressure line 212 also leads to the 3-4 shift valve 105. The second output pressure line 212 is connected to the lockup control valve 106 through a pressure line 218 if the 3-4 shift valve 105 has placed its spool in the left end position or to the forward clutch (FWC) 51 through a pressure line or forward clutch pressure line 219 if the 3-4 shift valve 105 has placed its spool in the right end position. A pressure line 220 branching off from the forward clutch pressure line 219 leads to the 3-4 shift valve 105 and is connected to the first accumulator 141 through the pressure line 210 if the 3-4 shift valve 105 has placed its spool in the left end position or to the brake release pressure chamber 54b of the 2-4 brake (2-4B) 54 through a pressure line or brake release pressure line 221 if the 3-4 shift valve 105 has placed its spool in the right end position.

Second duty solenoid valve 122, which receives the control source pressure through the pressure line 212, is connected at its downstream end to the relay valve 107 through a pressure line 222 and delivers a pilot pressure to the relay valve 107 at a control port so as to force the spool toward the left end position. A pressure line 223 branching off from the pressure line 222 leads to the low-reverse valve 103 and further to a pressure line 224 if the low-reverse valve 103 has placed its spool in the right end position. A pressure line 225, which branches off from the pressure line 224 and is provided with an orifice 151 in close proximity to the pressure line 224, leads to the 3-4 shift valve 105. If the 3-4 shift valve 105 has placed its spool in the left end position, the line pressure 225 is connected to the 2-4 brake (2-4B) 54 through the brake release pressure line 221. A pressure line 226, which branches off from the pressure line 225 leads to the bypass valve 104. If the bypass valve 104 has placed its spool in the right end position, the line pressure 226 is connected to the 3-4 clutch (3-4C) 53 through a pressure line or 3-4 clutch pressure line 227. The pressure line 224 further leads directly to the bypass valve 104 so as to be connected to the pressure line 225 through the pressure line 226 if the bypass valve 104 has placed its spool in the left end position. That is, the pressure lines 224 and 225 are brought into communication with each other so as to bypass th e orifice 151. Third duty solenoid valve 123, to which the control source pressure is delivered through the second output pressure line 2132, is connected at its downstream end to the lockup control valve 106 through a pressure line 1128. If the lockup control valve 106 has placed its spool in the right end position, the third duty solenoid valve 123 is connected to the forward clutch pressure line 219. On the other hand, if the lockup control valve 106 has placed its spool in the left end position, the third duty solenoid valve 123 is connected to the lockup clutch (LvC) 26 through the forward clutch pressure line 219.

Third output pressure line 213 extending from the manual shift valve 102 leads to the low-reverse valve 103 so as to deliver the line pressure. If the low-reverse valve 103 has placed its spool in the left end position, the third output pressure line 213 is connected to the reverse clutch (RVC) 52 through a pressure line or reverse clutch pressure line 230. A pressure line 231 branching off from the third output pressure line 213 is connected to the bypass valve 104. This pressure line 231 delivers the line pressure as a pilot pressure to the low-reverse valve 103 through the pressure line 208 if the bypass valve 104 has placed its spool in the right end position so as to cause the low-reverse valve 103 to force its spool to the left end position.

In addition, the hydraulic control circuit 100 is provided with a converter relief valve 109 which regulates operating pressure delivered by the regulator valve 101 through a pressure line 232 to a predetermined level and further supplied the predetermined level of operating pressure to the lockup control valve 106 through the pressure line 233. If the lockup control valve 106 has placed its spool in the right end position, it directs the predetermined level of operating pressure to the rear pressure chamber 26a of the lockup clutch 26 through a pressure line 229. On the other hand, If the lockup control valve 106 has placed its spool in the left end position, it directs the predetermined level of operating pressure to the rear pressure chamber 26b of the lockup clutch 26 through a pressure line 234. The lockup clutch 26 is locks when it receives the predetermined level of operating pressure in the rear pressure chamber 26a and unlocks or is released when receiving in the rear pressure chamber 26b. In this instance, during locking, i.e. when the lockup control valve 106 has placed its spool in the left end position, operating pressure regulated by the third duty solenoid valve 123 is delivered to the rear pressure chamber 26b, controlling the amount of slippage according to the operating pressure in the rear pressure chamber 2vb.

(2) Regulator Valve Structure

In the hydraulic control circuit 100, while the line pressure is controlled according, for instance, to engine throttle opening, it is intensified in the reverse (R) range rather than in the drive (D) range, the second speed (S) range, the slow speed (L) range and the neutral (N) range for purposes o f increasing the amount of input torque which is need to be large in the reverse range owing to a high reduction ratio.

Figure 8:
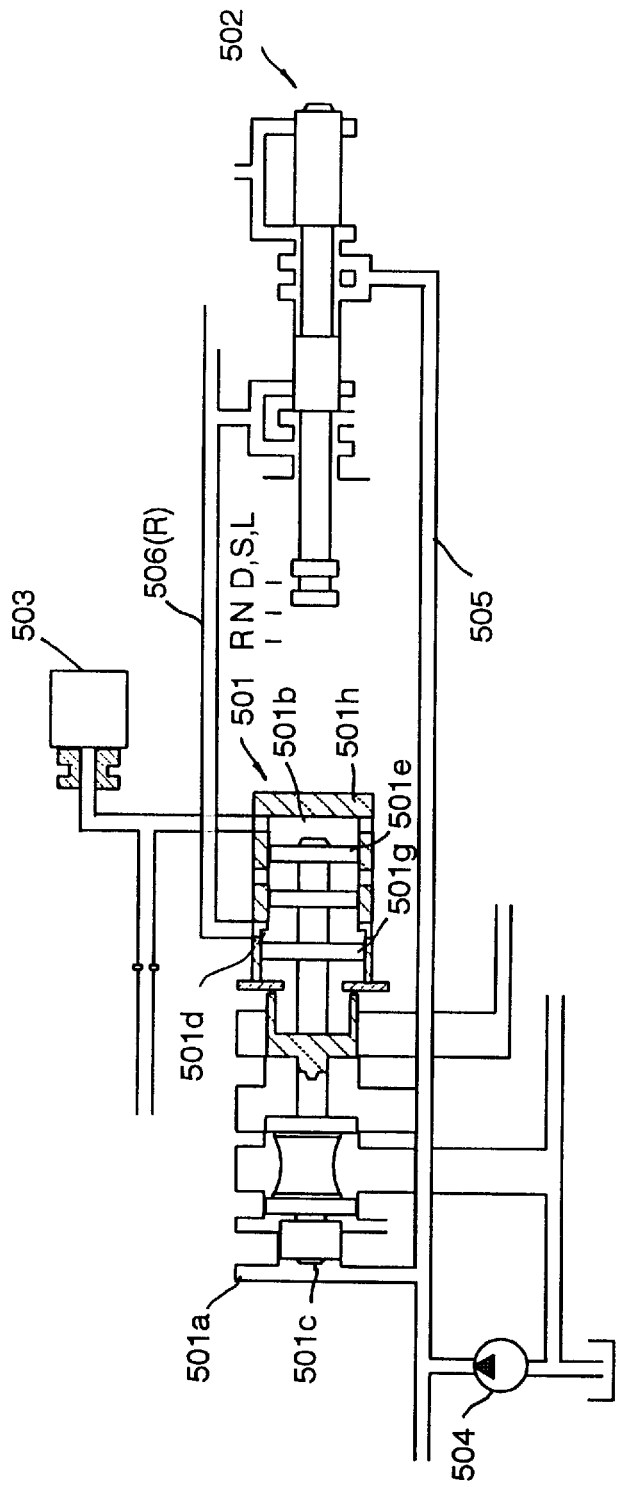
FIG. 8 is an enlarged view of a conventional regulator valve.

In order to achieve the intensification of line pressure, as shown in FIG. 8, the utilization is conventionally made of, for instance, a combination of a regulator valve 501 and 502 and a manual valve as taught by Japanese Unexamined Patent Publication No. 5-71630.

Regulator valve 501 shown in the Japanese Unexamined Patent Publication No. 5-71630 has , at its one end, a feedback port 501a to which line pressure discharged from an oil pump 504 is supplied through a main pressure line 505 and, at the opposite end, a control port 501b to which control pressure is supplied from a linear solenoid valve 503. The regulator valve 501 shifts its spool 501c to a reducing position (the right end position as viewed in the figure) with pressure supplied thereto through the feedback port 501a and an intensifying position (the right end position as viewed in the figure) with pressure supplied thereto through the control port 50b. At these positions, the regulator valve 501 regulates the line pressure according to the control pressure from the linear solenoid valve 503. The regulator valve 501 further has an intensifying port 501d th rough which a pressure line 506 is brought into communication with the main pressure line 505 when the manual valve 502 is placed in the reverse (R) range. The line pressure supplied to the intensifying port 501d from the manual valve 502 in the reverse (R) range forces the spool 501c toward the intensifying position with a result of being intensified in pressure level in the reverse (R) range. In order to balance the pressure between the feedback port and control port in each range other than the reverse (R) where the line pressure is not supplied to intensifying port 501d the control port 501b to which the line pressure having been reduced is supplied as control pressure must have a pressure receiving area larger than the feedback port 501a to which the line pressure is directly supplied. For this purpose, the regulator valve 501 and its spool 501c are structured such that the valve bore and spool land 501e on the side of control port 501b has a diameter larger than the valve bore and spool land 501f on the side of feedback port 501a. The pressure at the intensifying port 501d, as well as at the control port 501b, forces the spool 501c in the same direction toward the intensifying position. This necessity for this type of spool 501c is to have a spool land 501d larger in diameter than the spool land 501e on one side of the spool land 501e remote from the control port 501b. Since the spool land 501e at the control port 501b is larger in diameter than the spool land 501f a t the feed back port 501a, the spool 501 is formed with an intermediate spool land 501g having the largest diameter between the spool ports 501e and 501f. The largest intermediate spool land 501g is needed even these control and intensifying ports 501b and 501d are replaced in position with each other. This intermediate spool port 501g makes the valve body to have a bore section between smaller bore sections at opposite sides. For this reason, it is necessary to form the valve body by two parts, one of which comprises a sleeve-like cylindrical member 501h inserted into the main valve body. Owing to this structure, the spool must be divide d into two parts as shown in FIG. 8. This increases the number of parts and the number of assembling steps necessary for the regulator valve 501 to be assembled and makes the regulator valve 501 long in axial length.

Figure 9:
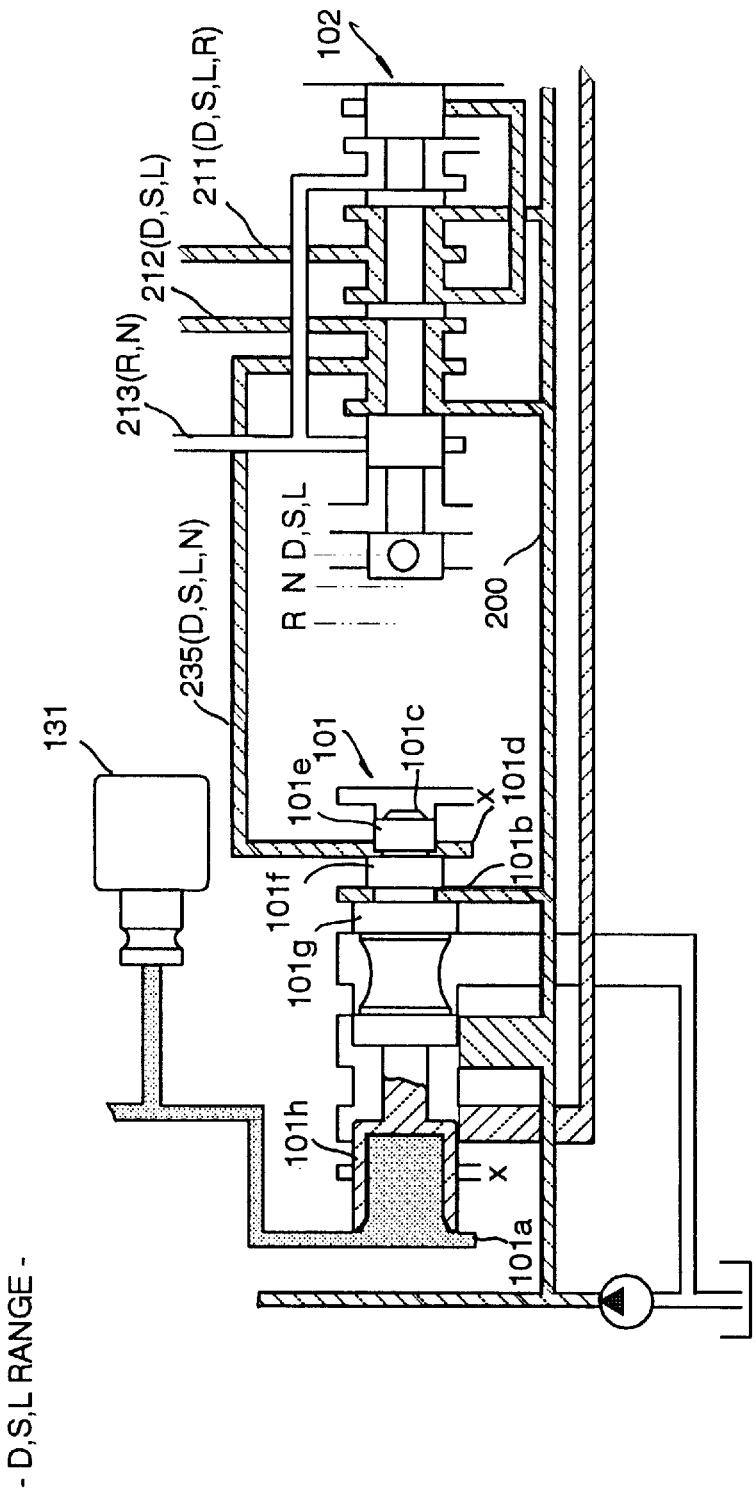
FIG. 9 is an enlarged view of essential part of the hydraulic control circuit of FIG. 7 in a drive range.
Figure 10:
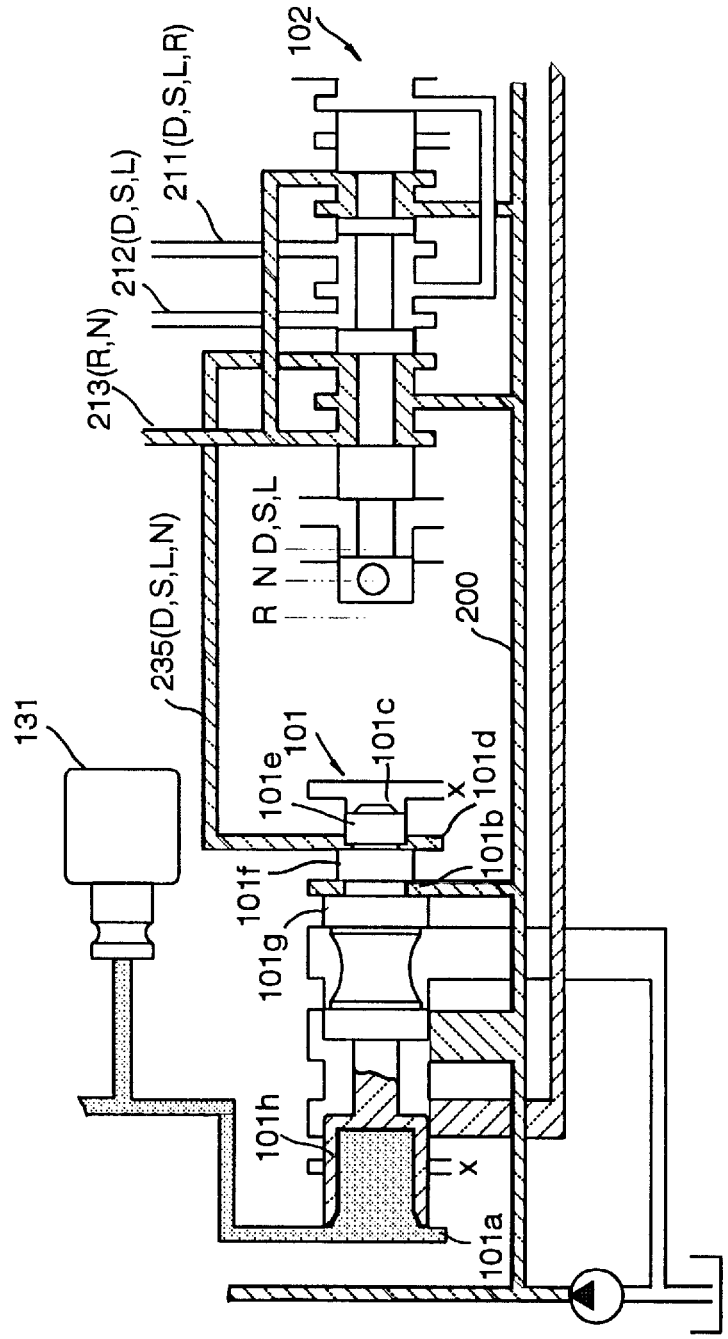
FIG. 10 is an enlarged view of the essential part of the hydraulic control circuit of FIG. 7 in a neutral range.
Figure 11:
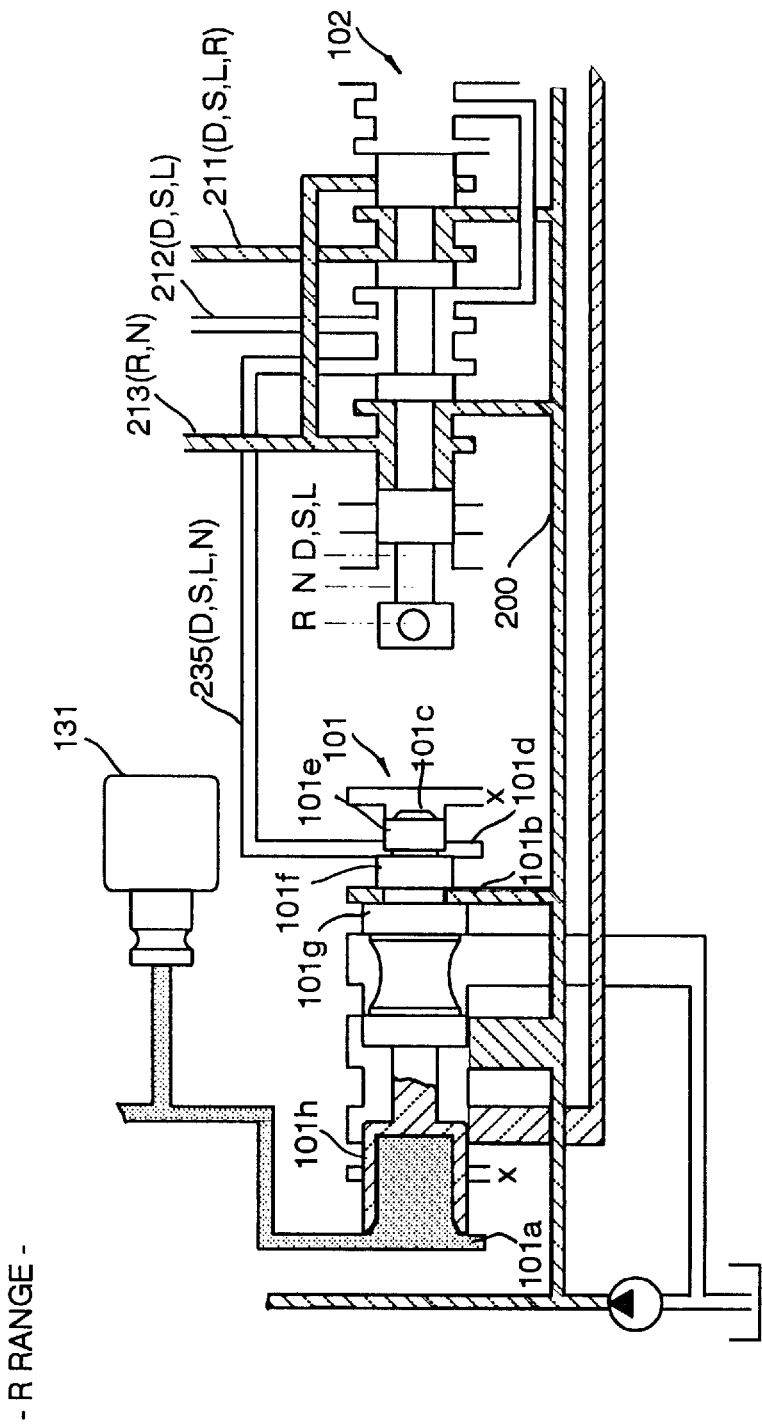
FIG. 11 is an enlarged view of the essential part of the hydraulic control circuit of FIG. 7 in a reverse range.

In order to avoid the problems that the conventional regulator valve encounters, the regulator valve 101 used in the hydraulic control circuit 100 incorporated in the automatic transmission control system of the invention is structured as shown in FIGS. 9 through 11.

Referring to FIGS. 9 through 11, the regulator valve 101 is formed at its one end with a control port 101a to which control pressure is supplied to force a spool 101c toward an intensifying position (the right end position as viewed in FIGS. 8–11) and at the opposite end with a feedback port 101b to which the line pressure is supplied through the main pressure line 200 to force a spool 101c toward a reducing position (the left end position as viewed in FIGS. 8–11). Further, the regulator valve 101 is formed with a reducing port 101d adjacent to the feedback port 101b for introducing pressure into the regulator valve 101 from the manual shift valve 102 through a line pressure 235 when any one of the drive (D), second speed(S) low speed(L) and neutral (N) ranges is selected so as to force the spool 501c toward the reducing position.

With the regulator valve 101 thus structured, the line pressure is introduced into the valve through the reducing port 101d through the pressure line 235 from the main pressure line 200 via the manual shift valve 102 in each of the drive (D), second speed(S), low speed(L) and neutral (N) ranges as shown in FIG. 10 and 11. The line pressure at both reducing port 101d and feedback port 101b confronts the control pressure at control port 101a in the regulator valve 101. Accordingly, the line pressure regulated by the regulator valve 101 is lowered in level by the pressure introduced at the reducing port 101d. In the reverse range, as shown in FIG. 11, the manual valve 101 disconnects the communication of the pressure line 235 with the main pressure line 200 and, as a result, only the line pressure at the feedback port 101b confronts the control pressure at control port 101a in the regulator valve 101 without the effect of pressure reduction. In this manner, the line pressure attains a level higher in the reverse (R) range than in each of the drive (D), second speed(S(, low speed(L) and neutral (N) ranges.

As described above, in the hydraulic control circuit 100, the line pressure is reduced in a range other than the reverse (R) range in place of being intensified in the reverse (R) range, resulting in that a higher level of line pressure is provided in the reverse (R) range with an effect of increased toque transmission.

The regulator valve 101 thus structured enables the pressure introduced at the reducing port 101d to act on the spool 101c in a direction in which the pressure introduced at the feedback port 101d, which is smaller in pressure receiving area than the reducing port 101d, to act on the spool 101c, which eliminates the problems about the numbers of parts and assembling steps and the size. Specifically, although the regulator valve 101, whose reducing and feedback ports 101b and 101d are formed so as to direct pressure in the same direction, has the necessity for an intermediate spool land 101g larger in diameter than and between the opposite end spool lands 101e and 101f, since the regulator valve 101 has a pressure receiving area larger at one end where the control port 101a is formed than the opposite end where the feedback port 101b and reducing port 101d are formed, the largest spool land 101h can be located at the end where the control port 101a is formed. Resultingly, the regulator valve 101 is formed with bore sections gradually decreasing in diameter from one end to the other end, which eliminates the necessity of a sleeve member and dividing the spool into two parts, resulting in a reduced numbers of parts and assembling steps and a shortened overall length of the valve body.

(3) Hydraulic Circuit Operation

Figure 12:
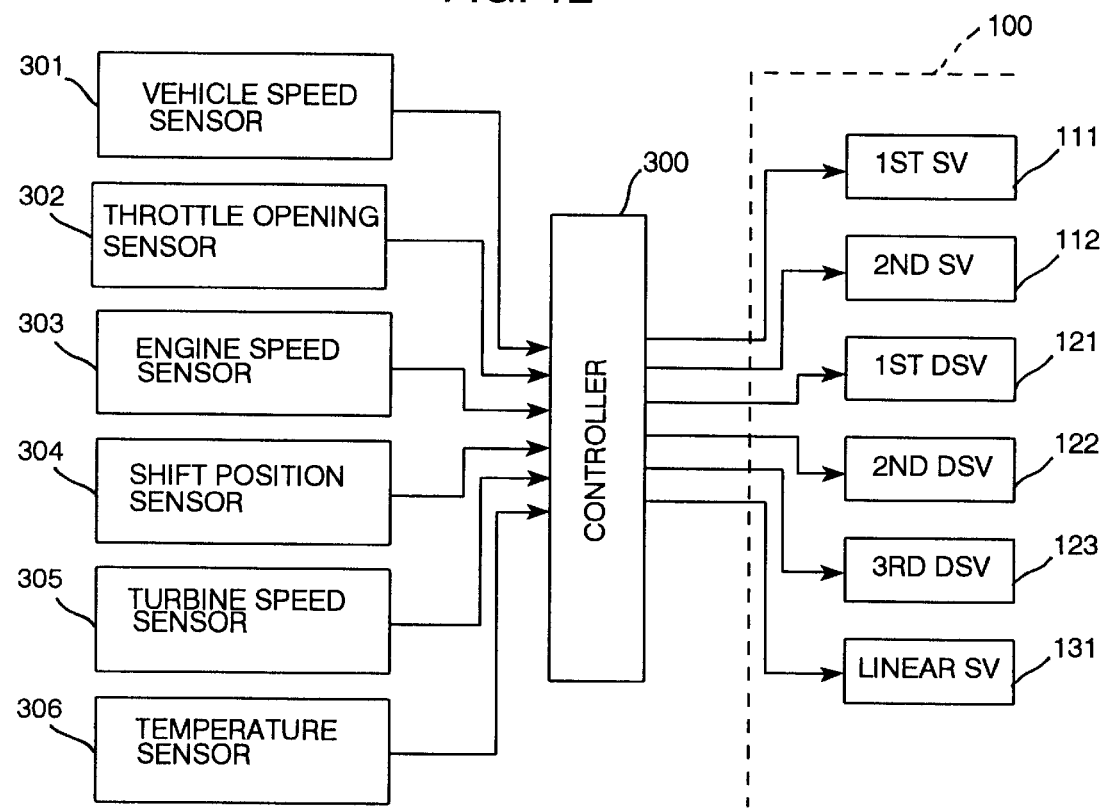
FIG. 12 is a block diagram showing a control system for valves in the hydraulic control circuit of FIG. 7.

As shown in FIG. 12(A), the hydraulic control circuit 100 cooperates with a controller 300 for controlling operation of the solenoid valves 11 and 112, the duty solenoid valves 121 - 123, and the linear solenoid valve 131. The controller 300 receives various control signals, such as a signal representative of a vehicle speed from a speed sensor 301, a signal representative of engine throttle opening as an engine load from a throttle opening sensor 302, a signal representative of an engine speed of rotation from a speed sensor 303, a signal representative of a shift position or range selected through the shift lever from a position sensor 304, a signal representative of a speed of rotation of turbine 23 of the torque converter 20 from a speed sensor 305, and a signal representative of a temperature of hydraulic oil in the hydraulic control circuit 100 from a temperature sensor 306.

Solenoid valves 111, 112 and 121 - 123 operate in various patterns in the respective gears as shown in FIG. 3(B). In the Table II in FIG. 3(B), it is to be noted that a circle in parentheses indicates a state, such as an ON or activated state of each solenoid valve 111, 112, and an OFF or deactivated state of each duty solenoid valve 121 - 123, where pressure lines upstream and downstream from the related valve are brought into communication with each other to allow operating pressure to pass there through, and that a cross or X in parentheses indicates a state, such as the OFF or deactivated state of each solenoid valve 111 - 112 and the ON or activated state of each duty solenoid valve 121 - 123, where the pressure line upstream from the related valve is shut off and the pressure line downstream from the related valve is drained.

1st Gear

Figure 13:
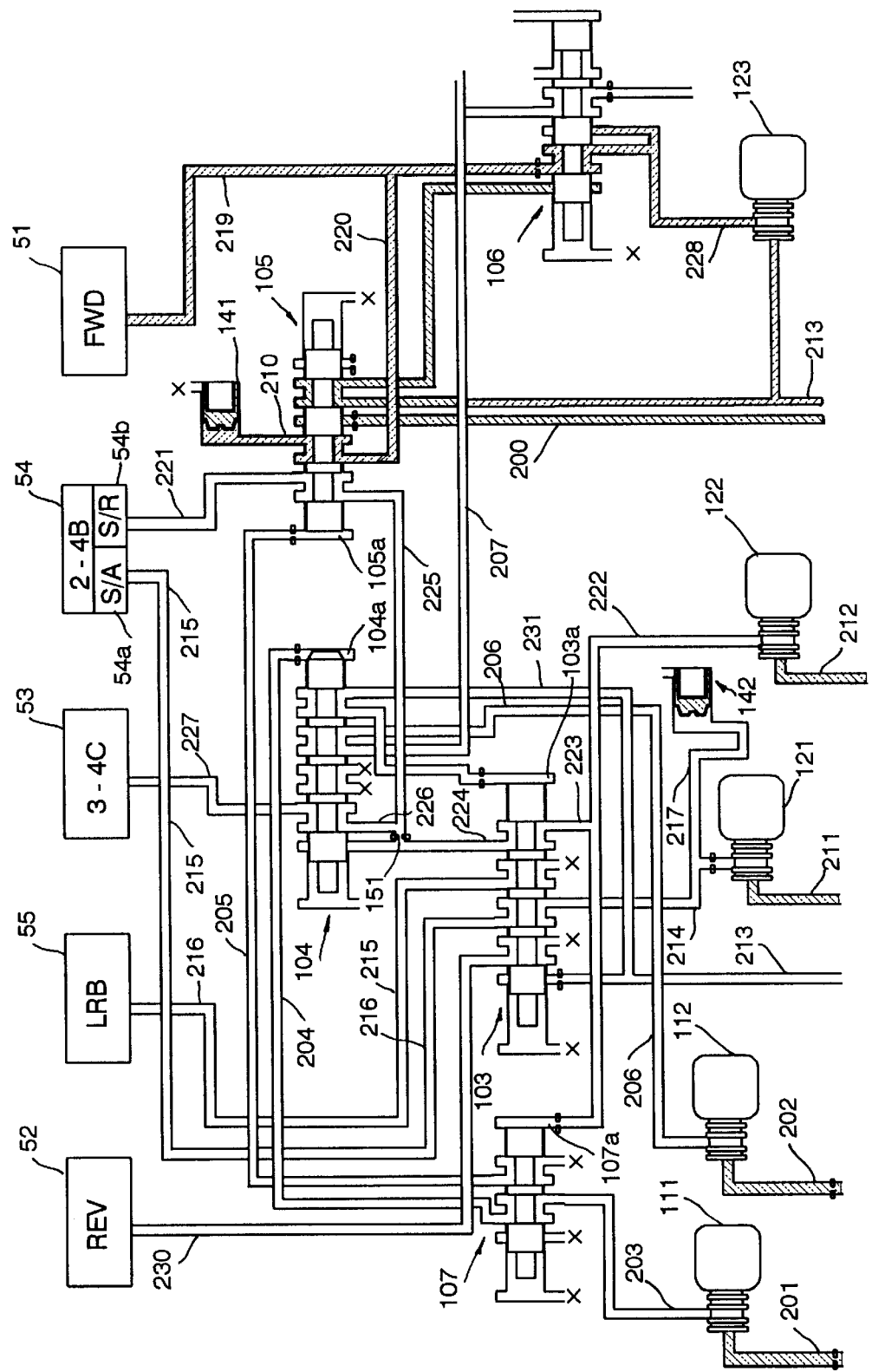
FIG. 13 is an enlarged view of essential part of the hydraulic control circuit of FIG. 7 which is in a first gear.

As shown in FIGS. 12(B) and 13, in the first (1st) gear in the forward range excepting the low-speed (L) range, only the third duty solenoid valve 123 is activated or assumes ON state, making the line pressure in the second output pressure line 212 available as source pressure and directing it to the lockup control valve 106 through the pressure line 228. When the lockup control valve 106 has placed its spool in the right end position as viewed in the figure, it directs the operating pressure as coupling pressure to the forward clutch (FWC) 51 through the forward clutch pressure line 219 so as thereby to lock the forward clutch (FWC) 51. At this time, the first accumulator 141, in communication with the 3-4 shift valve 105 to which a pressure line 220 branching off from the pressure line 219 and the pressure line 210 leads, delivers the coupling pressure gradually to the forward clutch (FWC) 51.

2nd Gear

Figure 14:
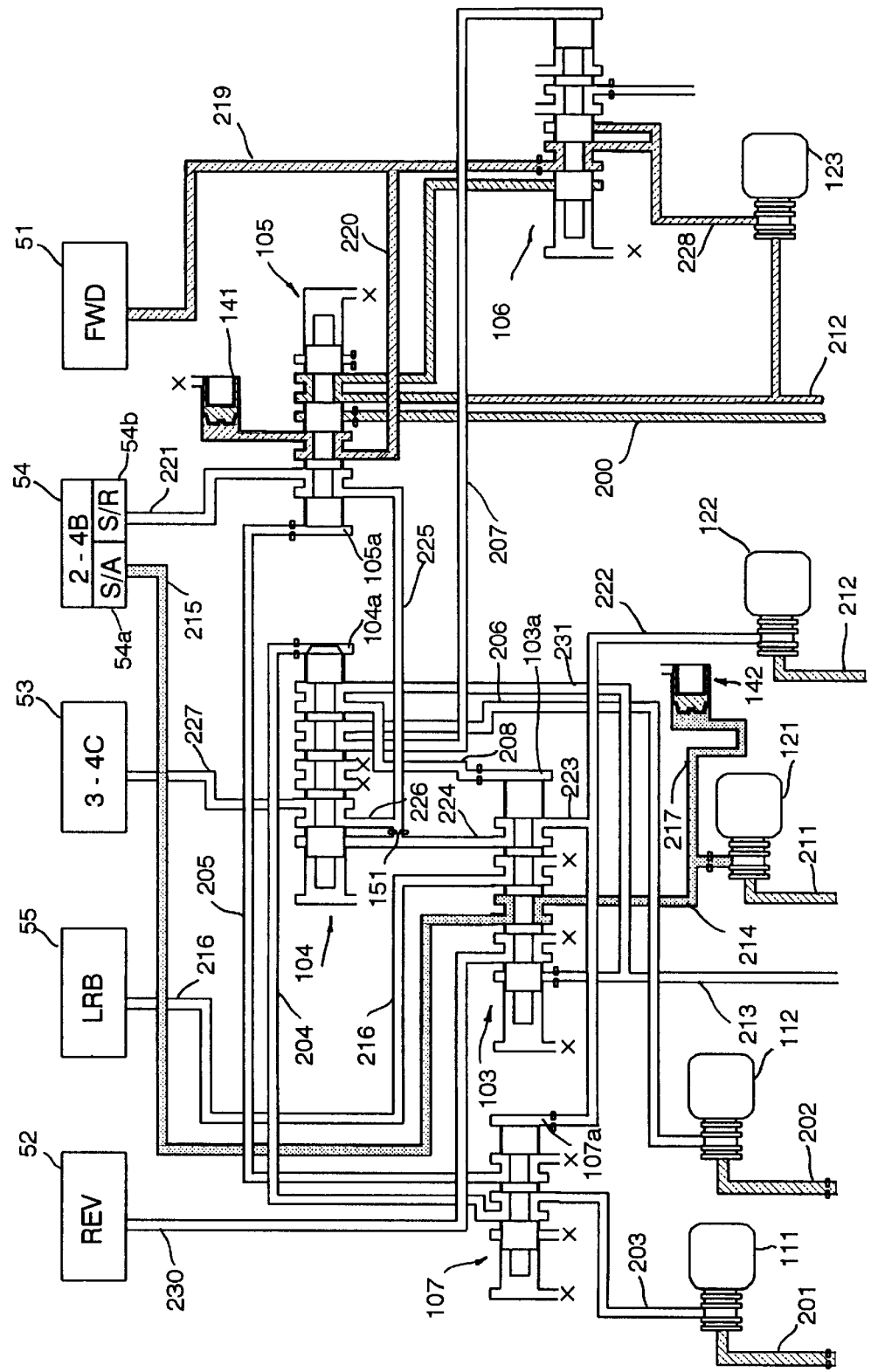
FIG. 14 is an enlarged view of the essential part of the hydraulic control circuit of FIG. 7 which is in a second gear.

As shown in FIGS. 12(B) and 14, in the second (2nd) gear, the first duty solenoid valve 121, in addition to the third duty solenoid valve 123, is activated or assumes ON state in the forward range excepting the low-speed (L) range, making the line pressure in the first output pressure line 211 available as source pressure and directing it to the low-reverse valve 103 through the pressure line 214. Since the row-reverse valve 103 has placed its spool in the right end position as viewed in the figure, it directs the operating pressure as a brake applying pressure to the brake apply pressure chamber 54a of the 2-4 brake (2-4B) 54 through the brake apply pressure line 215. As a result, the 2-4 brake (2-4B) 54, in addition to the forward clutch (FWC) 51, is locked. The second accumulator 142 causes locking the 2-4 brake (2-4B) 54 gently. Operating pressure accumulated temporarily in the second accumulator 142 is delivered to and pre-charged in the low-reverse brake (LRB) 55 when the low-reverse valve 102 shifts its spool to the left end position upon an output of a shift to the 1st (1st) gear in the low-speed (L) range as will be described later.

3rd Gear

Figure 15:
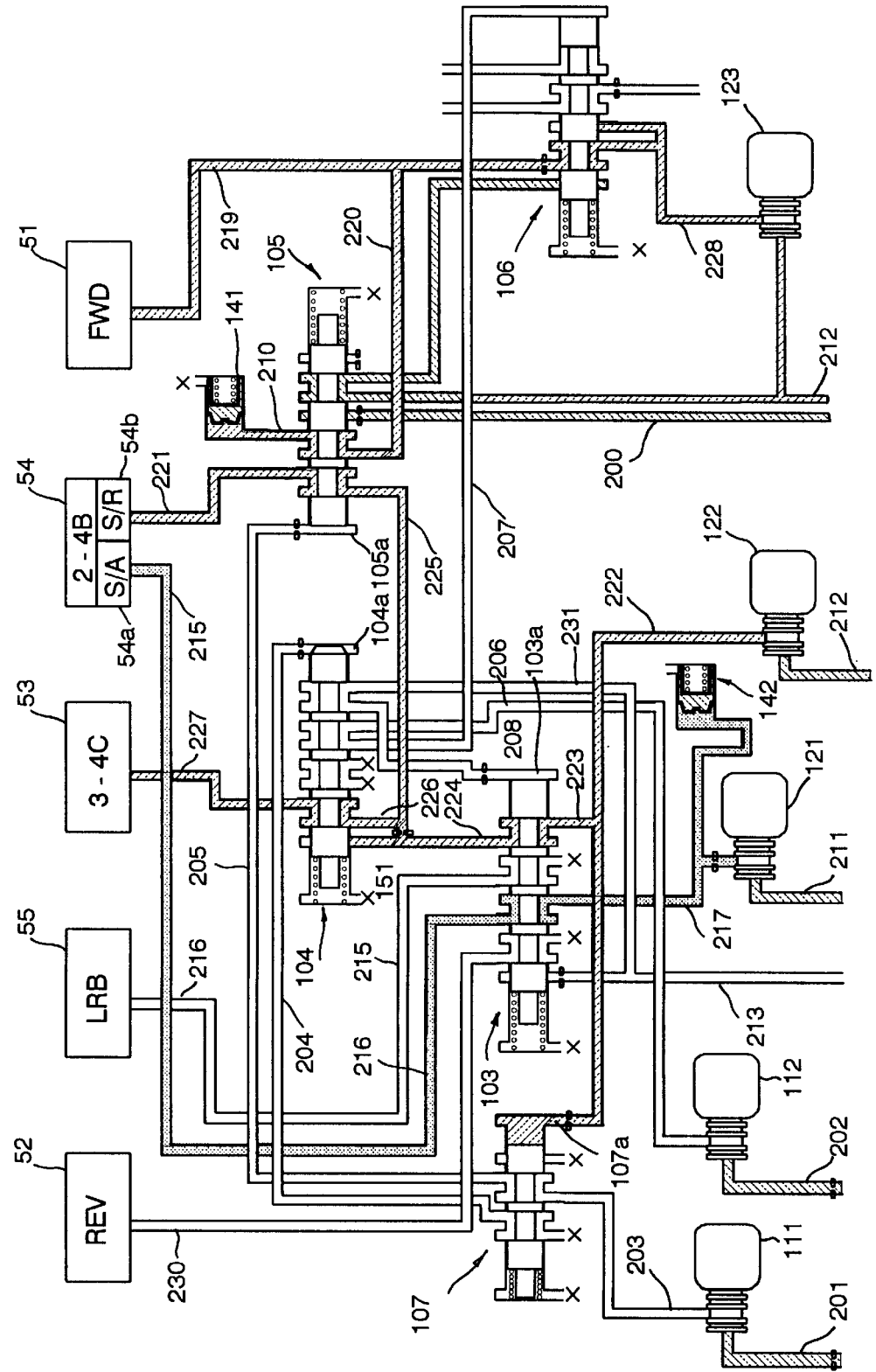
FIG. 15 is an enlarged view of the essential part of the hydraulic control circuit of FIG. 7 which is in a third gear.

As shown in FIGS. 12(B) and 15, in the third (3rd) gear, the second duty solenoid valve 122, in addition to the first and third duty solenoid valves 1121 and 1023, is activated or assumes ON state, making the line pressure in the second output pressure line 212 available as source pressure and directing it to the low-reverse valve 103 through the pressure line 222 via the pressure line 223. AT this time, the row-reverse valve 103 has placed its spool in the right end position as viewed in the figure, and it directs the operating pressure to the pressure line 224. On the other hand, the operating pressure from the second duty solenoid valve 122 is directed to the pressure line 225 through the pressure lines 222 and 224 via the orifice 151. Since, at this time, the 3-4 shift valve 107 has placed its spool in the left end position, the operating pressure is supplied as brake releasing pressure to the brake release pressure chamber 54b of the 2-4 brake (2-4B) 54 through the brake release pressure line 221, releasing or uncoupling the 2-4 brake (2-4B) 54. The pressure line 226, branching off from the pressure line 225 after the orifice 151, directs the operating pressure to the bypass valve 104 which allows the operating pressure to pass therethrough and reach the 3-4 clutch (3-4C) 53 through the 3-4 clutch pressure line 227. In such a way, selecting the third (3rd) gear causes, on one hand, the forward clutch (FWC) 51 and the 3-4 clutch (3-4C) 53 to be locked and, on the other hand, the 2-4 brake (2-4B) 54 to be unlocked. In the third (3rd) gear, the second duty solenoid valve 122 delivers the operating pressure to the relay valve 107 at the control port 107a, forcing the spool of the relay valve 107 to the left end position.

4th Gear

Figure 16:
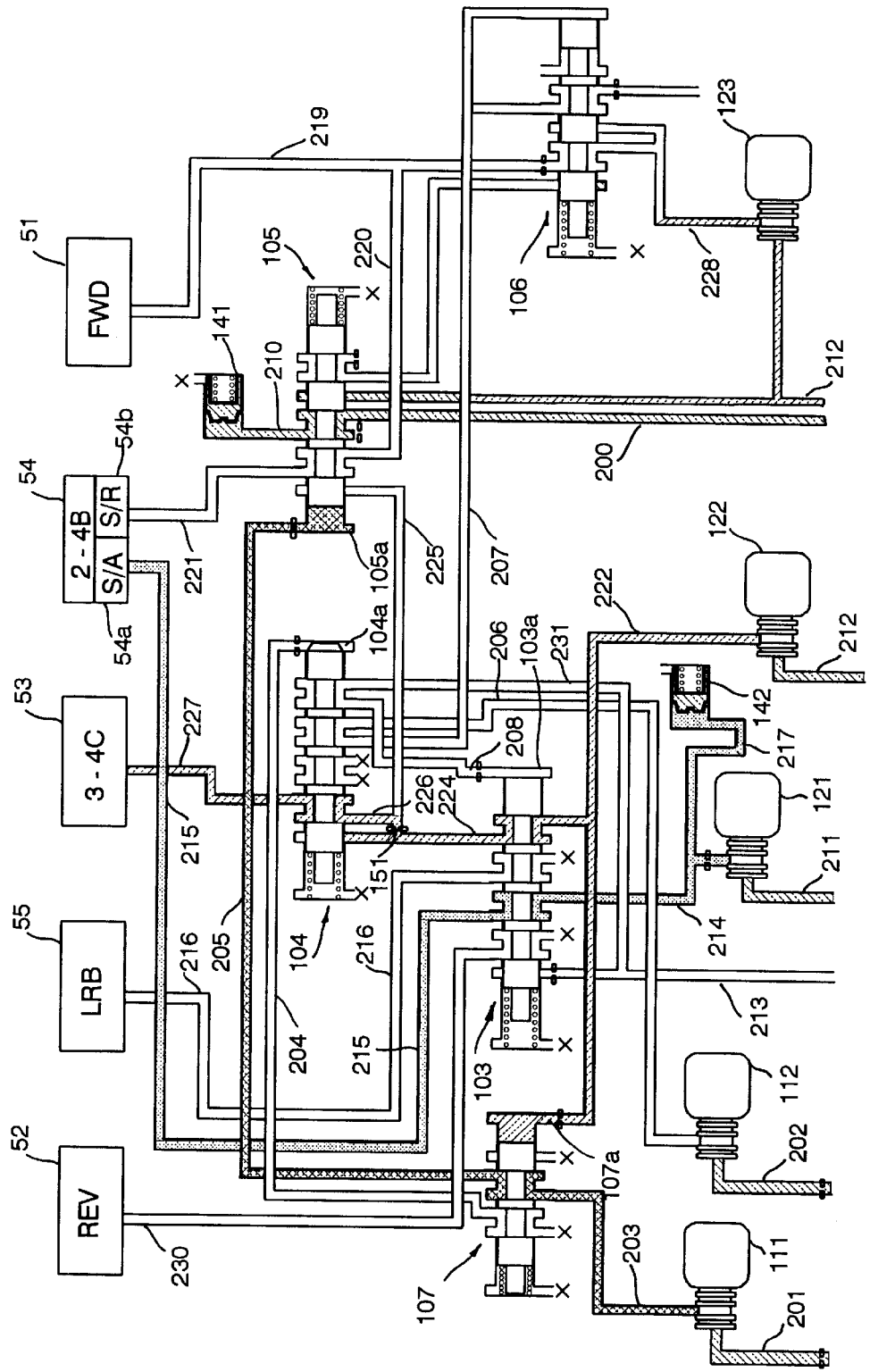
FIG. 16 is an enlarged view of the essential part of the hydraulic control circuit of FIG. 7 which is in a forth gear.

As shown in FIGS. 12(B) and 16, while the first and second duty solenoid valves 121 and 122 assume ON state, the third duty solenoid valve 123 is deactivated or assumes OFF state and the first solenoid valve 111 is activated or assumes ON state. When the first solenoid valve 111 is activated, the predetermined level of operating pressure in the pressure line 201 is directed to the relay valve 107 through the pressure line 203. Since the relay valve 107 has placed its spool in the left end position upon an output of a shift to the third (3rd) gear, the predetermined level of operating pressure passes therethrough and is directed to the control port 105a of the 3-4 shift valve and through the pressure line 205, so as thereby to force it to shift its spool to the right end position. Then, the 3-4 shift valve 105 brings the pressure line 220 branching off from the forward clutch pressure line 219 into communication with the brake release pressure line 221, providing communication between the forward clutch (FWC) 51 with the brake release pressure chamber 54b of the 2-4 brake (2-4B) 54. By means of deactivating the third duty solenoid valve 123 to shut down the operating pressure and drain the pressure line downstream therefrom, both forward clutch (FWC) 51 and 2-4 brake (2-4B) 54 are drained through the lockup control valve 106 and the pressure line 228. In the way, while the forward clutch (FWC) 5 4 is unlocked, the 2-4 brake (2-4B) 54 is locked again.

1st Gear In Low-Speed Range

Figure 17:
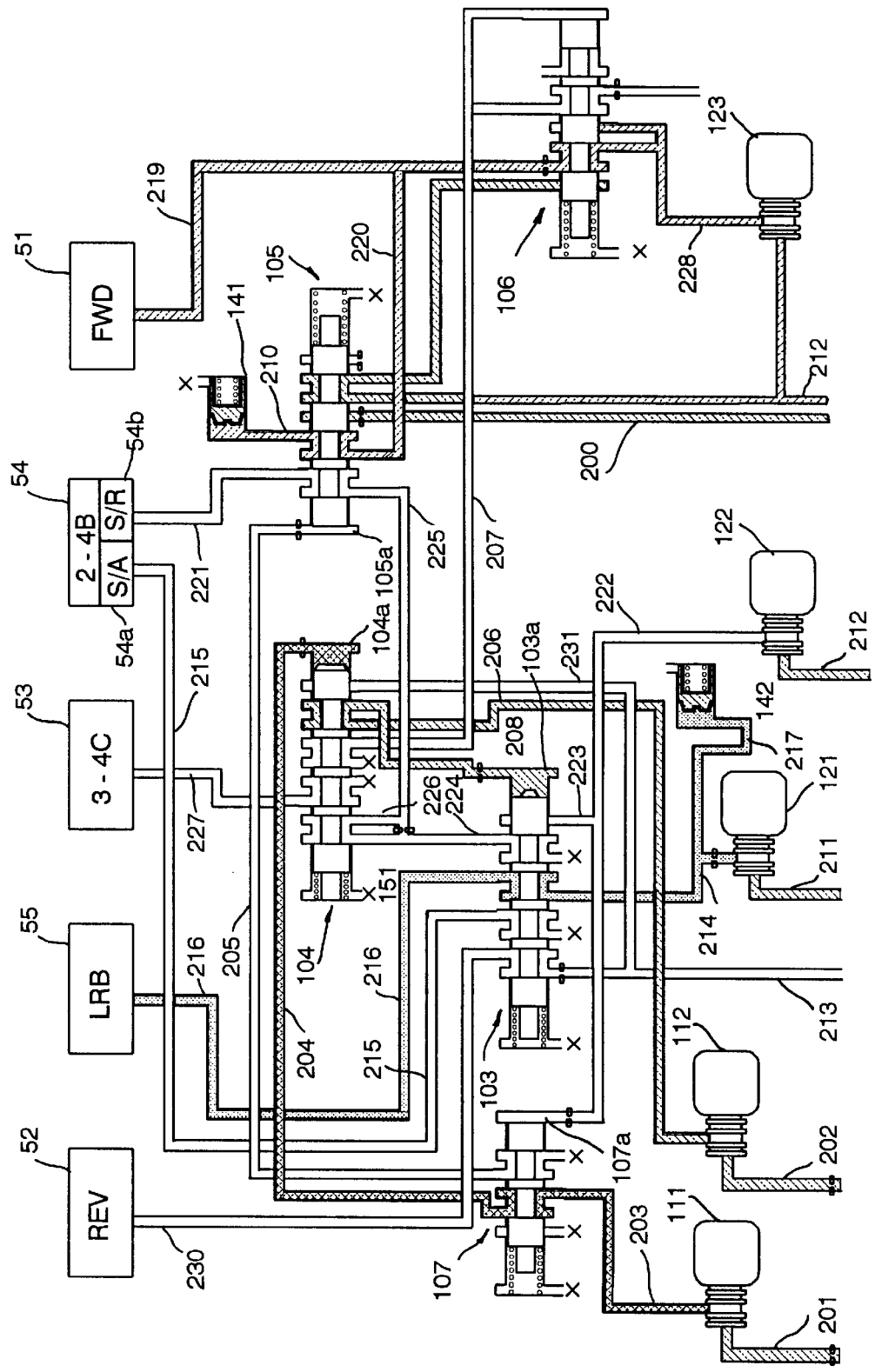
FIG. 17 is an enlarged view of the essential part of the hydraulic control circuit of FIG. 7 which is in the first gear in a low speed range.

As shown in FIGS. 12(B) and 17, when the first (1st) gear is selected in the low speed (L) range, the firs t and second solenoid valves 111 and 112 and the first and third duty solenoid valves 121 and 123 are activated or assume ON states. The operating pressure regulated by the third duty solenoid valve 1b23 is directed as forward clutch locking pressure to the forward clutch (FWC) 51 through pressure lines 228 and 219 via the lockup control valve 106 in the same way as selecting the first (1st) gear in the drive (D) range, locking the forward clutch (FWC) 51. At this time, the operating pressure is introduced into the first accumulator 141 through the pressure lines 210 and 220 via the 3-4 shift valve 105, locking the forward clutch (FWC) 51 gently likely in the drive (D) range.

When the first solenoid valve 111 is activated, the pilot pressure is delivered to the control port 104a of the bypass valve 104 through the pressure lines 203 and 204, forcing the bypass valve 104 to shift the spool to the left end position. The bypass valve 104 allows the operating pressure from the second solenoid valve 112 to pass therethrough and is directed to the low-reverse valve 103 through the pressure line 208, so as thereby to cause the low-reverse valve 103 to shift its spool to the left end position. Eventually, the operating pressure from the first duty solenoid valve 121 is delivered as low-reverse braking pressure to the low-reverse brake (LRB) 55 through the pressure line 216 via the low-reverse valve 103, locking the low-reverse brake (LRB) 55 as well as the forward clutch (FWC) 51. This creates the first (1st) gear with an effect of engine braking.

Reverse Gear

Figure 18:
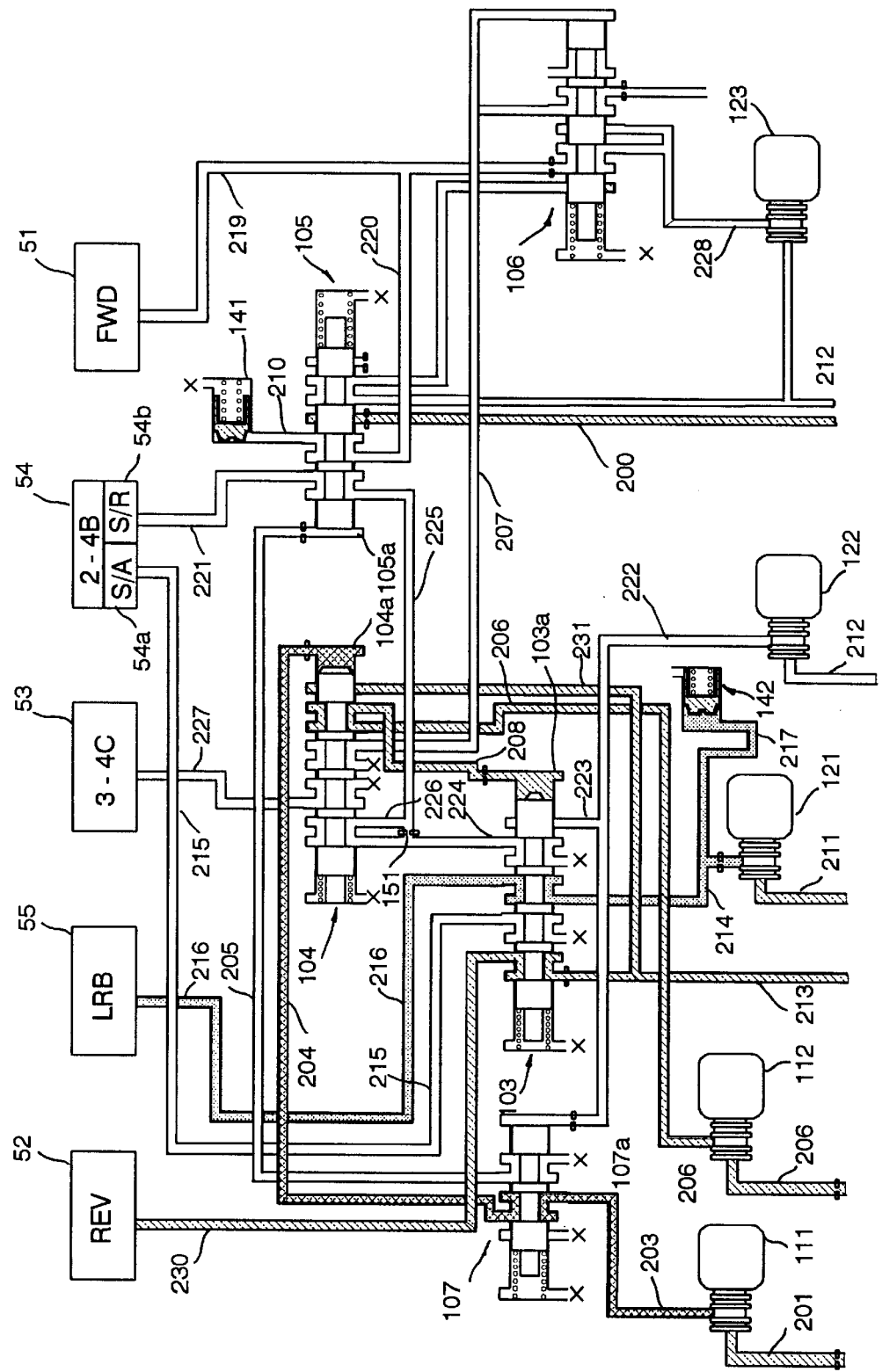
FIG. 18 is an enlarged view of the essential part of the hydraulic control circuit of FIG. 7 which is in a reverse gear.

As shown in FIGS. 12(B) and 18, when the reverse gear is selected, while all of the solenoid valves 111 and 112 and 121 - 123 are activated, there is however no line pressure from the second output pressure line 212 in the reverse (R) range, the second and third duty solenoid valves 122 and 123 do not develop any operating pressure. In the reverse (R) range, the first to third duty solenoid valves 121 - 123 are activated and, as a result, causes the bypass valve 104 and the low-reverse valve 103 to shift their spools to their left end positions likely in the first gear in the low-speed (L) range. In such a state, the first duty solenoid valve 121 develops operating pressure and delivers it as braking pressure to the low-reverse brake (LRB) 55. Together, in the reverse (R) range, the manual shift valve 102 introduces the line pressure into the third output pressure line 213 and delivers it to the reverse clutch (RVC) 52 through the pressure line 230 via the low-reverse valve 103 with the spool placed in the left end position. In this way, the reverse clutch (RVC) 52 and the low-reverse brake (LRB) 55 are simultaneously locked. In this instance, since the line pressure is introduced into the third output pressure line 213 via the manual shift valve 102 even in the neutral (N) range, the reverse clutch (RVC) 52 is locked even in the neutral (N) range if the low-reverse valve 103 has placed its spool in the left end position.

Reverse Gear in Fail Safe Mode

The hydraulic control circuit 100 is typically equipped with a fail-safe feature that, in an event where either one of the solenoid valves 111 and 112 falls into an inoperative condition due, for instance, to electrical breakdowns, the hydraulic control circuit 100 detects the breakdown and deactivates another solenoid valve so as to allow the reverse gear to be available. For example, if the second solenoid valve 112 becomes inoperative, the pilot pressure is not delivered to the low-reverse valve 103 through the pressure lines 206 and 208 via the bypass valve 104, so as to allow the low-reverse valve 1103 to shift the spool to the right end position, thereby disconnecting communication not only between the third output pressure line 213 and reverse clutch pressure line 230 but also between the first duty solenoid valve 121 and low reverse pressure line 216. This makes the reverse gear unavailable. In such an event, the controller 300 detects the breakage based, for instance, on the fact that a predetermined gear reduction rate is not obtained in the reverse range, and accordingly provides a signal to the first solenoid valve 111 for deactivation.

Figure 19:
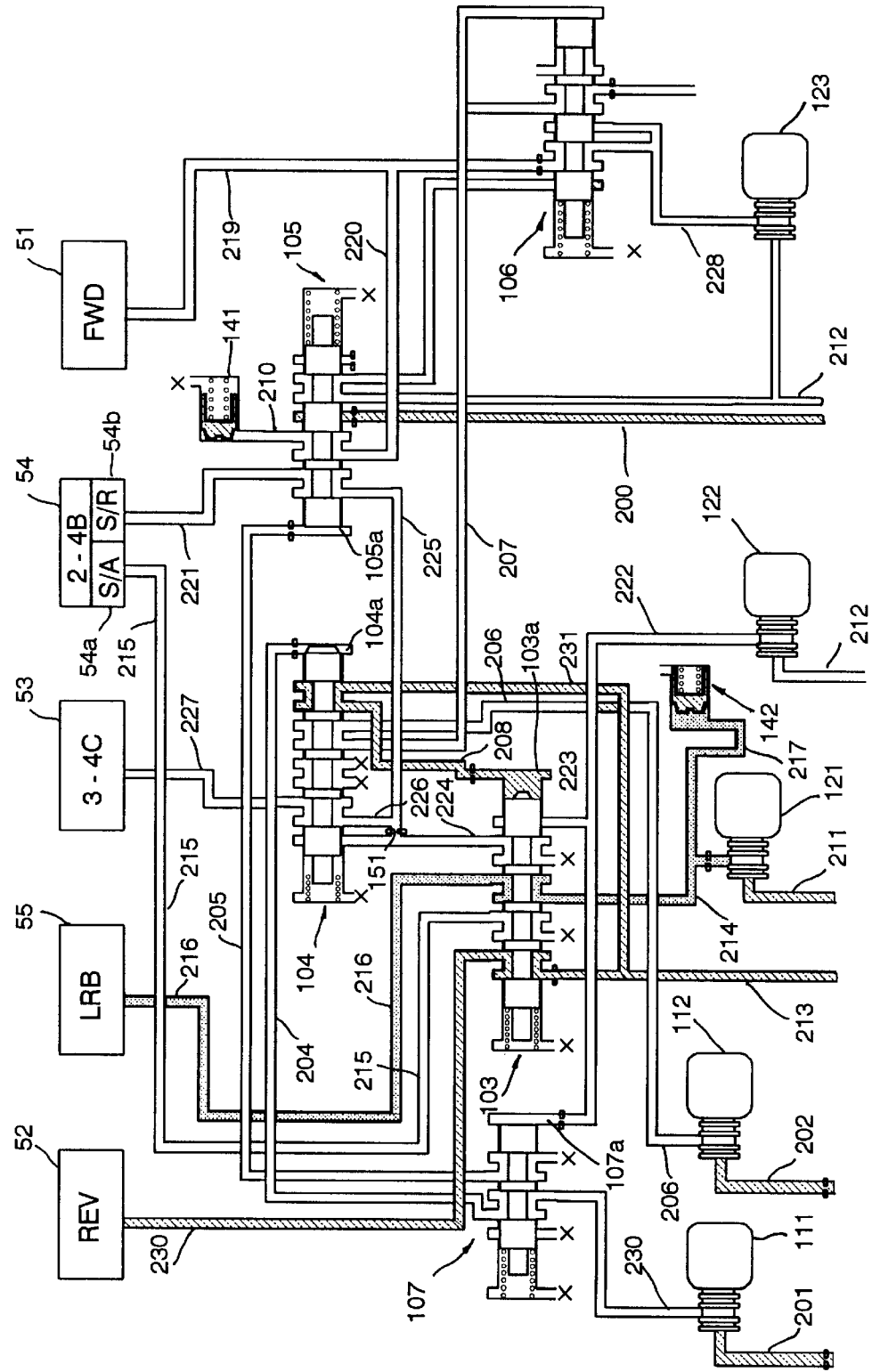
FIG. 19 is an enlarged view of the essential part of the hydraulic control circuit of Figure which is in the reverse gear in a fail-safe mode.

Resultingly, as shown in FIG. 19, when such a signal is provided and deactivates the first solenoid valve 111, the bypass valve 104 shifts the spool to the right end position as a result of disconnection of charge of the pilot pressure to the control port 104a, which is accompanied by connecting communication between the pressure line 231 branching off from the third output pressure line 213 and the pressure line 208 and directing the line pressure as pilot pressure to the low-reverse valve 103 at the control port 103a. Consequently, the low-reverse valve 103 forces the spool to the left end position, so as to bring the third output pressure line 213 and the first duty solenoid valve 1021 into communication with the reverse clutch pressure line 230 and the low-reverse pressure line 216, respectively, thereby causing both reverse clutch (RVC) 52 and low-reverse brake (LRB) 55 to lock and creating the reverse gear.

Since the reverse gear is created by deactivating both first and second solenoid valve 111 and 112, if the first solenoid valve 111 falls into inoperative conditions due, for instance, to electrical breakdowns, the hydraulic control circuit 100 detects the breakdown and deactivates the second solenoid valve 112 so as to maintain the reverse gear available.

Operation Control

The following description will be directed to the practical application of operational control accomplished by means of the controller 300.

(1). Up-Shift

Figure 20:
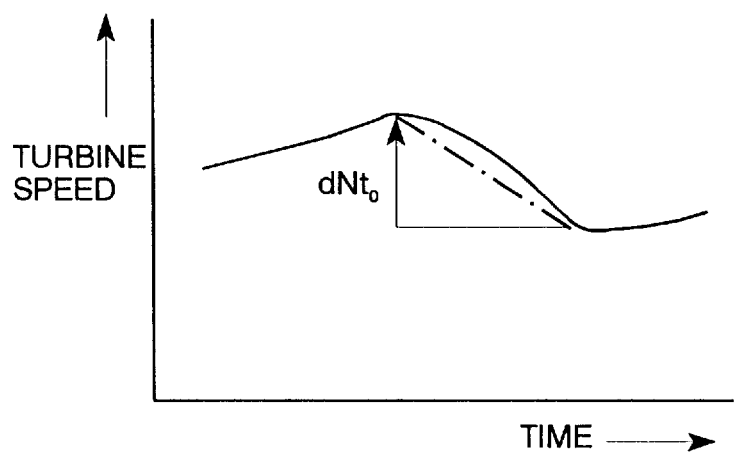
FIG. 20 is a graph enplaning the target turbine speed during gear shifts.
Figure 21:
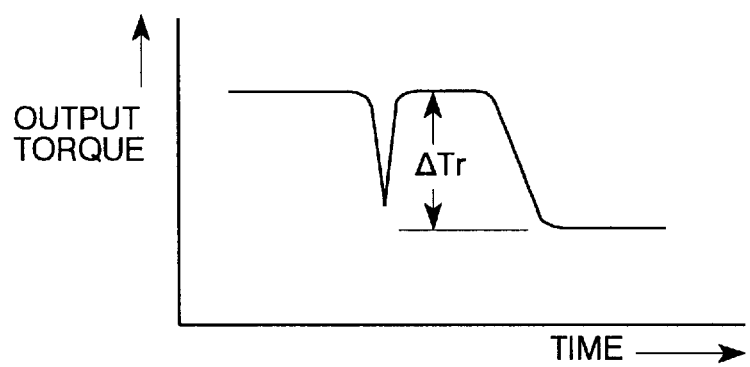
FIG. 21 is a graph of output torque during an up-shift.

An explanation will be provided first relating to an up-shift. Basically, the up-shift control is primarily accomplished by means of feedback control exercised over the charge of locking pressure relative to the coupling friction element in which the decreasing change dNt in turbine speed Nt is controlled to conform with the target change $dNt_o$, as shown in FIG. 20. The turbine speed change dNt, which corresponds to the height $\Delta Tr$ of the change in transmission output torque in an inertia phase during an up-shift relative to the torque after the completion of the shift as shown in FIG. 21, will provide an increase in shift shock if exceeding the input torque prior to the up-shift and extends a shift time if it is too low. Consequently, the target turbine speed change $dNt_o$ is established such that the height $\Delta Tr$ of torque change becomes roughly equal to the height of torque change prior to the shift. Specifically, as the engine throttle opening becomes large, the target turbine speed change $dNt_o$ is established to be greater and, as the turbine speed Nt at the time of commencement of a gear shift is high, it is established to be smaller. Furthermore, at extremely low temperatures, since there is an increase in the viscosity of hydraulic oil which leads to a marked delay in response of the oil pressure to changes, the feedback control is prevented.

1-2 up-shift is accomplished by charging brake apply pressure created by means of the first duty solenoid valve 121 to the brake apply pressure chamber 54a of the 2-4 brake 54. In the interim, the feedback control is accomplished of the brake apply pressure by means of the first duty solenoid valve 121.

In this instance, as mentioned previously, each of the duty solenoid valve 121-123 takes, at a duty rate of 100%, a drain state in which no operating pressure is produced and, at a duty rate of 0%, a full open state in which the operating pressure is equal to source pressure. The control over the operating pressure is accordingly accomplished in interim duty rates between 0% and 100%

Figure 22:
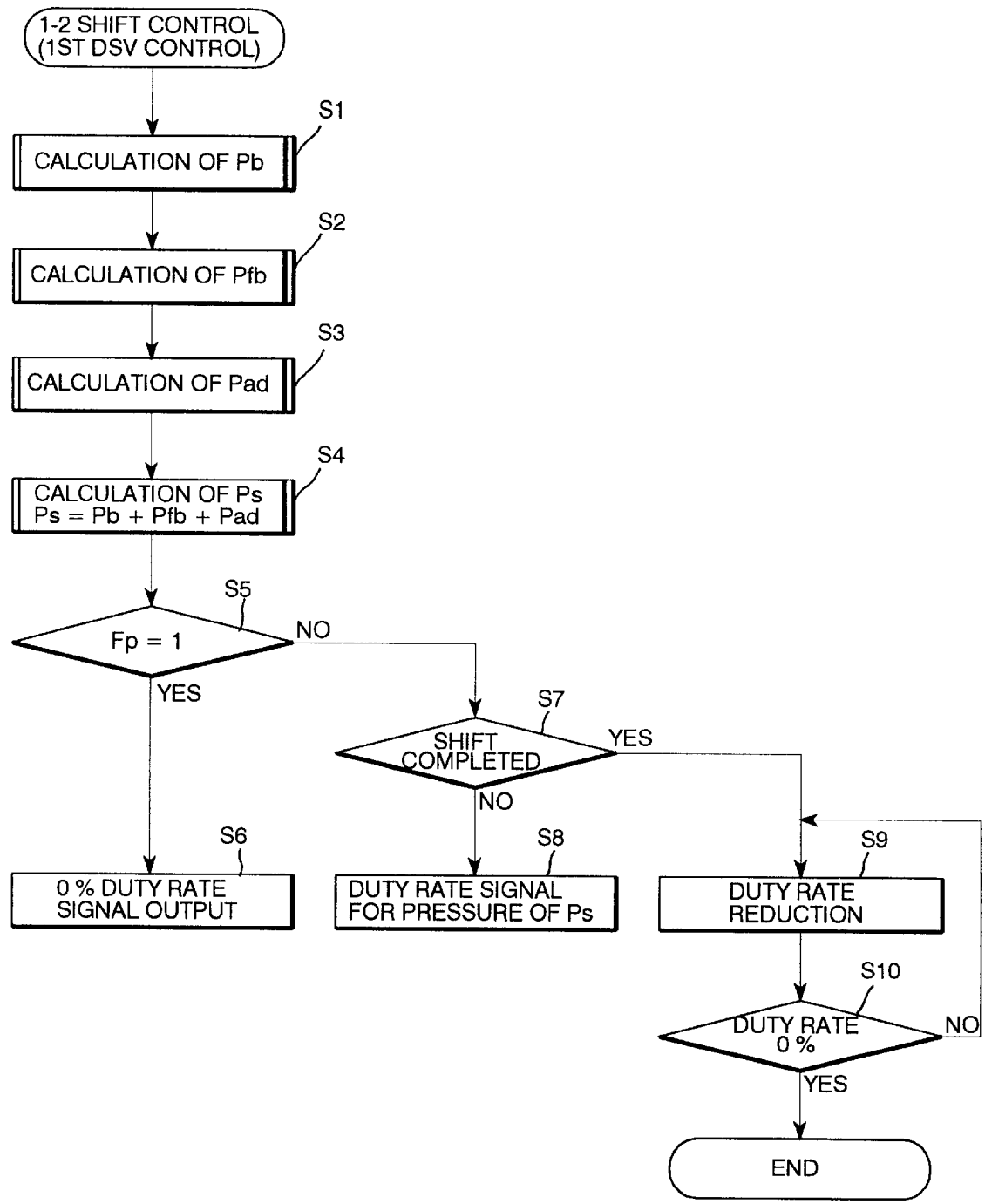
FIG. 22 is a flowchart illustrating a control sequence for a first duty solenoid valve (DSV) during a 1-2 shift.

Brake apply pressure control by means of the first duty solenoid valve 121 during a first to second (1-2) up-shift is accomplished in accordance with the sequence routine shown in FIG. 22. When a 1-2 up-shift command is provided, initially the base pressure Pb, feedback pressure Pfb, and learning control pressure Pad are calculated at steps S1 - S3, respectively. A description of each of these calculations is provided later.

At step S4, these pressure Pb, Pfb and Pad are added together, thereby computing the pressure Ps. At the same time, at step d5, a determination is made as to whether or not a pre-charge control period of brake apply pressure, conducted upon an output of a shift command, is in progress through the ascertainment of a pre-charge flag Fp. The pre-charge control is executed in order to quickly accomplish the complete supply of hydraulic pressure in the pressure line leading to the brake apply pressure chamber 54a of the 2 - 4 brake 54 at the commencement of a gear shift for improvement of responsiveness of the 1-2 up-shift operation. When the pre-charge flag Fp is up or set to a state 1, in other words when it is determined that the pre-charging period is progressing, then, at step S6, a duty rate signal indicating 0% is provided for the first duty solenoid valve 121. Furthermore, the pre-charge period determination control is accomplished by means of the sequence routine described later. On the other hand, when the pre-charge flag Fp is down or reset to a state 0, i.e., when the pre-charge period is over, another determination is made at step S7 as to whether or not the 1-2 up-shift has been completed. The determination of gear shift completion is accomplished on the basis of the fact that the turbine speed change dNt has become from minus to plus, that the absolute value of a turbine speed change dNt has decreased less than a half of a change during the 1-2 up-shift, or that the turbine speed Nt has decreased to a speed at the completion of the 1-2 up-shift which is calculated based on the turbine speed Nt at the commencement of the 1-2 up-shift. Also, prior to the completion of the 1-2 up-shift, i.e. during the period from the completion of the pre-charge period to the completion of 1-2 up-shift, at step S8, in order to obtain the calculated pressure Ps in the manner described above, the duty rate for the first duty solenoid valve 121 is calculated. A duty ratio signal is output so as to exercise the control over the brake apply pressure, namely 2 - 4 brake locking pressure. Following the termination of the 1-2 up-shift, at steps S9 and S10, the duty rate is reduced at a fixed rate until it reaches 0%.

Figure 23:
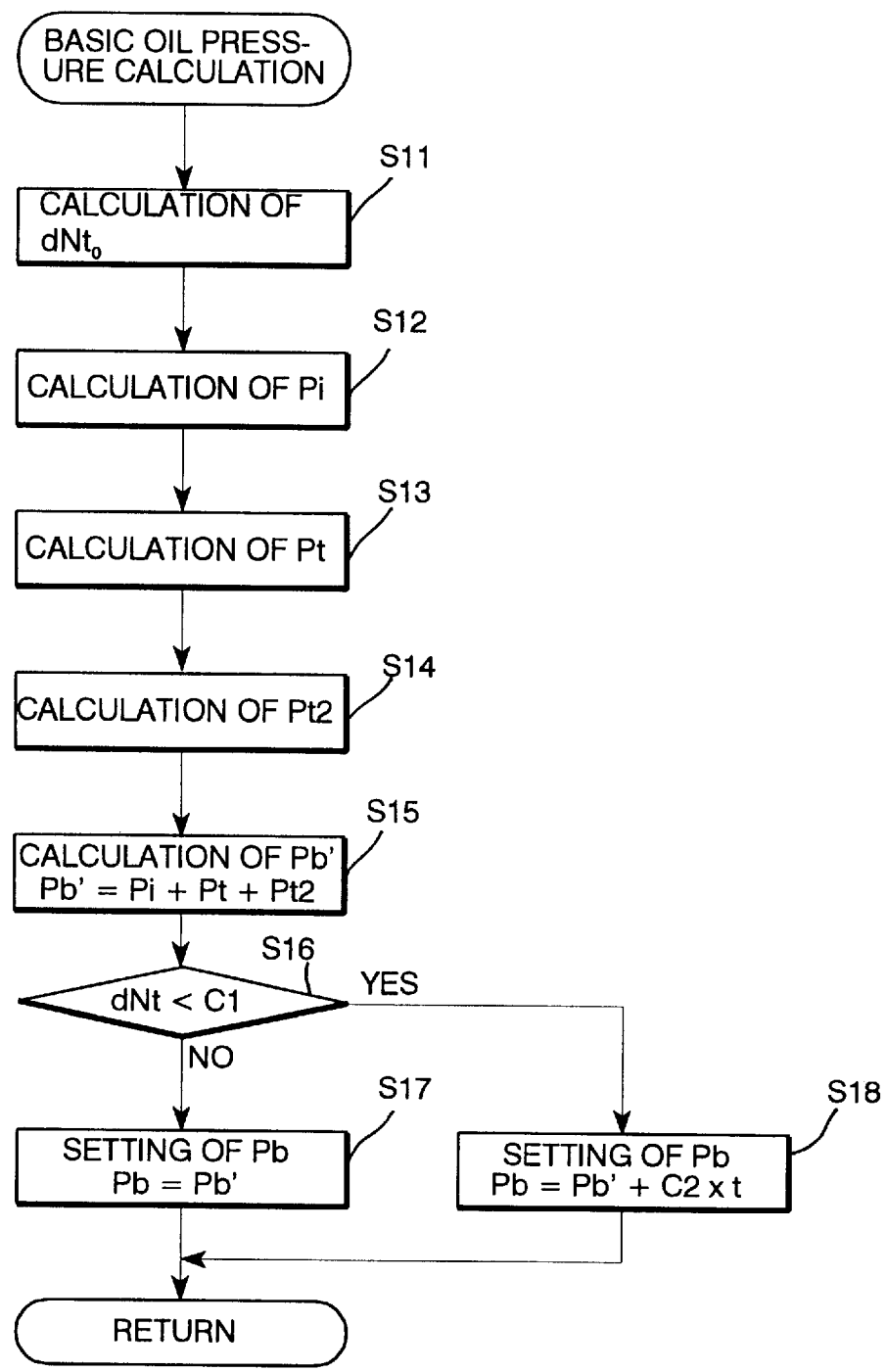
FIG. 23 is a flowchart illustrating a sequence for a calculation of base pressure during the 1-2 shift.

From among the respective pressure composing the calculated pressure Ps, the calculation of the base pressure Pb is accomplished in accordance with the sequence routine shown in FIG. 23.

Figure 24:
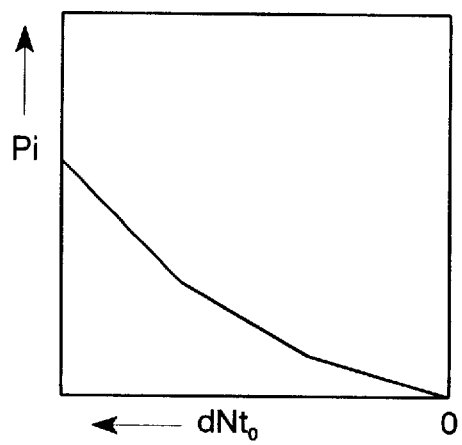
FIG. 24 is a diagram illustrating a map of hydraulic pressure with regard to a change in target turbine speed used in the calculation of base pressure.
Figure 25:
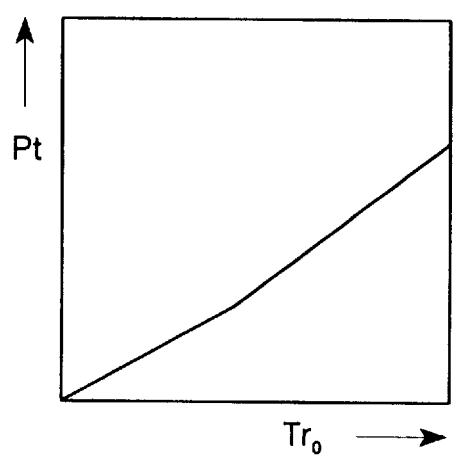
FIG. 25 is a diagram illustrating a map of hydraulic pressure with regard to target turbine torque used in the calculation of base pressure.
Figure 26:
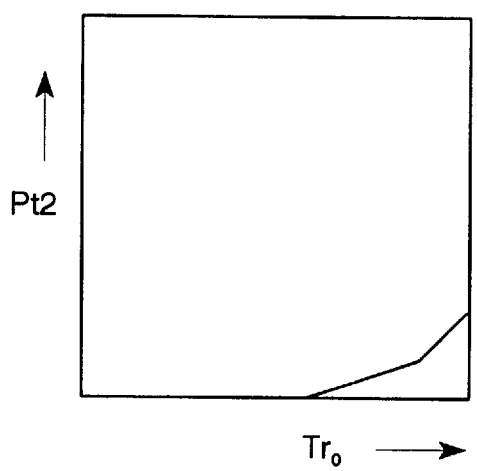
FIG. 26 is a diagram illustrating a map of hydraulic pressure with regard to squared target turbine torque used in the calculation of base pressure.

First of all, at step S11, a calculation is accomplished of a target turbine speed change $dNt_o$ during the 1-2 up-shift. At step S12, pressure P1 corresponding to the target turbine speed change $dNt_o$ is obtained on the basis of a map such as shown in FIG. 24 in which the pressure increases as the target turbine speed change $dNt_o$ in absolute value becomes small. Subsequently, at steps S13 and S14, the pressure Pt corresponding to the target turbine torque $Tr_o$ during gear shift and pressure Pt2 corresponding to the squared target turbine torque $Tr_o$ are obtained, respectively, on the basis of maps as shown respectively in FIGS. 25 and 26. At step S15, by adding these pressures Pt and Pt2 to the pressure Pi corresponding to the target turbine speed change $dNt_o$ an initial base value Pb' of the base pressure can be calculated. In this instance, the target turbine torque $Tr_o$ is one which is obtained by multiplying turbine torque prior to gear shifting by a torque down ratio of engine output torque during gear shifting. By revising the pressure Pi corresponding to the target turbine speed change $dNt_o$ with the pressures Pt and Pt2, fluctuations in the transmission output torque is further controlled during gear shifting.

Figure 34:
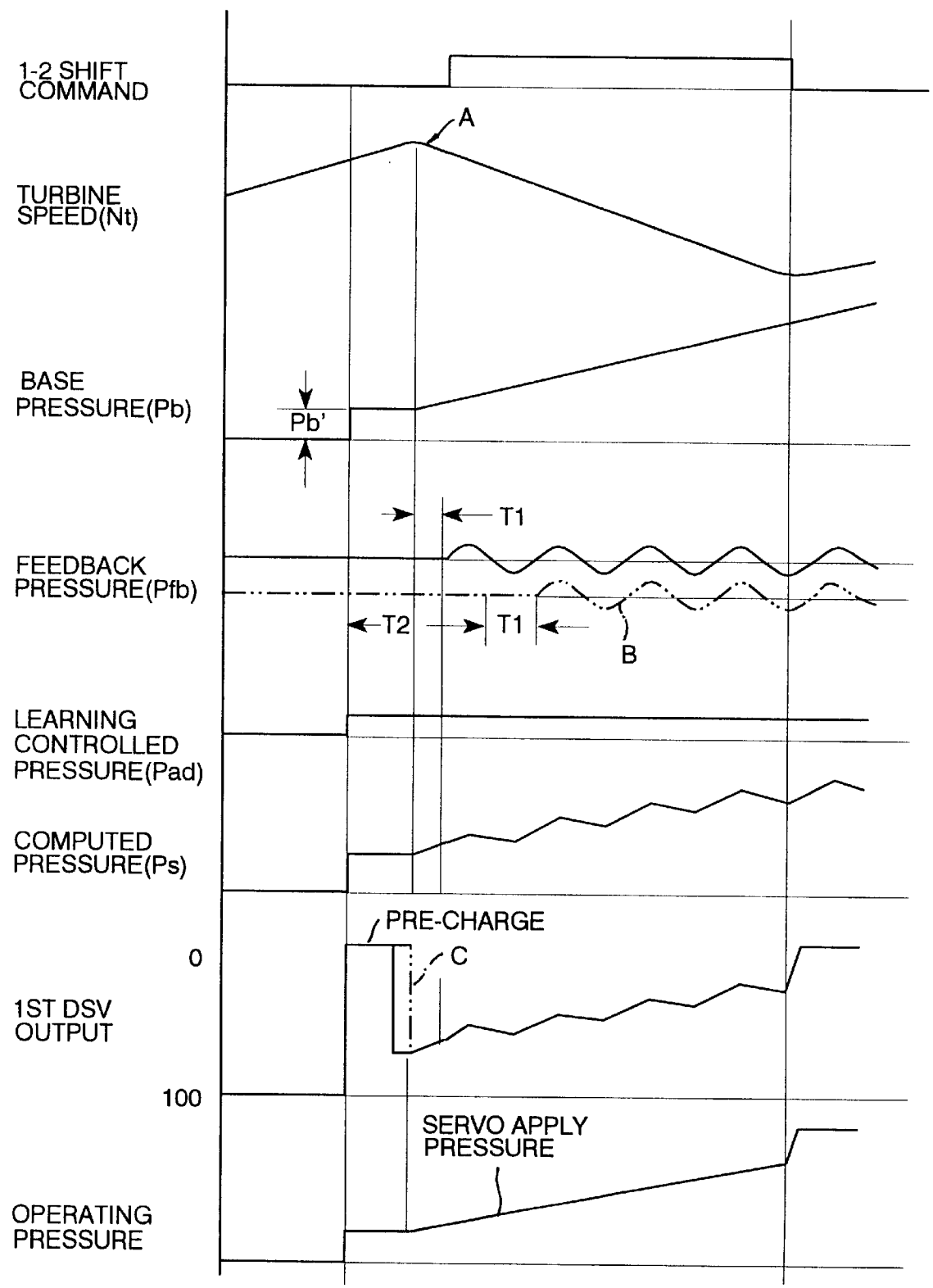
FIG. 34 is a time chart showing changes in various factors during a 1-2 shift.

At step S16, a determination is made as to whether or not an actual turbine speed change dNt has fallen below a specified change Cl. This is made in order to determine a time at which the turbine starts to reduce its speed due to the commencement of an inertia phase (see the notation "a" in FIG. 34). Until the actual turbine speed change dNt becomes less than the specified ration C1, at step 17, the base pressure Pb is maintained at the initial value Pb' and, however, once it becomes higher than the specified ratio C1, the base pressure Pb is increased constantly in fixed increments of a value obtained by adding to the initial value Pb' the product of a specified ratio C2 multiplied by a time t passed from when the actual turbine speed change ratio dNt has reached the specified ration C1. This procedure provides the base pressure Pb as shown in FIG. 34.

Figure 27:
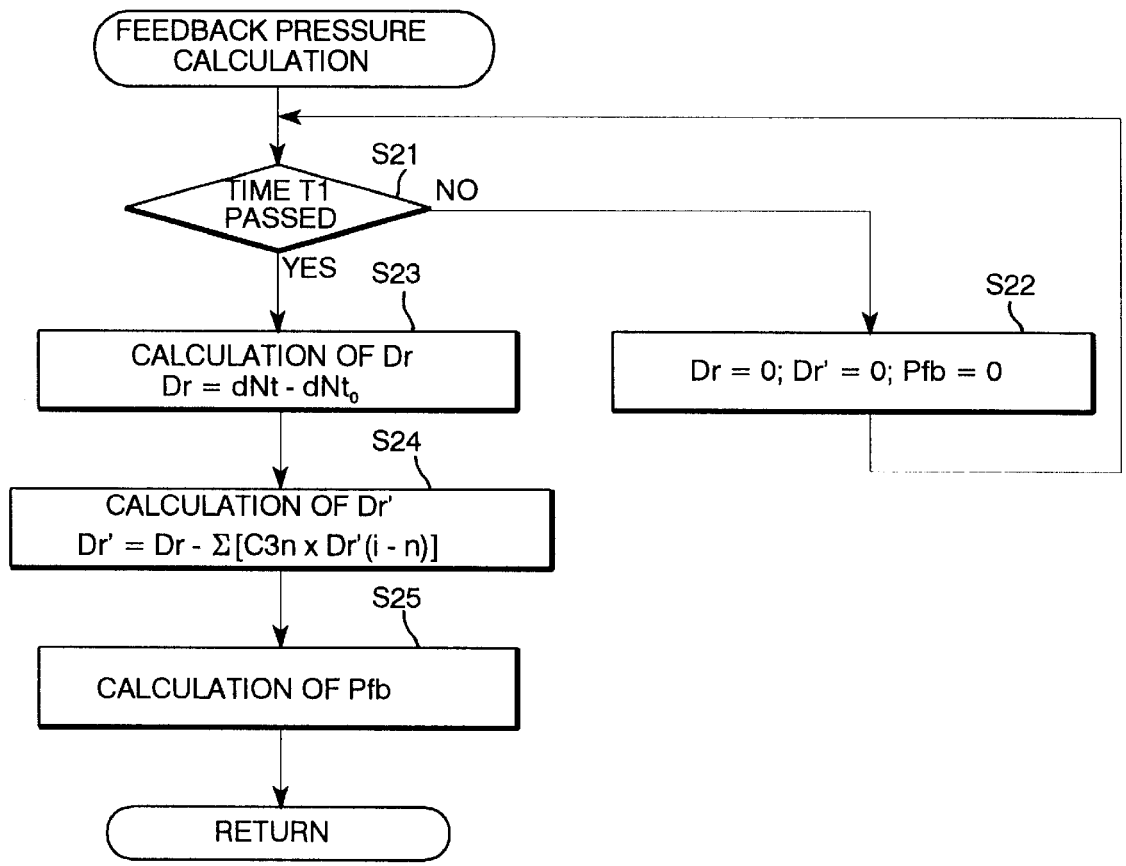
FIG. 27 is a flowchart illustrating a sequence for a calculation of feedback pressure during a 1-2 shift.

Calculation of the feedback pressure Pfb at step S2 in the routine shown in FIG. 22 is accomplished in accordance with the sequence routine shown in FIG. 27. At first, at step S21, after the turbine speed change dNt has become smaller than the specified ratio C1, a determination is made as to whether or not a specified time Ti has passed. Until the passage of time T1, at step S22, while a deviation Dr relating to the target speed change $dNt_o$ used in control described hereafter and a phase correction value Dr' are initialized and, at the same time, the feedback pressure Pfb is reset to 0. In summary, even when the inertia phase of a gear shift commences, the feedback control is prevented until the specified time T1 has passed. This is because, since the turbine speed change dNt is obtained as the difference between the previous and current turbine speeds Nt, it is hardly obtainable accurately at the beginning of the inertia phase during at which a change in the turbine speeds Nt is remarkably significant.

When there is provided a state where the turbine speed change dNt is obtainable accurately through the passage of the specified time T1 from the time the turbine speed change ratio dNt has become smaller than the specified ratio C1 necessary for the turbine speed change dNt to become stable, at step S23, the deviation Dr (=$dNt-dnt_o$) of the actual turbine speed change dNt from the target turbine speed ratio $dNt_o$ is calculated and subsequently, at step S24, a calculation of the phase correction value Dr+ for the deviation Dr is made in accordance with the following formula:

$$Dr'=Dr-\Sigma(C3n \times Dr'(i-n))$$

where C3n is the n-th factor C3; and
Dr+(i–n) is the phase correction value n cycles prior to the current cycle. Letting, for instance, the number n be 4, the phase correction value Dr' is given as follows:

$$Dr'=Dr-[C3_1 \times Dr'(i-n)+C3_2 \times Dr'(i-2)+C3_3 \times Dr'(i-3)+C3_4 \times Dr'(i-4)]$$

For example, these factors $C3_1$, $C3_2$, $C3_3$ and $C3_4$ are set as values of 1, 1, 0.5 and 0.2, respectively.

That is, owing to a delay in response of control, even when an output is provided correspondingly to the current deviation Dr, it is not reflected eventually on the control until a subsequent control cycle. If an output corresponding to the current deviation Dr is provided again after the delay, it will be an over control, causing divergence or hunting of the oil pressure or the turbine speed change dNt. For this reason, if a certain value of output is provided in the current cycle of control, then, in the subsequent cycle of control, a value of output must be given by subtracting the past value of output from a current value of output corresponding to a present deviation. In addition, the past value is weighted for subtraction greatly as the measurement of deviation is close to the present moment. By this means, compensation is made for the pressure or the turbine speed change dNt resulting from a delay in response of control so as to cause the actual turbine speed ratio dNt to converge at the target turbine speed ratio $dNt_o$.

Figure 28:
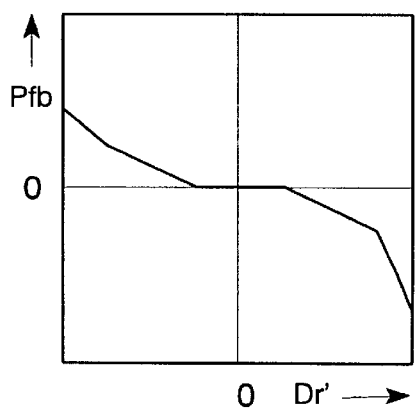
FIG. 28 is a diagram illustrating a map of feedback pressure used in the calculation of base pressure.

At step S25 in FIG. 27, the feedback pressure Pfb corresponding to the phase correction value Dr' relating to the deviation Dr obtained in the manner described above is obtained from a map such as shown in FIG. 28. In this instance, the feedback pressure Pfb has a negative value if the phase correction value Dr' relating to the deviation Dr is positive or a positive value if the phase correction value Dr' is negative, and the feedback pressure Pfb is established in its absolute value so as to correspond with an absolute value of the phase correction value Dr'. In this instance, as a safety measure for failure in detection of the commencement of an inertia phase, a back-up timer starts to count a time at an output of a gear shift command. When the timer counts up a specified time T2, then, in spite of the turbine speed change dNt, the feedback control is commenced as labeled by "B" in FIG. 34. Even in this instance, the feedback control is prevented until the passage of the specified time Ti following the passage of the specified time T2. The feedback control described above is fundamentally accomplished in the same manner even where there is control of the operating pressure during up-shifts other than the 1-2 up-shift.

Figure 29:
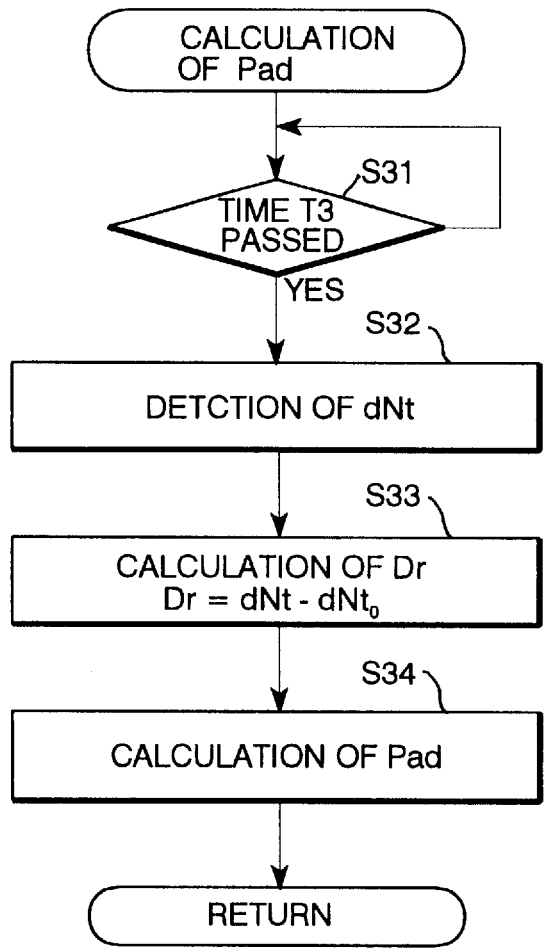
FIG. 29 is a flowchart illustrating a sequence for a calculation of learning control pressure during a 1-2 shift.
Figure 30:
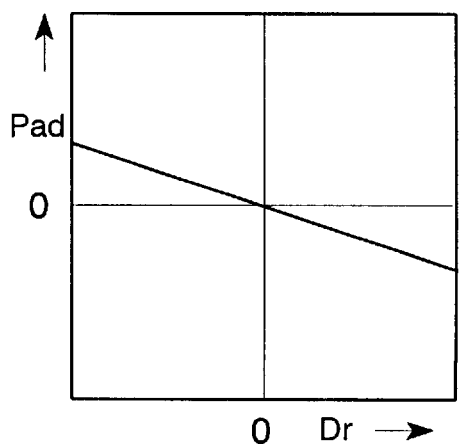
FIG. 30 is a diagram illustrating a map of learning control pressure used in the calculation of learning control pressure.
Figure 77:
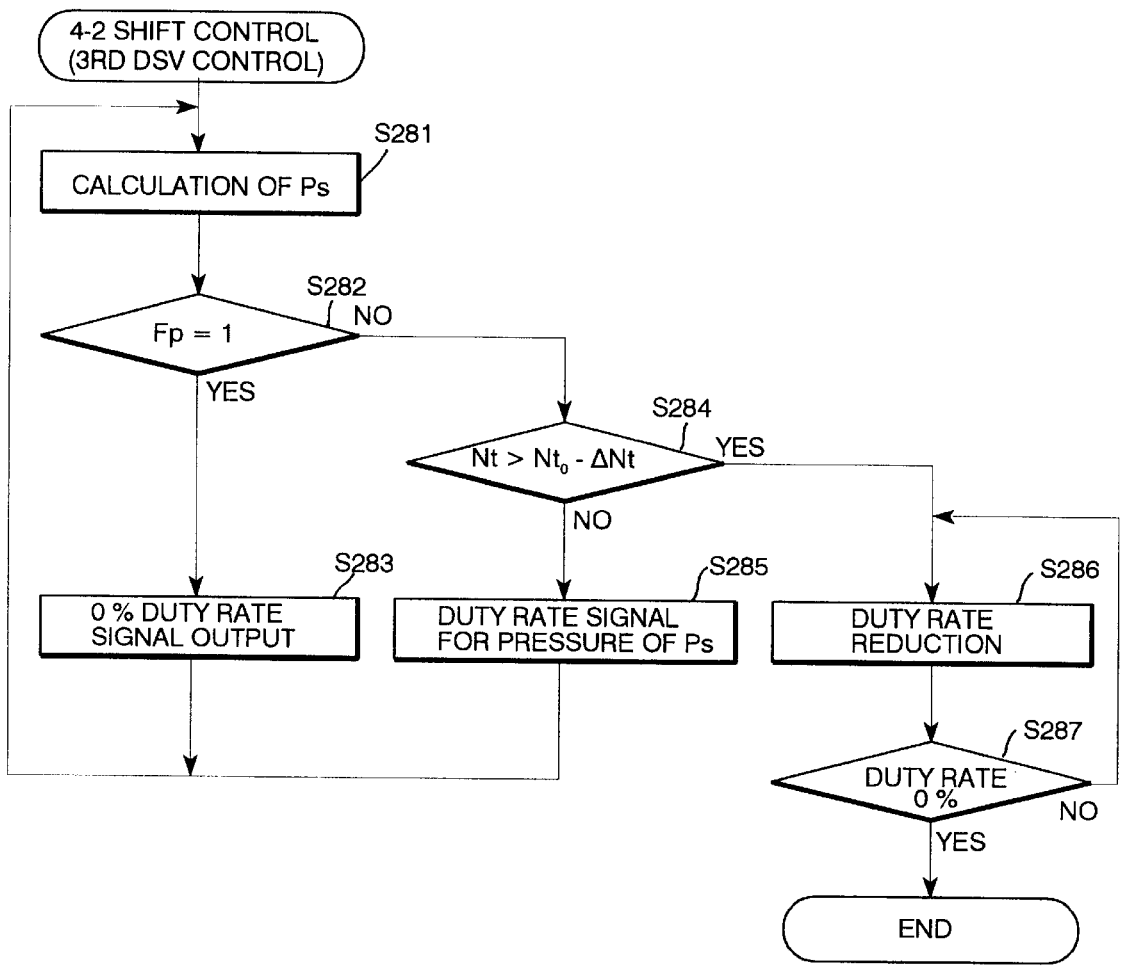
FIG. 77 is a flowchart illustrating a control sequence for the third duty solenoid valve (DSV) during a 4 - 2 shift.

Calculation of the learning control pressure Pad is made at step S3 in FIG. 22 in order to correct the pressure Ps during another 1-2 up-shift depending upon the appropriateness of the initial base pressure Pb' which exerts influence over the turbine speed change dNt at the beginning of an up-shift. This calculation is accomplished in accordance with the sequence routine shown in FIG. 29. The first step at step S31 in FIG. 29 is to make a determination as to whether or not a specified time T3 has passed from the commencement of an inertia phase after the turbine speed change dNt has become smaller than the specified value Cl. If the specified time T3 has passed, then, at step S32, detection is made of a current turbine speed change dNt at a time of the lapse of the specified time T3. Subsequently, at step r33, along with calculating the deviation Dr relative to the target turbine speed change dNt. at the time, a calculation is made on the basis of a map of learning control pressure Pad in relation to the deviation Dr such as shown in FIG. 77. In this instance, the learning control pressure Pad, as is the case with the feedback pressure Pfb, is negative when the deviation Dr is positive or positive when the deviation Dr is negative. Together, an absolute value of the learning control pressure Pad is established corresponding to an absolute value of the deviation Dr. It is desirable to set the specified time T3 equal to the specified time T1 for which the feedback control is prevented from the commencement of an inertia phase.

Figure 31:
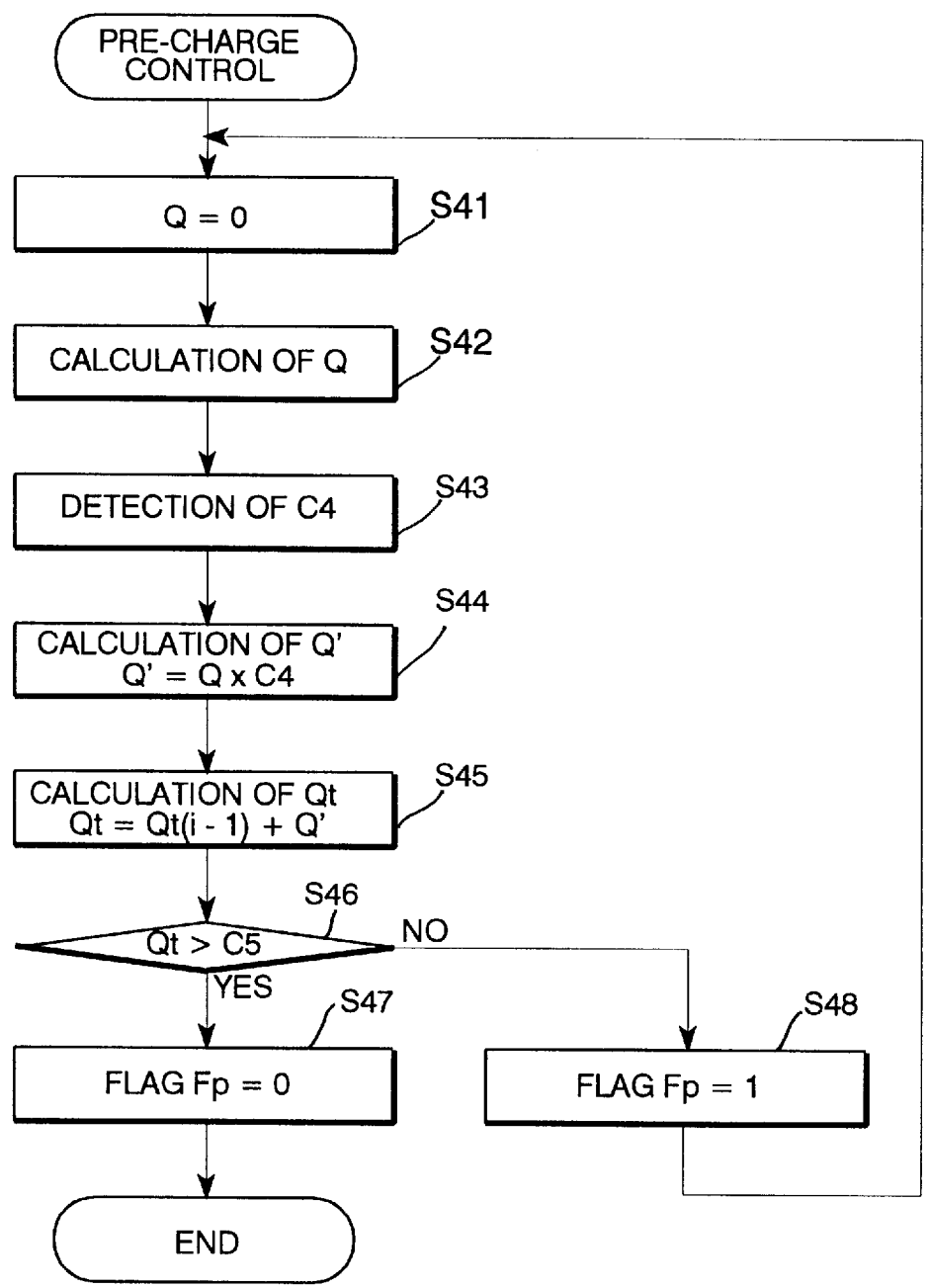
FIG. 31 is a flowchart illustrating a pre-charge control sequence during a 1-2 shift.

Setting or resetting the pre-charge flag Fp, whose state is determined at step 5 of the sequence routine in FIG. 22, is accomplished to establish the pre-charge period in accordance with the sequence routine shown in FIG. 31.

Meanwhile, in cases where an friction coupling element is locked or unlocked during a gear shift with operating pressure supplied to a pressure chamber of the friction coupling element from a hydraulic control circuit, even when the operating pressure is supplied to the pressure chamber immediately after an output of a shift command, it takes a relatively long time at the beginning of gear shifting to develop a necessary level of pressure in the pressure chamber, resulting in a delay of locking or unlocking. This is because, there is no oil in the oil line leading to the pressure chamber at the beginning of gear shifting. In order to eliminate this delay, what is called "pr-charge control" is executed by fully opening pressure control valves for a while upon an output of a gear shift command and filling oil lines with oil quickly. The delay in response of, in particular, operating pressure feedback control is avoided by controlling operating pressure by means of the valves following the pre-charge control. One of applications of the pre-charge control is known from, for instance, Japanese Unexamined Patent Publication No. 3-28571, but to a manual range shift from the neutral range to the drive range.

A matter of great importance in the pre-charge control is to set an appropriate control period, in other word, a timing at which control shifts to another type of control. If the pre-charge period is too short, the delay in control response can not be eliminated. On the other hand, if it is unduly long, the friction coupling element locks rapidly within the pre-charge period, resulting in a great shift shock.

For the above reasons, the hydraulic control circuit 100 executes control in which an appropriate pre-charge period is established. Although the following description will be directed to a 1-2 upshift by way of example, the pre-charge control may, if necessary, be available for gears shifts other than the 1-2 up-shift.

Figure 32:
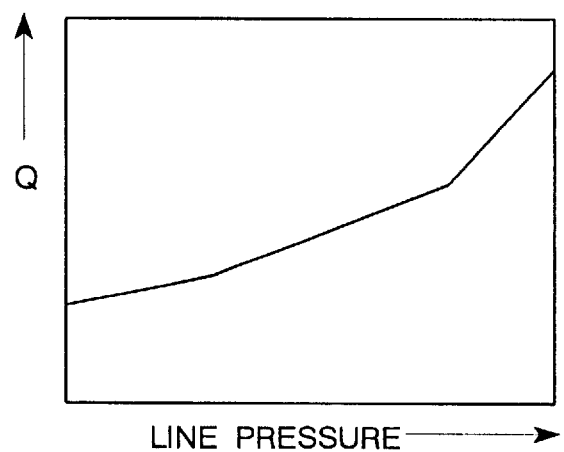
FIG. 32 is a diagram illustrating a map of base flow rate used in the pre-charge control.

The pre-charge control is executed coincidentally with the brake apply pressure control shown in FIG. 22 upon an output of a gear shift command. Following setting the total quantity Qt of oil to 0 at step S41, the base quantity Q of oil is calculated on the basis of the quantity of line pressure at the commencement of the control at step S42. This calculation of the base oil quantity Q is made using a map such as shown in FIG. 32 in which the base oil quantity Q is defined as the amount of oil passing through the first duty solenoid valve 121 fully opened or operating at a duty rate of 0%. In this case, the map provides the base oil quantity Q to become larger with an increase in the line pressure. In order for the base flow quantity Q to be accurately calculated, utilization may also be made of the estimated line pressure obtained by means of line pressure estimation control which will be described in detail later.

Figure 33:
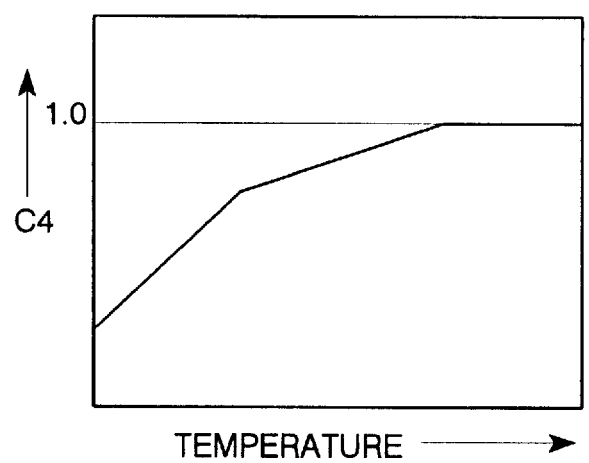
FIG. 33 is a diagram illustrating a map of oil temperature coefficient used in the pre-charge control.

At step S43, the oil temperature correction factor C4 is read from a map as shown in FIG. 33. The oil temperature map defines the correction factor C4 such that the factor C4 becomes smaller than 1 as the temperature of hydraulic oil declines. At step S44, a corrected base oil quantity Q' is obtained by multiplying the base oil quantity Q by the correction factor C4. By this means, if, because of a low temperature, and hence a high viscosity of the oil, the quantity of oil passing through a valve is smaller than that at ordinary temperatures, it is appropriately corrected according to the ambient conditions.

Thereafter, at step 45, the corrected base oil quantity Q' is added up from the following formula to calculate the total quantity Qt of oil from the commencement of the control to the current moment.

$$Qt = Qt\,(i-1) + Q'$$

At step S46, a determination is made as to whether or not the total oil quantity Qt has exceeded a specified quantity C5. Until the specified quantity C5 is exceeded, the pre-charge flag Fp is set to the state of 1 at step S47. On the other hand, when the specified quantity C5 is exceeded, the flag Fp is reset to the state of 0 at step S48. The specified quantity C5 is established corresponding to a volume of the oil passage between the valve and a related friction coupling element, for instance from the first duty solenoid valve 121 to the 2-4 brake 54 in the 1-2 up-shift. Accordingly, the oil passage is filled with oil when the total oil quantity Q has become larger than the specified quantity C5 and the pre-charge flag Fp is reset to the state 0 at that time for termination of the pre-charge control. As long as the precharge flag Fp is up, which means the progress of precharging, the duty rate of the first duty solenoid valve 121 is maintained at 0% at step S6 in FIG. 22, thereby quickly filling the oil passage leading to the pressure chamber 54a of the 2-4 brake 54 with oil.

Since, as described above, the base oil quantity Q, on the basis of which the precharge period is calculated, is established according to current line pressure, in any event where a fixed quantity of oil is supplied in a relatively short time period due to a high level of line pressure or, conversely, in a relatively long time period due to a low level of line pressure, the pre-charge control is terminated when the oil passage is eventually filled with the oil. Further, if it takes a longer time to fill the oil passage when the oil is at a low temperature as compared with when it is at ordinary temperatures, an appropriate correction is effected, terminating the pre-charge control accurately when the oil passage is eventually filled with the oil. Resultingly, a shift shock such as caused due to a delay in control response resulting from a shot precharge time period or abruptly locking the friction coupling element resulting from a long pre-charge time period is prevented. The pre-charge control followed by the feedback control of the line pressure always provides well controlled gear shifting. If the 1-2 up-shift starts in advance of the completion of the pre-charge time period determined in this sequence of control and, as a result, the turbine speed change dNt becomes smaller than the specified change C1, the pre-charge control is terminated at a time labeled with a character "C" in the time chart in FIG. 34, and the duty rate control is executed for brake apply pressure control. That is, an output is controlled to provide a duty rate so as to correspond to the pressure Ps calculated at step S8 of the sequence routine in FIG. 22. By this means, the pre-charge control is continued even after the commencement of the 1-2 up-shift, avoiding abruptly locking the friction coupling element, i.e. the 2-4 brake 54.

Alternatively, the determination of such a pre -charge time period may be predetermined in terms of time. In such the case, the time is revised or corrected such that it becomes shorter with an increase in the temperature of oil. Otherwise, a fixed pre-charge time period may be employed. In this case, the duty rate is controlled during the fixed time period.

With the pre-charge control described above, the brake apply pressure changing in the way as shown in FIG. 34 is provided, based on which the locking pressure for the 2-4 brake 54 is controlled appropriately so that the turbine speed change dNt comes into conformity with the target turbine speed change $dNt_o$ during the 1-2 up-shift.

As described above, in the automatic transmission control system of this type, while the line pressure is generated through regulation of discharge pressure from an oil pump, on the basis of the line pressure, the operating pressure is controlled and delivered to an friction coupling element. This causes a necessity of accurate detection of the actual line pressure for accurate operating pressure control. Specifically, in the pre-charge control for example, since the base oil quantity depends upon the level of line pressure, the pre-charge time period must be decided in consideration of the line pressure. Also in the feedback control following the pre-charge control where the operating pressure is controlled such that the turbine speed change is maintained at the target turbine speed change, since the operating pressure regulated by the duty solenoid valve depends not always upon the duty rate but also upon the line pressure as source pressure, the target line pressure must be controlled in consideration of the correct line pressure.

Line pressure is regulated by a linear solenoid valve according to throttle opening in order to transmit certainly torque to the friction coupling element, as described, for instance, in Japanese Unexamined Patent Publication No. 62-124343. Consequently, the current line pressure may be set as the target line pressure for the purpose of being used in the calculation of the base oil quantity in the pre-charge control and the operating pressure control. However, immediately after a change, the line pressure differs from the target level of pressure due to a delay in response and, consequently, the base oil quantity and the pre-charge time period will not be obtained correctly if they are obtained from the target pressure.

Therefore, control is made to estimate actual line pressure P on the basis of the target line pressure $P_o$. This estimation is accomplished by the following formula:

$$P=[C6_5 \times P_o(i-5)+C6_4 \times PO(i-4)+C6_3 \times PO(i-3)+C6_2 \times PO(i-2)+C6_1 \times PO(i-1) \div (C6_1+C6_2+C6_3+C6_4+C6_8)$$

In the above formula, $C6_n$ represents the estimation factor C6 at an n-th cycle prior to the current cycle and $P_o(i-n)$ represents the target line pressure $P_o$ at an (i–n)-th cycle prior to the current cycle. In this instance, the factor C6n is set to be smaller for the latest cycle than for an earlier cycle.

Specifically, in each control cycle, since there is a time delay in response until the target line pressure $P_o$ is made manifest in the actual line pressure P, after making the level of manifest of the target line pressure $P_o$ obtained during the latest cycle, a weighted average of target line pressures obtained during the respective control cycles is given as an estimated actual line pressure. By this means, when the line pressure changes, the estimation is made taking a time delay in response into consideration, the estimated line pressure P is close to the actual line pressure. Values of a plurality of estimation factors, five in this embodiment, is given as one set according to responsiveness and stability.

In place of the above formula which is one of approximate formulas of the transfer function, it is possible to use the transfer function itself expressed as follows:

$$P = C6_5 \times P_o(i-5) + C6_4 \times P_o(i-4) + C6_3 \times P_o(i-3) + \\ C6_2 \times P_o(i-2) + C6_1 \times P_o(i-1) + C7_5 \times P(i-5) + \\ C7_4 \times P(i-4) + C7_3 \times P(i-3) + C7_2 \times P(i-2) + C7_1 \times P(i-1)$$

where $C7_n$ represents the estimation factor C6 at an n-th cycle prior to the current cycle and P(i–n) represents the target line pressure P at an (i–n)-th cycle prior to the current cycle.

Further, the transfer function may simply formulated as follows:

$$P=(1-8C) \times P(i-1)+C8 \times P_o$$

where C8 is a number less th an 1.

This simplified formula is used to reflect the target line pressure $P_o$ obtained at the current cycle at a fixed proportion on the target line pressure $P_o$ obtained at the cycle immediately prior to the current cycle at a fixed proportion. The utilization of the transfer function itself needs a great number of calculations and provides an accurate estimation, and the utilization of the simplified transfer function needs only a small number of calculations but encounter an insufficient estimation accuracy. The utilization of the approximate formula is between the two in view point of complexity and accuracy.

Line pressure estimation is needed for accurate control on the basis of line pressure, in particular, during gear shifts caused when the line pressure shows a pronounce change according to engine load, such as a torque demand downshift accompanying a significant increase in throttle opening and a back-out up-shift accompanying a sharp change in throttle opening. a pronounced change in the line pressure, enables to develop an operating pressure at a correct level for coupling a specific friction coupling element by determining the duty rate of the duty solenoid valve based on the predicted line pressure. During these shifts, the estimation factors are altered between the torque demand shift which is accompanied by an increase in line pressure increases and the back-up shift which is accompanied by a fall in line pressure.

Figure 35:
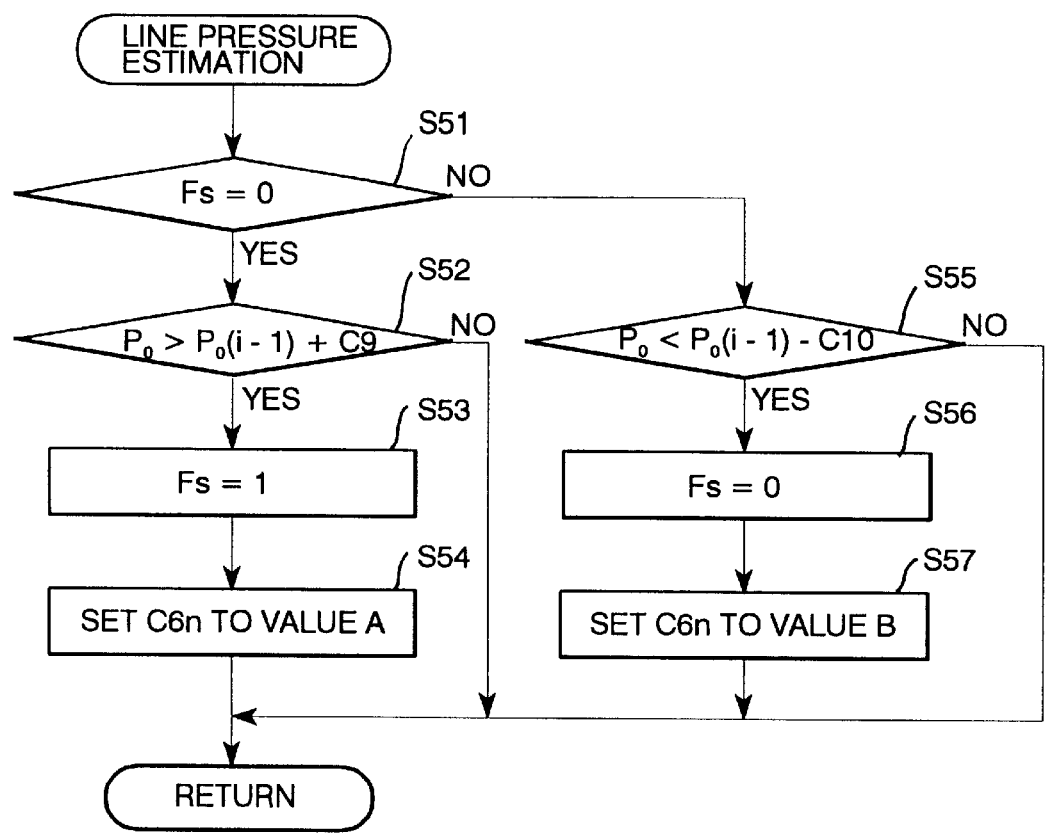
FIG. 35 is a flow chart showing a conventional line pressure estimation control.

Estimation fact or control is executed according to the sequence routine shown in FIG. 35 in the case where the approximate formula is used to estimate line pressure.

Figure 36:
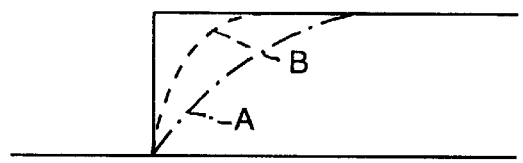
FIG. 36 is an explanatory view of coefficient used in the line pressure estimation control.
Figure 37:
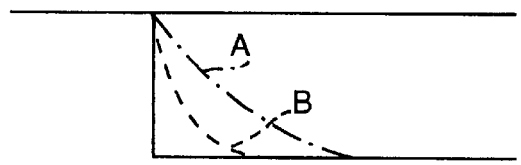
FIG. 37 is an explanatory view of coefficient used in the line pressure estimation control for low temperatures.

When the sequence logic commences and control passes directly to a function block at step S51 where a determination is made as to the state of shift flag Fs which indicates the type of gear shift. The shift flag Fs is up or set to the state 1 for a torque demand shift and down or reset to the state 0 for a back-out up-shift. If the shift flag Fs has been down, a determination is made at step S52 as to whether the target line pressure PO is larger than the target line pressure $P_o(i-1)$ obtained at one cycle prior to the current cycle added by a specified value C9 which represents non-operating pressure. Until the target line pressure $P_o$ satisfies the condition, the control is repeated. When the target line pressure $P_o$ satisfies the condition at step S52, this indicates that a torque demand down-shift is needed due to an increase in the target line pressure $P_o$ from an increase in throttle opening, after setting the shift flag Fs to the state 1 at step S53, the estimation factors C6n are changed to a set of factors A assigned to a line pressure increase at step S54. The factor set A is established such that the estimation provides the line pressure increasing gently as shown by a broken line A as compared to an increase in practical line pressure shown by a solid line in FIG. 36. Accordingly, the utilization of the set A of estimation factors C6n in the pre-charge control for, for example, a torque demand down-shift provides the base oil quantity Q on the basis of the line pressure estimated lower than the actual line pressure, elongating the pre-charge time period which accelerates locking the friction coupling element and eliminating a delay in response during rapid acceleration. When the shift flag Fs is set to the state 1 at step S53, the routine proceeds to step S55 after the determination at step S51. The, a determination is made as to whether the target line pressure $P_o$ is less than the target line pressure $P_o(i-1)$ subtracted by a specified value Cl 0 which represents another non-operating pressure. Until the target line pressure $P_o$ satisfies the condition, the control is repeated. When the target line pressure $P_o$ satisfies the condition at step S55, this indicates that a back-out up-shift is needed due to a fall in the target line pressure $P_o$ from a decrease in throttle opening, after setting the shift flag Fs to the state 0 at step S56, the estimation factors C6n are changed to a set B assigned to a line pressure decrease at step S57. That is, because the line pressure is not necessitated to be estimated unduly lower or higher, the estimation factor set B is established such that the estimation provides the decreasing line pressure change shown by a broken line B closely following a practical decreasing line pressure change shown by a solid line A as compared to an increase in actual line pressure as shown by a solid line in FIG. 37.

In the feedback control of the operating pressure supplied to a specific friction coupling element by means of a duty solenoid valve, the pressure Ps is obtained from the base pressure Pb added by the feedback pressure Pfb and leaning control pressure Pad and is converted into the form of a duty rate for the duty solenoid valve. Such a calculation of the operating pressure is known from, for instance, Japanese Unexamined Patent Publication No.62-124343. In such a case, since the target pressure (calculated pressure Ps) and source pressure (estimated line pressure) are already known, the duty rate is fundamentally obtained as a proportional ratio of the target pressure relative to the source pressure. However, in practically, the output pressure from the duty solenoid valve is not always faithful to the duty rate defined by the proportional ratio because of the operating characteristic of the duty solenoid valve. Accordingly, the duty rate is rather obtained on the basis of a duty rate correction map.

Figures 38, 39, 40:
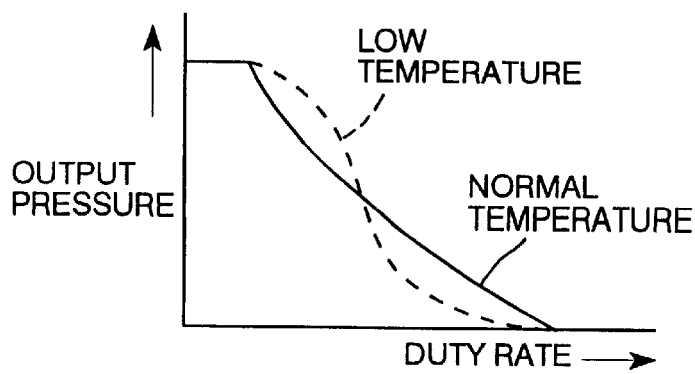
FIG. 38 is a diagram illustrating a conventional map for the calculation of duty rate.
FIG. 39 a diagram illustrating a conventional map for the calculation of duty rate used in the present invention.
FIG. 40 is a diagram showing temperature characteristics of output pressure used in the calculation of duty rate.

A duty rate correction map conventionally used is shown in FIG. 38, which arranges source pressure and target line pressure in a vertical column and a horizontal line, respectively. For example, when the duty solenoid valve fully opens at a duty rate of 100%, a duty rate practically assigned to a proportion of the target pressure of 0.2 $Kg/cm^2$ relative to the source pressure 1.0 $Kg/cm^2$ is 80% although it should theoretically be 80%. The problem the conventional correction map encounters is that, because the target pressure is practically always lower than the source pressure, the shaded regions in the map in each of which the target pressure is higher than the source pressure are useless and, however, occupy a significant area of the memory of the controller. In addition, there is the deficiency that, since there is little data concerning the output pressure in these regions where the source pressure is low, strict control is hardly exercised.

In terms of strict control, the map has been revised and improved as shown in FIG. 39. In the improved map which defines proportions of target output pressure relative to source pressure in a line and source pressure in a column, both having been corrected according to the duty solenoid valve characteristics.

For example, for the source pressure of 0.6 $Kg/cm^2$ and the target pressure of 0.3 $Kg/cm^2$, the duty rate is found at an intersection between a line of 0.6 $Kg/cm^2$ and a column of 50% to be 48%. With this map, while the entire region of the map is effectively used, even regions where the source pressure is low are given the same number of data as the high regions, enabling such low source pressure regions having a demand for precise control to satisfy the demand. For pressure which are not found in the map, the duty rate is determined by a linear interpolation.

As shown in FIG. 40, in order to corp with differences in the output pressure attributable to varying temperatures of the hydraulic oil even for the same source pressure and the same duty ratios, there are provided two correction maps for ordinary oil temperatures and low oil temperatures. These two maps are used together in order to obtain duty rates for interim oil temperatures by an interpolation.

For a second to third (2-3) up-shift, fundamentally, in addition to the operated state of various solenoid valves for the 2nd gear, the second duty solenoid valve 122 is operated to provide operating pressure for locking the 3-4 clutch 53 and releasing the 2-4 brake 54. During the 2-3 up-shift, control is exercised over the operating pressure in the inertia phase during locking the 3-4 clutch 53 so as to exercise the feedback control of the magnitude of what is called leveled transitional pressure so as to permit appropriate slippage of the 3-4 clutch 53. In such a way, the turbine speed change dNt is made to conform with the target turbine speed change $dNt_o$. In this specification, the term "leveled transitional pressure" shall mean and refer to increasing pressure including intermediate portion unchanging in level for a certain period. Such the leveled transitional pressure control is accomplished not by means of controlling the 3-4 clutch locking pressure through the second duty solenoid valve 122 but by means of controlling the servo apply pressure through the first duty solenoid valve 121. Specifically, as shown in FIG. 7, in the hydraulic control circuit 100, since both pressure lines 225 leading to the brake release pressure line 221 and pressure line 226 leading to the 3-4 clutch pressure line 227 branch off from the pressure line 224 extending from the second duty solenoid valve 122, and the orifice 151 is disposed upstream from the juncture of the pressure line 224. During supplying or discharging the operating pressure, the pressure line 224 is disconnected in terms of operating pressure from the second duty solenoid valve 122 upstream therefrom. In addition, while the piston reciprocates within the servo cylinder under the supply of brake release pressure to the brake release pressure chamber 54, it is difficult to control the operating pressure within the pressure chamber 54b of the 3-4 clutch 53.

Figure 6:
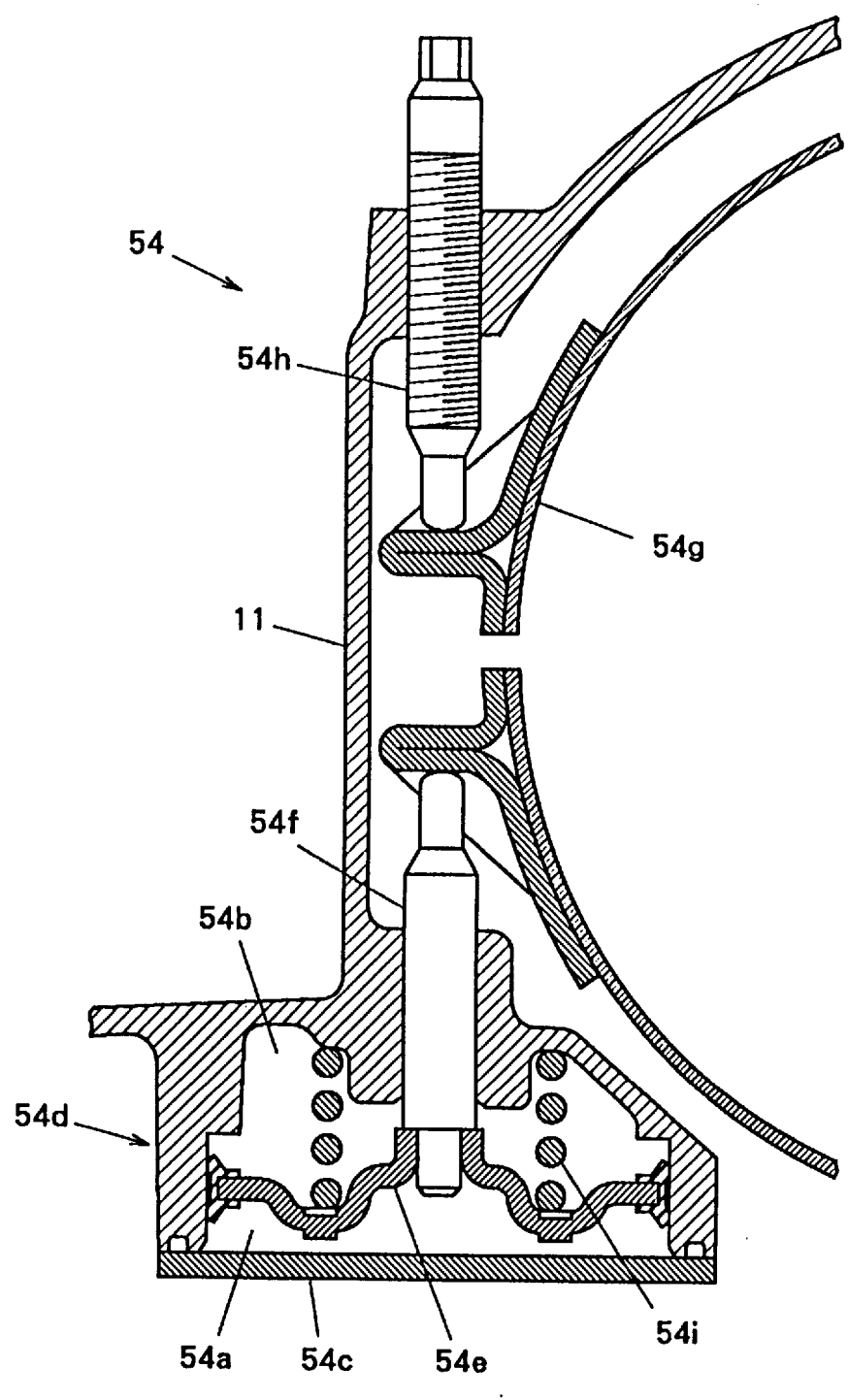
FIG. 6 is a cross-sectional view of a hydraulic actuator of a 2-4 brake.

On the other hand, as shown in FIG. 6, since the brake apply pressure chamber 54a and the brake release pressure chamber 54b are separated by the piston 54e, the operating pressure within the brake release pressure chamber 54b is directly affected by the operating pressure within the brake apply pressure chamber 54a. Consequently, controlling the 3-4 clutch pressure is effected through the brake release pressure by means of controlling the brake apply pressure. In addition, the second duty solenoid valve 122 controls the quantity of the operating oil supplied to the brake release pressure chamber 54b of the 2-4 brake 54 and the pressure chamber of the 3-4 clutch 53 through the orifice 151. By this means, the transition time of the leveled transitional pressure in the inertia phase during locking the 3-4 clutch 53 is controlled. Accordingly, for the 2-3 up-shift control, while the level of the leveled transitional pressure during locking the 3 -4 clutch 53 is controlled by means of the first duty solenoid valve 121, the transition time is controlled by means o f the second duty solenoid valve 122 .

An explanation is subsequently provided with regard to the practical control of the first and second duty solenoid valves 121 and 122.

Figure 41:
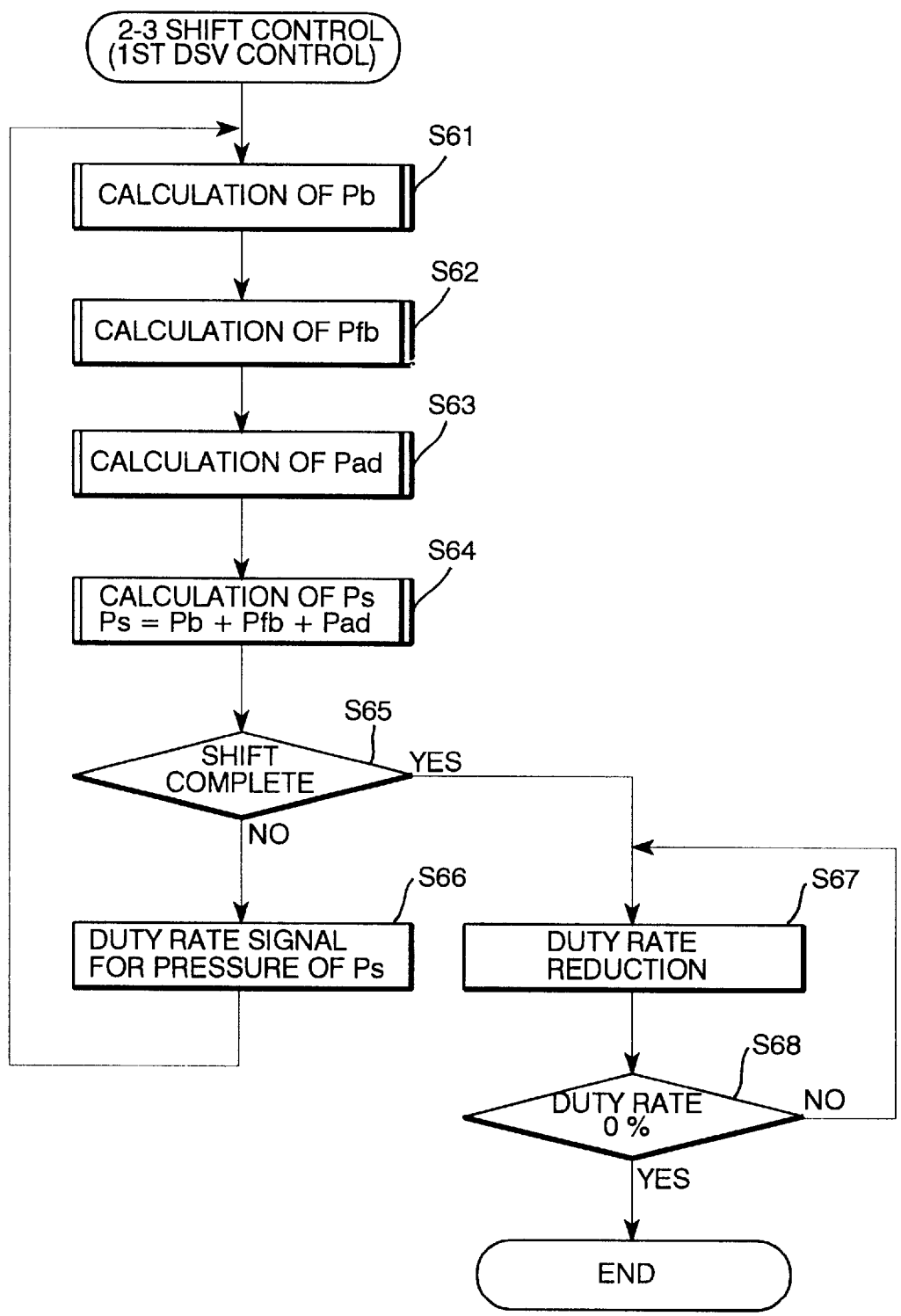
FIG. 41 is a flowchart illustrating a control sequence for the first duty solenoid valve (DSV) during a 2 - 3 shift.

Control of the servo apply pressure through the first duty solenoid valve 121 is executed in accordance with the sequence routine shown in FIG. 41. In the routine, function blocks at steps S61 through S64 operate in the same manner as those at steps S1 through S4 in the sequence routine of the 1-2 up-shift shown in FIG. 22. The base pressure Pb, feedback pressure Pfb and learning control pressure Pab are calculated, respectively, in accordance with the same sequence routine as for each of the related routines described above, and following their addition, the computed operating pressure Ps is obtained. At step S65, a determination is subsequently made as to whether or not the shift operation has been completed. Until the shift operation has been completed, a duty rate corresponding to the computed operating pressure Ps is provided at step S66. Since the duty rate of the first duty solenoid valve 121 immediately prior to an occurrence of the 2-3 up-shift is 0%, and consequently, brake apply pressure is supplied, the pre-charge control is not executed.

Figure 43:
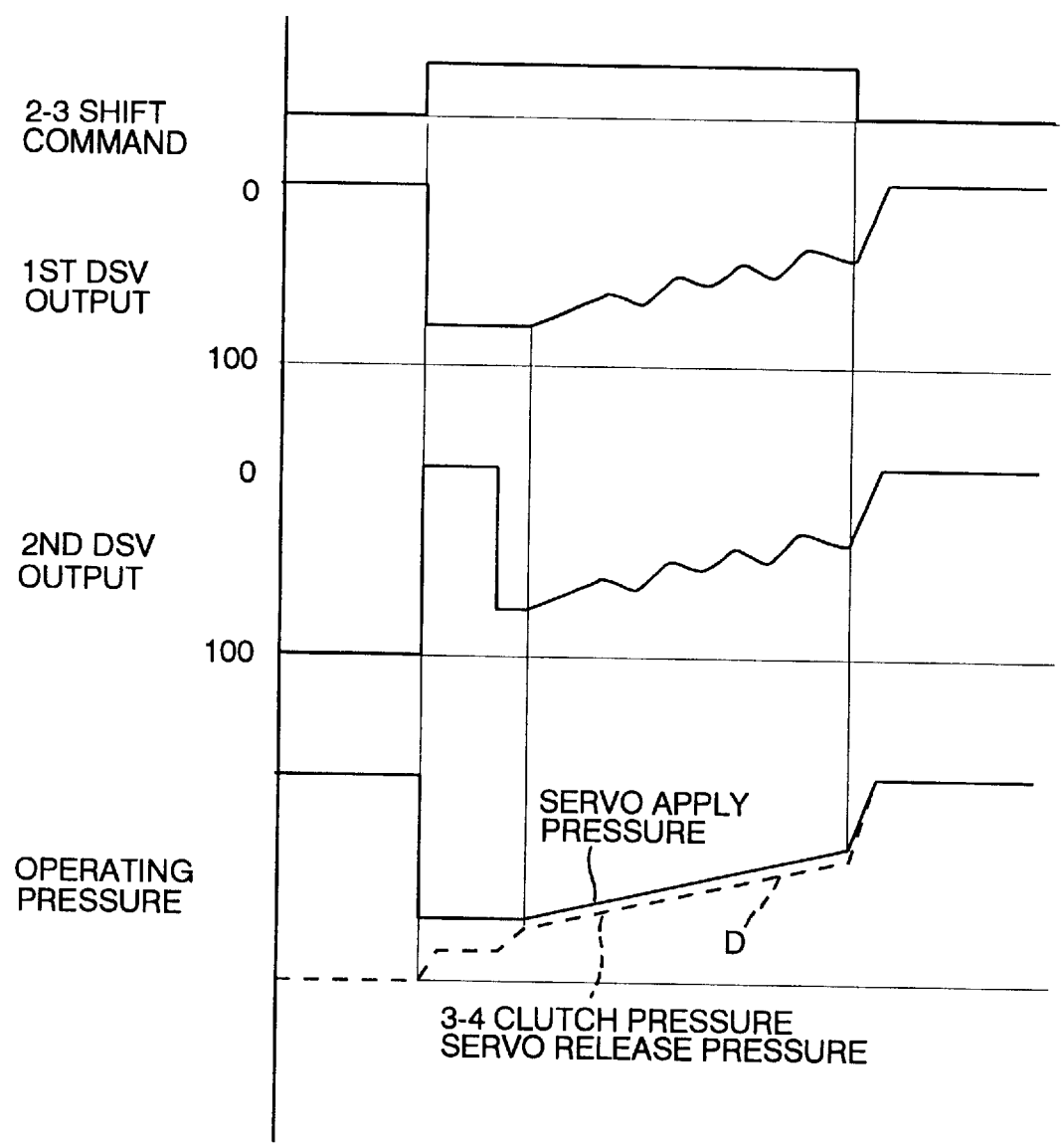
FIG. 43 is a time chart showing changes in various factors during a 2 - 3 shift.

When the 2-3 up-shift has been concluded, the duty rate is reduced at a fixed rate to 0% through steps S67 and S68. In this way, a duty rate signal, changing as shown in FIG. 43, is output, in accordance with which, as seen in FIG. 43, there is developed a brake apply pressure dropping once from a specified level and increasing again to another specified level by way of a leveled transitional pressure. The 3-4 clutch pressure and brake release pressure are correspondingly developed. In particular, as labeled with a character "D" in FIG. 43, the leveled transitional pressure in the inertia phase during locking the 3-4 clutch 53 is controlled to a level corresponding to that of the brake apply pressure.

Figure 42:
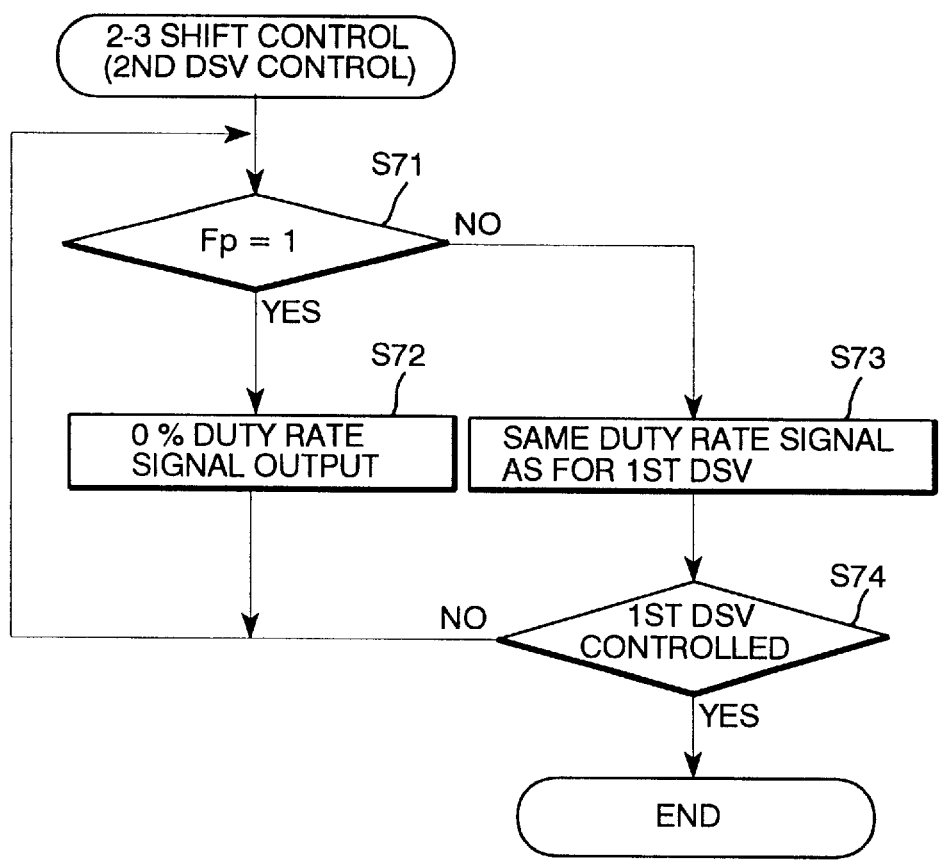
FIG. 42 is a flowchart illustrating a control sequence for a second duty solenoid valve (DSV) during a 2 - 3 shift.

On the other hand, control of the second duty solenoid valve 122 is executed in accordance with the sequence routine shown in FIG. 42. the first step at step S71 in the figure is to make a determination as to whether or not the pre-charge flag Fp has been up or set to the state 1, i.e. whether or not it is still in the pre-charge period. When it is in the pre-charge period (Fp=1), then, the duty rate of the second duty solenoid valve 122 is set 0% at step S72 so as to execute the pre-charge control in which the oil passage leading to the brake release pressure chamber 54b of the 2-4 brake 54 and pressure chamber of the 3-4 clutch 53 are rapidly filled with the operating oil.

Subsequently, when the pre-charge control has been achieved (Fp=0), then, at step S73, a signal representative of the duty rate which is the same as that of the first duty solenoid valve 121 obtained at step S66 in the routine in FIG. 41 is output to the second duty solenoid valve 122. As a result, through the orifice 151, the quantity of the operating oil supplied to the brake release pressure chamber 54b of the 2-4 brake 54 and pressure chamber of the 3-4 clutch 53 is reduced more than during the pre-charge control and suppressed to a specified quantity. In particular, the duty rate of the second duty solenoid valve 122 made to be the same as that of the first duty solenoid valve 121 provides for the brake apply and release chambers 54a and 54b of the 2-4 brake 54 the same level of brake apply and brake release pressure, respectively. In this instance, as shown in FIG. 6, since the pressure receiving area of the piston 54e are substantially the same in both chambers 54a and 54b, the piston 54e strokes in the releasing direction only through the effort of the return spring 54i, this movement being accomplished over a relatively long period of time. Subsequently, when a determination is made at step S74 that the control of the first duty solenoid valve 121 is over, the control of the second duty solenoid valve 122 is also terminated.

As described above, a sufficiently long period is assured for the leveled transitional pressure during locking the 3-4 clutch 53 and, consequently, the inertia phase is positively completed in this transition period, so as, for example, to avoid an occurrence of a significant shift shock due to a sudden increase in the operating pressure following the conclusion of a transition period within the inertia phase.

For a 3-4 up-shift, simultaneously with releasing the forward clutch 51, the 2-4 brake 54 is locked. When a 3-4 shift command is provided, the hydraulic control circuit 100 changes its operating condition such that the first solenoid valve 1111 switches from OFF state to ON state as shown in FIGS. 15 and 16, forcing the 3-4 shift valve 105 to shift its spool to connect communication between the forward clutch pressure line 219 and the brake release pressure line 221. On the other hand, the third duty solenoid valve 123 discharges the forward clutch pressure, as well as the brake release pressure, through the pressure lines 219 and 221, so that the forward clutch 51 is unlocked and the 2-4 brake 54 is locked. At this time, while the brake apply pressure chamber 54a of the 2-4 brake 54 has been filled with the brake apply pressure, the control of levelled transitional pressure of the brake apply pressure is executed during locking the 2-4 brake 54 through the first duty solenoid valve 121.

Figure 44:
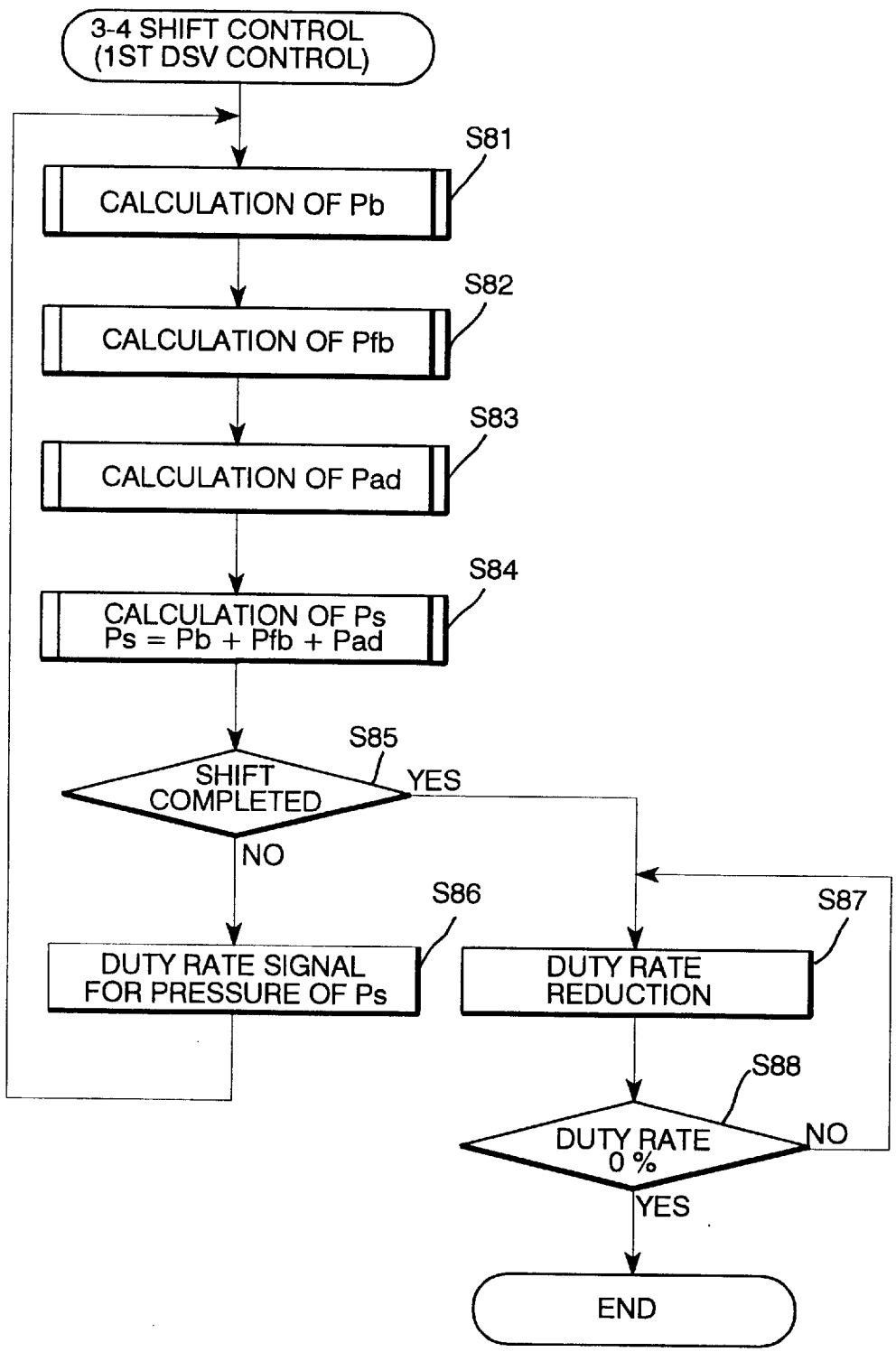
FIG. 44 is a flowchart illustrating a control sequence for the first duty solenoid valve (DSV) during 3 - 4 shifting.
Figure 46:
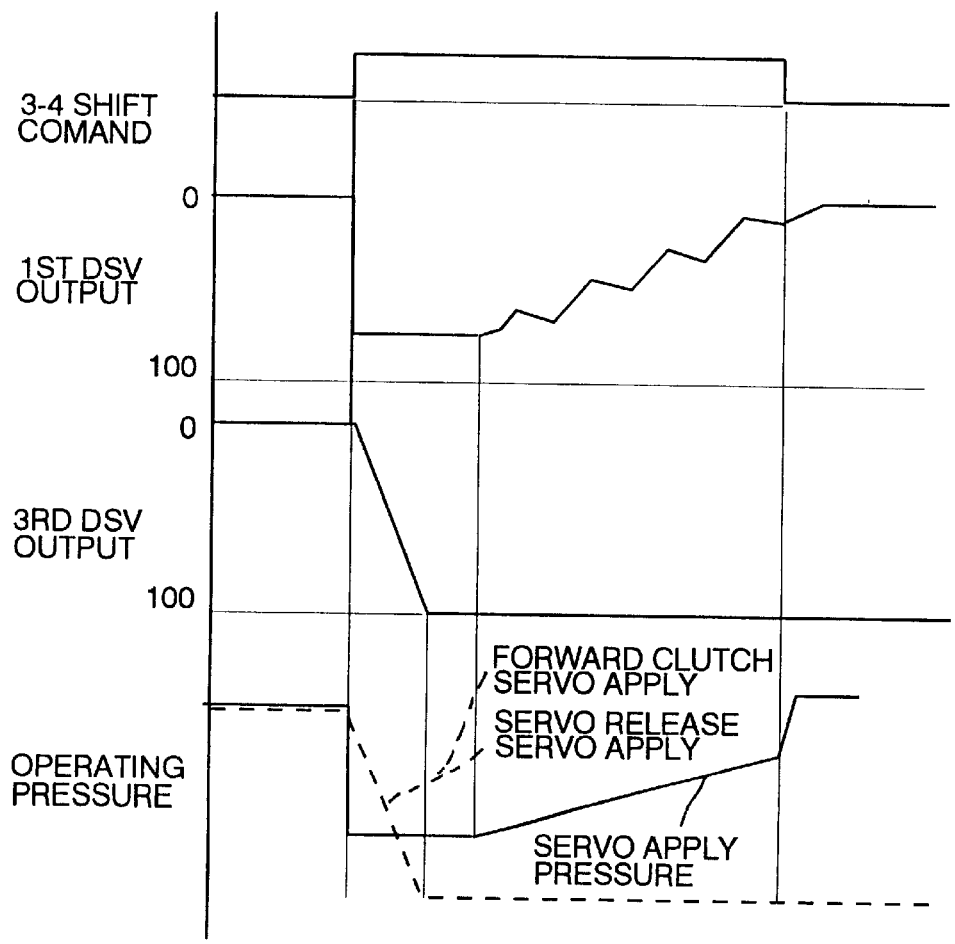
FIG. 46 is a time chart showing changes in various factors during a 3 - 4 shift.

Control of the brake apply pressure through the first duty solenoid valve 121 is executed in accordance with the sequence routine shown in FIG. 44. This sequence routine operates similarly to the control of the first duty solenoid valve 121 during a 2-3 up-shift. Through steps S81 - S84, after having obtained the base pressure Pb, feedback pressure Pfb and learning control pressure Pad, a computed operating pressure Ps is obtained. Thereafter, through steps S85 and S86, a signal representative of a duty rate corresponding to the computed operating pressure Ps is output to the first duty solenoid valve 121 continuously from an output of a shift command to the completion of the 3-4 up-shift, so as thereby to control the brake apply pressure. After the completion of the 3-4 up-shift, the duty rate is reduced by a fixed rate to 0% through steps S87 and S88. In the way, as shown in FIG. 46, the brake apply pressure is developed such that it drops once at the beginning of the 3-4 up-shift and increases again via a period of a transition time of the levelled transitional pressure at a specified level.

Figure 45:
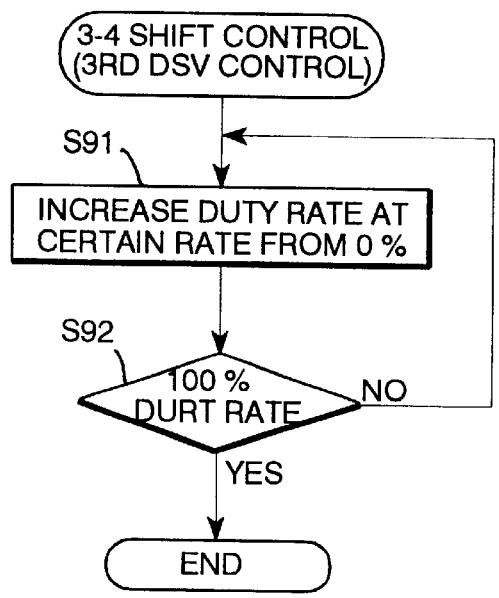
FIG. 45 is a flowchart illustrating a control sequence for a third duty solenoid valve (DSV) during 3 - 4 shifting.

Discharging the forward clutch pressure and brake release pressure is accomplished by the sequence routine shown in FIG. 45 through the third duty solenoid valve 123. This discharge control increases the duty rate from 0% to 100% at a fixed rate from an output of a shift command through steps S91 and S92. Because of this, as shown in FIG. 46, the forward clutch pressure and brake release pressure are discharged at a constant rate. As described above, while the forward clutch 51 is released relatively quickly, the 2-4 brake 54 is brought into coupling by means of the feedback control of the brake apply pressure via an appropriate slipping condition, making the turbine speed Nt change in conformity with the target turbine speed change $dNt_o$.

A 1-3 up-shift is achieved by locking the 3-4 clutch 53 while holding the 2-4 brake unlocked. During the 1-3 gear shift, while the 3-4 clutch pressure and brake release pressure are supplied, the brake apply pressure is also supplied providing for a shift to the second (2nd) gear or the forth (4th) gear from the third gear immediately after the 1-3 up-shift. Therefore, in this 1-3 up-shift, the supply control is accomplished of the brake apply pressure through the first duty solenoid valve 121 simultaneously with the supply control of the 3-4 clutch pressure and brake release pressure through the second duty solenoid valve 122.

Figure 47:
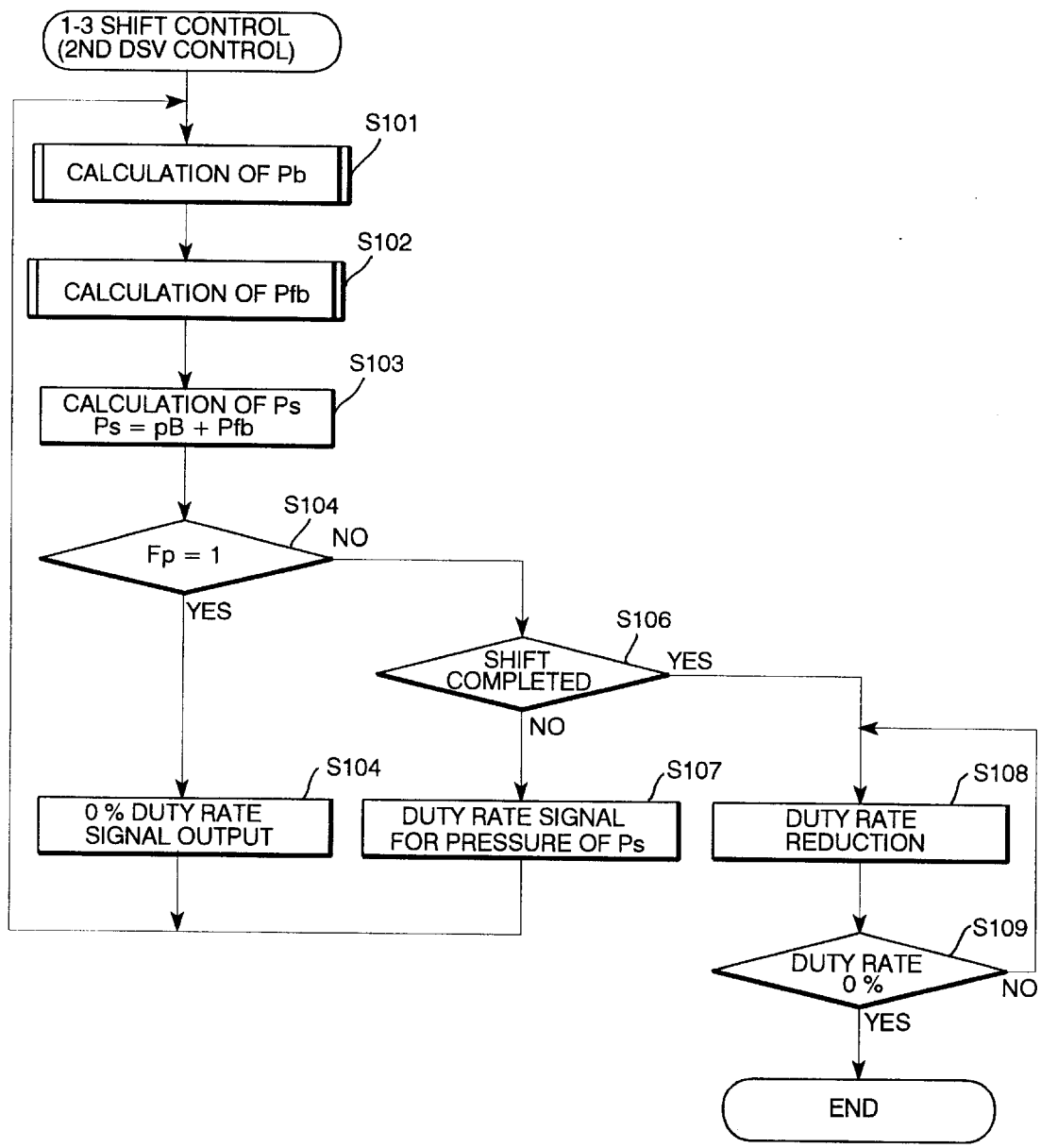
FIG. 47 is a flowchart illustrating a control sequence for the second duty solenoid valve (DSV) during a 1 - 3 shift.

Control of the second duty solenoid valve 122 during the 1-3 up-shift is executed in accordance with the sequence routine shown in FIG. 47. This sequence routine is, on one hand, similar to the brake apply pressure control accomplished through the first duty solenoid valve 121 during a 1-2 up-shift shown in FIG. 22 and, on the other hand, differs only at a point in which the learning control is not exercised. Specifically, after calculations of the base pressure Pb and feedback pressure Pfb at steps S101 and S102, the pressure Ps is calculated by adding them together at step S103. When it is still in the pre-charge period (Fp=1) which is determined in the precharge determination sequence routine, the duty rate of the second duty solenoid valve 122 is changed to 0% so as to execute pre-charging to fill quickly the oil passage leading to the pressure chamber of the 3-4 clutch 53 with the operating oil through steps S104 and S105. When the pre-charge control is concluded (Fp=0), through steps S106 and S107, the duty rate corresponding to the computed operating pressure Ps is calculated, and a signal representative of which is continuously output to the second duty solenoid valve 122 until completion of the 1-3 up-shift. After the completion of the 1-3 up-shift, the duty rate is reduced to 0% at a fixed rate through steps S108 and S109.

Figure 49:
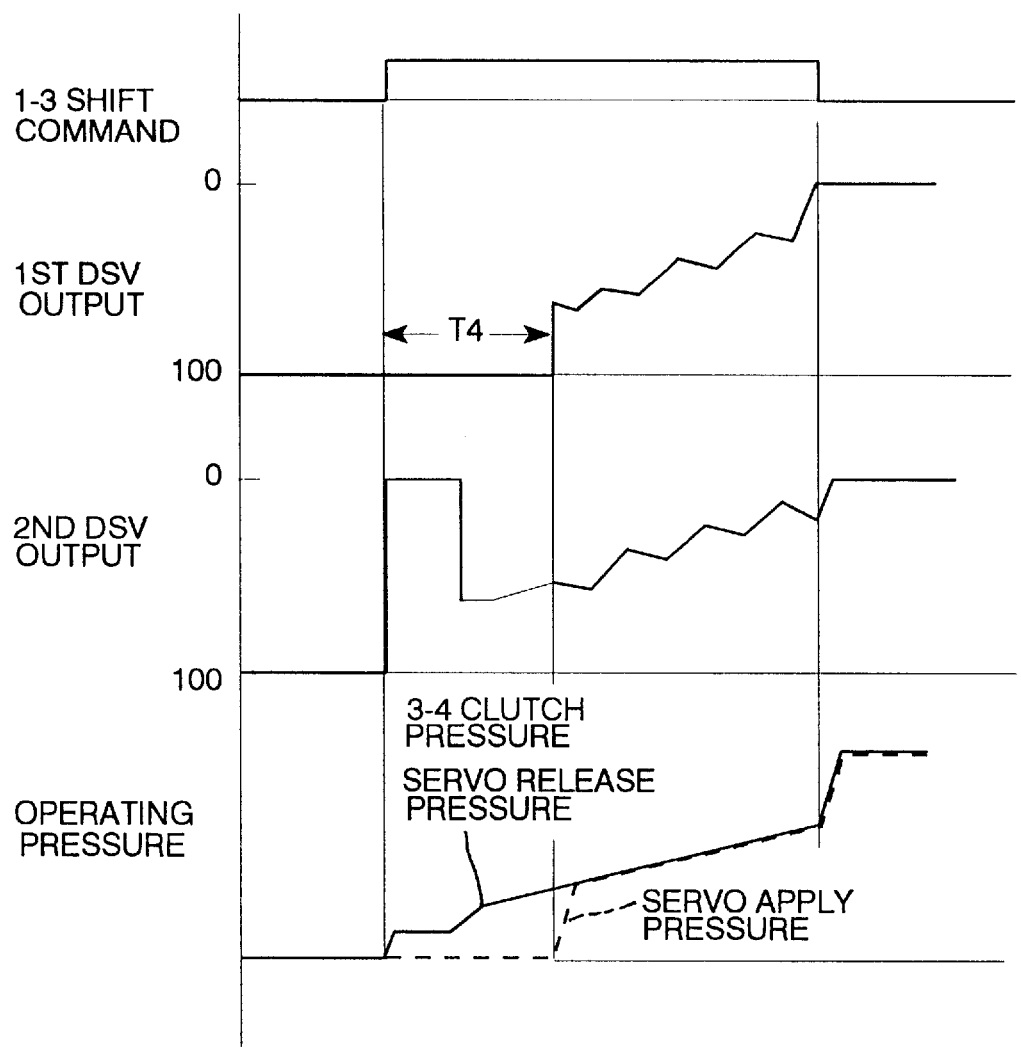
FIG. 49 is a time chart showing changes in various factors during a 1 - 3 shift.

With the control, as shown in FIG. 49, the 3-4 clutch pressure and brake release pressure are supplied via the state of the specified constant pressure, and the 3-4 clutch 53 is brought into coupling via an appropriate slipping condition, making the turbine speed Nt change in conformity with the target turbine speed change $dNt_o$.

Figure 48:
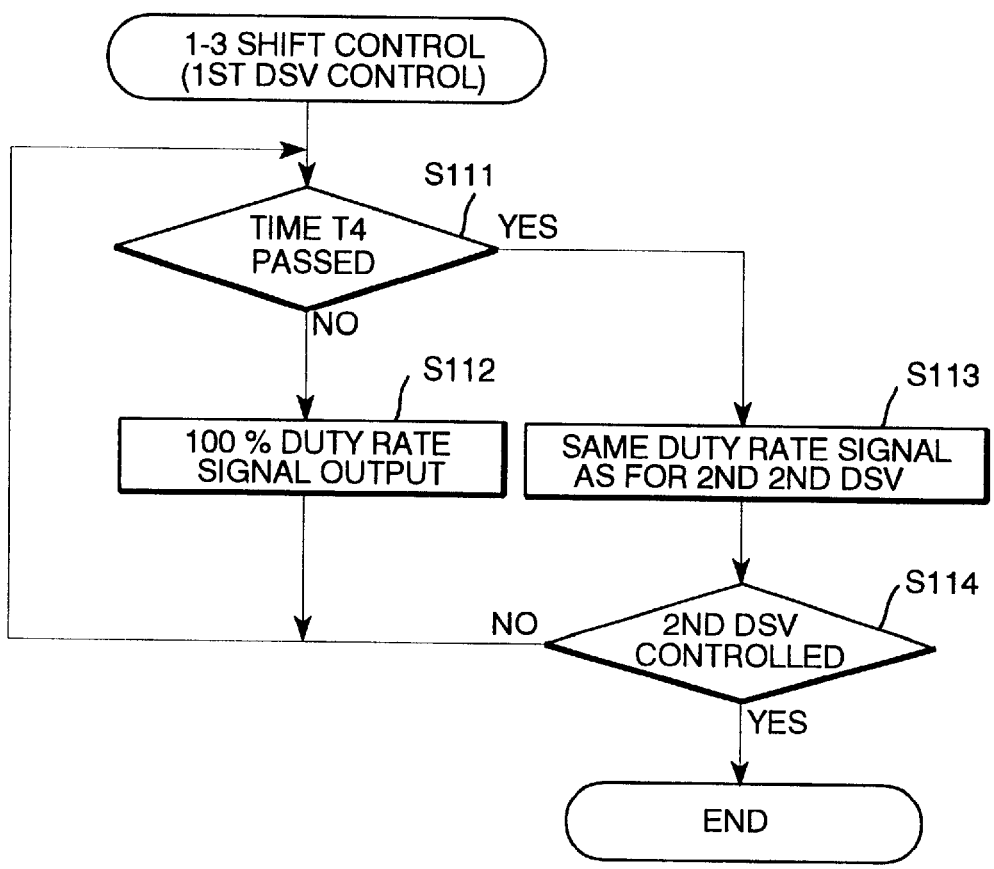
FIG. 48 is a flowchart illustrating a control sequence for the first duty solenoid valve (DSV) during a 1 - 3 shift.

In order for the first duty solenoid valve 121 to provide for shifting to the second gear or the forth gear after the 1-3 up-shift, control of the supply of brake apply pressure is executed in accordance with the sequence routine shown in FIG. 48. At step S11, after an output of a shift command for the 1-3 up-shift, a determination is made as to whether or not a specified time T4 has passed. Until the specified time T4 has passed, a signal representative of a duty rate of 100% is output to the first duty solenoid valve 121 at step S112. During this period, the brake apply pressure is not supplied, and only the 3-4 clutch pressure and brake release pressure are supplied. This is to avoid that the 2-4 brake 54 is temporally brought into coupling due to the brake apply pressure supplied prior to the brake release pressure. This prevents creation of the second gear during the 1-3 up-shift, or an occurrence of interlock of the transmission gear mechanism caused by simultaneously locking the 2-4 brake 54 and 3-4 clutch 53. While, when the specified time T4 has passed, a signal representative of the duty rate which is the same as that output to the second duty solenoid valve 122 is output to the first duty solenoid valve 121 at step S113, when it is determined that the control of the second duty solenoid valve 122 has been completed, the control of the first duty solenoid valve 121 is also terminated at the moment at step S114.

As shown in FIG. 49, the operating pressure which is the same in level as the brake release pressure is supplied as the brake apply pressure from a time of the lapse of the specified time T4 following an output of a shift command, In such a case, as described previously, since the areas for receiving pressure of the piston 54e are substantially equal to each other on the sides of the brake apply pressure chamber 54a and brake release pressure chamber 54b of the 2-4 brake 54, only the return spring 54i acts on the piston 54e, preventing the piston 54e from stroking in the direction in which it brings the 2-4 brake 54 into locking.

A 1-4 up-shift is accomplished by, on one hand, unlocking the forward clutch 51 and, on the other hand, locking both 3-4 clutch 53 and 2-4 brake 54 so as to perform control of supplying the 3-4 clutch pressure though the second duty solenoid valve 122, control of supplying the brake apply pressure through the first duty solenoid valve 121, and control of discharging the forward clutch pressure through the third duty solenoid valve 123. As will be obvious through a comparison between FIGS. 13 and 16, during the control, the hydraulic control circuit 100 causes the first solenoid valve 111 switches from OFF state to ON state, supplying pilot pressure to the 3-4 shift valve 105 through the relay valve 107. As a result, the 3-4 shift valve 105 disconnects the communication of the brake release pressure line 221 with the 3-4 clutch pressure line 227 and connects the communication of it with the forward clutch pressure line 219.

Figure 50:
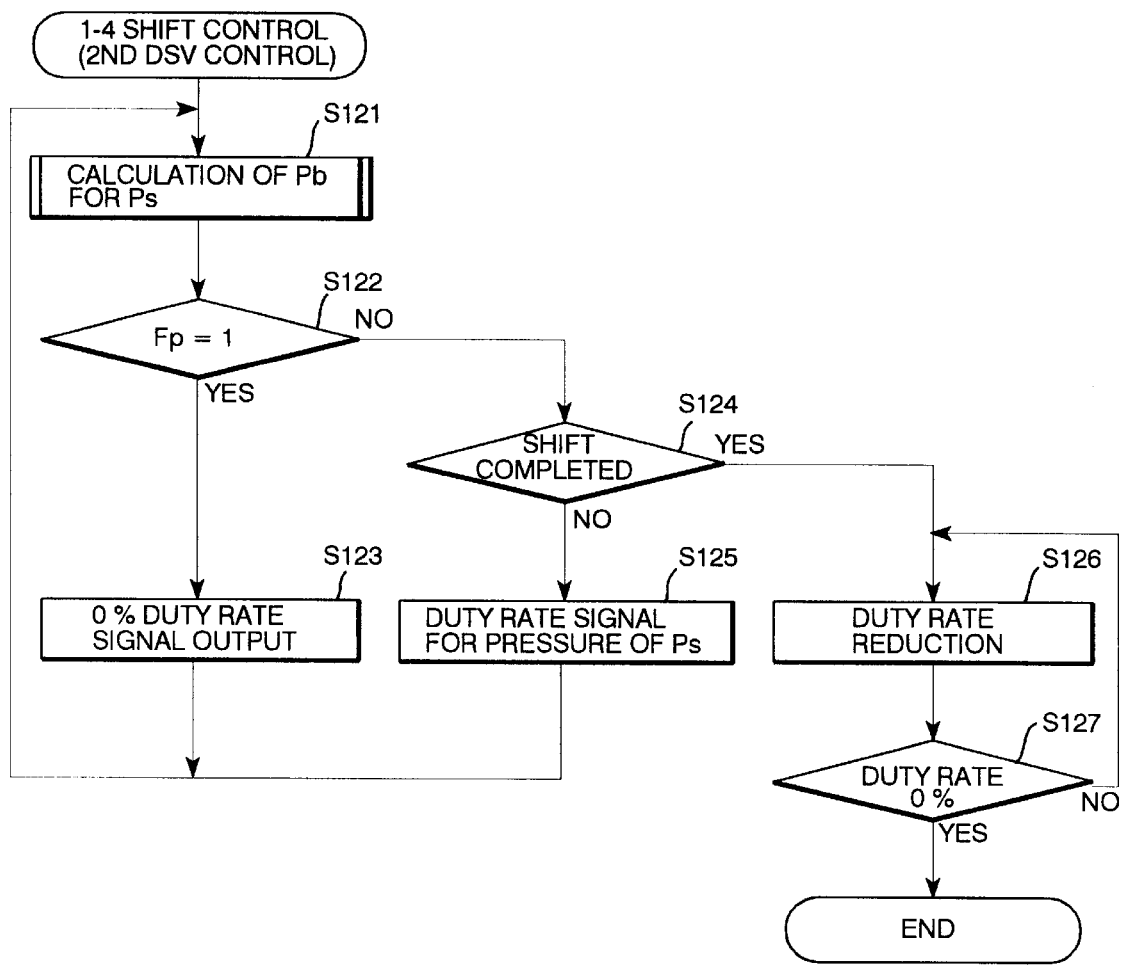
FIG. 50 is a flowchart illustrating a control sequence for the second duty solenoid valve (DSV) during a 1 - 4 shift.
Figure 51:
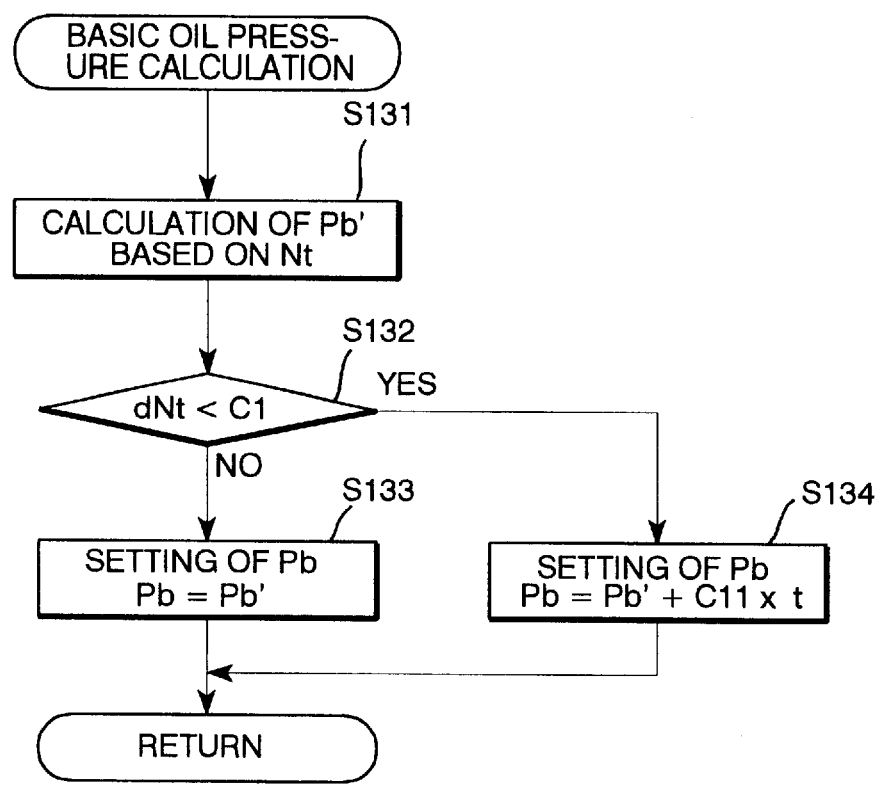
FIG. 51 is a flowchart illustrating a sequence for a calculation of base pressure during a 1 - 4 shift.

One of the duty solenoid valves operative during the 1-4 up-shift, namely the second duty solenoid valve 122, controls supply of the 3-4 clutch pressure in accordance with the sequence routine shown in FIG. 50. After having calculated the operating pressure Ps at step S121, through steps S122 and S123, the second duty solenoid valve 1022 is operated at a duty rate of 0% for the specified pre-charge period (Fp=1) so as to execute the pre-charge control by which the operating pressure is quickly filled in the oil passage leading to the pressure chamber of the 3-4 clutch. When the precharge control is concluded (Fp=0), a signal representative of the duty rate corresponding to the computed operating pressure Ps is continuously output to the second duty solenoid valve 122 until completion of the 1-4 up-shift, through steps S124 and S125. In addition, after the completion of the 1-4 up-shift, the duty ratio is reduced to 0% at a fixed rate through steps S126 and S127. In this instance, during the 1-4 up-shift, without calculating the feedback pressure Pf and leaning control pressure Pad, the base pressure is substituted for the calculated pressure Ps. In place of the calculation of this base pressure, as shown in FIG. 51, an initial level of base pressure Pb', which is established corresponding to the turbine speed Nt immediately before the 1-4 up-shift at step S131, is simply substituted for the base pressure Pb until commencement of the inertia phase in which the turbine speed change dNt becomes smaller than the specified change C1 through steps S132 and S133 and thereafter increased at a fixed rate at steps S134.

This is because, the 1-4 up-shift is generally demanded in driving conditions where the engine throttle valve is abruptly closed and needs not any accurate control of pressure, such as the feedback control and the learning control.

Figure 52:
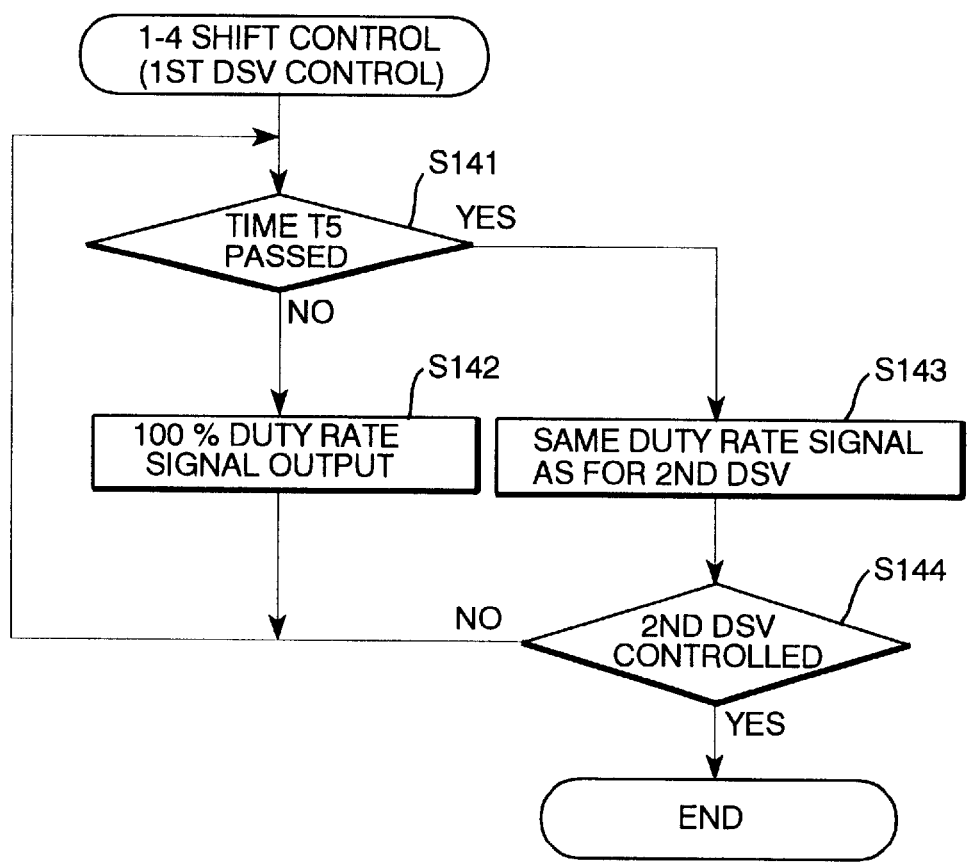
FIG. 52 is a flowchart illustrating a control sequence for the first duty solenoid valve (DSV) during a 1 - 4 shift.

Control of the brake apply pressure through the first duty solenoid valve 121 during the 1-4 up-shift is executed in accordance with the sequence routine shown in FIG. 52. Similarly to the control for the 1-3 up-shift, after the an output of a shift command for the 1-4 up-shift, a determination is made at step S141 as to whether or not a specified time T5 has passed. Until the specified time T5 has passed, a signal representative of a duty rate of 100% is output to the first duty solenoid valve 121 at step S142. Therefore, provided for the period in which the 100% duty rate signal is output is not brake apply pressure but only the 3-4 clutch pressure and brake release pressure. When the specified time T5 has passed, a signal of the same duty ratio as provided for the second duty solenoid valve 122 is output to the first duty solenoid valve 121 at step S143 and when it is determined that the control of the second duty solenoid valve 122 has terminated, the control of the first duty solenoid valve 121 is also terminated at that moment at step S144.

Figure 54:
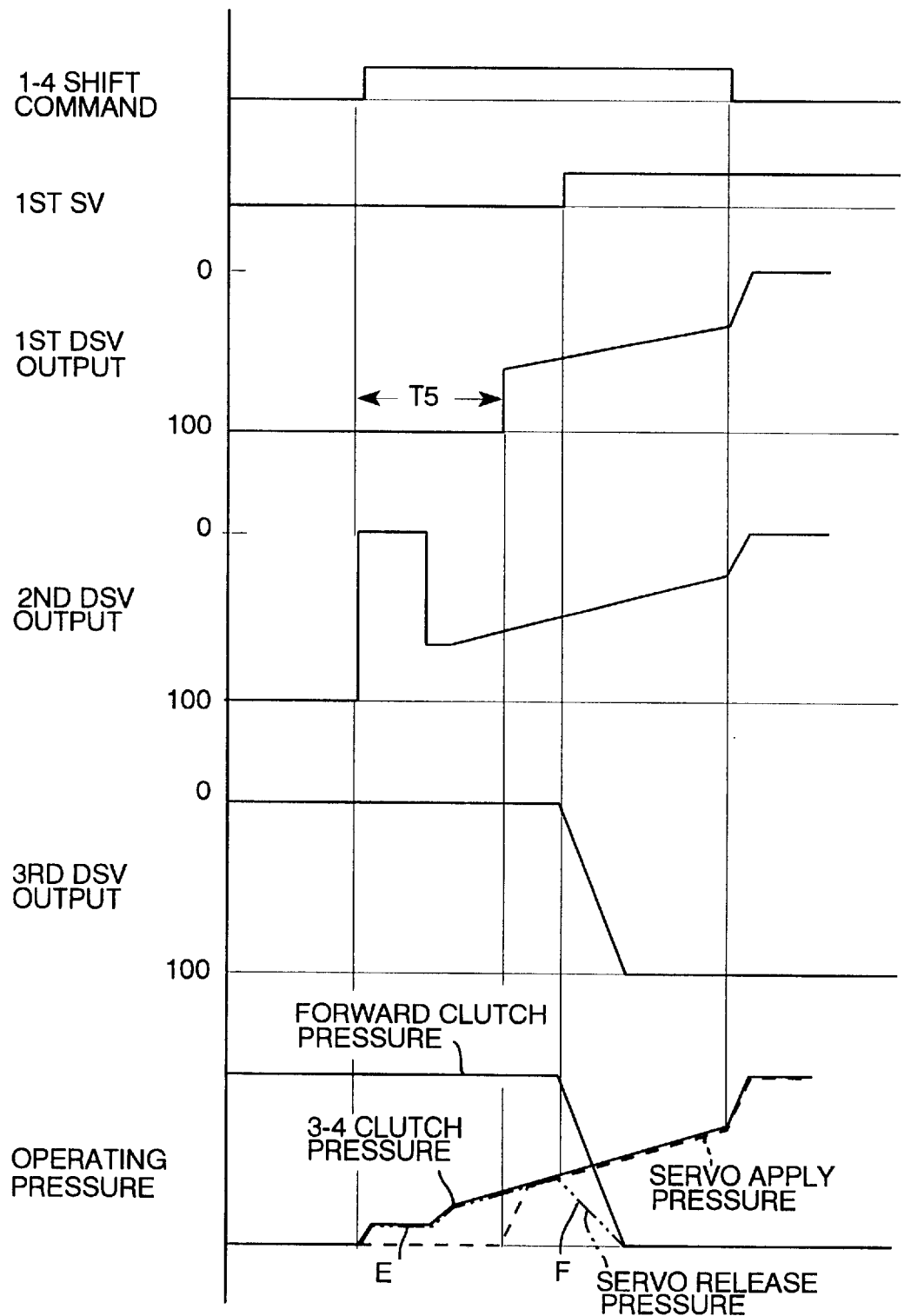
FIG. 54 is a time chart showing changes in various factors during a 1 - 4 shift.

In this way, as shown in FIG. 54, after the lapse of the specified time T5, the brake apply pressure is supplied at the same level as the 3-4 clutch pressure.

Figure 53:
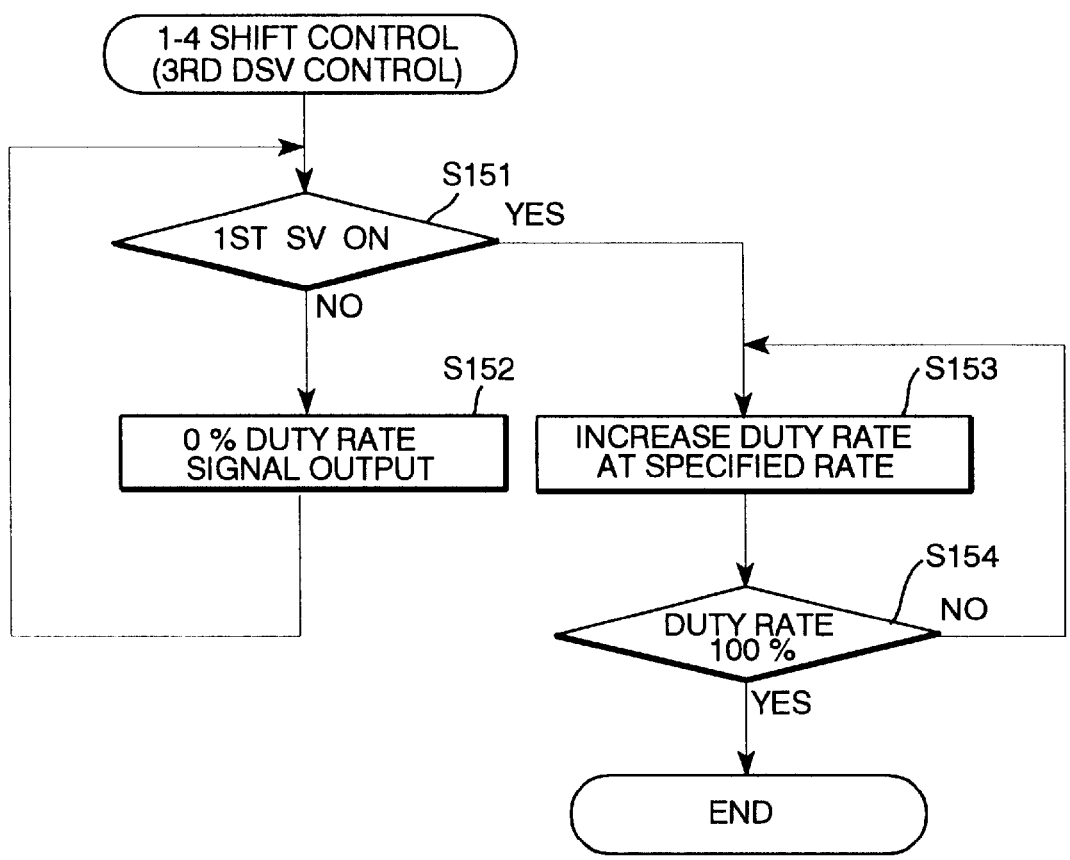
FIG. 53 is a flowchart illustrating a control sequence for the third duty solenoid valve (DSV) during a 1 - 4 shift.

Meanwhile, for the 1-4 up-shift, discharging the forward clutch pressure is controlled through the third duty solenoid valve 123 in accordance with the sequence routine shown in FIG. 53. Specifically, after switching the first solenoid valve 111 from OFF state to ON state at step Si 51, a determination is made at step Si 52 as to whether or not the 3-4 shift valve 105 has switched oil passages. Before switching the oil passages, since there is created communication between the brake release pressure line 221 and 3-4 clutch pressure line 227, the operating pressure is provided for the brake release pressure chamber 54b of the 2-4 brake 54 the brake release pressure equal to the 3-4 clutch pressure (as indicated by a label E in FIG. 54). On the other hand, until the first solenoid valve 111 attains ON state, the duty rate of the third duty solenoid valve 123 is held at 0% at step S152, allowing the forward clutch pressure to be supplied.

When switching the oil passages is caused through the first solenoid valve 111 and 3-4 shift valve 105, the duty rate for the third duty solenoid valve 123 is increased at a fixed rate to 100%, effecting discharging the forward clutch pressure at a linear gradient through steps Si 53 and S154. During the pressure discharge, the brake release pressure line 221 is brought into communication with the forward clutch pressure line 219, discharging the brake release pressure having been supplied simultaneously with the 3-4 clutch pressure in the first half of the 1-4 up-shift, is discharged along with the forward clutch pressure in the second half of the 1-4 upshift (as indicated by a label F in FIG. 54). In this way, with a timing shown in FIG. 54, supplying the 3-4 clutch pressure and brake apply pressure, and discharging the forward clutch are timely accomplished.

As described above, for the 1-4 gear shift, the 3-4 shift valve 105 is switched in state by the first solenoid valve total. As seen in the hydraulic control circuit 1 up shown in FIG. 7, the relay valve 107 disposed between the first solenoid valve 111 and 3-4 shift valve 105 shifts its spool with the 3-4 clutch pressure controlled through the second duty solenoid valve 122. For this arrangement, the first solenoid valve 111 switches from OFF stat e to ON state after an increase in the 2-4 clutch pressure above a specified level sufficient for the first solenoid valve 1011 and 3-4 shift valve to be brought into communication through the relay valve 107.

Figure 55:
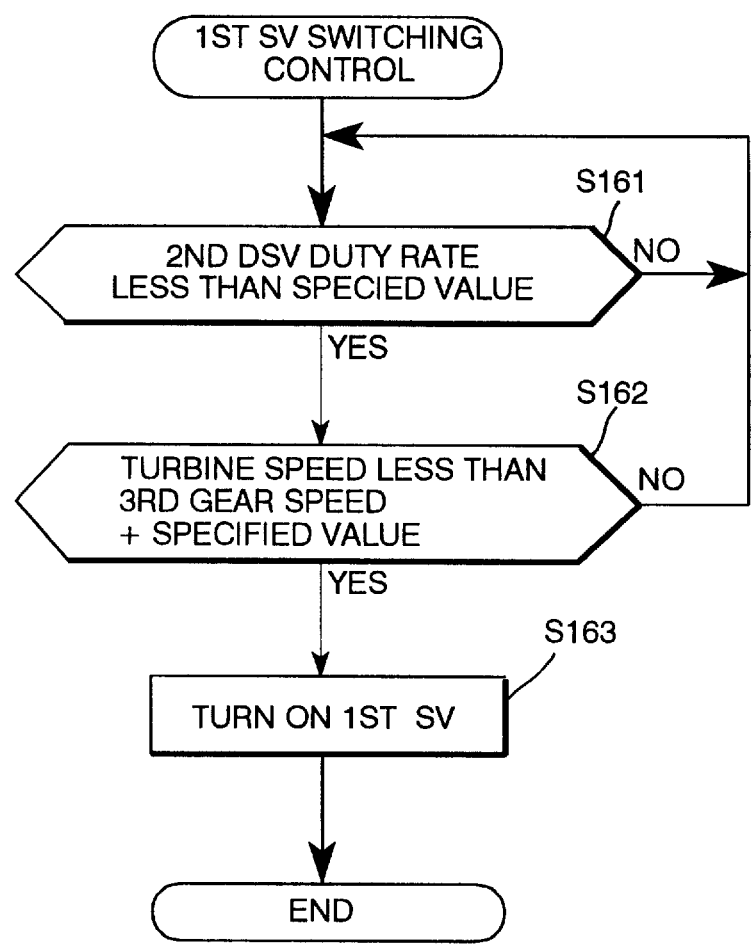
FIG. 55 is a flowchart illustrating a switching control sequence for the first solenoid valve (SV) during a 1 - 4 shift.

This control is executed in accordance with the sequence routine shown in FIG. 55. Specifically, at first, a determination is made at step S161 as to whether or not the output of the second duty solenoid valve 122 has dropped below a specified level. Further, at step S162, another determination is made as to whether or not the turbine speed Nt has get less than a speed which is one obtained by adding a specified value to the turbine speed for the third gear immediately before the 1-4 up-shift. When any determination results is YES, in other words, when the 3-4 clutch pressure has increased up sufficiently for the relay valve 107 to shift its spool against the return spring and when it is monitored that the gear ratio has reached at least that of the third gear, the first solenoid valve 111 is switched to ON state. Thus, the 3-4 shift valve 105 is reliably switched with the pilot pressure from the first solenoid valve 111, discharging the forward clutch pressure and brake release pressure appropriately.

A 2-4 up-shift is achieved by creating a state in which the forward clutch 51 is unlocked and the 3-4 clutch 53 is locked from a locked state of both forward clutch 51 and 2-4 brake 54. Consequently, during the 2-4 up-shift, control is made of supplying the 3-4 clutch pressure through the second duty solenoid valve 122 and unlocking the forward clutch 51 through the third duty solenoid valve 123. Similarly to the 1-4 up-shift, the 3-4 shift valve 105 is switched following switching the first solenoid valve 111 from OFF state to ON state during shifting, switching the communication of the brake release pressure line 221 to with the forward clutch pressure line 219 from with the 3-4 clutch pressure line 227.

Figure 56:
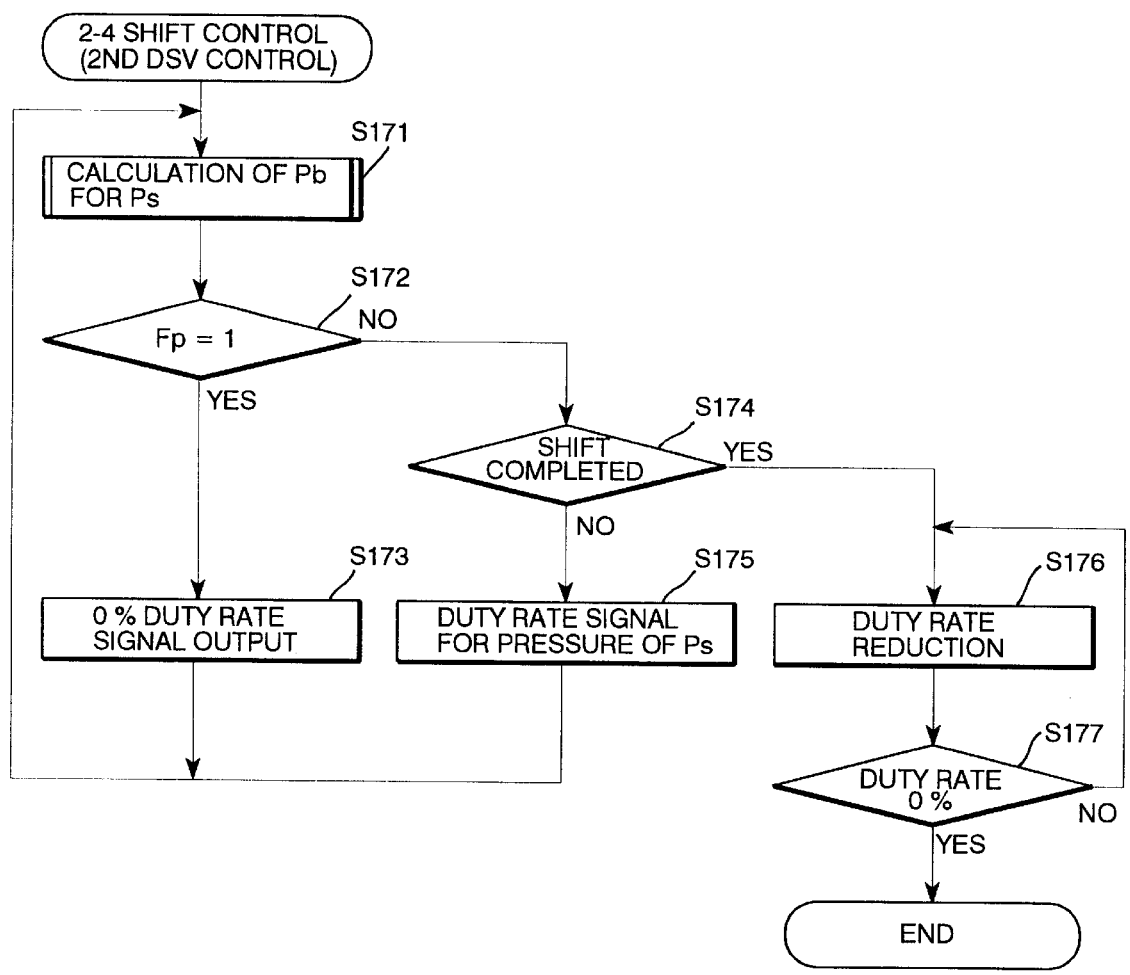
FIG. 56 is a flowchart illustrating a control sequence for the second duty solenoid valve (DSV) during a 2 - 4 shift.

The control of supplying the operating pressure through the second duty solenoid valve 122 during a 2-4 up-shift is executed in accordance with the sequence routine shown in FIG. 56, which is the same as the control by the second duty solenoid valve 122 during the 1-4 up-shift previously described. Specifically, at step Si 71, the base operating pressure Pb is found as the computed operating pressure Ps. During the pre-charge period (Fp=1) that is determined at step S172, the duty rate is set 0% at step S173, promptly filling the pressure line leading to the operating pressure chamber of the 3-4 clutch 53 with the operating oil. In addition, when the pre-charge period is concluded (Fp=0), the duty rate corresponding to the operating pressure Ps, i.e the base pressure Pb, is computed through steps S174 and Si 75 and is output to the second duty solenoid valve 122 until the completion of the 2-4 up-shift. Furthermore, after the completion of the 2-4 up-shift, the duty rate is reduced to 0% at a fixed rate through steps S176 and S177.

Also during the 2-4 up-shift, both feedback control and learning control are interrupted and, in addition, the initial pressure Pb' for the base operating pressure Pb is determined based only the turbine speed Nt prior to the 2-4 up-shift in accordance with the sequence routine similar to that shown in FIG. 51 for the 1-4 up-shift.

Figure 57:
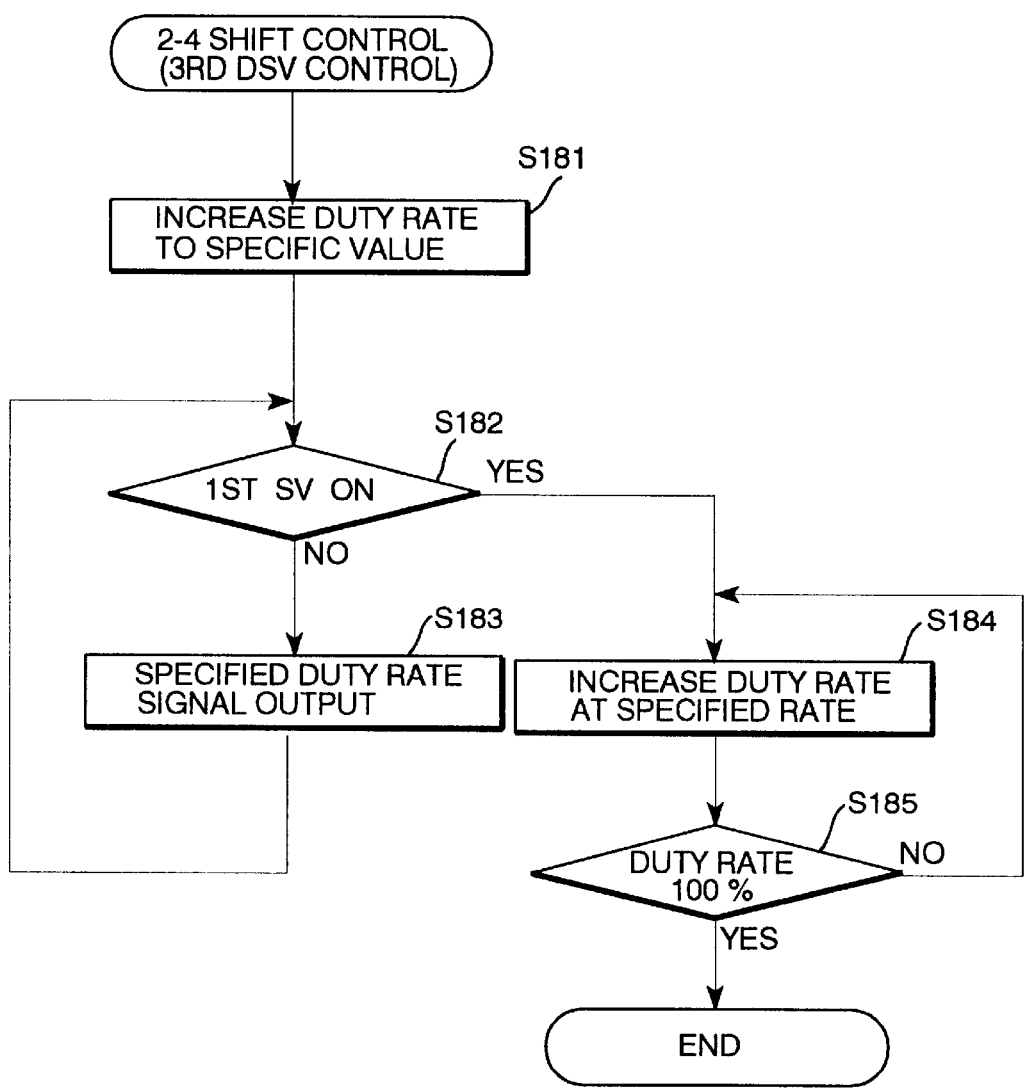
FIG. 57 is a flowchart illustrating a control sequence for the third duty solenoid valve (DSV) during a 2 - 4 shift.
Figure 58:
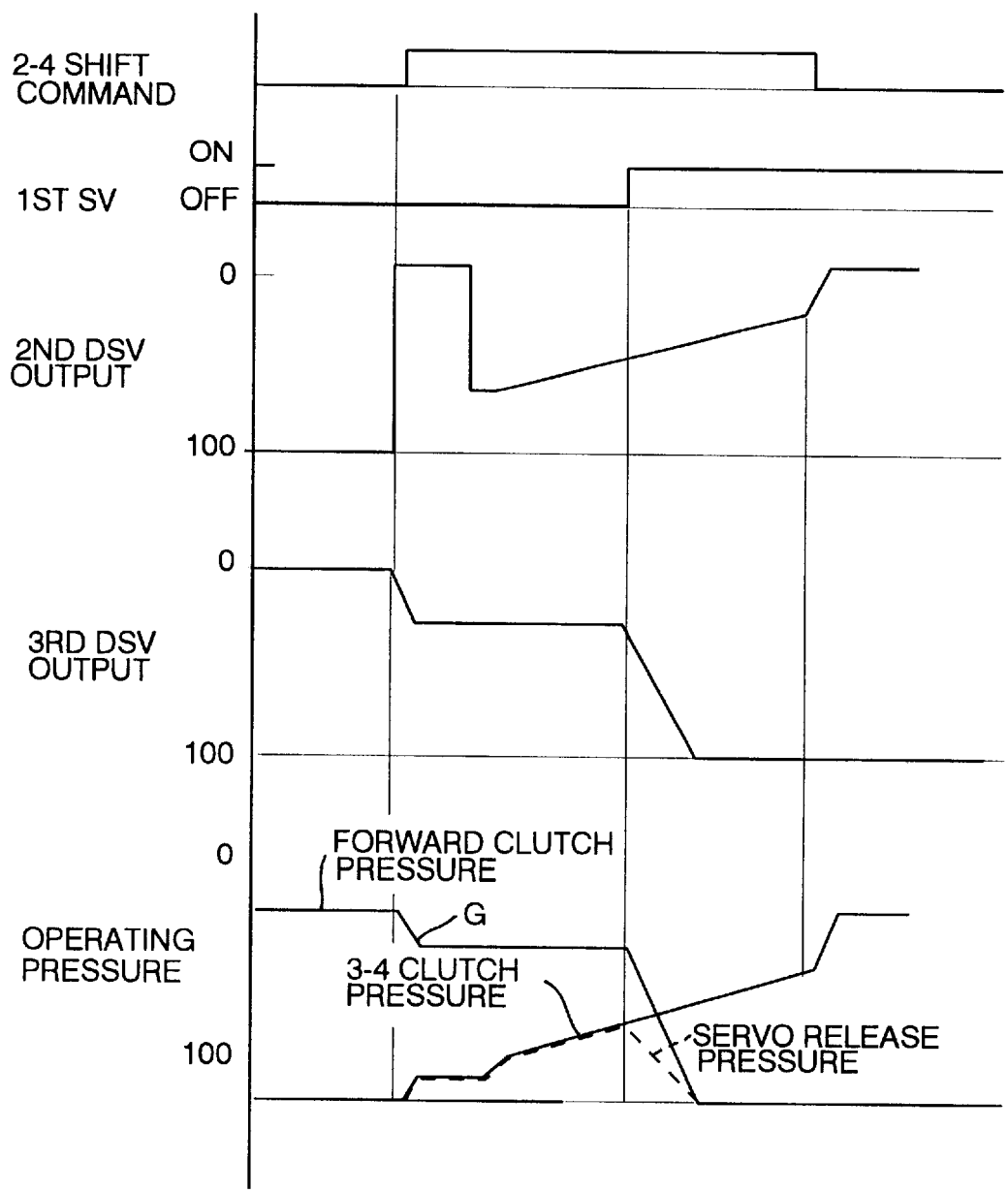
FIG. 58 is a time chart showing changes in various factors during a 2 - 4 shift.

On the other hand, the discharge control of the forward clutch pressure through the third duty solenoid valve 123 during the 2-4 up-shift is executed in accordance with the sequence routine shown in FIG. 57. In this discharge control, at the commencement of shifting, the forward clutch pressure is reduced to a predetermined level by increasing the duty rate from 0% to a predetermined rate at step S181 (as labeled with a character "G" in FIG. 58). Other than the reduction in the duty rate, the sequence routine is the same as that exercised during the 1-4 up-shift.

Specifically, even during the 2-4 up-shift, the relay valve 107 shifts its spool due to a rise in the 3-4 clutch pressure and changes to ON state from OFF state when the 3-4 shift valve 105 is enabled to switch by the first solenoid valve 111. At the time, the forward clutch pressure is discharged and declines at a predetermined gradient due to the linear increase in the duty rate of the third duty solenoid valve 123. Together, at this time, the brake release pressure which has been supplied in conjunction with the 3-4 clutch pressure is discharged together with the forward clutch pressure. In such a manner, the supply of the 3-4 clutch pressure, the supply of the brake apply pressure and the discharge of the forward clutch pressure are caused in the time sequence shown in FIG. 58.

In this instance, the shift of the spool of relay valve 107 is determined on the basis of whether or not the duty rate for the second duty solenoid valve 122 has reached a rate sufficiently great for the 3-4 clutch pressure to cause the relay valve 107 to shift the spool against the return spring. Until the determination of shifting the spool based on the duty rate is completed, the 2-4 up-shift is always achieved via the third gear.

(2). Down-Shift

The following description will be directed to down-shifts.

In general, during down-shifts of the transmission gear in which two friction coupling elements are coincidentally locked and unlocked, respectively, in particular during a torque demand down-shift caused from a particular increase in engine throttle opening, unlocking one friction coupling element is caused in advance of locking another friction coupling element so as to cause slippage of the one friction coupling element, thereby creating an inertia phase in which the turbine speed Nt is allowed to rise. At a moment the turbine speed Nt reaches a pre-calculated turbine speed $Nt_o$ for the termination of the torque demand down-shift, locking the other friction coupling element is caused to create the torque phase.

Figure 59:
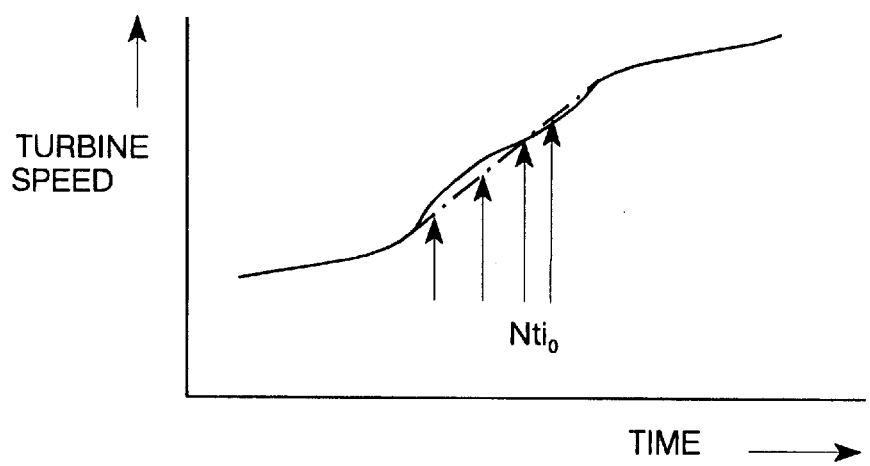
FIG. 59 is an explanatory diagram showing turbine speed of rotation as a control target during a down-shift.

In the down-shift, as shown in FIG. 59, the feedback control is executed of the unlocking pressure for the one friction coupling element so as to make the turbine speed Nt in the inertia phase conform with the target turbine speed $Nti_o$ for every specific control cycle. This is because, in the torque demand down-shift, more importance is attached to control responsiveness rather than shift shocks and, consequently, it is necessary to raise the turbine speed Nt rapidly to the speed to be attained after the down-shift.

A 4-3 gear shift is caused by supplying brake release pressure and forward clutch pressure through the third duty solenoid valve 123, while the first solenoid valve 111 is in ON state and communicates the brake release line 221 with the forward clutch pressure line 219 through the 3-4 shift valve 105 in the hydraulic control circuit 100 as shown in FIG. 7. At this time, the feedback control is exercised of the brake apply pressure by means of the first duty solenoid valve 121, so as thereby to control the rise in the turbine speed Nt accompanying the uncoupling of the 2-4 brake 54 caused by the brake release pressure.

Figure 60:
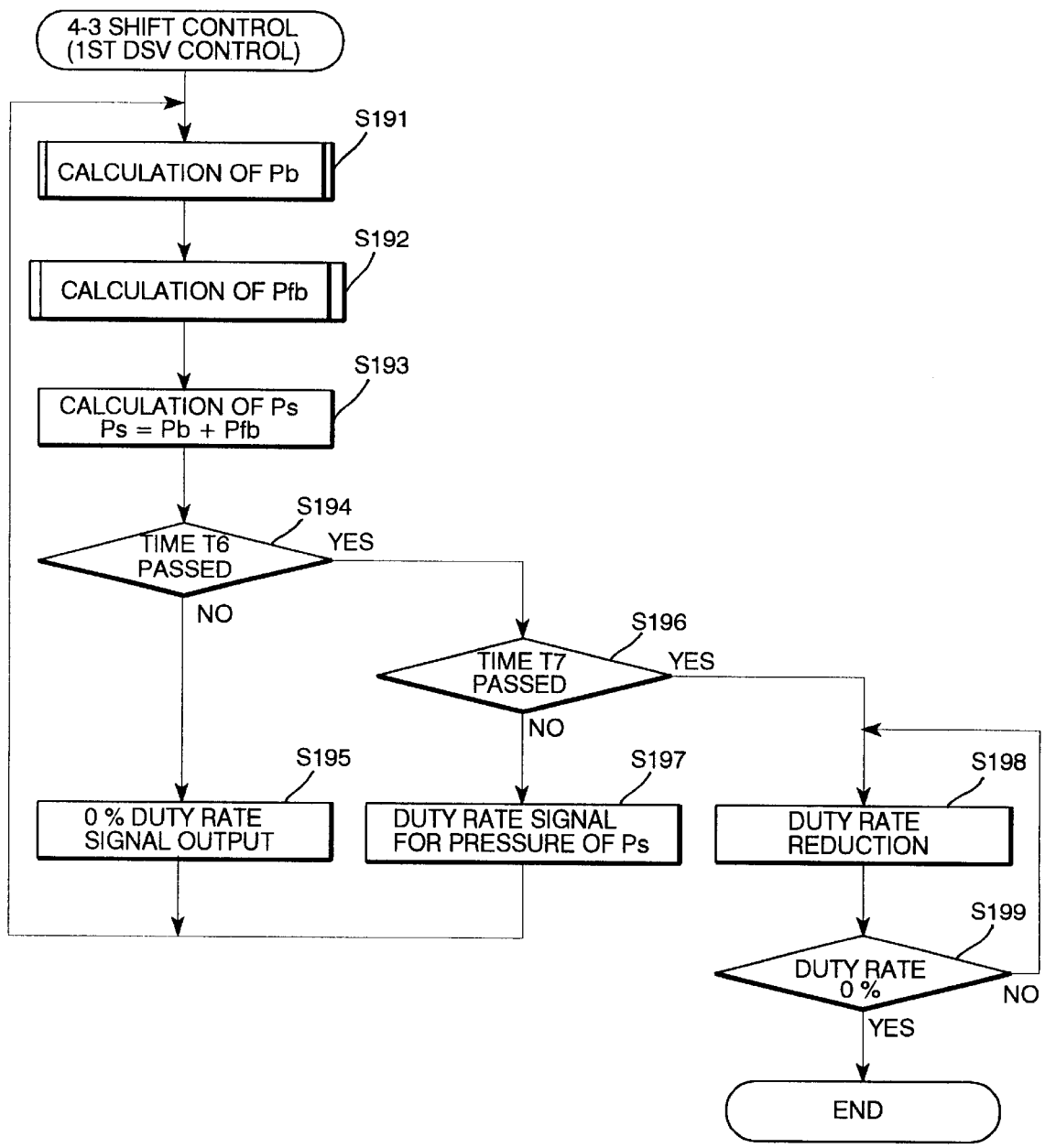
FIG. 60 is a flowchart illustrating a control sequence for the first duty solenoid valve (DSV) during a 4 - 3 shift.

Control of supplying the brake apply pressure through the first duty solenoid valve 121 during the 4-3 down-shift is exercised in accordance with the sequence routine shown in FIG. 60. After computing the base pressure Pb and feedback pressure Pfb steps S191 and S192, respectively, these pressure are added together at step Si 93 to find the computed operating pressure Ps. At step Si 94, a determination is made as to whether or not a predetermined delay time T6 (see FIG. 67) has passed following the output of a shift command. Until the delay time T6 has passed, the sequence routine waits at step S195 with the duty rate of the first duty solenoid valve 121 maintained at 0%. This is in order to conduct the control described below after the line pressure, which tends to rise rapidly accompanying an increase in engine throttle opening during the torque demand down-shift, has been stabilized. When the delay time T6 passes, a determination is made at step S196 as to whether or not a predetermined time T7 has passed from a moment the turbine speed Nt has risen to a speed that is slightly lower by only a very small predetermined value ΔNt than a turbine speed $Nt_o$ expected at termination of the down-shift. In this instance, the turbine speed Nt less than the finally expected turbine speed $Nt_o$ by only the predetermined speed ΔNt is hereafter referred to as a "directly before-gear shift termination turbine speed. Until a lapse of the time T7, a signal representative of the duty rate which corresponds to the computed operating pressure Ps found as noted above is output to the first duty solenoid valve 121 at step S197 to control the brake apply pressure. On the other hand, when the predetermined time T7 has passed, a signal is output representative the duty rate decreased at a fixed rate until the duty rate becomes 0% through steps S198 and S199

The reason that the feedback control is continued of the brake apply pressure for the period of the predetermined time T7 after the attainment of the directly before-gear shift termination turbine speed ($Nt_o$–ΔNt) is that execution of the control of supplying the brake apply pressure is forced to continue until the completion of the 4-3 downshift, that is to say, until the forward clutch 51 is completely locked.

Figure 61:
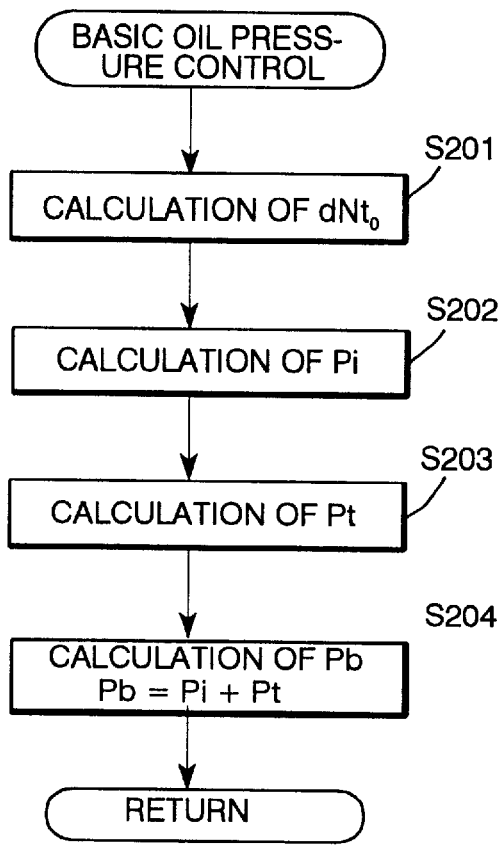
FIG. 61 is a flowchart illustrating a sequence for a calculation of base pressure during a 4 - 3 shift.

Calculation of the base operating pressure Pb at step S191 of the sequence routine shown in FIG. 60 is executed in accordance with the sequence routine shown in FIG. 61. Following the calculation of target turbine speed change $dNt_o$ during the 4-3 down-shift at step S201, the operating pressure Pi corresponding to the target turbine speed change $dNt_o$ is found in the map at step S202. Subsequently, at step S203, the operating pressure Pt corresponding to the target turbine torque $Tr_o$ during the 4-3 down-shift is found in the map and, at step S204, the base operating pressure Pb is calculated by adding these pressure Pi and Pt together.

Figure 62:
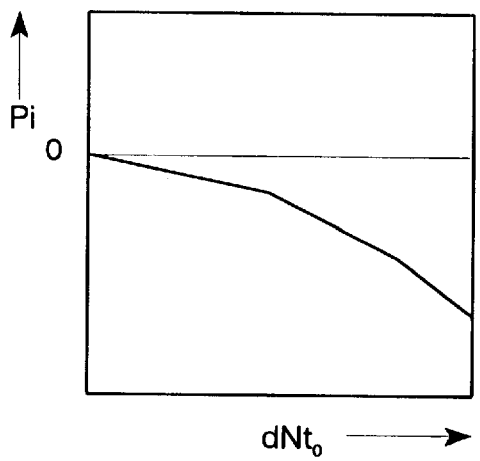
FIG. 62 is a diagram illustrating a map of hydraulic pressure with regard to a change in target turbine speed used in the calculation of base pressure during a 4 - 3 shift.
Figure 63:
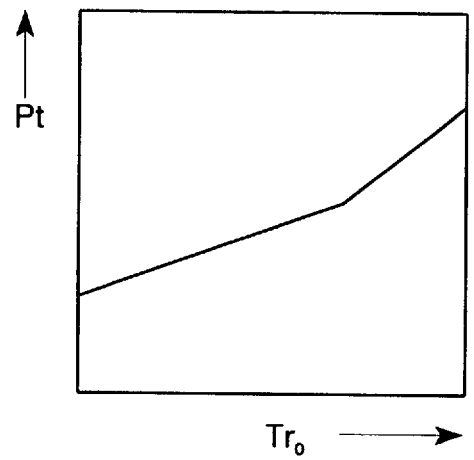
FIG. 63 is a diagram illustrating a map of hydraulic pressure with regard to target turbine torque used in the calculation of base pressure during a 4 - 3 shift.

The computation of the base operating pressure Pb is the same as of the computation of the base operating pressure during the up-shift described in connection with the 1-2 up-shift, with only the exception of the omission of operating pressure Pt2 corresponding to the squared target turbine torque $Tr_o$. However, the maps used in the computation of the pressure Pi and Pt are those shown in FIGS. 62 and 63, respectively, and a fixed operating pressure found as described above is used as the base pressure Pb during the 4-3 down-shift (as labeled with a character "H" in FIG. 67).

Figure 64:
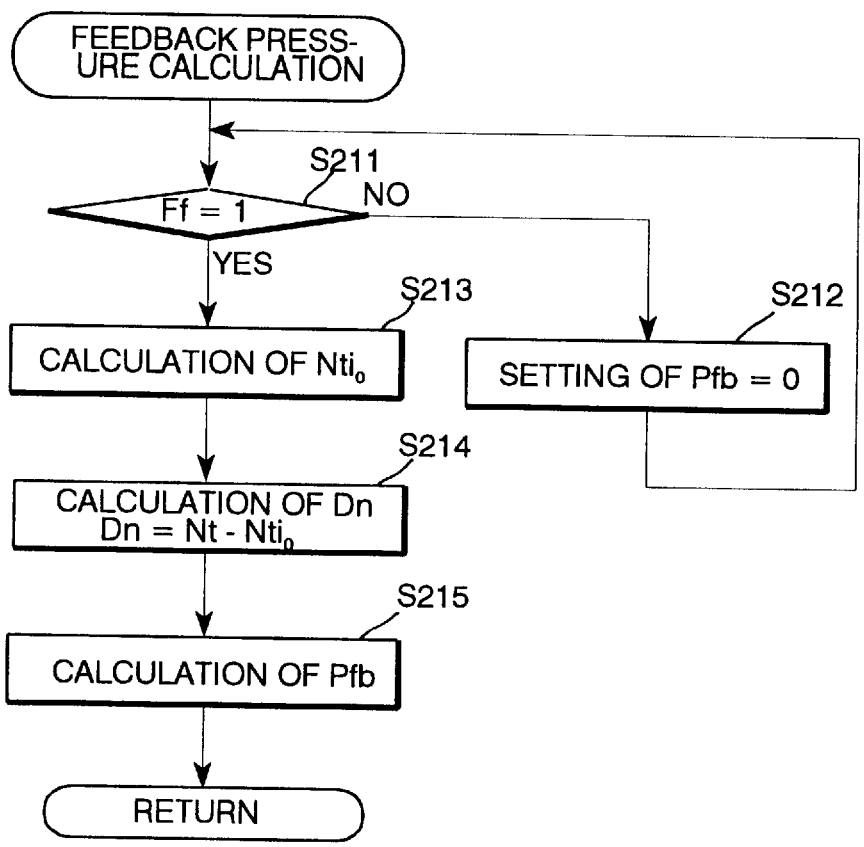
FIG. 64 is a flowchart illustrating a sequence for a calculation of feedback pressure during 4 - 3 shift.
Figure 65:
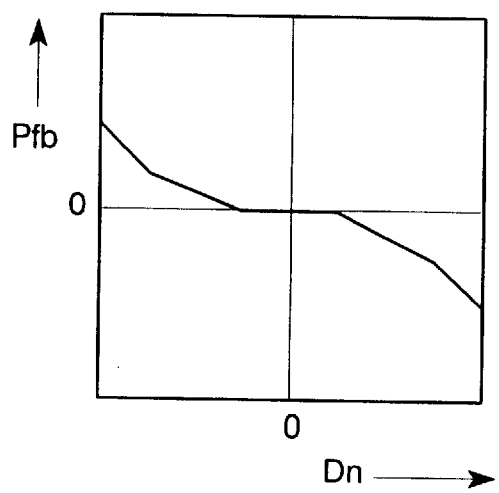
FIG. 65 is a diagram illustrating a map of feedback pressure used in the calculation of base pressure.

Calculation of the feedback pressure Pfb at step S192 of the sequence routine in FIG. 60 is executed in accordance with the sequence routine shown in FIG. 64. At step S211, a feedback flag Ff, which indicates whether or not the condition for starting the feedback control has been satisfied, is examined. Subsequently, the feedback pressure Pfb is maintained at a level of 0 at step S212 until the start condition is attained and the feedback flag Ff is set to the state 1. Otherwise, if the start condition has been attained and, consequently, the feedback flag Ff has been up or set to the state 1, the current target turbine speed $Nti_o$ is calculated at step S213. This calculation is executed on the basis of the difference between the turbine speeds before and after the 4-3 down-shift and a predetermined optimal shift time to find the target turbine speed $Nti_o$ for each control cycle. Subsequently, a deviation Dn of the eventual turbine speed Nt from the target turbine speed $Nti_o$ ($Nt-Nti_o$) is found at step S214, and the feedback pressure Pfb corresponding to the deviation Dn is computed using the map shown in FIG. 65 at step S215. In this map, the feedback pressure Pfb, which takes a negative value for a positive deviation Dn and takes a positive value for a negative deviation Dn, has an absolute value in conformity with the absolute value of the deviation Dn.

With the control described above, as shown in FIG. 67, the duty solenoid valve 121 operates at a fixed duty rate corresponding to the base pressure Pb which is attained at a time after a lapse of a specified delay time T6 from an output of a shift command. Thereafter, the feedback control is executed from a moment required conditions including commencement of the inertia phase are satisfied. When a specified time T7 passes after the turbine speed Nt has attained the directly before-gear shift termination turbine speed ($Nt_o-\Delta Nt$) in the inertia phase, the duty rate is changed again to 0%. Following this, the feedback control is executed of the brake apply pressure such that it drops once and increases again so as to make the turbine speed Nt attain the target turbine speed $Nti_o$. The brake apply pressure drops to a specified level after the completion of gear shifting.

Figure 66:
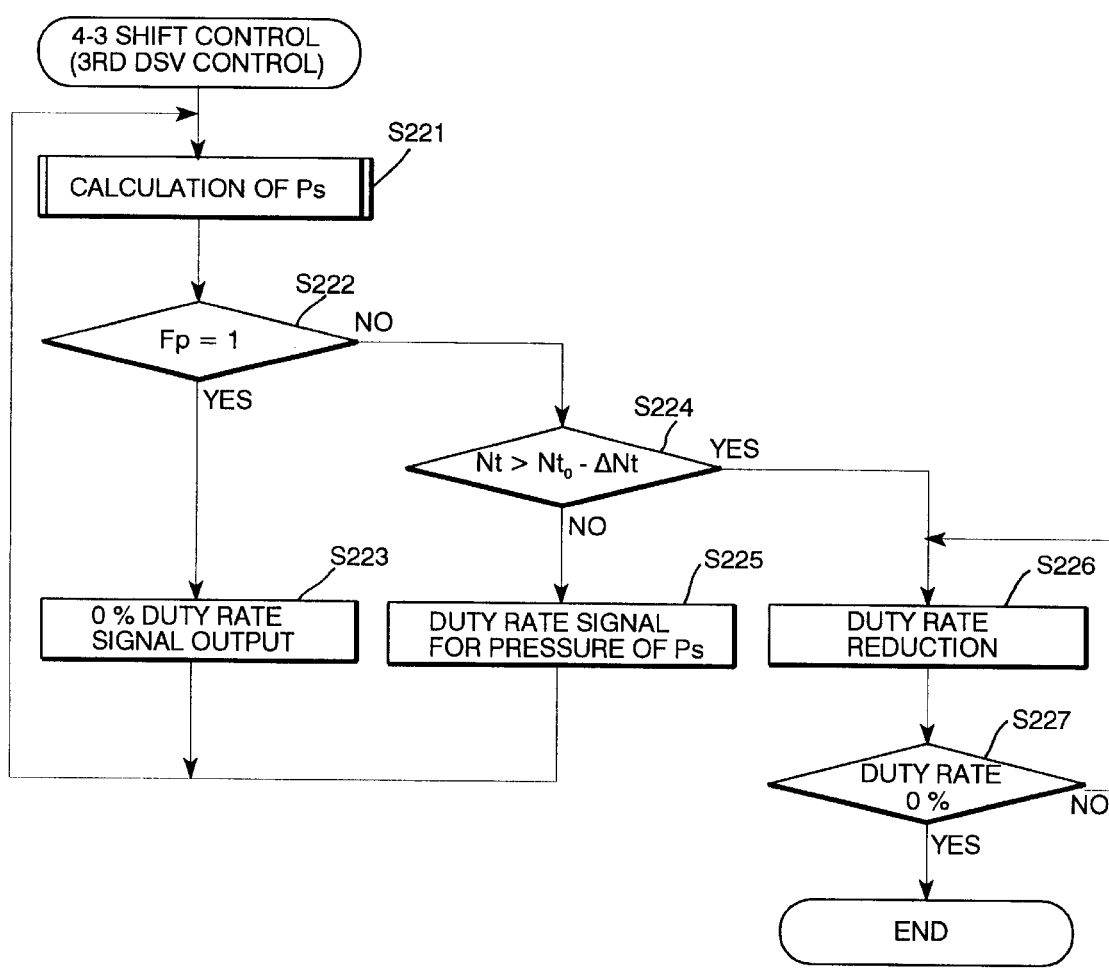
FIG. 66 is a flowchart illustrating a sequence for a judgement of commencement of the feedback control during a 4 - 3 shift.

On the other hand, control of the forward clutch pressure and brake release pressure through the third duty solenoid valve 123 during the 4-3 down-shift is executed in accordance with the sequence routine shown in FIG. 66. First, at step S221, the computed operating pressure Ps is found. During the pre-charge period (Fp=1), the duty rate of the third duty solenoid valve 123 is changed to 0% so as to cause the pressure to swiftly fill the oil passage leading to both pressure chamber of the forward clutch 51 and brake release pressure chamber 54b of the 2-4 brake 54 through steps S222 and S223. When the pre-charge period is concluded (Fp=0), a determination is made at step S224 as to whether or not the turbine speed Nt has risen as high as the directly before-gear shift termination turbine speed ($Nt_o-\Delta Nt$). During the rise of turbine speed Nt to that specific speed, a signal of the duty rate corresponding to the computed operating pressure Ps is output to the third duty solenoid valve 123 at step S225. In this instance, the computed operating pressure Ps, which is in conformity with the thrust force of the return spring loaded in the forward clutch 51, maintains the piston of the clutch 51 in a condition immediately before locking the clutch 51 when supplied to the pressure chamber of the forward clutch 51. Subsequently, when the turbine speed Nt has risen as high as the directly before-gear shift termination turbine speed ($Nt_o-\Delta Nt$), the duty rate declines to 0% at a fixed rate through steps S226 and S227.

Figure 67:
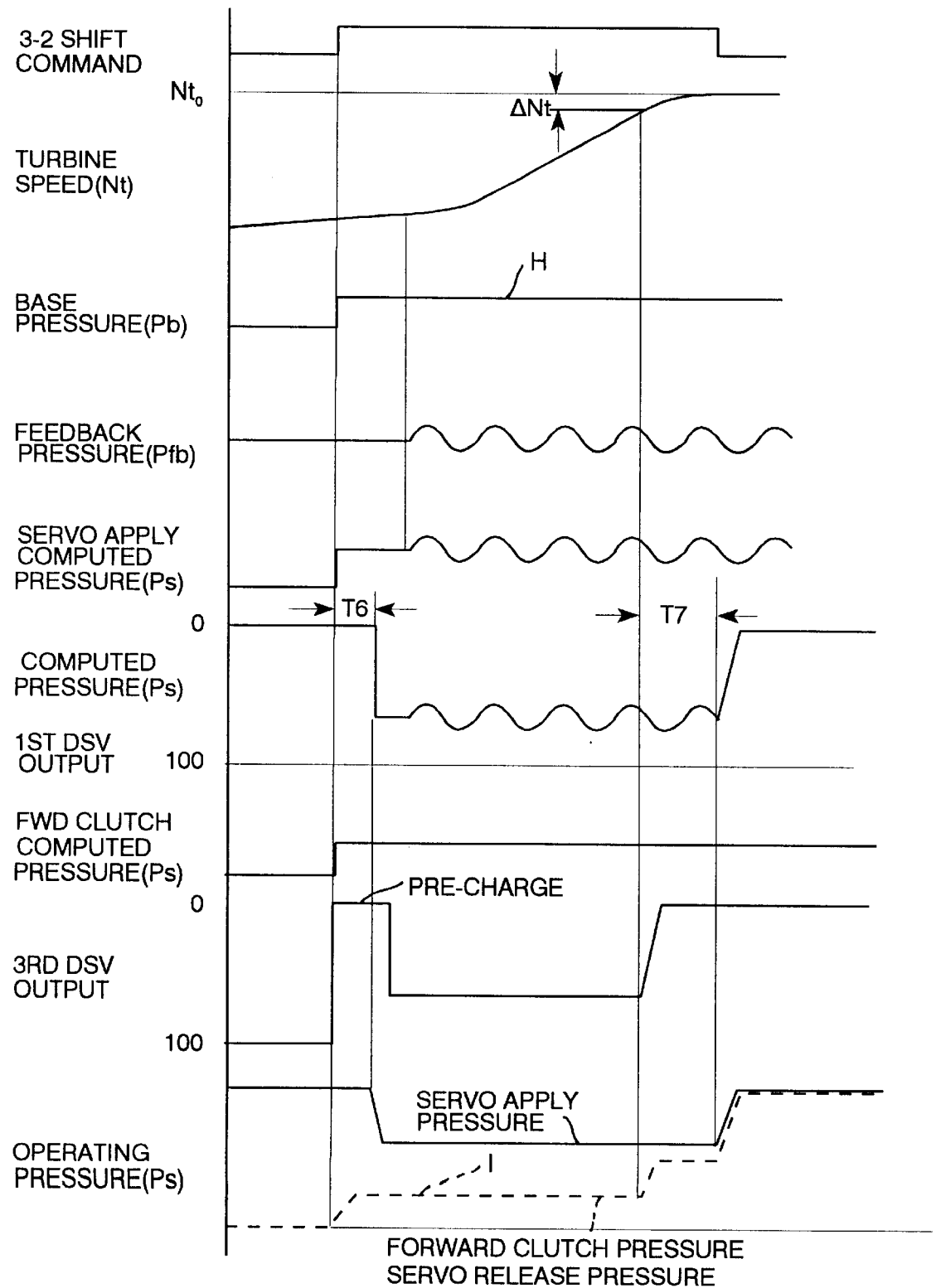
FIG. 67 is an explanatory diagram showing a change in turbine speed of rotation during a 4 - 3 shift.

With the control, while the forward clutch pressure is maintained at a level to place the forward clutch 51 in the condition immediately before locking the clutch 51 during unlocking the 2-4 brake 54, as indicated by a label "I" in FIG. 67, the forward clutch pressure is raised to a predetermined level at a time the turbine speed Nt rises as high as the directly before-gear shift termination turbine speed ($Nt_o-\Delta Nt$) due to slippage of the 2-4 brake 54 which is caused through the feedback control of the brake apply pressure, bringing the forward clutch 51 into locking. In this instance, since the forward clutch pressure has risen to a level immediately below the level necessary for the forward clutch 51 to lock, the forward clutch 51 locks swiftly without a delay in response.

During a torque demand down-shift, such as the 4-3 down-shift described above, where two friction coupling elements are locked and unlocked two friction coupling elements are coincidentally coupled and uncoupled, respectively, unlocking one friction coupling element is caused in advance of locking another friction coupling element so as to cause slippage of the one friction coupling element, thereby creating an inertia phase in which the turbine speed Nt is allowed to rise. At a moment the turbine speed Nt rises closely a pre-calculated directly before-gear shift termination turbine speed ($Nt_o-\Delta Nt$), locking the other friction coupling element is caused to create the torque phase. Thereafter, the feedback control is executed of the unlocking pressure for the one friction coupling element so as to make the turbine speed Nt in the inertia phase conform with the target turbine speed $Nti_o$ for every specific control cycle. Consequently, as described in, for instance, Japanese Unexamined Patent Publication No. 4-25168, in order to determine a timing of commencement of the inertia phase at which execution of the feedback control starts during a down-shift, a point of time at which the turbine speed Nt reaches slightly higher than the target speed is detected. This technique possibly encounters an timing detection error and, as a result, allows the feedback control to commence incorrectly.

Figure 4:
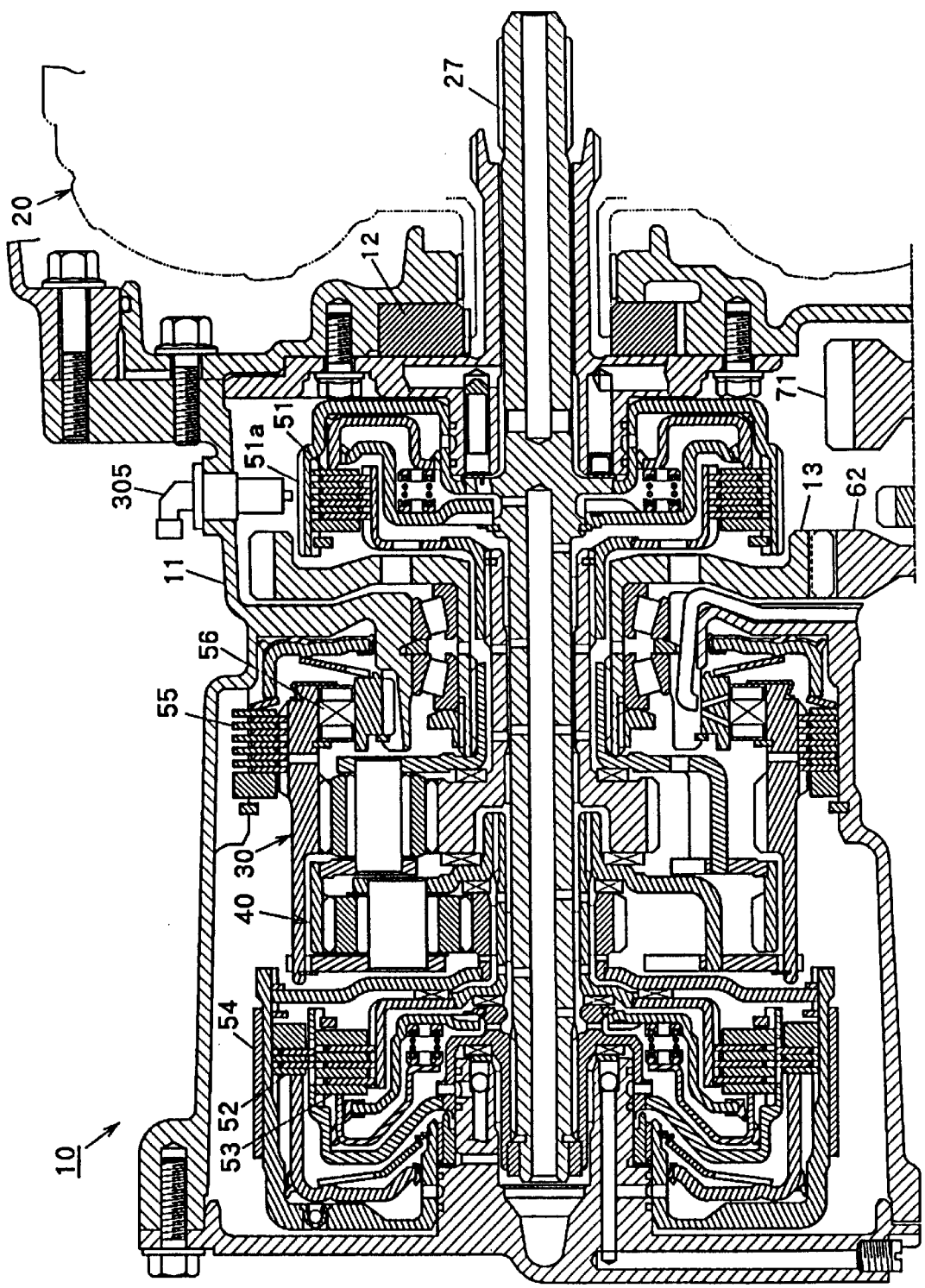
FIG. 4 is an enlarged cross-sectional view of a forward clutch and its associated part of FIG. 2.

Specifically, as shown in FIG. 4, since the turbine speed sensor 305 is secured to the transmission casing 11, it experiences a relative turn with respect to the turbine shaft 27 due to rolling of the engine and the automatic transmission upon an occurrence of an abrupt increase in engine throttle, i.e. engine load. Consequently, the turbine speed Nt detected by the turbine speed sensor 305 includes the speed of relative turn and demonstrates a momentary increase in apparent speed. This momentary apparent speed increase is caused immediately after an output of a shift command and, as a result, causes a wrong determination of commencement of the inertia phase. Specifically, as labeled with a character "K" in FIG. 58, the time of commencement of the inertia phase is determined to be earlier than a practical time.

Figure 69:
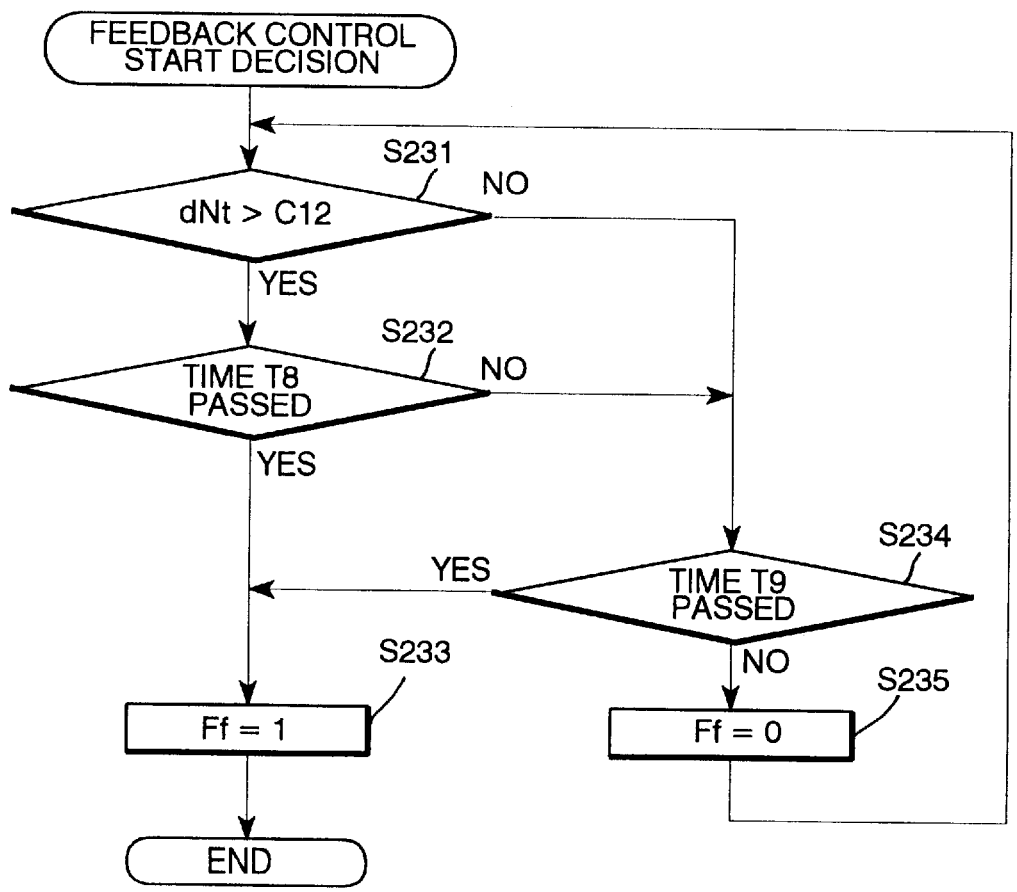
FIG. 69 is a flowchart illustrating the feedback control commencement determination during a down-shift.

This problem is eliminated by executing the sequence routine for determining the inertia phase commencement which is shown in FIG. 69.

Figure 68:
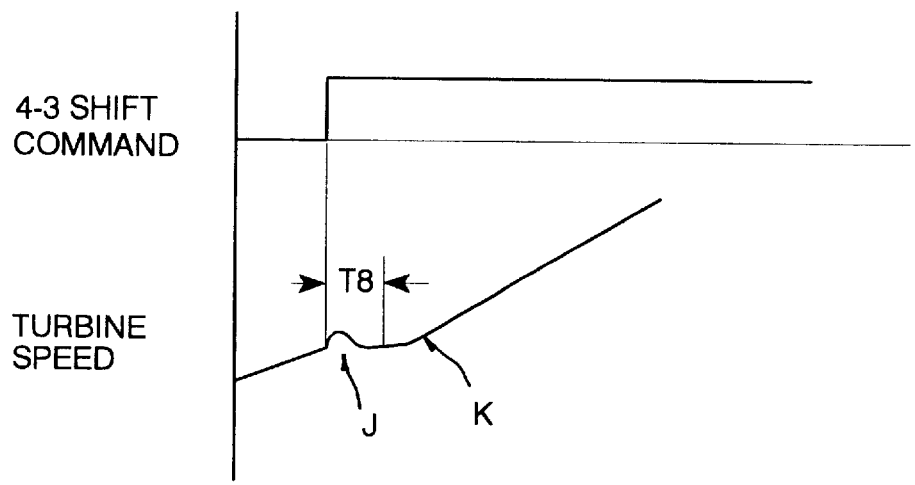
FIG. 68 is a flowchart illustrating a control sequence for the third duty solenoid valve (DSV) during a 4 - 3 shift.

As shown in FIG. 69, when the sequence logic commences and control proceeds directly to a function block at step S231 where a determination is made as to whether or not the turbine speed change dNt has exceeded a predetermined value C12. While this determination is essentially made to find a point of time, labeled with a character "K" in FIG. 68, at which the inertia phase commences, there is great possibility that the inertia phase commencement is determined based on an momentary apparent speed increase labeled with a character "J". For this reason, when the turbine speed Nt has risen above the predetermined value C12, another determination is subsequently made at step S232 as to whether or not a predetermined time T8 has passed from an output of a shift command. The inertia phase commencement is determined only when the turbine speed change dNt has exceeded the predetermined value C8 following the lapse of the time T8. After the determination, the feedback flag Ff is set to the state 1, this indicates that the feedback control start condition has been attained, at step S213. In the 4-3 dow-shift, the predetermined time T8 is set to be longer than the delay time T6 for the commencement of the brake apply pressure control. This inertia phase commencement determination sequence eliminates a wrong determination of commencement of the inertia phase from a momentary increase in turbine speed.

Even if it is determined at steps S231 and S232 that one or both of the conditions have not been attained, a determination is further made at step S234 as to whether or not the backup timer has counted a predetermined backup time T9 given when a shift command is output. When the backup time T9 has passed, the feedback flag Ff is set to the state of 1. Specifically, in the 4-3 down-shift, if unlocking the 2-4 brake occurs very gently due, for instance, to a high base brake apply pressure Pb which is supplied at a lapse of the delay time T6 after the output of a shift command, the turbine speed change dNt does possibly not rise larger than the predetermined value C12 and, in this kind of case, it is necessary to wait for the backup time T9 to pass before a promptly start of the feedback control.

If it is determined at step S231 and step S232 that at least one of the these two start conditions has not yet attained, while the condition concerning the backup time T9 has not attained either at step S234, then, the feedback flag Ff is reset to the state 0 at step S235. While the feedback flag is down, the feedback pressure Pfb is maintained at a level of 0 through the sequence routine in FIG. 64.

Figure 70:
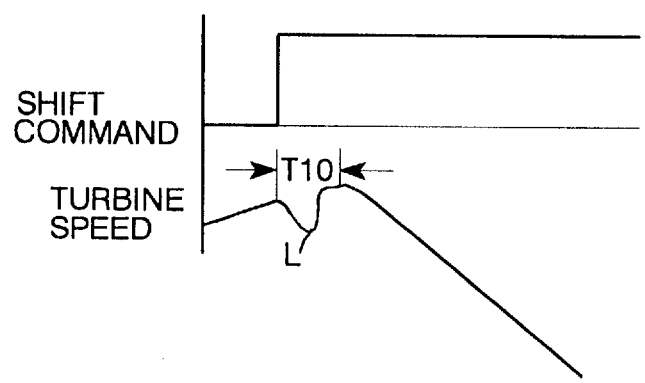
FIG. 70 is an explanatory view showing changes in turbine speed during an up-shift.

A momentary change in turbine speed due to a relative turn of the turbine speed sensor 305 occurs similarly during back-out up-shifts from abrupt increases in throttle opening. In such a case, the apparent turbine speed momentarily decreases as labeled with a character "L" in FIG. 70. This momentary apparent speed decrease also causes a wrong determination of commencement of the inertia phase. Accordingly, if necessary, the determination may be made on the basis of satisfaction of conditions that the turbine speed change dNt has fallen below the specified change C1 and that a specified delay time T10 an output of a shift command has passed.

A 3-2 down-shift is achieved by unlocking the 3-4 clutch 53 simultaneously with locking the 2-4 brake 54. In this shift control, the first solenoid valve 111 is turned OFF to cause the 3-4 shift valve 105 so as to bring the brake release pressure line 221 and 3-4 clutch pressure line 227 into communication with each other, and the second duty solenoid valve 122 is controlled so as to discharge the brake release pressure and 3-4 clutch pressure, while holding the brake apply pressure chamber of the 2-4 brake with brake supply pressure supplied therein.

The second duty solenoid valve 122 regulates the flow quantities of the pressure oil discharged from the 3-4 clutch and 2-4 brake through the orifice 151, so as thereby to control the transition time of levelled transitional pressure. In this manner, during the 3-2 down-shift, the levelled transitional pressure is controlled in level by the first duty solenoid valve 121 and in duration by the second duty solenoid valve 122.

Figure 71:
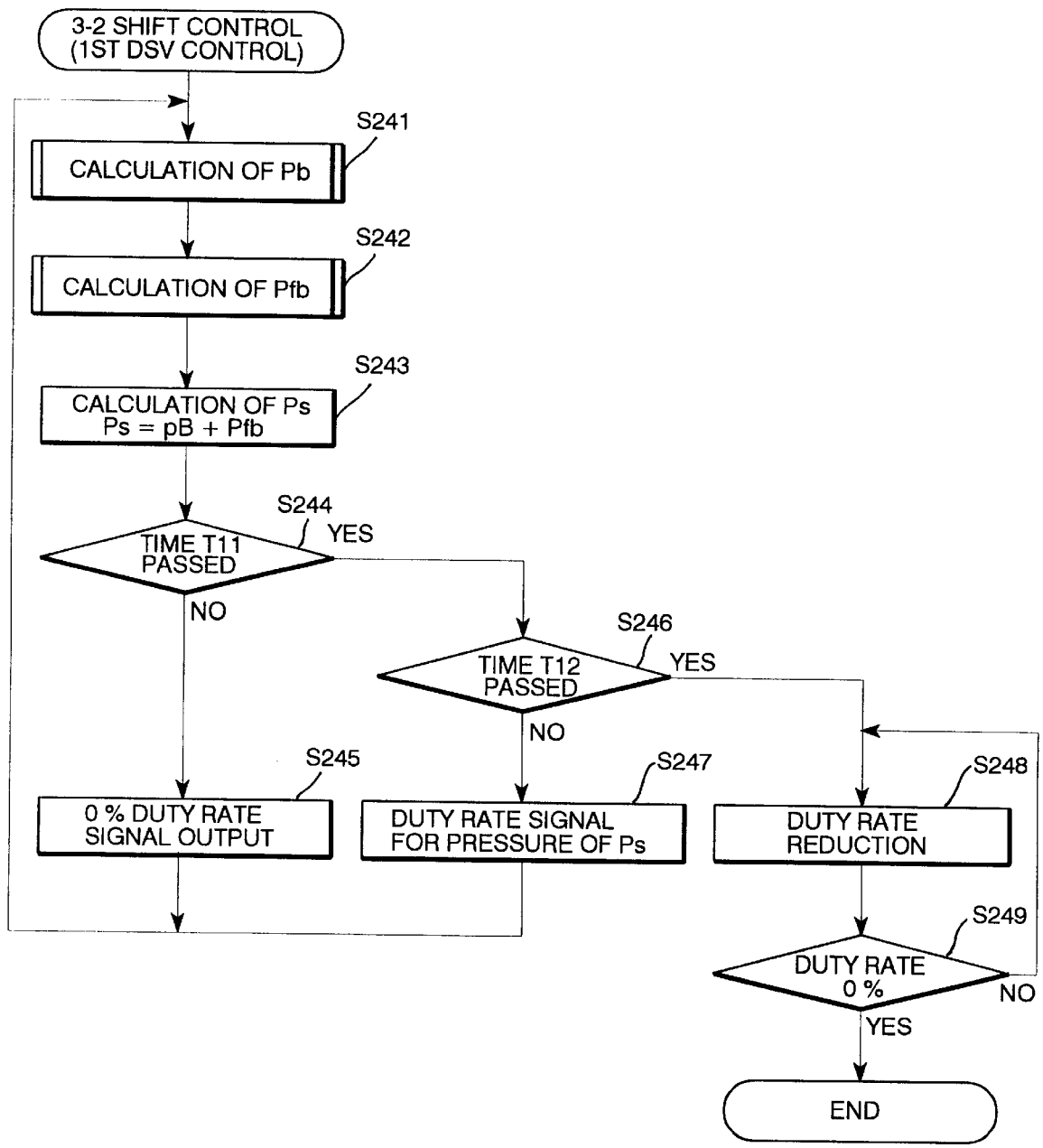
FIG. 71 is a flowchart illustrating a control sequence for the first duty solenoid valve (DSV) during a 3 - 2 shift.

Control of the brake apply pressure by means of the first duty solenoid valve 121 is executed in accordance with the sequence routine shown in FIG. 71.

As shown in FIG. 71, calculations of the base pressure Pb and feedback pressure Pfb are made steps S241 and 242, respectively. After computing the base pressure Pb and feedback pressure Pfb steps S241 and S242, respectively, these pressure are added together at step S243 to find the computed operating pressure Ps. At step S244, a determination is made as to whether or not a predetermined delay time T11 has passed following the output of a shift command. Until the delay time T11 has passed, the sequence routine waits at step S245 with the duty rate of the first duty solenoid valve 121 maintained at 0%. This is in order to conduct the control after the line pressure, which tends to rise rapidly accompanying an increase in engine throttle opening likely in a 4-3 down-shift, has been stabilized. The calculations of the base pressure Pb and feedback pressure Pfb are executed in the same sequence as those for a 4-3 down-shift shown in FIGS. 61 and 64.

When the delay time T11 passes, a determination is made at step S246 as to whether or not a predetermined time T12 has passed from a moment the turbine speed Nt has risen to a directly before-gear shift termination turbine speed $(Nt_o-\Delta Nt)$. Until a lapse of the time T12, a signal representative of the duty rate which corresponds to the computed operating pressure Ps found as noted above is output to the first duty solenoid valve 121 at step S247 to execute the feedback control of brake apply pressure in order to the levelled transitional pressure during unlocking the 3-4 clutch 53. As a result of this feedback control, the 3-4 clutch pressure falls, commencing the inertia phase in which the turbine is allowed to rises its speed.

On the other hand, when the predetermined time T12 has passed after attainment of the directly before-gear shift termination turbine speed $(Nt_o-\Delta Nt)$, the feedback control terminates and a signal is output representative the duty rate decreased at a fixed rate until the duty rate becomes 0% through steps S248 and S249

Figure 72:
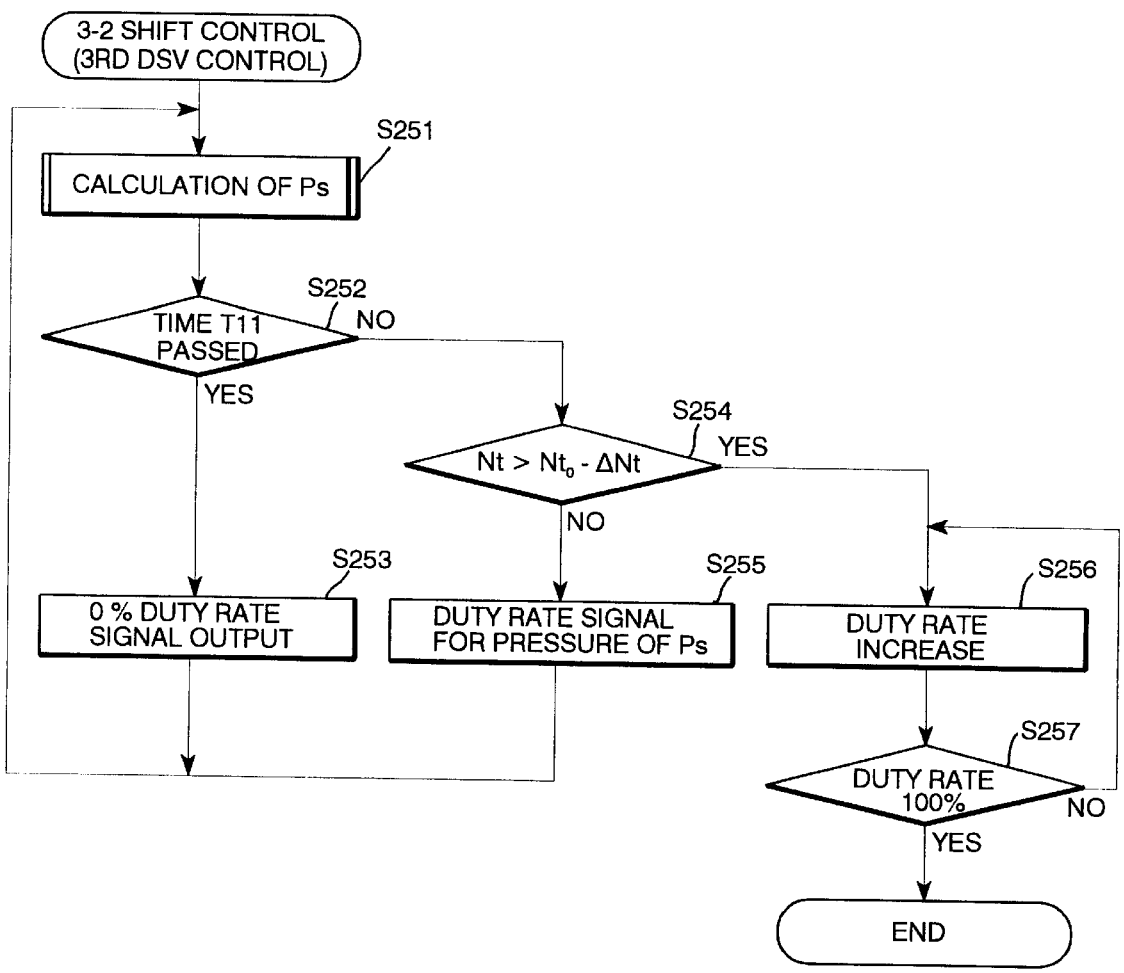
FIG. 72 is a flowchart illustrating a control sequence for the second duty solenoid valve (DSV) during a 3 - 2 shift.

Control of discharging the 3-4 clutch pressure and brake release pressure is executed by means of the second duty solenoid valve 122 in accordance with the sequence routine shown in FIG. 72. After computing the computed operating pressure Ps at step S251, a determination is made at step S252 as to whether or not a predetermined delay time T11 has passed following the output of a shift command. Until the delay time T6 has passed, the sequence routine waits at step S253 with the duty rate of the first duty solenoid valve 121 maintained at 0%. When the delay time T11 passes, a determination is made at step S254 as to whether or not the turbine speed Nt has risen to a directly before-gear shift termination turbine speed $(Nt_o-\Delta ANt)$. Until attainment of the directly before-gear shift termination turbine speed $(Nt_o-\Delta Nt)$, that is, while the control of levelled transitional pressure is being executed through the feedback control, a signal representative of the duty rate which corresponds to the computed operating pressure Ps is output to the second duty solenoid valve 122 at step S255.

Figure 73:
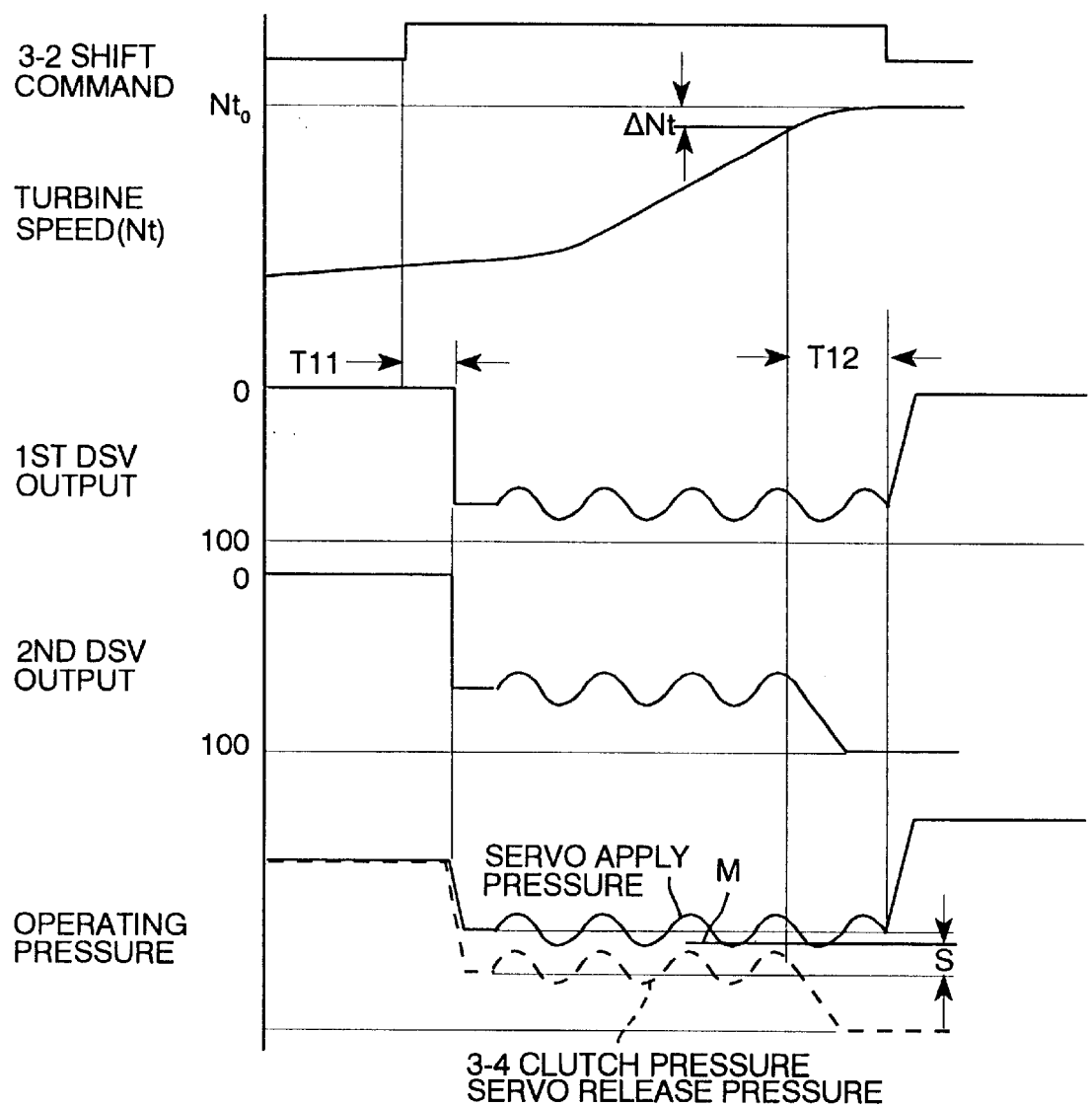
FIG. 73 is a time chart showing changes in various factors during 3 - 2 shift.

As shown by a label "M" in FIG. 73, the brake release pressure Ps is established such that the brake release pressure added by equivalent oil pressure S to which the spring force of spring 54i is converted is slightly lower than the brake apply pressure. Owing to the restricted discharge of oil from the 3-4 clutch 53 and 2-4 brake 54 through the orifice 151 and second duty solenoid valve 122, the piston 54e strokes gently in the servo cylinder 54d. 3Resultingly, this movement of the piston 54e enables to provide a period of the inertial phase which is sufficiently long for the turbine to raise its speed Nt to the directly before-gear shift termination turbine speed $(Nt_o-\Delta Nt)$.

When the turbine speed Nt attains the directly before-gear shift termination turbine speed ($Nt_o-\Delta Nt$), the duty rate is increased to 100% at a fixed rate through steps S256 and S257. Resultingly, the 2-4 clutch pressure and brake release pressure having been maintained at a levelled height are completely discharged, releasing the 3-4 clutch and locking the 2-4 brake.

Figure 74:
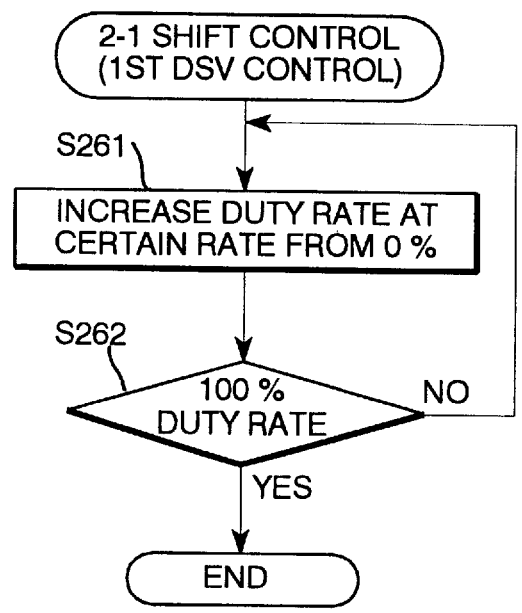
FIG. 74 is a flowchart illustrating a control sequence for the first duty solenoid valve (DSV) during 2 - 1 shift.
Figure 75:
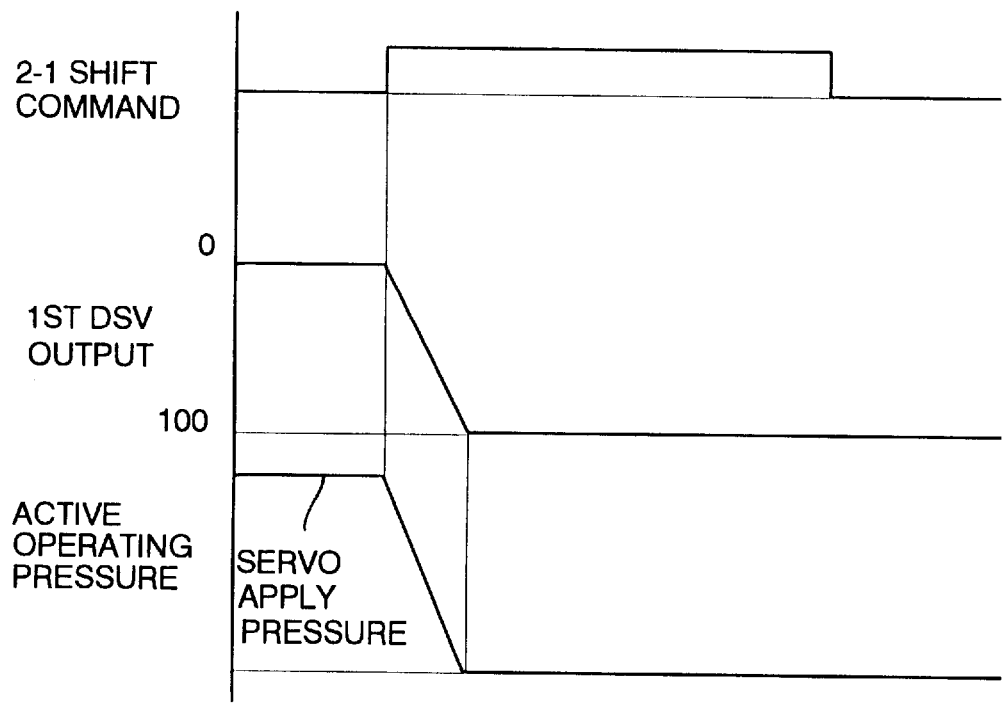
FIG. 75 is a time chart showing changes in various factors during a 2 - 1 shift.

A 2-1 gear shift is achieved by discharging the brake apply pressure through the first duty solenoid valve 121. The 2-4 shift control is executed only through increasing the duty ratio from 0% to 100% at a fixed rate from an output of a shift command through steps S261 and S262 of the sequence routine shown in FIG. 74. with the effect of discharging the brake apply pressure at a fixed rate and unlocking the 2-4 brake 54 as shown in FIG. 75.

A 4-2 down-shift is made by unlocking the 3-4 clutch 53 and, simultaneously with this, locking the forward clutch 51, while maintaining the 2-4 brake 54 locked. Accordingly, discharge control of the 3-4 clutch pressure through the second duty solenoid valve 122 and supply control of the forward clutch pressure through the third duty solenoid valve 123 are coincidentally conducted. Of these control the former discharge control is conducted through feedback control.

During the 4-2 down-shift, the first solenoid valve 111 assumes OFF, causing the 3-4 shift valve 105 to change the brake release pressure line 221 from communication with the forward clutch pressure line 219 to communication with the 3-4 clutch pressure line 227. Resultingly, there is not provided supply of the brake release pressure through the control of forward clutch pressure.

Figure 76:
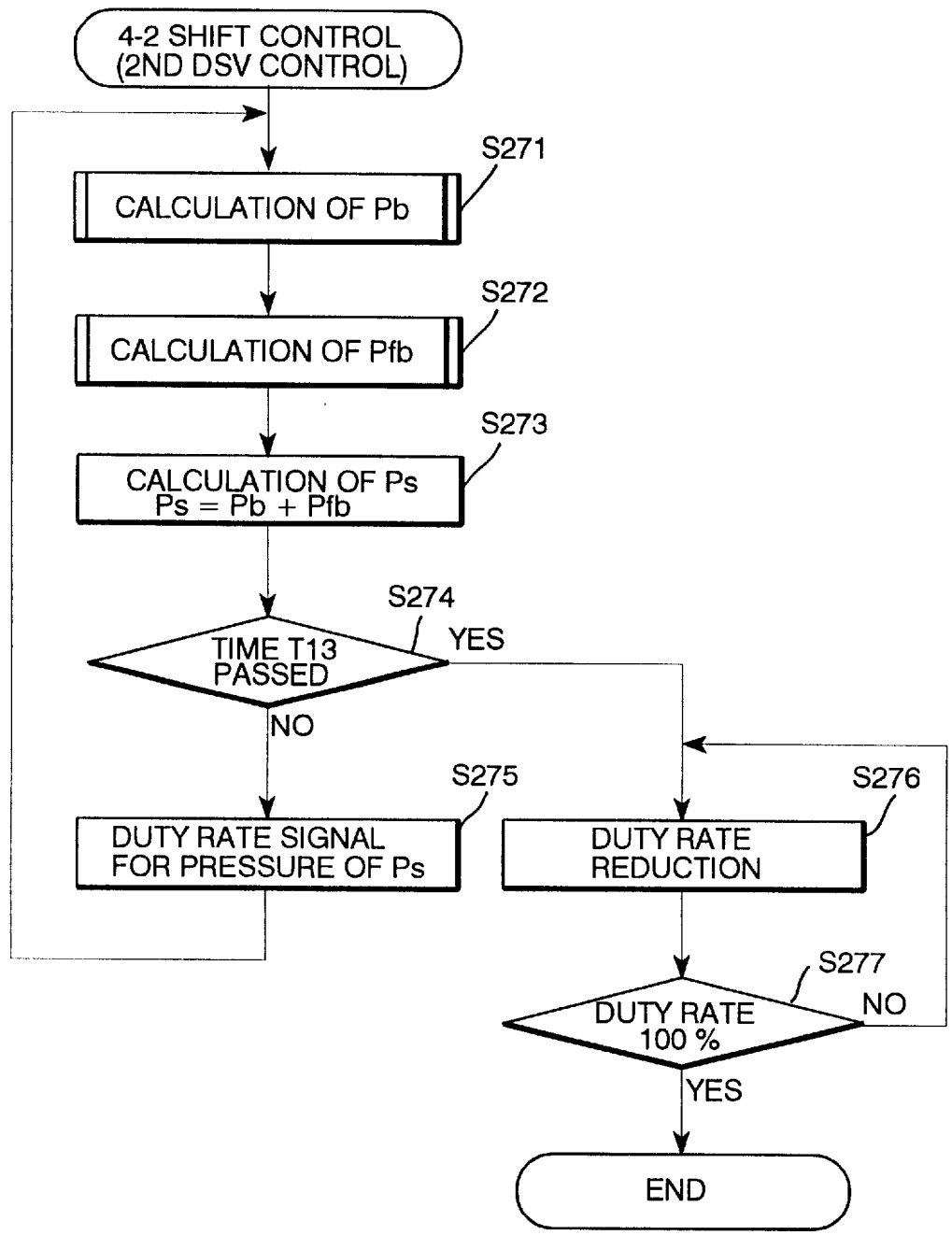
FIG. 76 is a flowchart illustrating a control sequence for the second duty solenoid valve (DSV) during a 4 - 2 shift.

Discharge control of the 3-4 clutch pressure through the second duty solenoid valve 122 during the 4-2 down-shift is executed in accordance with the sequence routine shown in FIG. 76. Calculations of the base pressure Pb, feedback pressure Pfb and computed operating pressure Ps are effected through steps S271 through S273, respectively. Subsequently, a determination is made at step S274 as to whether or not a specified time T13 has passed after the turbine speed Nt has risen to the directly before-gear shift termination turbine speed ($Nt_o-\Delta Nt$). Prior to a lapse of the specified time T13, a signal for the duty rate corresponding to the computed operating pressure Ps is output to the second duty solenoid valve 122 at step S275 in such a way to lower the 3-4 clutch pressure so as to cause a rise in turbine speed Nt in conformity with a rise in the target turbine speed $Nti_o$.

When the specified time T13 has passed after the turbine speed Nt has attained the directly before-gear shift termination turbine speed ($Nt_o-\Delta Nt$), the duty rate is increased up to 100% at a fixed rate through steps 7S27 and S278, unlocking completely the 3-4 clutch 53. The reason that the feedback control continues until the specified time T13 has passed from the attainment of the directly before-gear shift termination turbine speed ($Nt_o-\Delta Nt$) is the same as for the control of the brake apply pressure during the 4-3 down-shift or the 3-2 down-shift described previously. However, the 4-2 down-shift differs from the cases of 4-3 down-shift and 3-2 down-shift in that the control starts immediately after a shift command without passing any delay time.

On the other hand, the control of the forward clutch pressure supply through the third duty solenoid valve 123 during the 4-2 down-shift is executed in accordance with the sequence routine shown in FIG. 77. While this control differs from the control for the 4-3 down-shift in which both forward clutch pressure and brake release pressure are simultaneously controlled in that the control is made only for supply of the forward clutch pressure, all other respects of the control are the same as those of the control of forward clutch pressure supply during the 4-3 down-shift shown in FIG. 66.

Specifically, the computed operating pressure Ps is found at step S281, and the operating pressure is swiftly filled in the oil path leading to the pressure chamber of the forward clutch 51 by means of the third duty solenoid valve 123 operating at a duty rate held at 0% during the pre-charge period (Fp=1) through steps S282 and S283. When the pre-charge period is over (Fp=0), a determination is made at step S284 as to whether or not the turbine speed Nt has risen to the directly before-gear shift termination turbine speed ($Nt_o-\Delta Nt$). While the turbine speed is rising to the directly before-gear shift termination turbine speed ($Nt_o-\Delta Nt$), a signal of the duty rate corresponding to the computed operating pressure Ps is continuously output to the second duty solenoid valve 122 at step S285. In this case, the computed operating pressure Ps is also set immediately below the level at which the forward clutch 51 is locked, likely during the 4-3 down-shift. When the turbine speed Nt attains the directly before-gear shift termination turbine speed ($Nt_o-\Delta Nt$), the duty rate is reduced to 0% at a fixed rate through steps S286 and S287.

Figure 78:
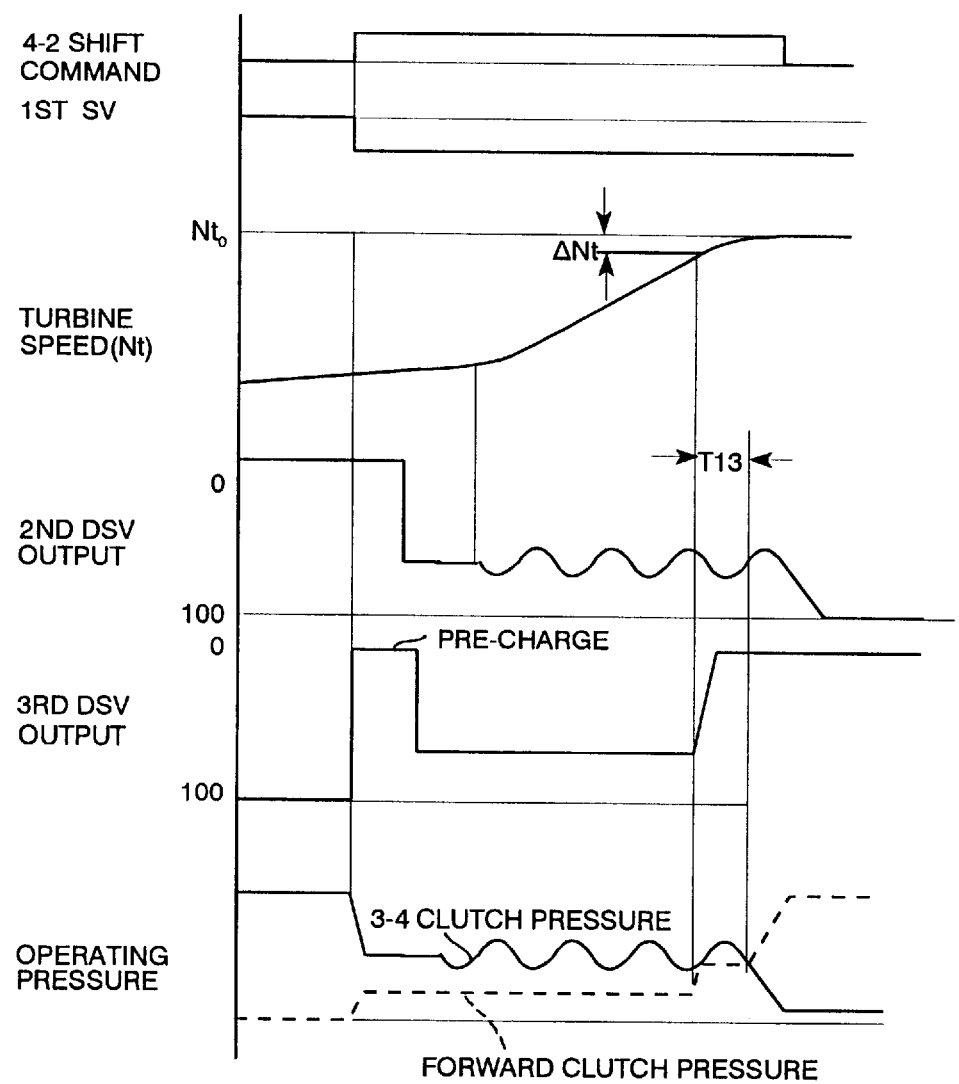
FIG. 78 is a time chart showing changes in various factors during a 4 - 2 shift.

With the control, the forward clutch pressure is maintained immediately below the locking level for the forward clutch 51 during slippage of the 3-4 clutch 53 allowed through the feedback control, as shown in FIG. 78. Further, the forward clutch pressure rises to the predetermined level as a result of the slippage of the 3-4 clutch 53 when the turbine speed Nt attains the directly before-gear shift termination turbine speed ($Nt_o-\Delta Nt$), locking quickly the forward clutch 51 without accompanying any delay in response.

A 4-1 down-shift is executed by, on one hand, unlocking both 2-4 brake 54 and 3-4 clutch 53 and, on the other hand, locking the forward clutch 51. Accordingly, what is controlled are discharge of the brake apply pressure through the first duty solenoid valve 121, discharge of the brake release pressure and 3-4 clutch pressure through the second duty solenoid valve 122 with the brake release pressure line 1121 and the 3-4 clutch pressure line 1127 communicated with each other through the 3-4 shift valve 105, and supply of the forward clutch pressure through the third duty solenoid valve 123. At this time, because communication is disconnected between the forward clutch and brake release pressure lines 219 and 221, there is not provided supply of the brake release pressure through the control of forward clutch pressure.

Figure 79:
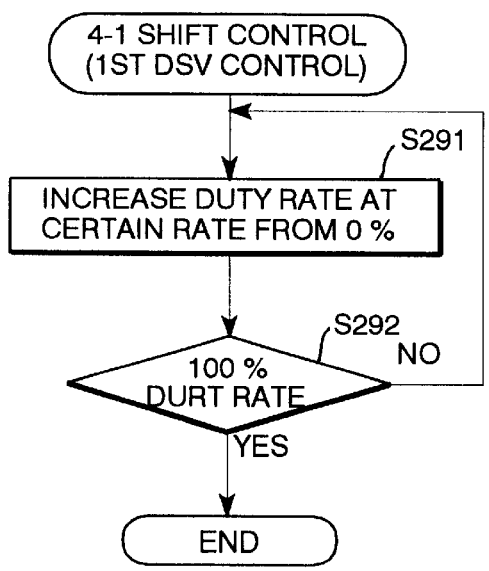
FIG. 79 is a flowchart illustrating a control sequence for the first duty solenoid valve (DSV) during a 4 - 1 shift.
Figure 83:
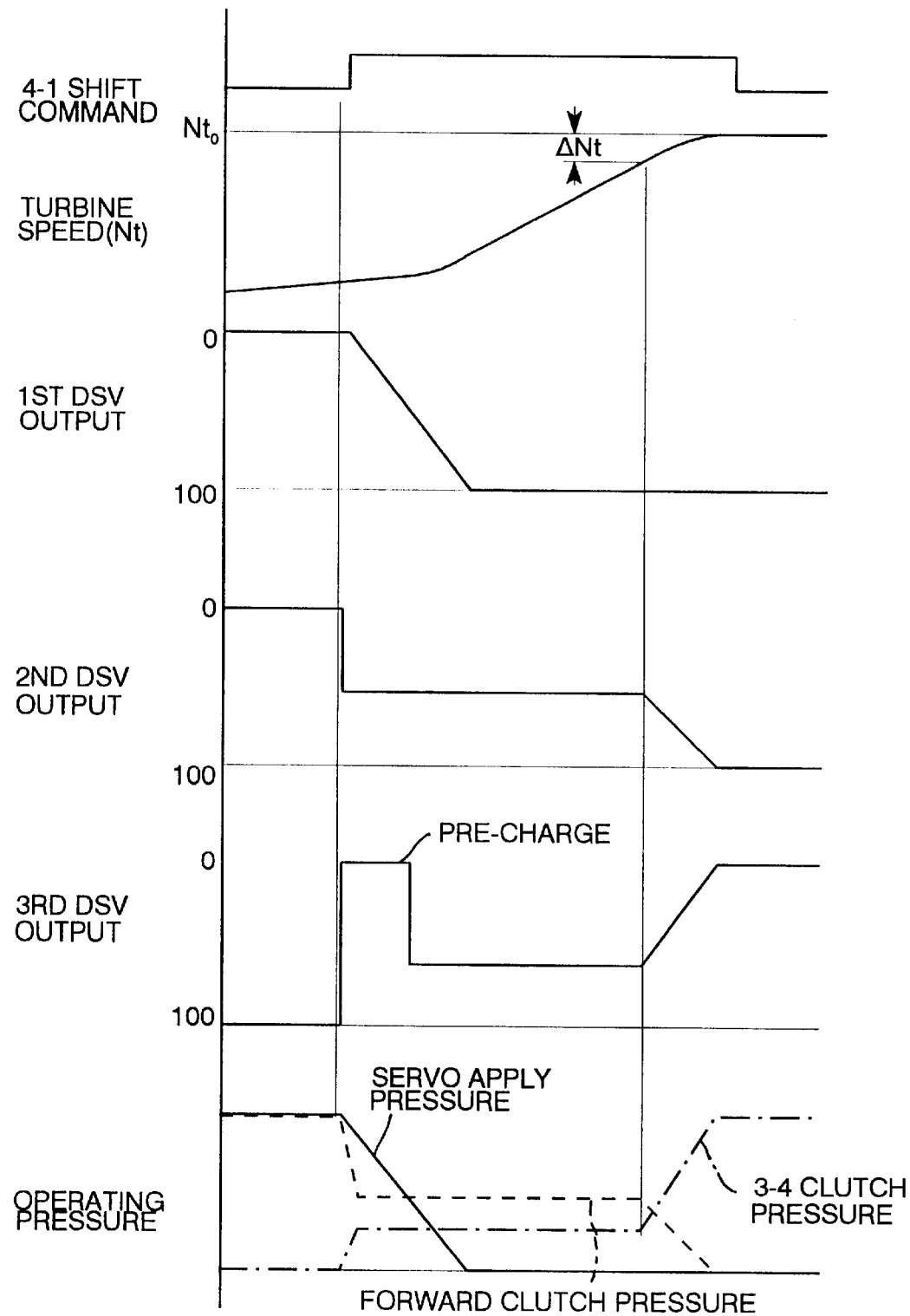
FIG. 83 is a time chart showing changes in various factors during a 4 - 1 shift.

Discharge control of the brake apply pressure through the first duty solenoid valve 121 is executed in accordance with the sequence routine shown in FIG. 79. This control consists of only causing an increase of the duty rate of the first duty solenoid valve 121 from 0% to 100% at a fixed rate through steps S291 and S292 in response to a shift command. As a result, as shown in FIG. 83, the brake apply pressure is discharged relatively quickly at a fixed gradient.

Figure 80:
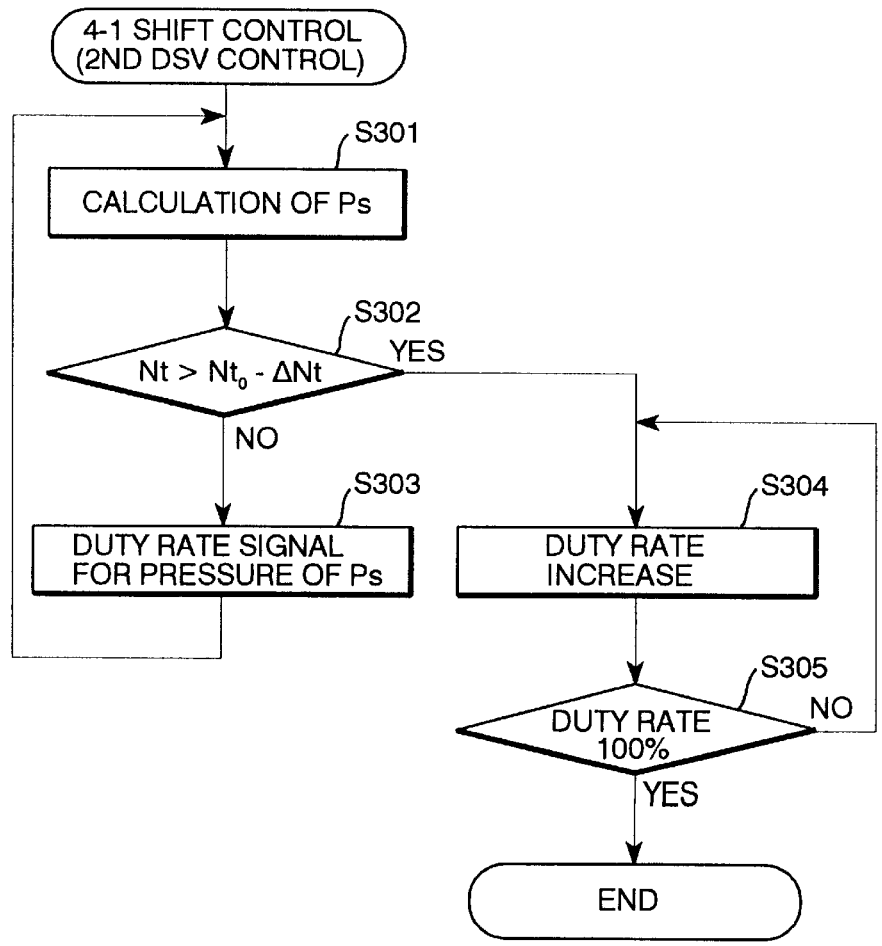
FIG. 80 is a flowchart illustrating a control sequence for the second duty solenoid valve (DSV) during a 4 - 1 shift.

Together, the discharge control of the brake release pressure and 3-4 clutch pressure through the second duty solenoid valve 122 is executed in accordance with the sequence routine shown in FIG. 80. After finding the computed operating pressure Ps at step S301, a determination is made at step S302 as to whether or not the turbine speed Nt has risen as high as the directly before-gear shift termination turbine speed ($Nt_o-\Delta Nt$). Until this turbine speed ($Nt_o-\Delta Nt$) is attained, a signal representative of the duty rate corresponding to the computed operating pressure Ps is continuously output to the second duty solenoid valve 122 at step S303. The computed operating pressure Ps is obtained from a map which defines the computed operating pressure becoming higher with an increase in the turbine speed Nt' immediately prior to shifting. Operating the second duty solenoid valve 122 at the duty rate corresponding to the computed operating pressure Ps causes the 3-4 clutch to slip appropriately. That is, the turbine speed Nt is allowed to rise smoothly by allowing the 3-4 clutch 53 to slip after having quickly unlocked the 2-4 brake 54. When the turbine speed Nt attains the directly before-gear shift termination turbine speed ($Nt_o-\Delta Nt$), the duty ratio is increased up to 100% at a fixed rate through steps S304 and S305. As a result, the 3-4 clutch 53 is completely unlocked.

Figure 82:
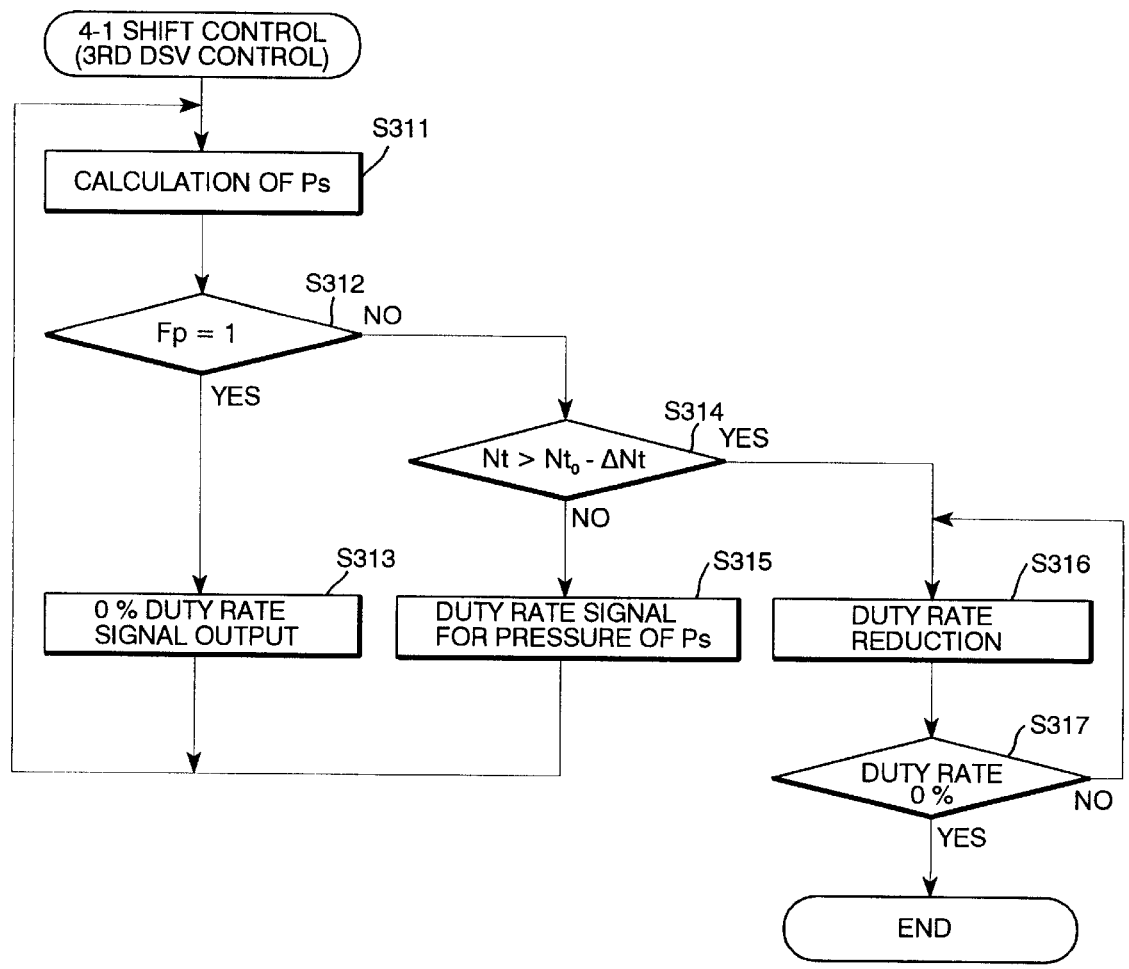
FIG. 82 is a flowchart illustrating a control sequence for the third duty solenoid valve (DSV) during a 4 - 1 shift.

Together, the supply control of forward clutch pressure through the third duty solenoid valve 123 is executed in accordance with the sequence routine shown in FIG. 82. This control is almost the same as that for the third duty solenoid valve 123 during the 4-2 down-shift. That is, at step S311, the computed operating pressure Ps is found. During the pre-charge period (Fp=1), the operating pressure is filled quickly in the pressure line leading to the pressure chamber of the forward clutch 51 by means of the third duty solenoid valve 123 operating a duty rate set at 0% through steps S312 and S313. On the other hand, when the pre-charge period is concluded (Fp=0), a determination is made at step S314 as to whether or not the turbine speed Nt has risen as high as the directly before-gear shift termination turbine speed ($Nt_o-\Delta Nt$). Until this turbine speed ($Nt_o-\Delta Nt$) has been attained, a signal representative of the duty rate corresponding to the computed operating pressure Ps is output to the second duty solenoid valve 122 at step S315. The computed operating pressure Ps is the same as that during the 4-3 down-shift and 4-2 down-shift with respect to the fact that it keeps the forward clutch 51 in the state immediately prior to locking.

When the turbine speed Nt has risen to the directly before-gear shift termination turbine speed ($Nt_o-\Delta Nt$), the duty rate is reduced to 0% at a fixed rate through steps S316 and S317. By means of this control, while the forward clutch pressure is held at a level to place the 3-4 clutch 53 in a condition immediately prior to locking during the slippage control, as shown in FIG. 83, it rises quickly when the turbine speed Nt attains the directly before-gear shift termination turbine speed ($Nt_o-\Delta Nt$), completely unlocking the forward clutch 51.

A 3-1 down-shift is achieved by unlocking both 2-4 brake 54 and 3-4 clutch 53, while holding the forward clutch 51 locked. Accordingly, the 3-1 gear shift control is the same as the 4-1 down-shift control, with only the exception of the fact that the supply control of forward clutch pressure through the third duty solenoid valve 123 is not conducted. The discharge control of brake apply pressure through the first duty solenoid valve 121, and the discharge control of brake release pressure and 3-4 clutch pressure through the second duty solenoid valve 123 are conducted. Even in a torque demand 3-1 down-shift accompanying an increase in engine throttle opening, the fact that the feedback control of operating pressure is not conducted is the same as for the 4-1 down-shift.

Figure 84:
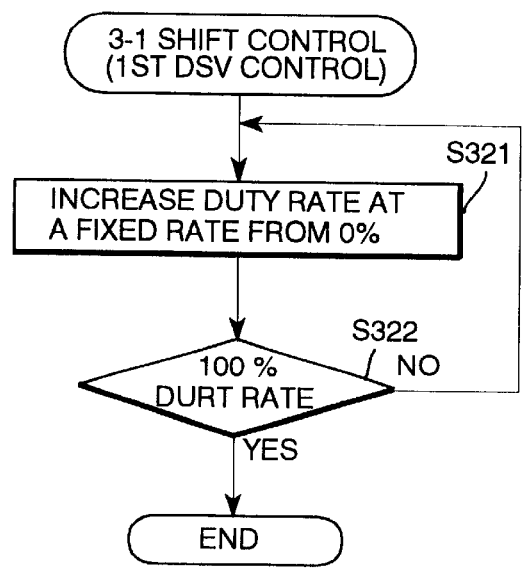
FIG. 84 is a flowchart illustrating a control sequence for the first duty solenoid valve (DSV) during a 3 - 1 shift.
Figure 86:
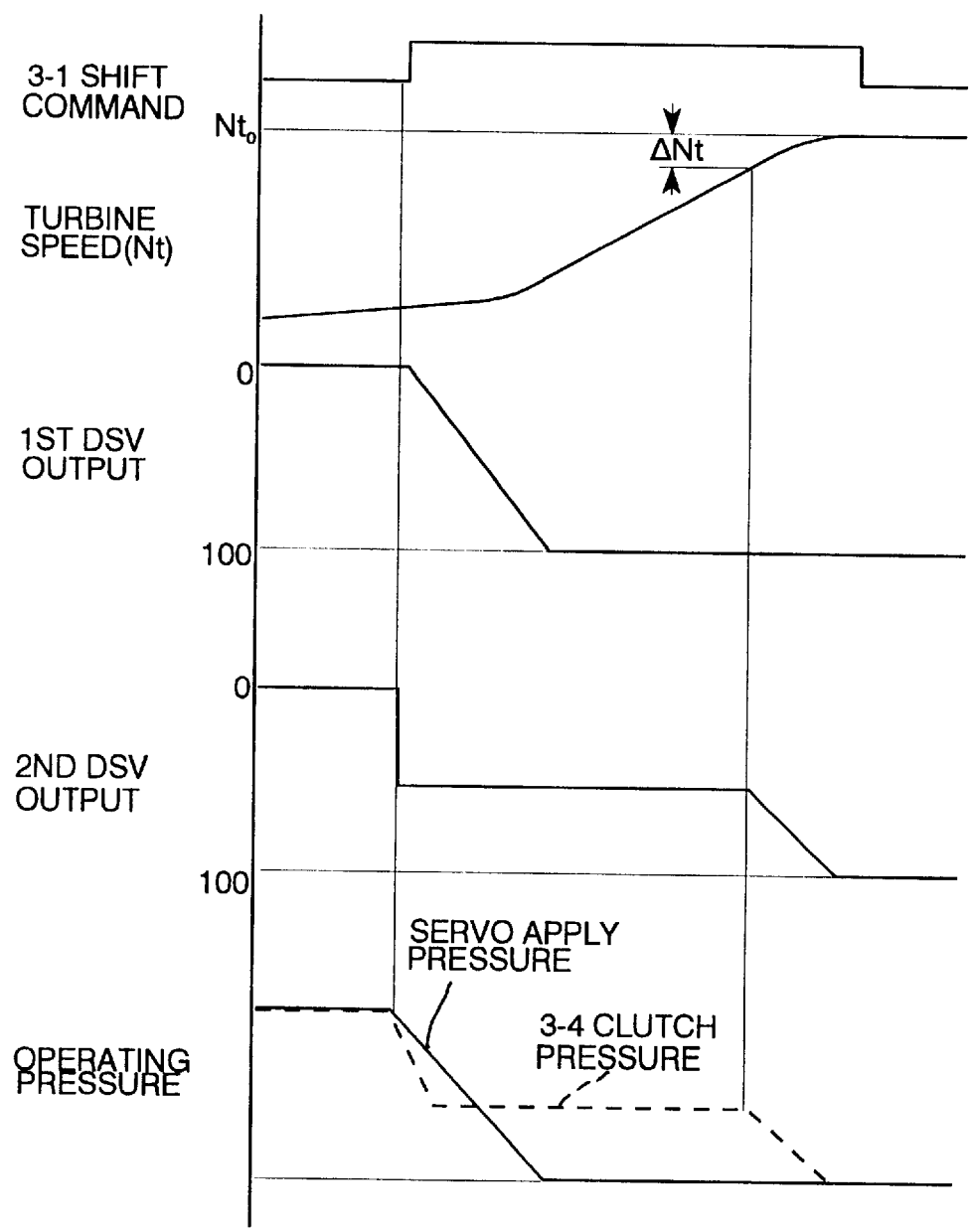
FIG. 86 is a time chart showing changes in various factors during a 3 - 1 shift.

The discharge control of brake apply pressure through the first duty solenoid valve 121 is executed in accordance with the sequence routine shown in FIG. 84. When a shift command is provided, the duty rate of the first duty solenoid valve 121 is increased from 0% to 100% at a fixed rate through steps S321 and S322. By means of this control, the brake apply pressure is discharged relatively swiftly with a fixed gradient, as shown in FIG. 86.

Figure 81:
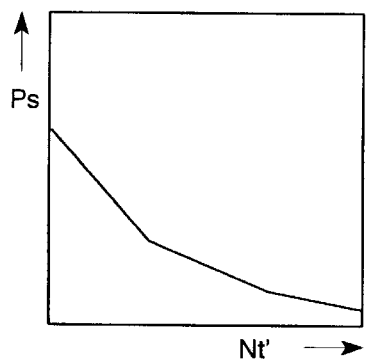
FIG. 81 is a diagram illustrating a map of output pressure during a 4 - 1 shift.
Figure 85:
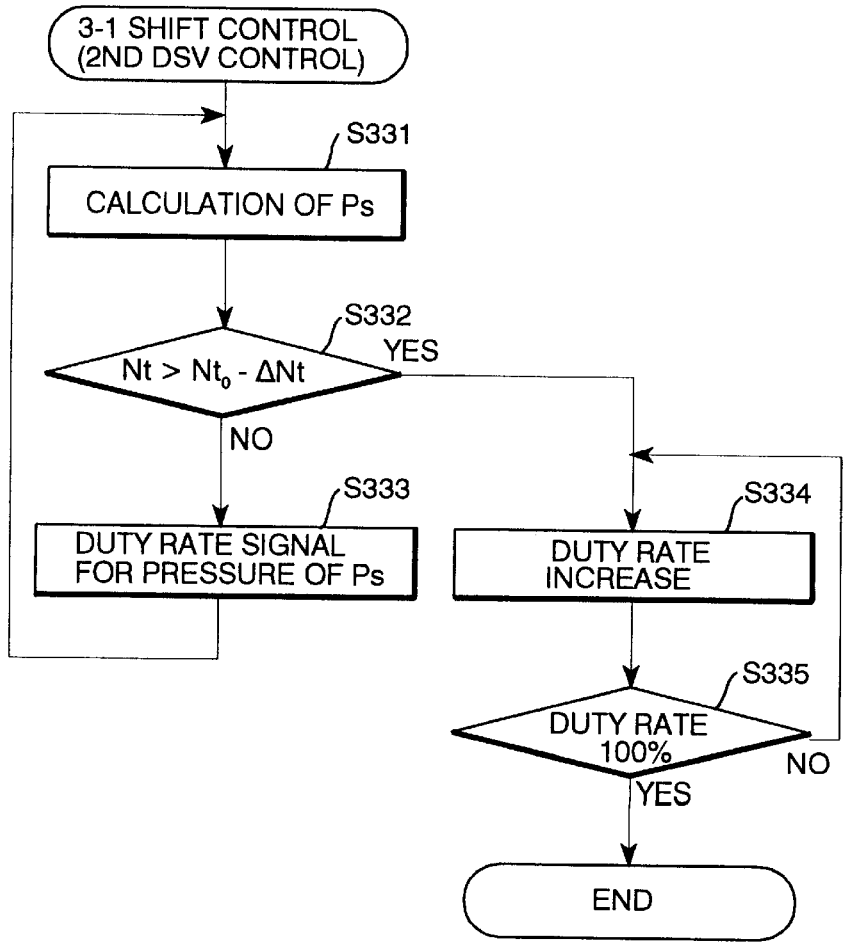
FIG. 85 is a flowchart illustrating a control sequence for the second duty solenoid valve (DSV) during a 3 - 1 shift.

The discharge control of brake apply pressure and 3-4 clutch pressure through the second duty solenoid valve 122 is executed in accordance with the sequence routine shown in FIG. 85. After founding the computed operating pressure Ps at step S331, a determination is made at step S332 as to whether or not the turbine speed Nt has risen to the directly before-gear shift termination turbine speed ($Nt_o-\Delta Nt$). Until the directly before-gear shift termination turbine speed ($Nt_o-\Delta Nt$) is attained, a signal representative of the duty ratio corresponding to the computed operating pressure Ps is output to the second duty solenoid valve 122 at step S333. In this instance, the computed operating pressure Ps is set to become higher as the turbine speed Nt' before the 3-1 down-shift is higher so as to allow the 3-4 clutch 53 to cause appropriate slippage and thereby to cause the turbine speed Nt to increase smoothly. The setting is made on the basis of the same map as the one shown in FIG. 81 provided for the 4-1 down-shift.

When this turbine speed Nt attains the directly before-gear shift termination turbine speed ($Nt_o-\Delta Nt$), the duty rate is increased up to 100% at a fixed rate through steps S334 and S335, locking the 3-4 clutch 53 completely.

(3). Manual Down-Shift

Down-shifts to the first gear in the low speed (L) range from second to any one of the second to fourth gears in the drive (D) range or the like through manual operation of the shift lever will be described.

A down-shift from the second (2nd) gear in the drive (D) range to the (1st) first gear in the low speed (L) range will be described. This 2-L1 down-shift is caused by unlocking the 2-4 brake 54 and locking the low reverse brake 55. In the hydraulic control circuit 100, both first and second solenoid valves 111 and 112 switch their states from OFF to ON as shown in FIG. 17, directing the operating pressure to the bypass valve 104 at the control port 104a through the first solenoid valve 111, and thereby forcing the bypass valve 104 to shift the spool. Accompanying to this, the operating pressure is directed and supplied to the low-reverse valve 103 at the control port 103a from the second solenoid valve 112 through the bypass valve 104, so as to force the low-reverse valve 103 to shift the spool.

As a result, the pressure line 214 downstream from the first duty solenoid valve 121 is switched from communication with the brake apply pressure line 215 to communication with the low-reverse brake pressure line 216. Thus, The discharge control of the brake apply pressure and supply control of the low-reverse brake pressure is performed through the first duty solenoid valve 121 only.

Figure 87:
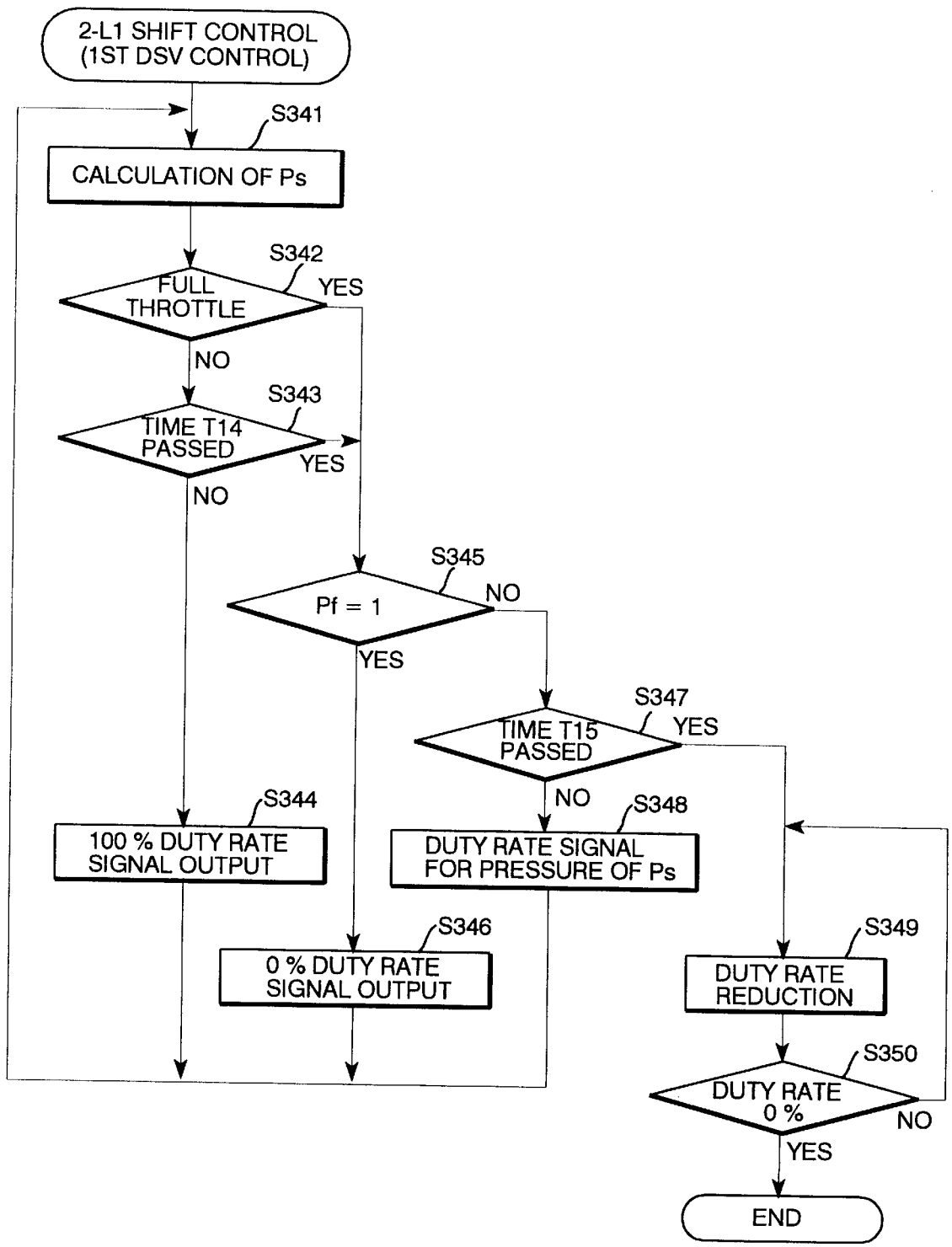
FIG. 87 is a flowchart illustrating a control sequence for the first duty solenoid valve (DSV) during a 2 - L1 shift.
Figure 88:
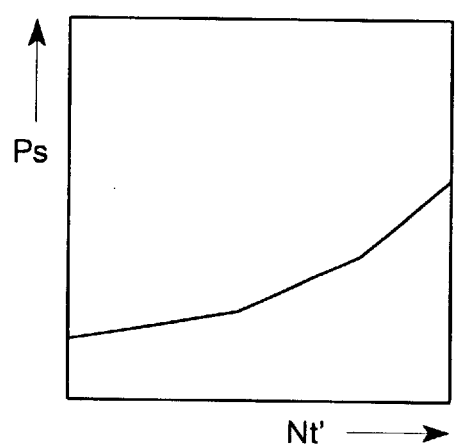
FIG. 88 is a diagram illustrating a map of output pressure during a 2 - Li shift.

The control through the first duty solenoid valve 121 during the 2-L1 down-shift is executed in accordance with the sequence routine shown in FIG. 87. At first, the computed operating pressure Ps is found from the map as shown in FIG. 88 at step S341. This map of computed operating pressure Ps defines the operating pressure such that it becomes higher as the turbine speed Nt' in a condition immediately prior to the 2-L2 down-shift becomes higher. Subsequently, a determination is made at step S342 as to whether or not the engine throttle opening is fully closed. When the engine throttle is not fully closed, the duty rate is set to 100% at step S343 and the first duty solenoid valve 121 is drained at its downstream side until a predetermined delay time T14 has passed at step S344. This is because, in the 2-L1down-shift during acceleration, the one-way clutch 56 operates and, consequently, causes the transmission gear mechanism to interlock if the low reverse brake pressure is supplied too early with respect to discharging the brake apply pressure. For this reason, the low-reverse brake pressure is supplied after having completely discharged the brake apply pressure so as thereby to prevent the transmission gear mechanism from interlocking. When the delay time T14 passes, the sequence routine proceeds to steps S345 and S346 for the pre-charge control.

Figure 89:
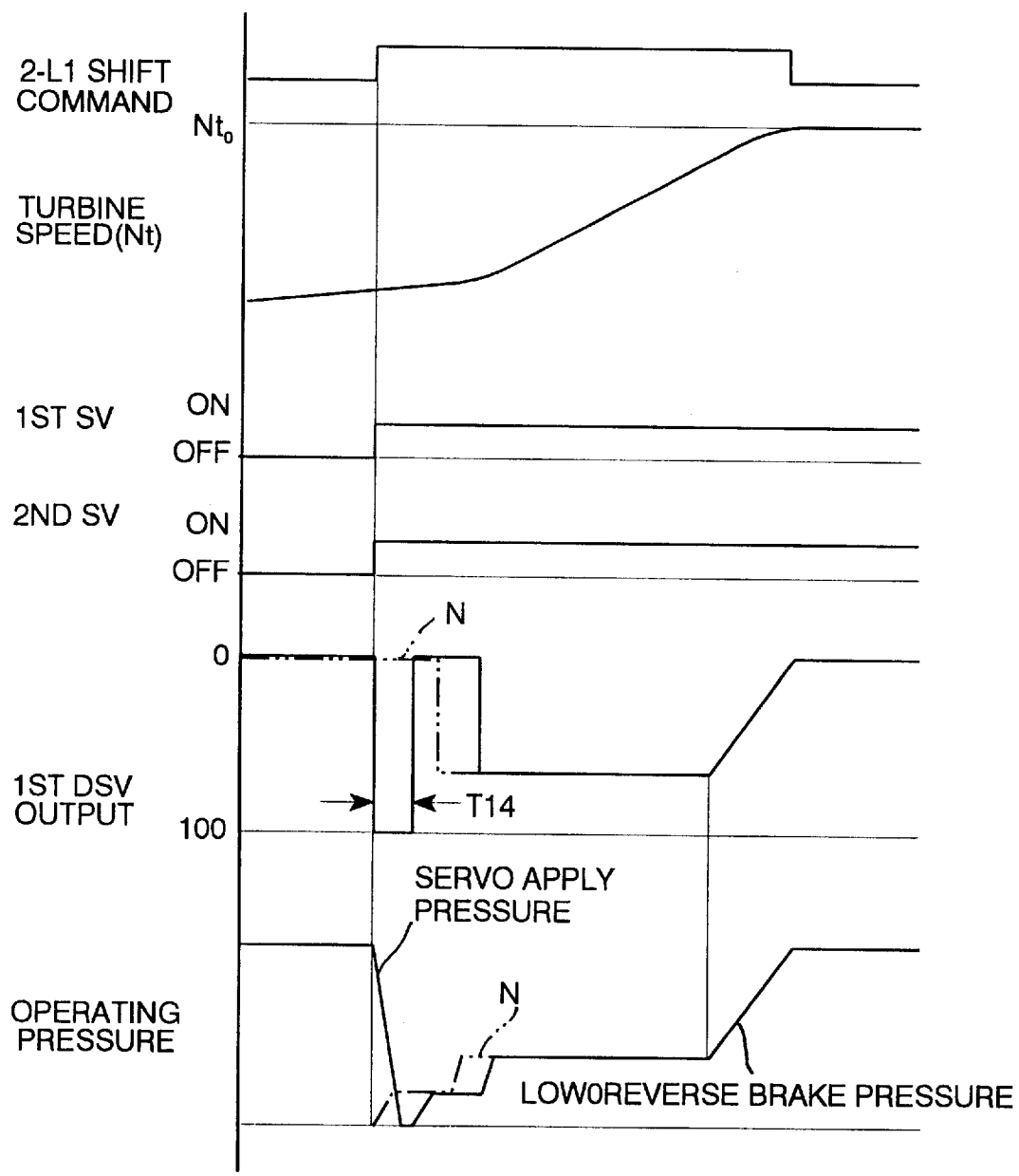
FIG. 89 is a time chart showing changes in various factors during a 2 - LI shift.

In the 2-L1 down-shift accompanied by full closing of the engine throttle where the one-way clutch 56 does not operate and an immediate effect of engine braking is required, the pre-charge control is executed promptly without following the delay time T14, using the brake apply pressure as the low-reverse brake pressure (labelled with a character "L" in FIG. 89) through steps S345 and S346.

In the hydraulic control circuit 100, the operating pressure that is supplied to the brake apply pressure chamber 54a of the 2-4 brake 54 through the first duty solenoid valve 121 in the second gear is introduced into and accumulated in the second accumulator 142 and thereafter supplied to the pressure chamber of the low-reverse brake 55 through the low-reverse valve 103 during the 2-L1 down-shift, so that the pre-charge period of the pre-charge control through the first duty solenoid valve 121 is correspondingly shortened.

When the pre-charge control is concluded (Fp=0), a determination is made at step S347 as to whether or not the 2-L1 down-shift has been concluded, or the backup timer has counted a backup time T15. Until a lapse of the backup time T15, a signal representative of the duty rate corresponding to the computed operating pressure Ps is output to the first duty solenoid valve 121 at step S348. In this instance, the computed operating pressure Ps is set to conform with the turbine speed Nt' in a condition immediately prior to the 2-L1 down-shift as described above, so as to allow the low-reverse brake 55 to cause appropriate slippage, thereby providing an increase in the turbine speed Nt during the backup time.

Subsequently, when the 2-L1 down-shift is concluded or the backup time T15 passes, the duty rate is reduced to 0% at a fixed rate through steps S349 and S350, locking the low-reverse brake 55 completely. The determination concerning the conclusion of the 2-L1 down-shift is made based on the satisfaction of the condition that the difference between the turbine speeds Nt immediately before and after the 2L1 down-shift has become at least as great as a computed value; that the turbine speed change dNt has altered from minus to plus; or that the turbine speed change dNt has become less than half the rate during the 2-L1 down-shift.

A manual down-shift to the first gear in the low speed (L) range from the third gear in the drive (D) range is achieved by locking the low reverse brake 55 through the first duty solenoid valve 121 and unlocking the 3-4 clutch 53 through the second duty solenoid valve 122. During the gear shift, as was the case of the 2-L1 down-shift, the first and second solenoid valves 111 and 112 are jointly switched from OFF to ON through switching the bypass valve 104 and causes the low reverse valve 1003 to switch the pressure line 214 downstream from the first duty solenoid valve 121 from communication with the brake apply pressure line 215 to communication with the low reverse brake line 216. By this means, the control is accomplished for discharge of the brake apply pressure and supply of the low reverse brake pressure through the first duty solenoid valve 121. However, during the gear shift from the third gear to the first gear of the low speed (L) range, since the 3-4 clutch pressure is supplied to the control port 107a of the relay valve 107 which disconnects the communication between the first solenoid valve 111 and bypass valve 104, switching the bypass valve 104 can not be accomplished by means of the operating pressure from the first solenoid valve 111, the low reverse valve 103 is rendered disable to cause switching of the communication of the pressure line 214 downstream from the first duty solenoid valve 121.

Therefore, for this down-shift, following switching the first and second solenoid valves 111 and 112 from OFF to ON after the relay valve 107 has shifted the spool to the right end position as shown in FIG. 17, the control of low reverse brake pressure supply through the first duty solenoid valve 121 is effected. In this instance, as concerns switching the spool position of the relay valve 107, discriminating control is accomplished in a manner described separately.

Figure 90:
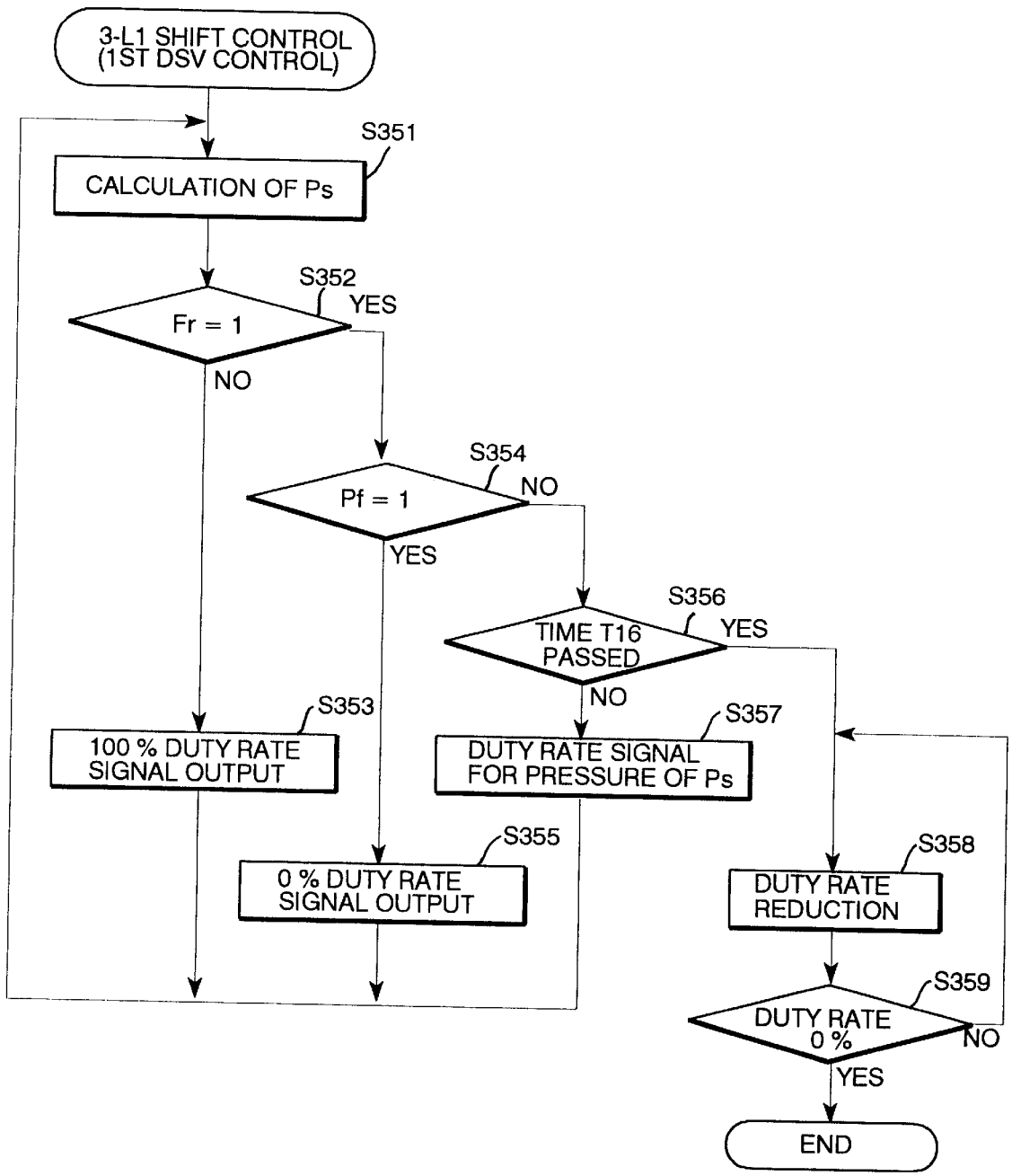
FIG. 90 is a flowchart illustrating a control sequence for the first duty solenoid valve (DSV) during a 3 - LI shift.
Figure 93:
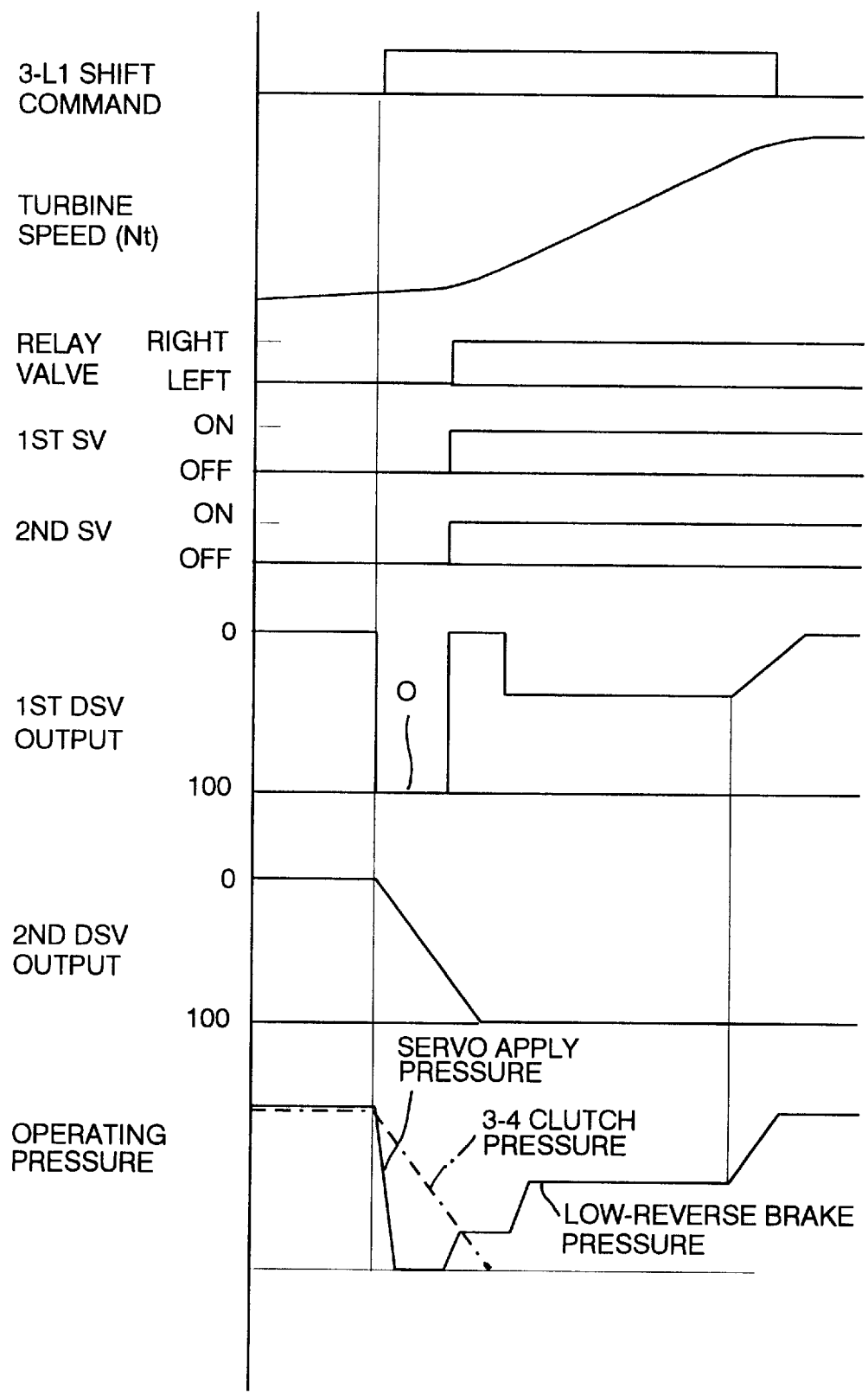
FIG. 93 is a time chart showing changes in various factors during a 3 - Li shift.
Figure 94:
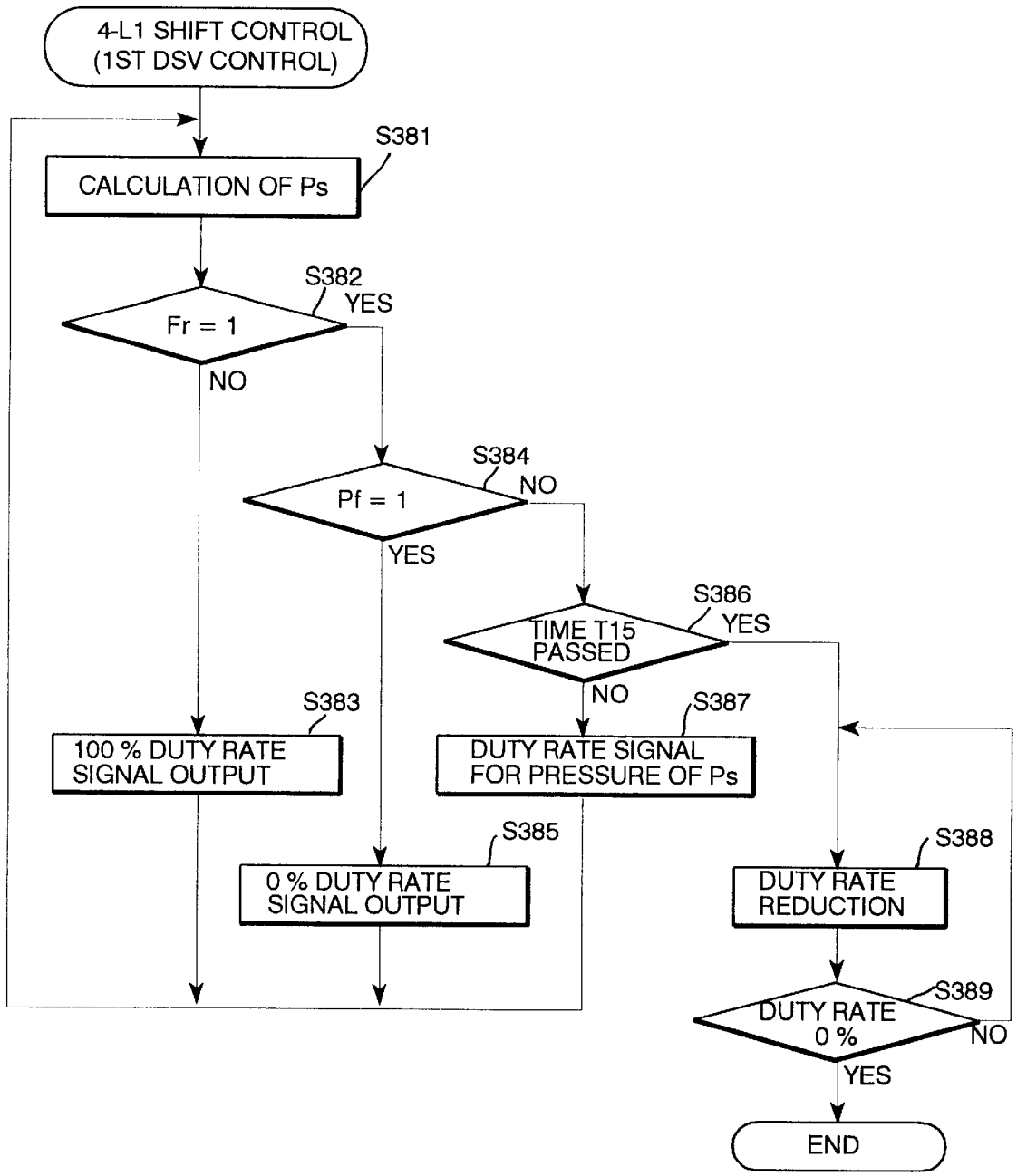
FIG. 94 is a flowchart illustrating a control sequence for the first duty solenoid valve (DSV) during a 4 - Li shift.

Control of the first duty solenoid valve 121 during the 3-L1 down-shift is executed in accordance with the sequence routine shown in FIG. 90. First of all, the computed operating pressure Ps is found from a pressure map at step S351. The map of computed operating pressure Ps is the same as that utilized for the 2-L1 down-shift and defines the computed operating pressure Ps such that it becomes higher with an increase in the turbine speed Nt' prior to shifting. Subsequently, at step S352, a determination is made as to a relay valve switch flag Fr. The relay valve switch flag Fr indicates that, when it is up or set to the state 1, the relay valve 107 has shifted its spool from the left end to the right end position. If it is prior to switching (Fr=0) the duty rate is held at 100% at step S353 and drains the first duty solenoid valve 121 at its downstream side. As was previously described, this is because, at the time the relay valve 107 has not yet shifted the spool to the right end position, while the low reverse brake pressure can not be supplied, only discharge of the brake apply pressure is carried out as labelled with a character "O" in FIG. 93.

When the relay valve 1007 shifts the spool to the right end position (Fr=1), the control proceeds to pre-charge process at steps S354 and S355. In other words, during the period in which the pre-charge flag Ft is up or set to the state 1, the duty rate of the first duty solenoid valve 121 is held at 0% and fills rapidly the passage leading to the pressure chamber of the low reverse brake 55 with the operating oil. On the other hand, when the pre-charge control has terminated (Fp=0), a determination is made at step S356 as to whether or not the 3-L1 down-shift has concluded, i.e. whether the back-up timer has counted a specified backup time T16. Before a lapse of the backup time T16, a duty rate corresponding to the computed operating pressure Ps is output to the first duty solenoid valve 121 at step S357. In this instance, the computed operating pressure Ps, which is set corresponding to the turbine speed Nt' immediately prior to shifting, allows the low reverse brake 55 to slip appropriately and provides an increase the turbine speed Nt during slippage.

Subsequently, when the 3-1L down-shift is concluded, or the specified backup time T15 has passed, the duty rate is reduced to 0% at a fixed rate through steps S358 and S359. In such a way, the low reverse brake 55 is completely locked.

Figure 91:
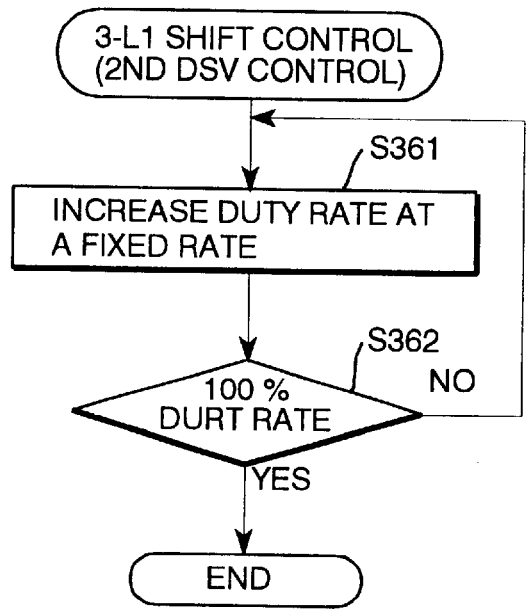
FIG. 91 a flowchart illustrating a control sequence for the second duty solenoid valve (DSV) during a 3 - Li shift.

During the 3-L1 down-shift, discharge control of the 3-4 clutch pressure and brake release pressure through the second duty solenoid valve 122 is executed in accordance with the sequence routine shown in FIG. 91. Specifically, through steps S361 and S362, the duty rate of the second duty solenoid valve 122 is increased to 100% at a fixed rate. With this increasing duty rate, the 3-4 clutch pressure is discharged with a linear gradient following an output of a shift command, unlocking the 3-4 clutch 53.

Figure 92:
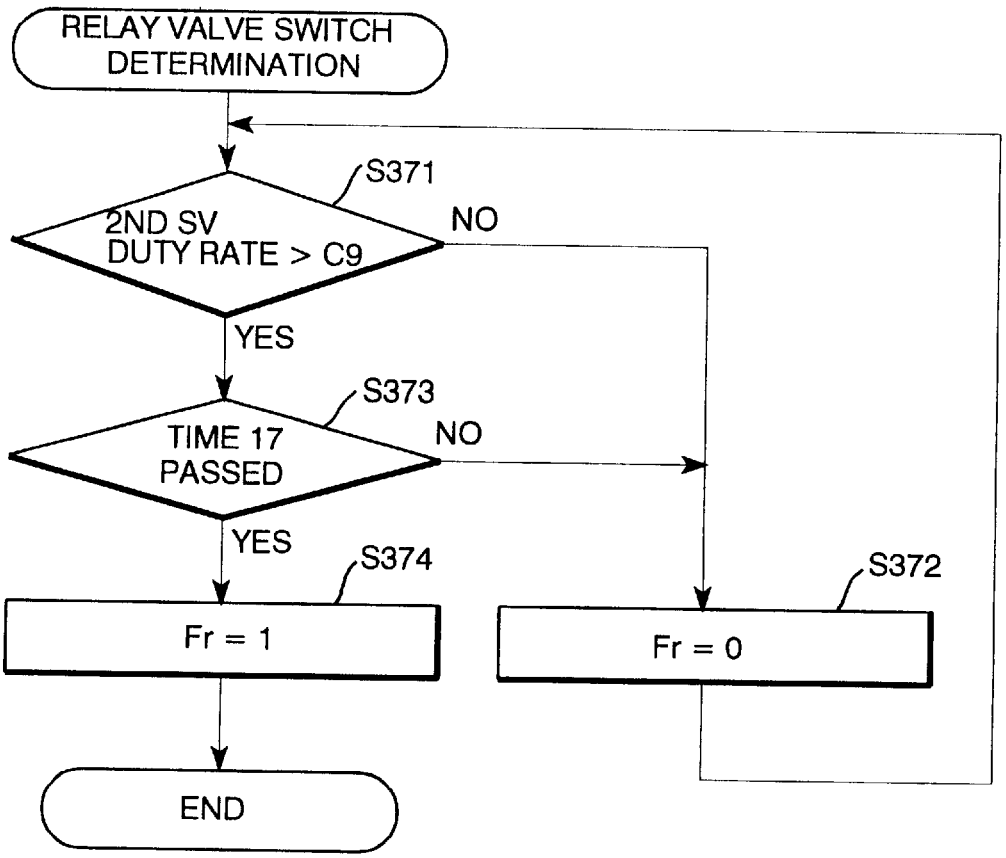
FIG. 92 is a flowchart illustrating a switching control sequence for a relay valve during a 3 - Li shift.

Determination of switching the relay valve 107 in spool position which comprises the condition of switching the first and second solenoid valves 111 and 112 from OFF to ON and commencement of the control of low reverse brake pressure through the first duty solenoid valve 121 is executed through the sequence routine shown in FIG. 92. Specifically, a determination is made at step S371 as to whether or not the duty rate of the second duty solenoid valve 122 is greater than a specified rate C13, in other words, whether or not the 3-4 clutch pressure discharged from the second duty solenoid valve 122 has fallen below specific pressure equivalent to the force of the return spring of the relay valve 107. Until the 3-4 clutch pressure halls down below the specific pressure, the relay valve switch flag Fr is held in the state0 at step S372. When it becomes less in level than the specific pressure, i.e. the duty rate has increased greater than the specified rate C13, then, at step S373, a lapse of a specified time T17 is waited.

When the specified time T17 has passed, the relay valve switch flag Fr is set to the state 1 at step S374 and causes the first and second solenoid valves 111 and 112 to turn ON, starting the control over the low reverse brake pressure.

A manual down-shift to the first gear in the low-speed (L) range from the fourth gear in the drive (D) range is almost the same as the 3-L1 down-shift control, with the exception of the point that locking the forward clutch 51 is needed.

Control of the 4-L1 down-shift by means of controlling the first duty solenoid valve 121 is executed in accordance with the sequence routine shown in FIG. 92. At first, the computed operating pressure Ps is found from a map similar to the map used in the 2-L1 down-shift at step S381, following which, through steps S372 and S373, the duty rate is held at 100% and the brake apply pressure is discharged quickly until it is determined that the relay valve 107 has switched (Fr=0). When the relay valve 107 switches (Fr=1), the pre-charge control is executed by means of altering the duty rate to 0% for the pre-charge period (Fp=1) through steps S384 and S385. On the other hand, when the pre-charged period has been over (Fp=0), a determination is made at step 386 as to whether or not the 4-L1 down-shift has been concludes or the back-up timer has counted a specified backup time T18. Before the conclusion of the 4-L1 down-shift, a duty ratio corresponding to the computed operating pressure Ps is output to the first duty solenoid valve 121 at step S387.

With this control, the low reverse brake 55 is allowed to cause appropriate slippage and provide an increase in the turbine speed Nt during the slippage. Subsequently, when the 4-L1 down-shift is concludes, or the backup time T18 has passed, the duty rate is reduced to 0% at a fixed rate through steps S388 and S389, locking the low reverse brake 55 completely.

Figure 95:
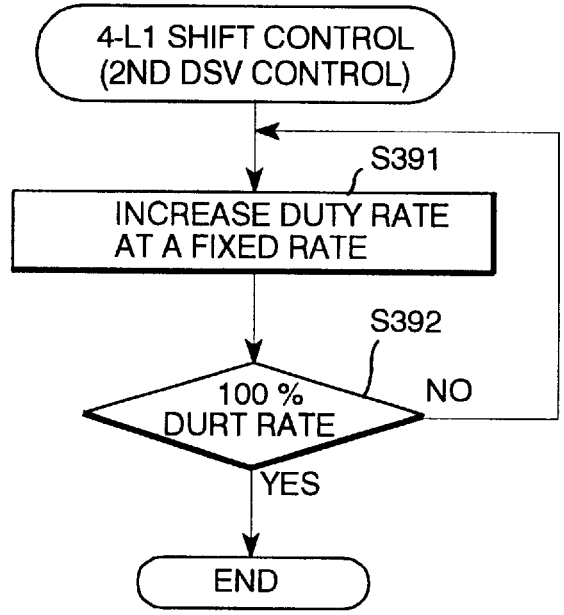
FIG. 95 is a flowchart illustrating a control sequence for the second duty solenoid valve (DSV) during a 4 - Li shift.

During the 4-L1 down-shift, control is executed of discharging the 3-4 clutch pressure through the second duty solenoid valve 122 in accordance with the sequence routine shown in FIG. 95. At first, through steps S391 and S392, the duty rate of the second duty solenoid valve 122 is increased to 100% at a fixed rate. Following an output of a shift command, the 3-4 clutch pressure is discharged at a linear gradient, unlocking the 3-4 clutch 53.

Figure 96:
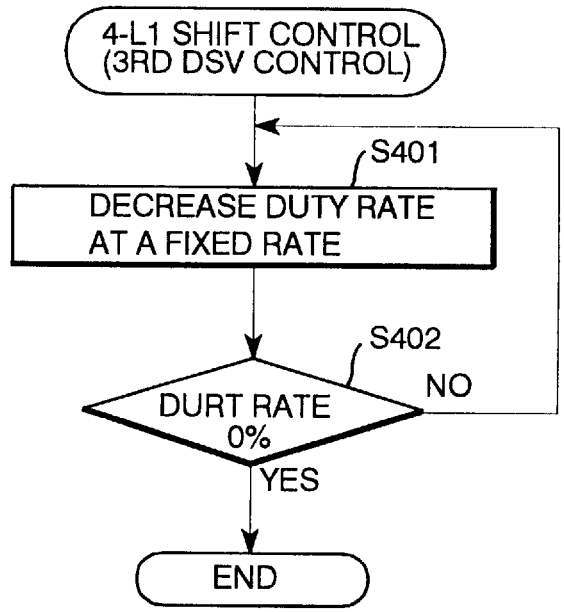
FIG. 96 is a flowchart illustrating a control sequence for the third duty solenoid valve (DSV) during a 4 - Li shift.
Figure 97:
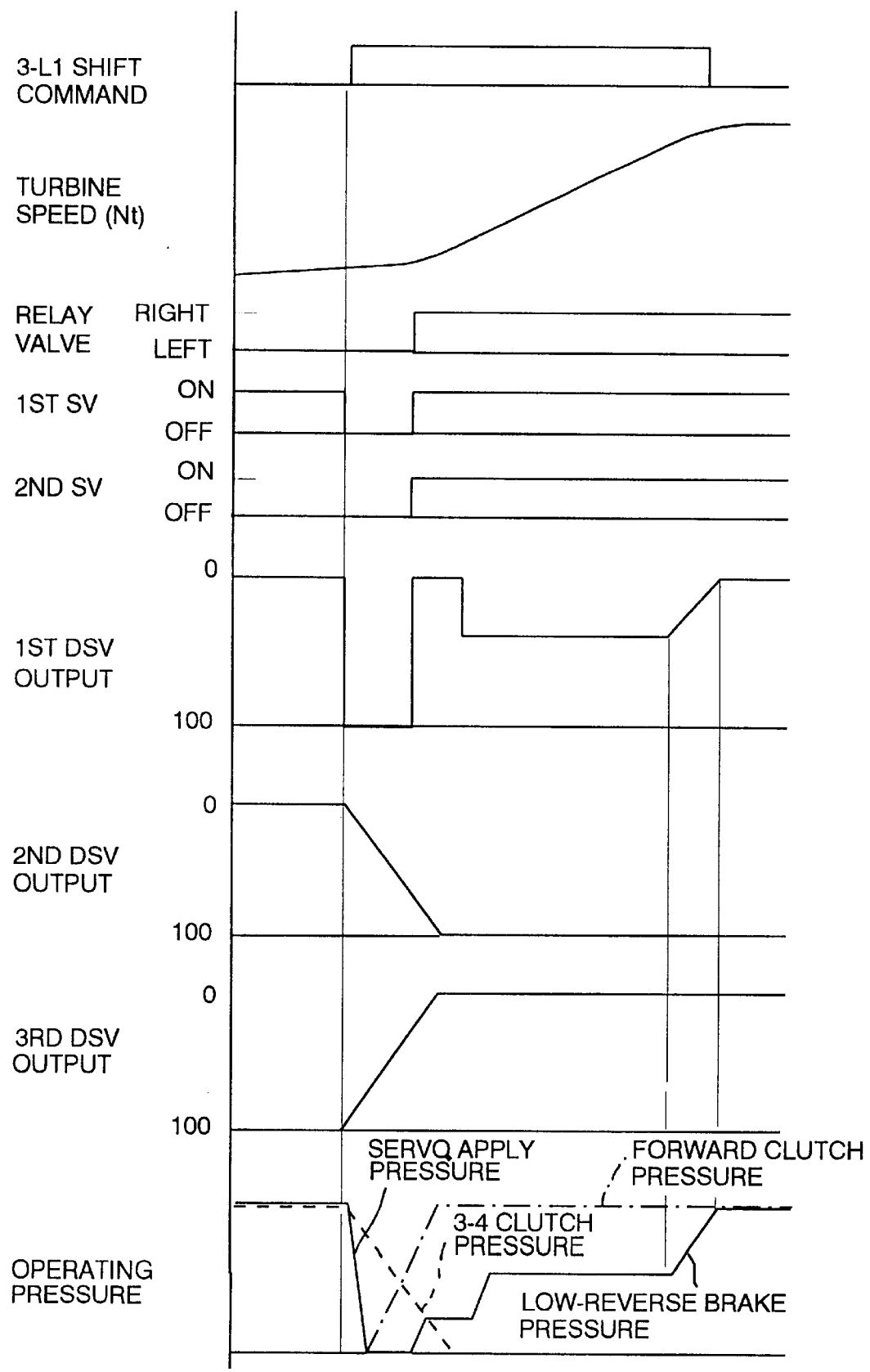
FIG. 97 is a time chart showing changes in various factors during a 4 - Li shift.

Control of the forward clutch pressure through the third duty solenoid valve 123 is executed in accordance with the sequence routine shown in FIG. 96. At steps S401 and S402, a duty rate of the third duty solenoid valve 123 is decreased 0% at a fixed rate. With the linearly increasing duty rate, the forward clutch pressure is supplied at a linear gradient following an output of a shift command and unlocks the forward clutch 51. In this instance, the forward clutch 51 is locked in advance of locking the low reverse brake 55 following unlocking the 2-4 brake 54 by means of the first duty solenoid valve 121, in other words, in a neutral state, it is not necessary for the low-reverse brake 55 to be precisely feedback controlled.

(4). Coast Down-Shift

As one of down-shifts, other than torque demand down-shifts which accompany an increase in throttle opening, there are coast down-shifts which are caused due to manually selected down-shifts under the condition where the engine throttle valve is fully opened or due to a reduction in vehicle speed. Of these coast down-shifts, a 4-3 down-shift, in particular, which needs locking the forward clutch 51 requires special control.

Specifically, as compared with a torque demand down-shift for which feedback control is performed to control locking pressure for a friction coupling element, such as the 2-4 brake 54 in the 4-3 down-shift, so as to raise smoothly the turbine speed Nt to a turbine speed $N_o$ to expected at the conclusion of the down-shift, raising the turbine speed Nt is provided by controlling the friction coupling element to be locked for the coast down-shift. In cases of 4-3 coast down-shift, the rise of the turbine speed Nt is provided by controlling locking the forward clutch 51. In such a case, since the forward clutch 51 is designed and structured so as to have a great capacity in order to bear a large portion of torque occurring during acceleration, it is essential for the forward clutch to perform delicate control with operating pressure at a low level while the vehicle is coasting with input torque extremely low.

Figure 98:
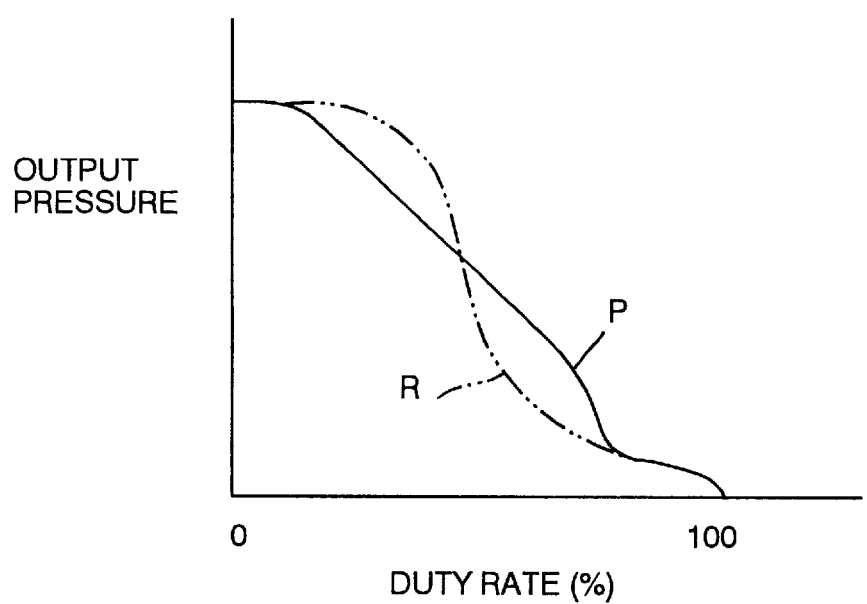
FIG. 98 is a diagram illustrating a map of output pressure with regard to duty rate.

On the other hand, with regard to the output characteristic of the duty solenoid valve relative to duty rate, as labelled with a character "P" in FIG. 98, in a region of low output pressure where the clutch piston is allowed to stroke, there is a specific region where duty solenoid valve shows a sharp change in output pressure relative to changes in duty rate. Therefore, it is significantly difficult to control locking the forward clutch which needs to be controlled within a low pressure region. For this reason, by making utilization of an accumulator during the 4-3 down-shift during coasting, the locking control of the forward clutch 51 is accomplished with satisfaction by means of the third duty solenoid valve 123.

As shown in FIG. 15, when a 4-3 shift command is provided during coasting, the first solenoid valve 121 is switched from ON to OFF, the 3-4 shift valve 105 is caused to shift its spool to the left end position as viewed in the figure, bringing a first accumulator 141 into communication with the forward clutch pressure line 219. At the same time, the feedback control is commenced over the forward clutch pressure by means of the third duty solenoid valve 123. Shifting the spool of the 3-4 shift valve 105 to the left end position provides communication between the brake release pressure line 221 and 3-4 clutch pressure line 227, so as to force the 3-4 clutch pressure to enter the brake release pressure chamber 54b of the 2-4 brake 54 as a brake release pressure through the second duty solenoid valve 122.

Figure 99:
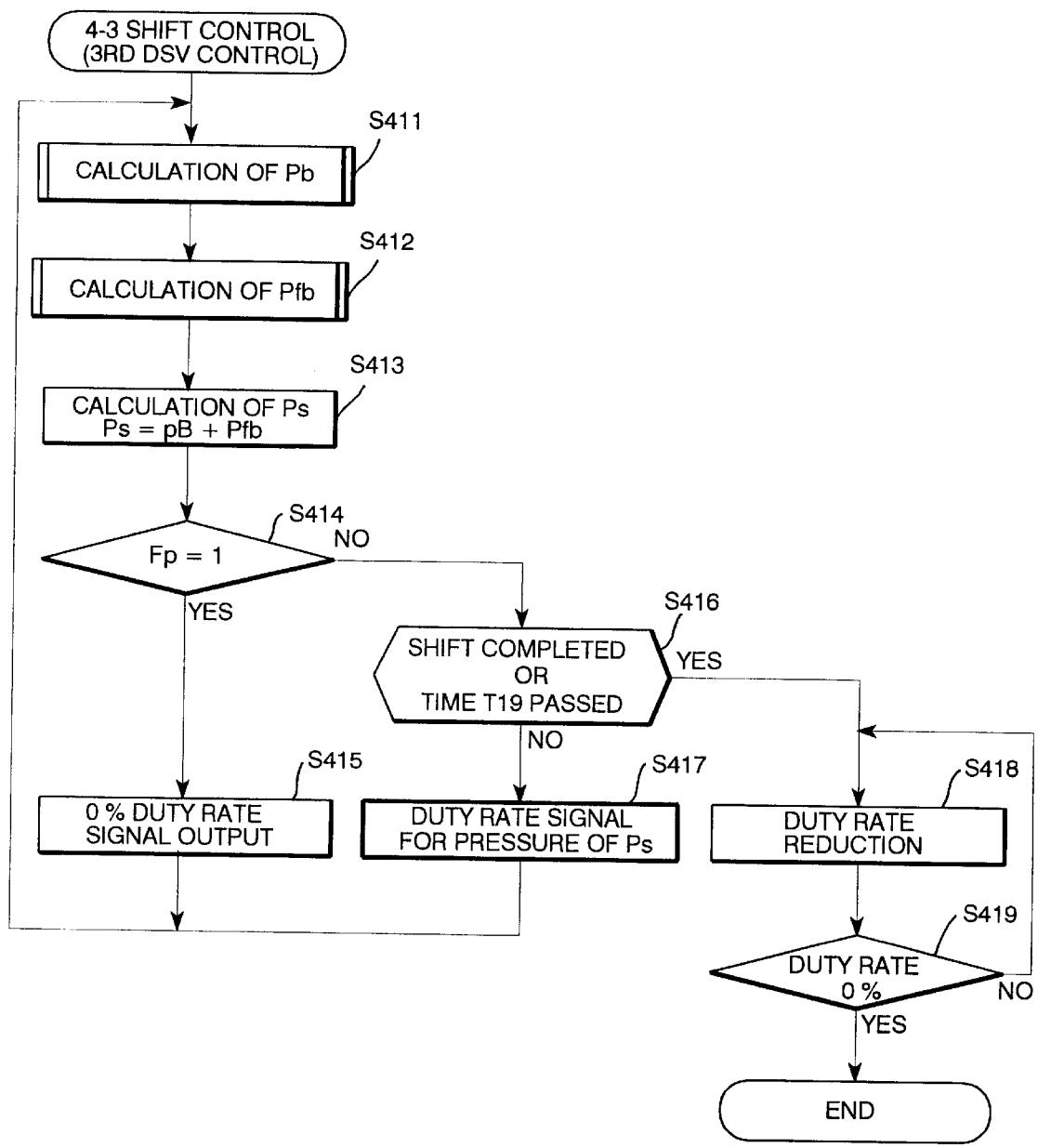
FIG. 99 is a flowchart illustrating a control sequence for the third duty solenoid valve (DSV) during a 4 - 3 shift.

Control of forward clutch pressure supply through the third duty solenoid valve 123 during coasting is executed in accordance with the sequence routine shown in FIG. 99. First of all, through steps S411 and S412, calculations are made of the base pressure Pb and feedback pressure Pfb. Subsequent to calculation of the computed operating pressure Ps by adding these pressure Pb and Pfb at step S413, the pre-charge control is executed during the pre-charge period (Fp=1) through steps S414 and S415. When the pre-charge period is over (Fp=0), a determination is made at step S416 as to whether or not the gear shift has been completed or a specified backup time T19 has been counted up by the back-up timer. Until a lapse of the backup time T19, at step S417, a signal representative of the duty rate corresponding to the computed operating pressure Ps is output to the third duty solenoid valve 123. On the other hand, when the coast 4-3 down-shift is over, that i s, the backup time T19 has passed, the duty rate is reduced at a fixed rate until reaching 0% through steps S418 and S419. In this instance, the calculations of these base pressure Pb and feedback pressure Pfb made, respectively, at steps S411 and S412 are executed in accordance with the same sequence as the that for the feedback control of brake apply pressure through the first duty solenoid valve 121 during a torque demand 4-3 gear shift (see FIGS. 61 and 64).

With the control described above, as shown in FIG. 100, during the control of the forward clutch pressure, the turbine speed Nt increases to a turbine speed $Nt_o$ expected at the conclusion of shifting. Particularly, at the beginning of shifting, performing the supply of operating pressure from the first accumulator 141 in addition to the pre-charge through the third duty solenoid valve 123 enables the forward clutch pressure to rise in a very short time as labelled with a character "Q" in FIG. 100.

Figure 100:
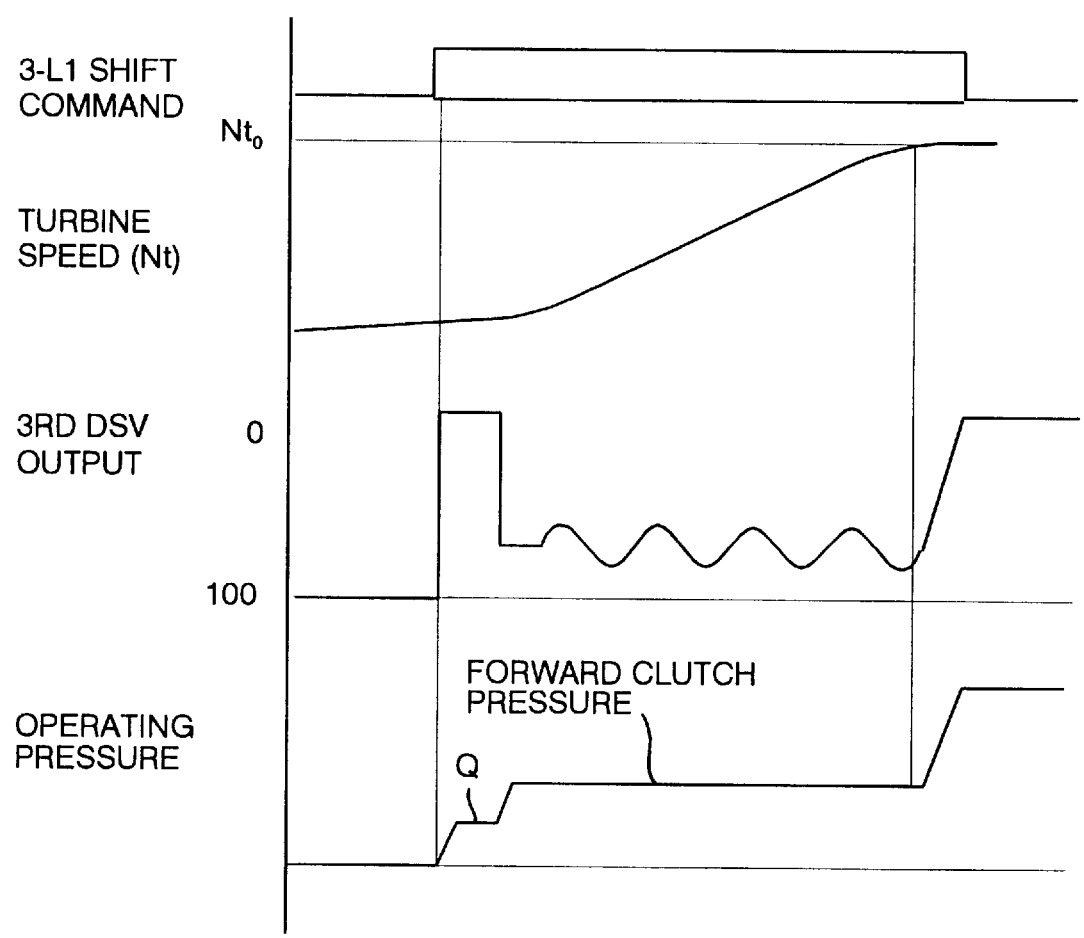
FIG. 100 is a time chart showing changes in various factors during a 4 - 3 shift.

Together, a dumping effect of the first accumulator 141 mitigates a sharp change in the output characteristic of the duty solenoid valve in a low pressure region shown in FIG. 98 and provides a smooth change in the output pressure relative to changes in duty rate as labelled with a character "R" in FIG. 100. With this control, the forward clutch pressure, which is particularly required to be controlled precisely in a low pressure region for the coast 4-3 down-shift during coasting, is satisfactorily realized. Down-shifts during coasting other than the 4-3 down-shift do not require minute control in a low pressure region and consequently, avoids any necessity of the feedback control.

(5). Manual Shift Operation

A description will be hereafter provided with respect to control of manual shift operation between the respective ranges, in particular, while the vehicle is in a halt.

When range shift operation is made from the neutral (N) range or the reverse (R) range to the drive (D) range, locking the forward clutch 51 is controlled. In order for the forward clutch 51 to generate only reduced shock upon locking, shift control is performed such that the third gear is instantaneously created before the first gear is achieved. Accordingly, when this shift operation takes place, control is performed for supply and discharge of the forward clutch pressure through the second duty solenoid valve 122 and supply of the forward clutch pressure through the third duty solenoid valve 123. In these range shifts, the control is common to both range shifts, i.e. a shift from the neutral (N) range to the drive (D) range and a shift from the reverse (R) range to the drive (D) range. However, for the reverse (R) to drive (D) range shift, control is additionally performed over discharging the low reverse brake pressure.

Figure 101:
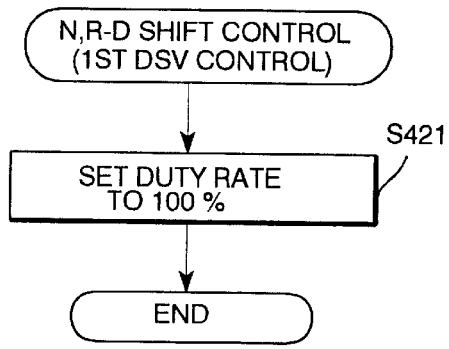
FIG. 101 is a flowchart illustrating a control sequence for the first duty solenoid valve (DSV) during a N or R - D shift.

When a manual range shift is made from the reverse (R) range to the drive (D) range, discharge control is accomplished over the low reverse brake pressure through the first duty solenoid valve 121 as described above. As shown in FIG. 101, the discharge control of the low reverse brake pressure is accomplished only by providing a duty rate of 100% for the first duty solenoid valve 121 at step S421. Though in the manual range shift from the neutral (N) range to the drive (D) range, control is made of the first duty solenoid valve 121 in the same manner, since the manual shift valve 102 shuts off the supply of source pressure to the first duty solenoid valve 121 in the neutral (N) range, the low-reverse brake is already in a drained condition.

Figure 102:
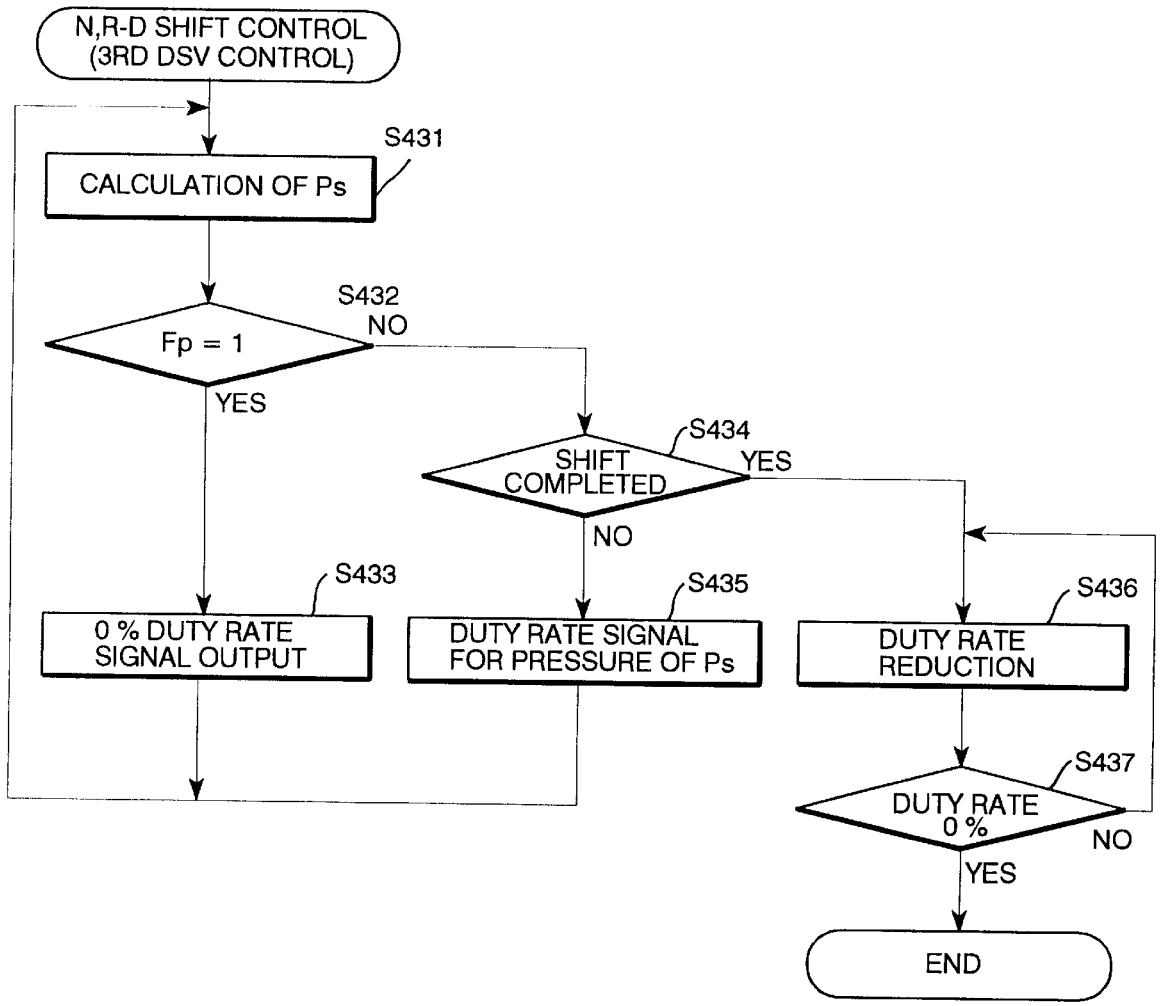
FIG. 102 is a flowchart illustrating a control sequence for the third duty solenoid valve (DSV) during a N or R - D shift.

Control of the forward clutch pressure is executed in accordance with the sequence routine shown in FIG. 102 through the third duty solenoid valve 123. After having obtained the computed operating pressure Ps at step S431 in accordance with the sequence routine described later, the pre-charge control is executed through steps S432 and S433. When the pre-charge control is over (Fp=0), then, through steps S434 and S435, a signal representative of the duty rate corresponding to the computed operating pressure Ps is output to the duty solenoid valve 123 until conclusion of the manual range shift to the drive (D) range and provides the forward clutch pressure in accordance with the computed operating pressure Ps. Subsequently, when the manual range shift is concluded, then, through steps S436 and S437, the duty rate is reduced at a fixed rate until reaching 0%, increasing the forward clutch pressure to a specified level.

Figure 103:
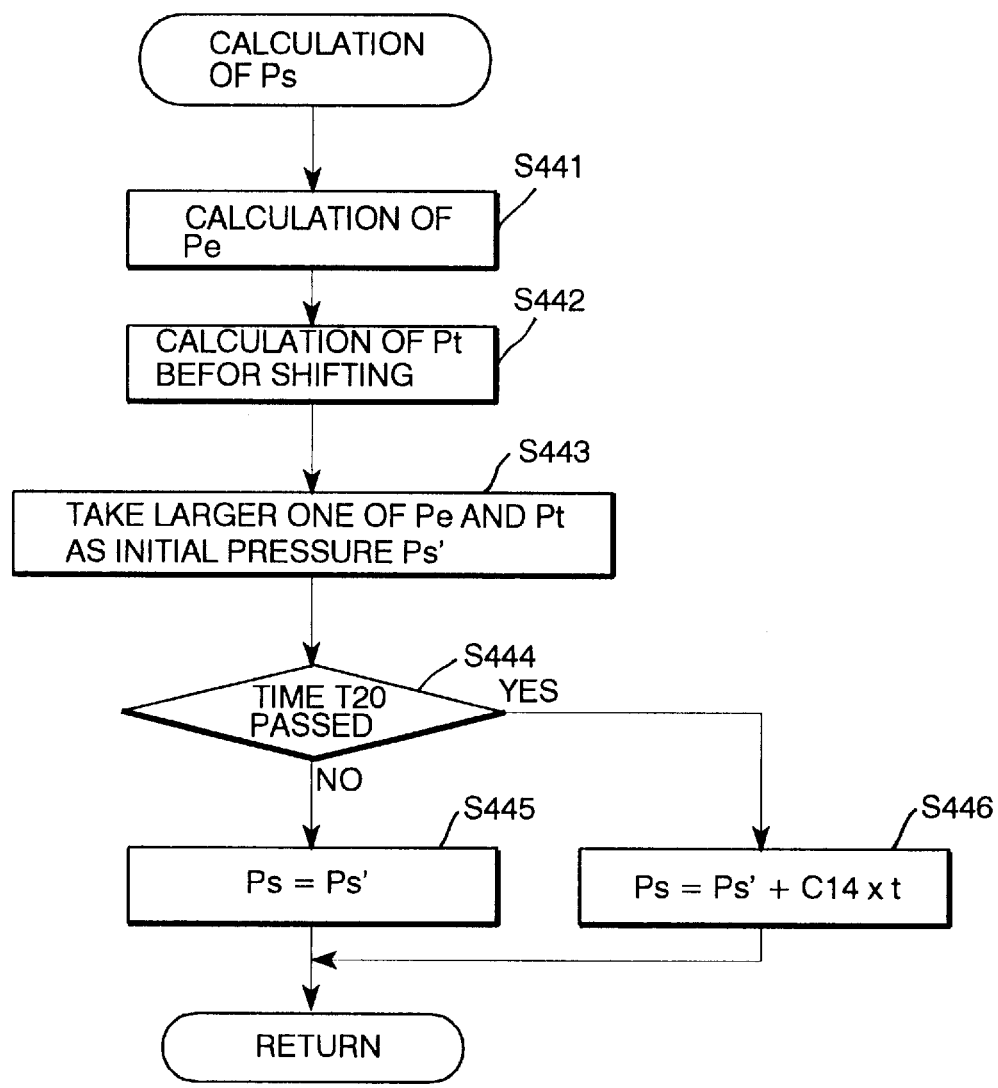
FIG. 103 is a flowchart illustrating a sequence for a calculation of hydraulic pressure during a N or R - D shift.
Figure 104:
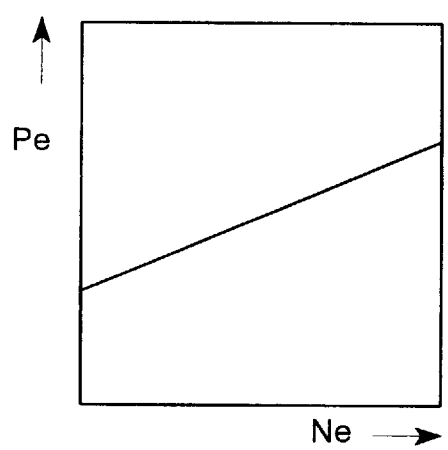
FIG. 104 is a diagram illustrating a map of hydraulic pressure with regard to engine speed used in the calculation of hydraulic pressure.
Figure 105:
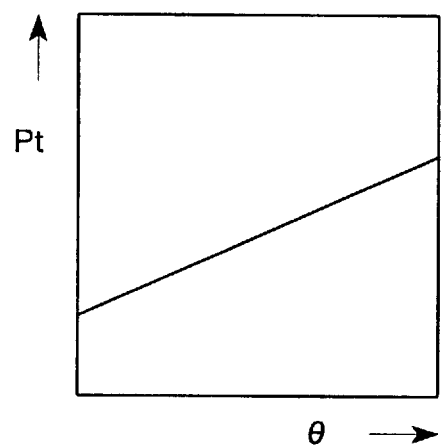
FIG. 105 is a diagram illustrating a map of hydraulic pressure with regard to throttle opening used in the calculation of hydraulic pressure.

The calculation of computed operating pressure Ps at step S431 is performed in accordance with the sequence routine shown in FIG. 103. In the sequence routine, the pressure Pe and Pt corresponding to the engine speed Ne and throttle opening 9, respectively, both immediately prior to the manual range shift to the drive (D) range, are found from maps at steps S441 and S442, respectively. Subsequently, at step S443, either one of these pressure Pe and Pt which is higher than the other is adopted as an initial operating pressure Ps'. Here, as shown in FIGS. 104 and 105, the maps define the pressure Pe and Pt such each pressure Pe or Pt becomes higher with an increase engine speed Ne or throttle opening θ. At step S444, a determination is made as to whether or not a specified time T20 has passed following the manual operation to the drive (D) range. Until the specified time T20 passes, the computed oil pressure Ps is maintained equal to the initial operating pressure Ps' at step S445. On the other hand, when the specified time T19 passes, the computed operating pressure Ps is increased by a fixed rate with progress of time from the lapse of the specified time T20 at step S446.

Figure 107:
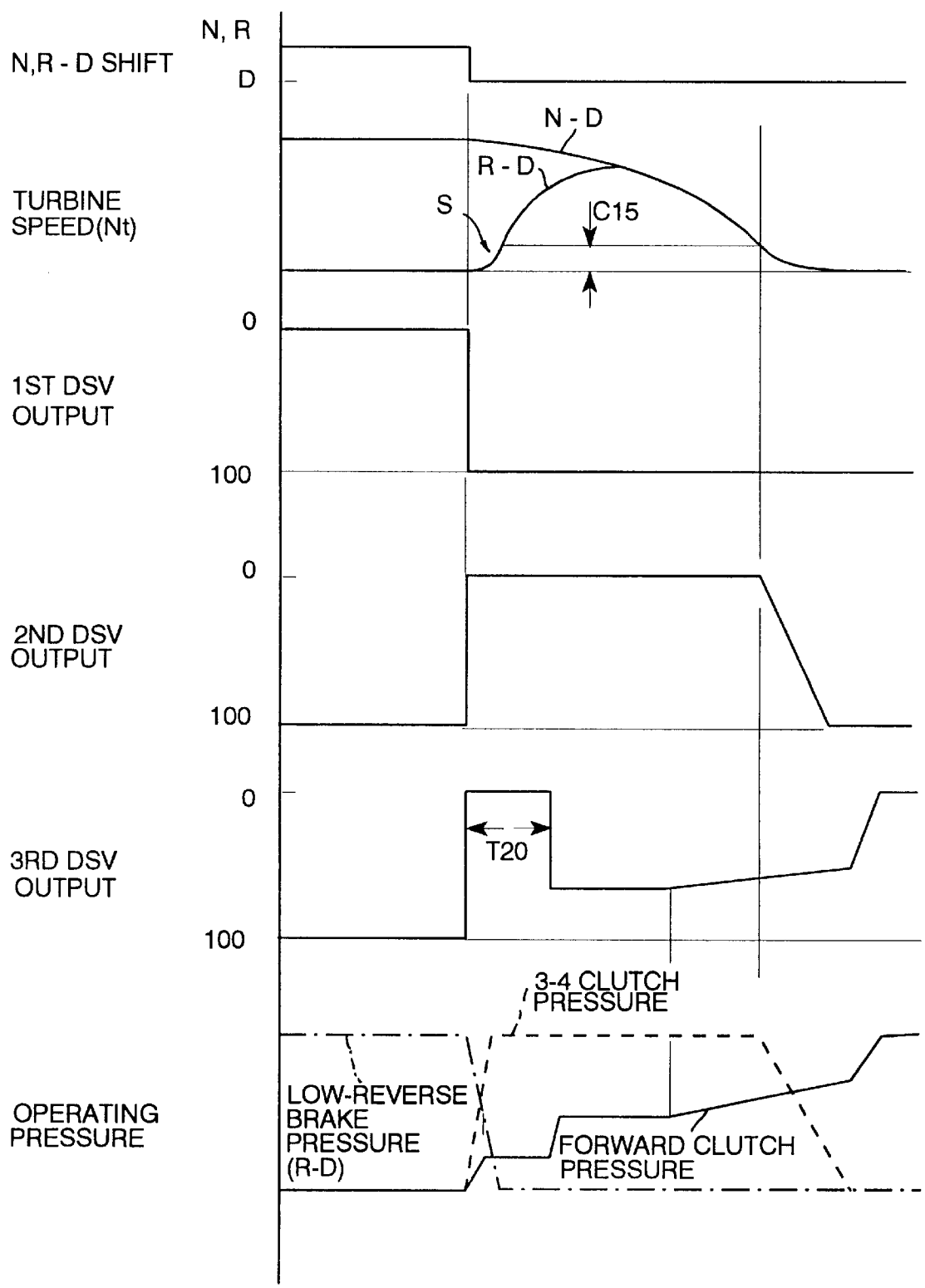
FIG. 107 is a time chart showing changes in various factors during a N or R - D shift.

With this control, the duty rate of the third duty solenoid valve 123, and hence the forward clutch pressure corresponding to the duty rate, changes as shown in FIG. 107. Following the increase in duty rate, the turbine speed Nt drops directly down upon an occurrence of the manual range shift from the neutral (N) range and drops down following a spontaneous increase due to discharge of the low reverse brake pressure upon an occurrence of the manual range shift from the reverse (R) range.

Figure 106:
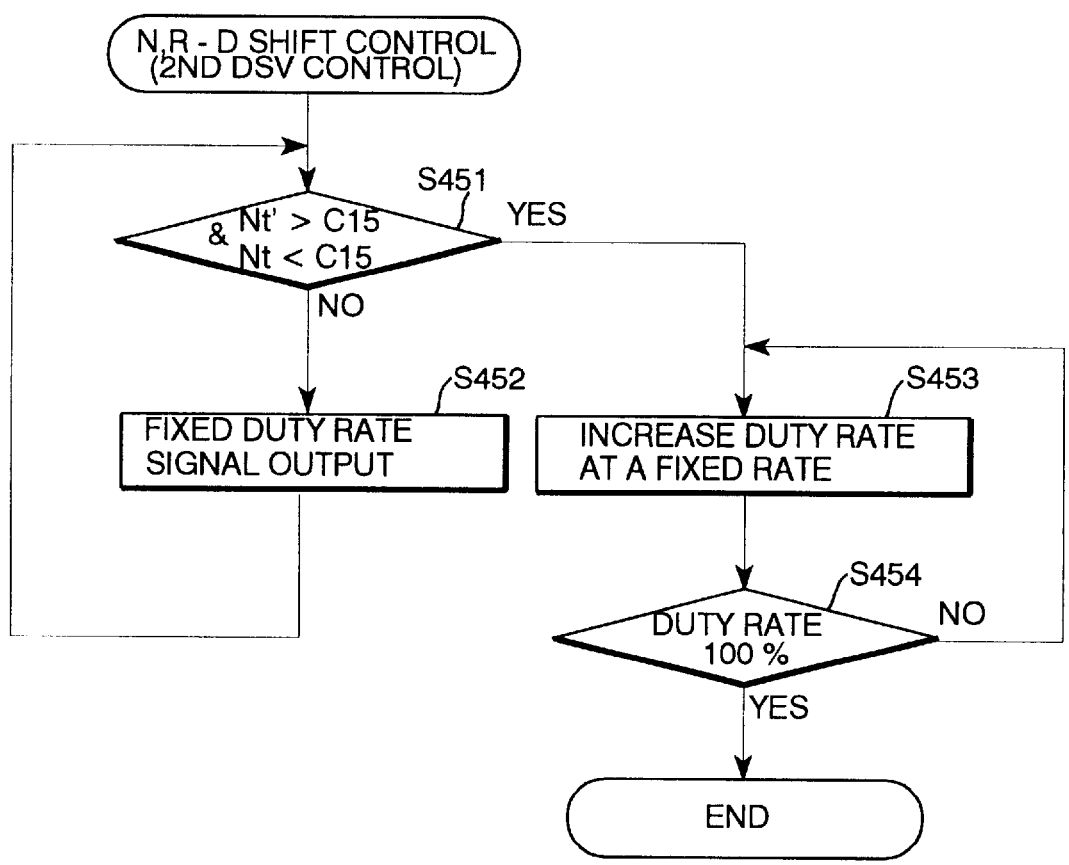
FIG. 106 is a flowchart illustrating a control sequence for the second duty solenoid valve (DSV) during a N or R - D shift.

Control of the 3-4 clutch pressure and brake release pressure is made through the second duty solenoid valve 122 for a manual range shift to the drive (D) range and executed in accordance with the sequence routines shown in FIG. 106. That is, a determination is made at step S451 as to whether or not a previous turbine speed Nt' is greater than a specified speed Cl 5 and a current turbine speed Nt is smaller than the specified speed C15. In other words, it is a determination as to whether or not the turbine speed Nt has decreasingly varied across the specified value C11. In discriminating a time at which the turbine speed Nt becomes below the specified value Cl 5, determining the relativity of speed only the utilization of the simple condition of Nt<C15 renders it difficult to discriminate correctly a reduction in the turbine speed Nt. That is because the discriminatory condition is effective within a region of turbine speeds during the manual shift from the reverse (R) range as labelled with a character "S" in FIG. 107 and the reduction in the turbine speed Nt can not be correctly ascertained. In other words, by conducting the discrimination of a reduction in the turbine speed under the condition given at step S451, the sequence routine is effective commonly to both manual range shifts to the drive (D) range from the neutral (N) range and from the reverse (R) range.

Until turbine speed Nt decreasingly varies across the specified speed Cl 5 from the commencement of a manual range shift operation, the second duty solenoid valve 122 is operated at a duty rate so as to provide for the specified 3-4 clutch a desired pressure, thereby causing a rapid increase in the 3-4 clutch pressure and holding the increased 3-4 clutch pressure, by means of which the 3-4 clutch 53 is locked to create the third gear.

Subsequently, when the turbine speed Nt decreasingly varies across the specified speed Cl 5, the duty rate is changed at a fixed rate until reaching 100% through steps S453 and S454 so as to unlock the 3-4 clutch 53, thereby concluding the manual range shift to the first gear.

Although control for a manual range shift from the reverse (R) range to the low-speed (L) range differs in the point of locking the low-reverse brake 55 after the range shift operation, as compared to the control of the manual range shift from the reverse (R) range to the drive (D) range. Because, during the R-L manual range shift from the reverse (R) range to the low-speed (L) range, the 3-4 clutch 53 is locked to temporarily create the third gear, there occurs interlock of the transmission gear mechanism when locking the 3-4 clutch 53 takes place while the low reverse brake 55 is locked. For this reason, during the R-L manual range shift, the first duty solenoid valve 121 is controlled to discharge the low reverse brake pressure once and then supplies it again after the temporary creation of the third gear from locking the 3-4 clutch 53.

Figure 108:
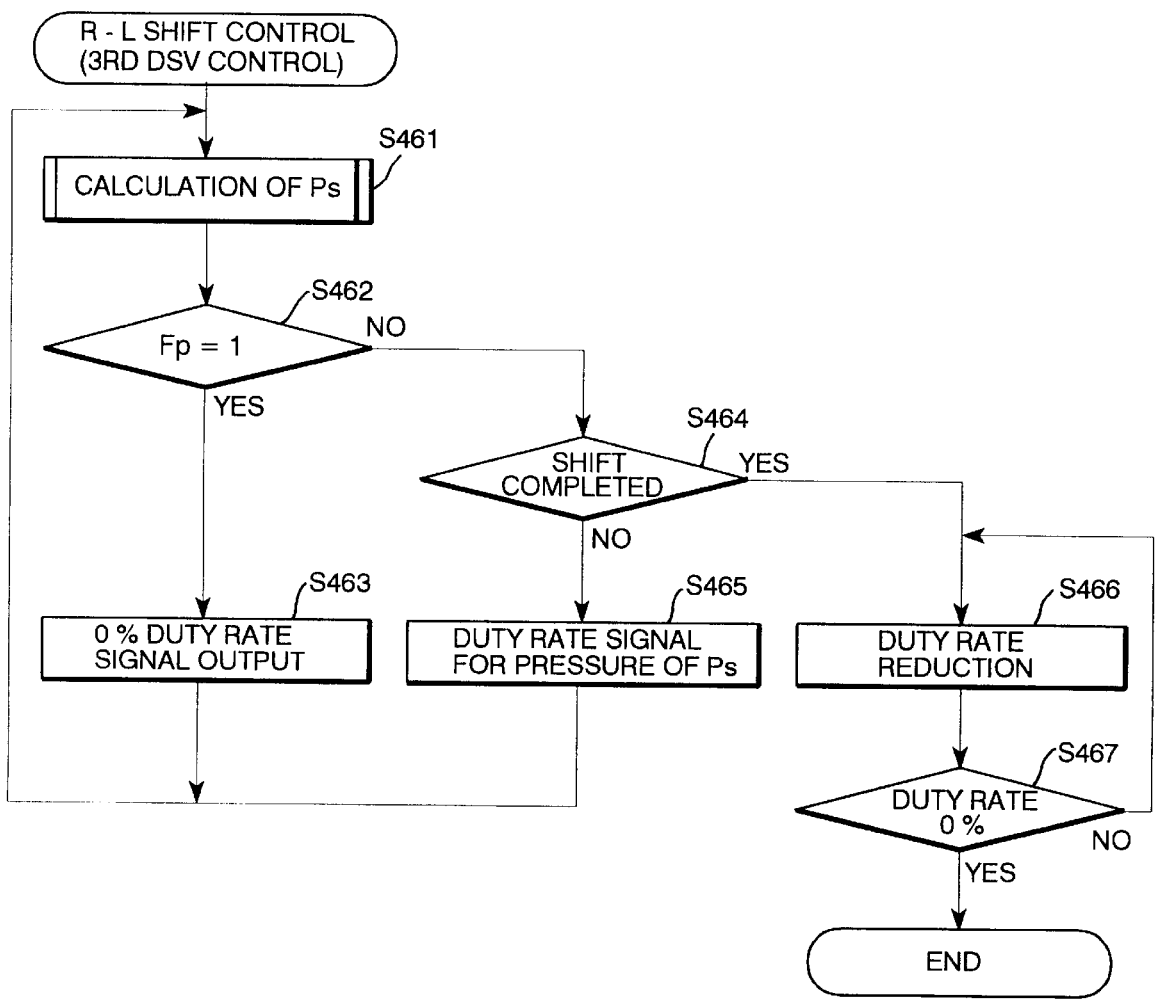
FIG. 108 is a flowchart illustrating a control sequence for the third duty solenoid valve (DSV) during a R - L shift.

Control is executed for supply of the forward clutch pressure through the third duty solenoid valve 123 during the R-L manual range shift in accordance with the sequence routine shown in FIG. 108. This control is exactly the same as the control executed for the N-D or R-D manual range shift. After having obtained the computed operating pressure Ps at step S461, the pre-charge control is executed (Fp=1) through the following steps S462 and S463. Subsequently, when the pre-charge control is over (Fp=1), a signal representative of the duty rate corresponding to the computed pressure Ps is output to the third duty solenoid valve 123 until the conclusion of the manual range shift through steps S464 and S465, so as thereby to supply the forward clutch pressure corresponding to the computed pressure Ps. When the manual range shift is over, the duty rate is reduced at a fixed rate until it reaches a duty ratio of 0% through steps S466 and S467, raising the forward clutch pressure to a specified level. In this instance, the calculation of the pressure Ps is accomplished in this same manner as for the N-D or R-D manual range shift shown in FIG. 103.

Figure 109:
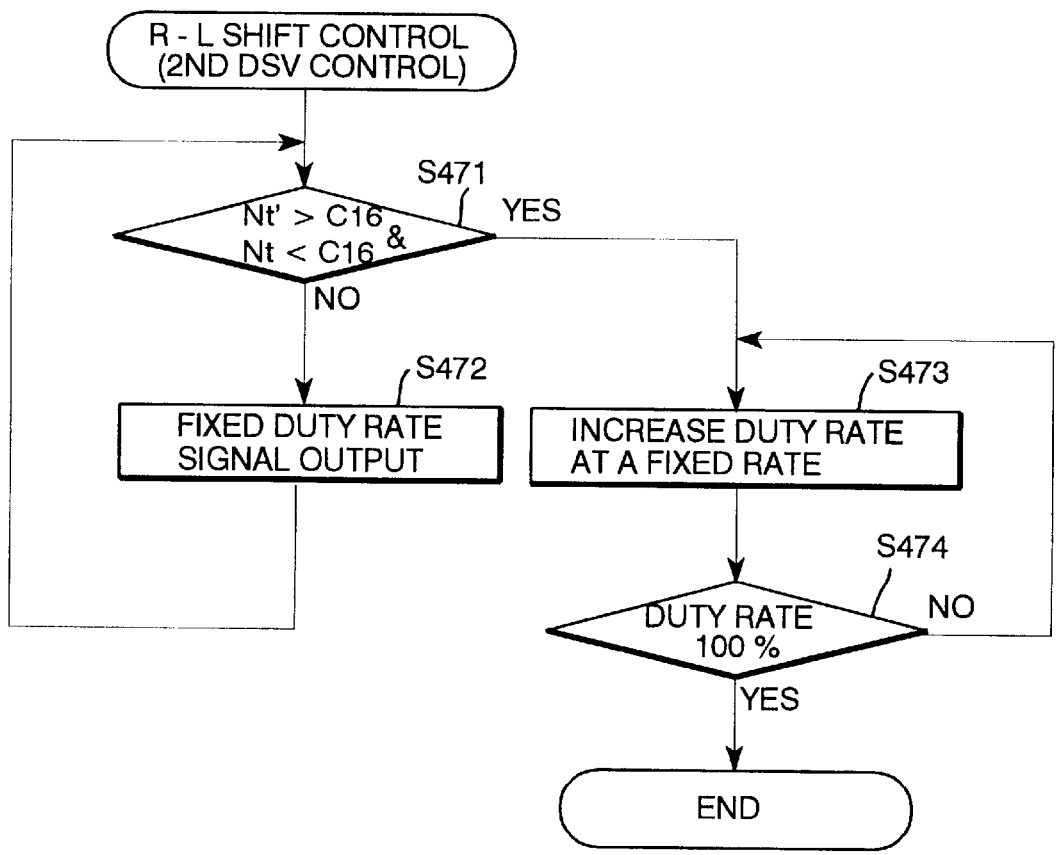
FIG. 109 is a flowchart illustrating a control sequence for the second duty solenoid valve (DSV) during a R - L shift.

Control of supply of the 3-4 clutch pressure and brake release pressure through the second duty solenoid valve 122 is executed in accordance with the sequence routine shown in FIG. 109. In this instance as well, the control is accomplished in the same manner as for the N-D or R-D manual range shift. Specifically, at step S471, a determination is made as to whether or not the turbine speed Nt has decreasingly varied across a specified speed C16. Until it varies across the specified speed C16, a duty rate is provided for the second duty solenoid valve 122 so as to develop the specified 3-4 clutch pressure at a predetermined level with a rapid increase and hold it at step S472 so as lock the 3-4 clutch 53 to create the third gear.

When the turbine speed Nt decreasingly varies across the specified speed Cl 6 as it declines, the duty rate is increased at a fixed rate until reaching 100% through steps S473 and S474, unlocking the 3-4 clutch 53.

Figure 110:
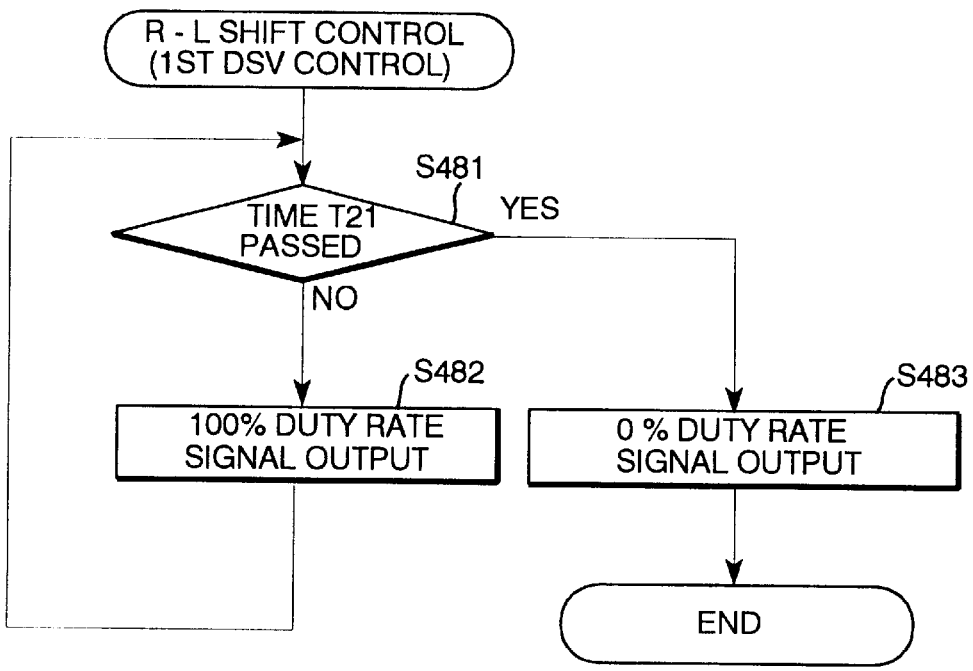
FIG. 110 is a flowchart illustrating a control sequence for the first duty solenoid valve (DSV) during a R - L shift.
Figure 111:
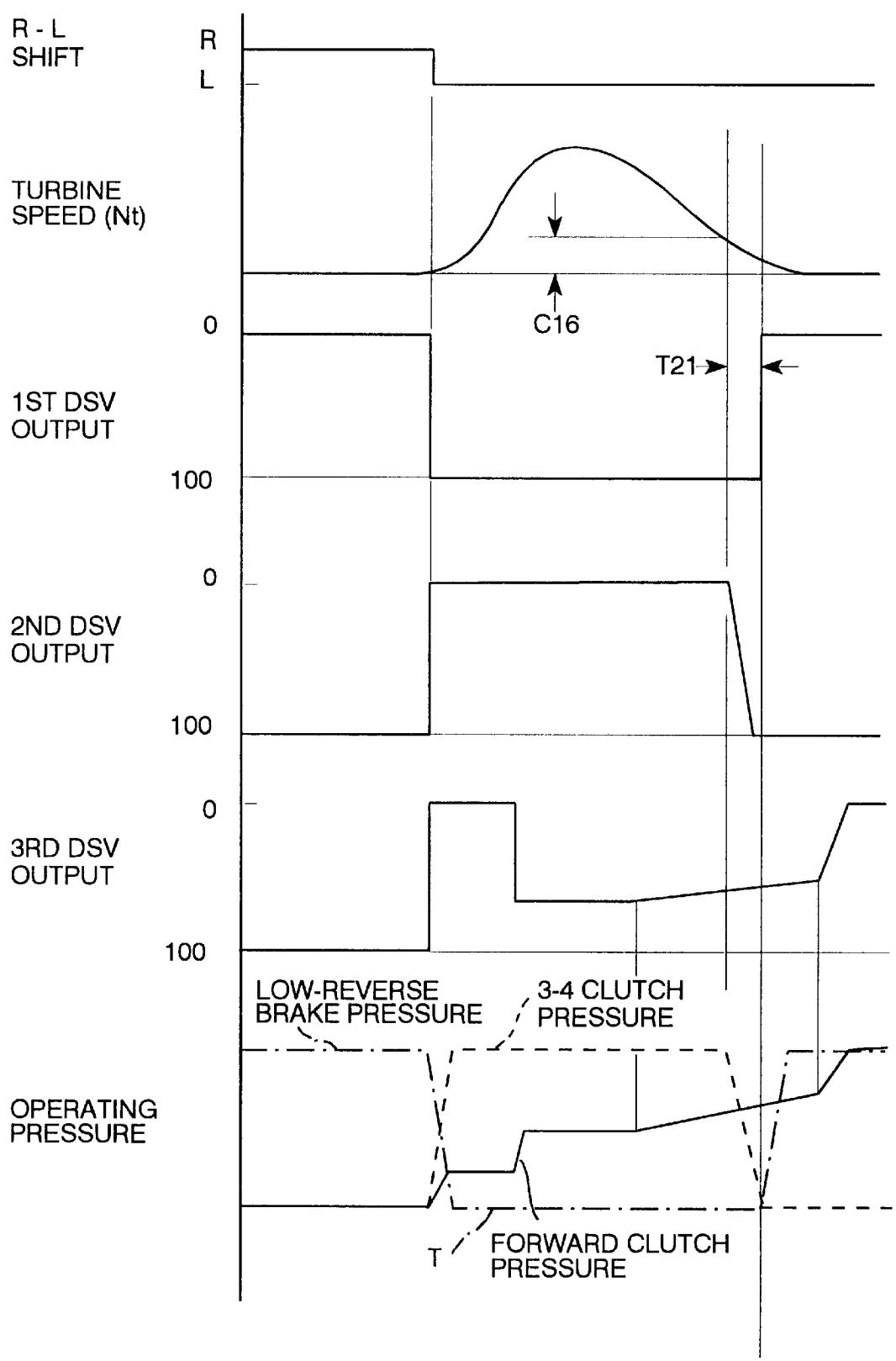
FIG. 111 is a time chart showing changes in various factors during a R - L shift.

Control of the low reverse brake pressure during the R-L manual range shift is executed through the first duty solenoid valve 121 in accordance with the sequence routine shown in FIG. 110. At step S481, a determination is made as to whether or not a specified time T21 has passed since the turbine speed Nt decreasingly varies across the specified speed C16. Until a lapse of the specified time T21, a signal representative of a duty rate of 100% is output to the first duty solenoid valve 121 at step S482. As a result, as labelled with a character "T", the low reverse brake pressure is completely discharged. When the specified time T21 has passed from a moment at which the specified value Cl 6 is crossed by the decreasing turbine speed Nt, a signal of a duty ratio of 0% is again output at step S483 so as to supply the low reverse brake pressure and lock the low reverse brake 55 once again.

With this control, while the third gear takes place immediately following the R-L manual range shift operation, the low reverse brake 55 stands ready for locking, so as to prevent the low reverse brake 55 and 3-4 clutch 53 from coincidentally locking, thereby placing the transmission gear mechanism free from interlocking. Thereafter, the first gear in the low-speed (L) range is created.

In a manual range shift from the low-speed (L) range or from the neutral (N) range to the reverse (R) range, the reverse clutch 52 and low reverse brake 55 are locked. The line pressure is directly supplied as the reverse clutch pressure to the pressure chamber of the reverse clutch 53 through the manual shift valve 102. Together, the low reverse brake pressure is supplied to the pressure chamber of the low reverse brake 54 through the first duty solenoid valve 121.

Meanwhile, because the low reverse brake 54 has been locked upon the L-R manual range shift, while the low reverse brake 54 is locked, the reverse clutch 52 is locked during the range shift to the reverse (R) range. In this event, the manual shift valve 102 supplies the line pressure directly to the reverse clutch 52, forcing it to lock abruptly, which always generates heavy shocks. For this reason, during the L-R manual range shift, after the low reverse brake pressure has been discharged through the first duty solenoid valve 121 once, it is introduced again after having locked the reverse clutch 52.

Figure 112:
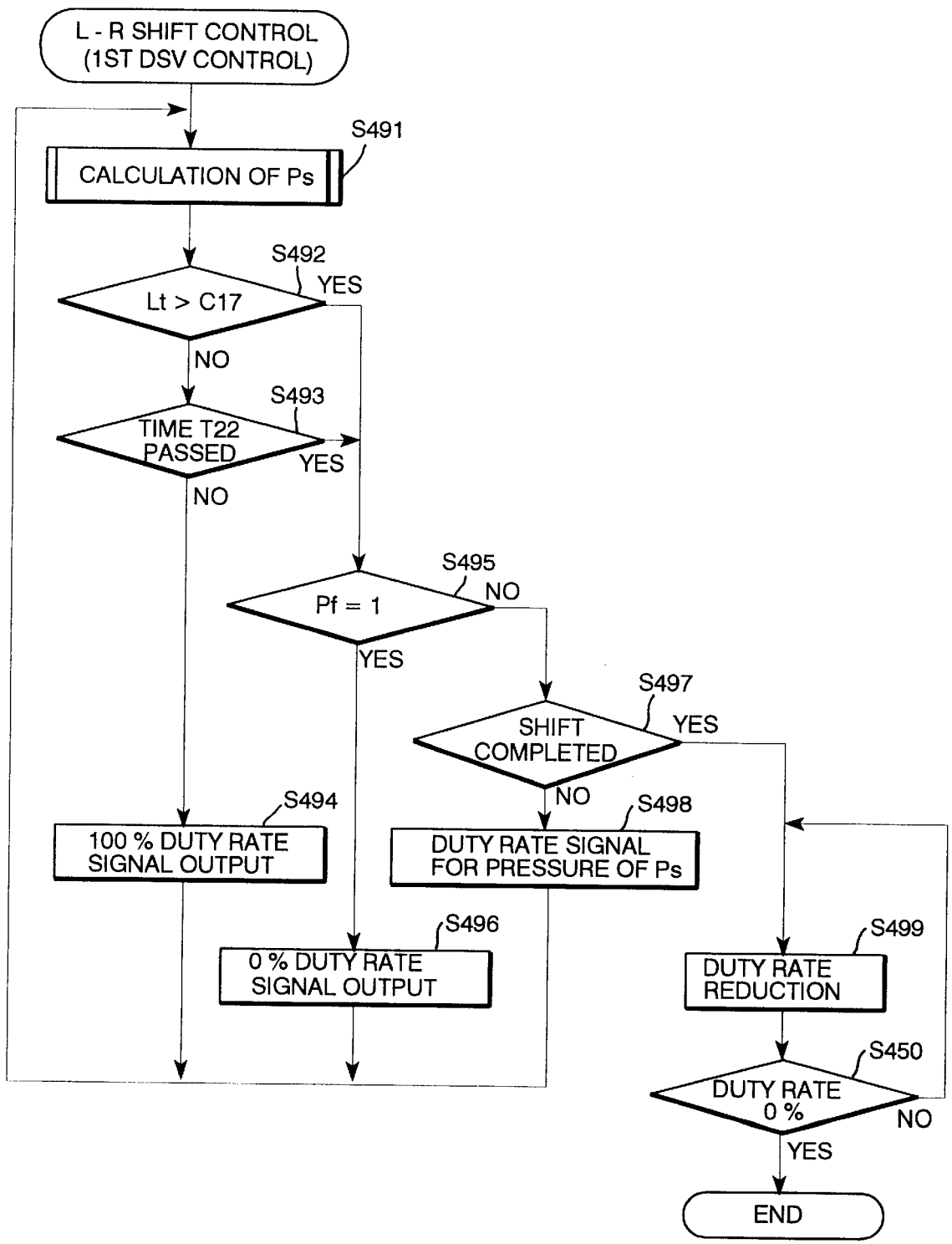
FIG. 112 is a flowchart illustrating a control sequence for the first duty solenoid valve (DSV) during a L - R shift.

Control of the first duty solenoid valve 121 is accomplished in accordance with the sequence routine shown in FIG. 112. After having obtained the computed operating pressure Ps at step S491, a determination is made at step S492 as to whether or not an L-range timer has counted a count Lt greater than a specified value C17. The L-range timer counts a time from the point of time from the manual operation from the low-speed (L) range to another range based on a signal generated by the inhibitor switch which detects shift lever positions. The measurement is accomplished in accordance with a sequence routine described later. When the count Lt of the L-range timer is still less than the specified value C17 which is slightly short, or in other words when the manual range shift is made directly to the reverse (R) range from the low-speed (L) range, a 100% duty rate is held until a lapse of a specified delay time T22 through steps S493 and S494 so as to discharge the low reverse brake pressure through the first duty solenoid valve 121 as labelled with a character "U" in FIG. 115. This is in order to avoid heavy shocks caused due to that the reverse clutch 52 abruptly locks upon a range shift to the reverse (R) range while the low reverse brake 55 has been locked.

When the delay time T22 has passed, the pre-charge control takes place through steps S495 and S496. When the count Lt of the L-range timer is greater than the specified value Cl 7, or in other words when the range shift is made from a range other than the low-speed (L) range, such as the neutral (N) range, to the reverse (R) range, the pre-charge control takes place immediately even before a lapse of the delay time T22 as labeled with a character "V" in FIG. 115. In this event, during the pre-charge period (Fp=1), the first duty solenoid valve 121 is operated at a duty rate of 0%, filling the oil passage leading to the pressure chamber of the low reverse brake 55 with the operating oil quickly. On the other hand, when the pre-charge control has been completed (Fp=0), a determination is made at step S497 as to whether or not the manual range shift has been concluded. Until the manual range shift is concluded, a signal of the duty rate corresponding to the computed pressure Ps is output to the first duty solenoid valve 121 at step S498. Upon the conclusion of the manual range shift, the duty ratio is reduced at a fixed rate until it reaches 0% through steps S499 and S500. In this way, the low reverse brake 55 is completely locked.

Figure 113:
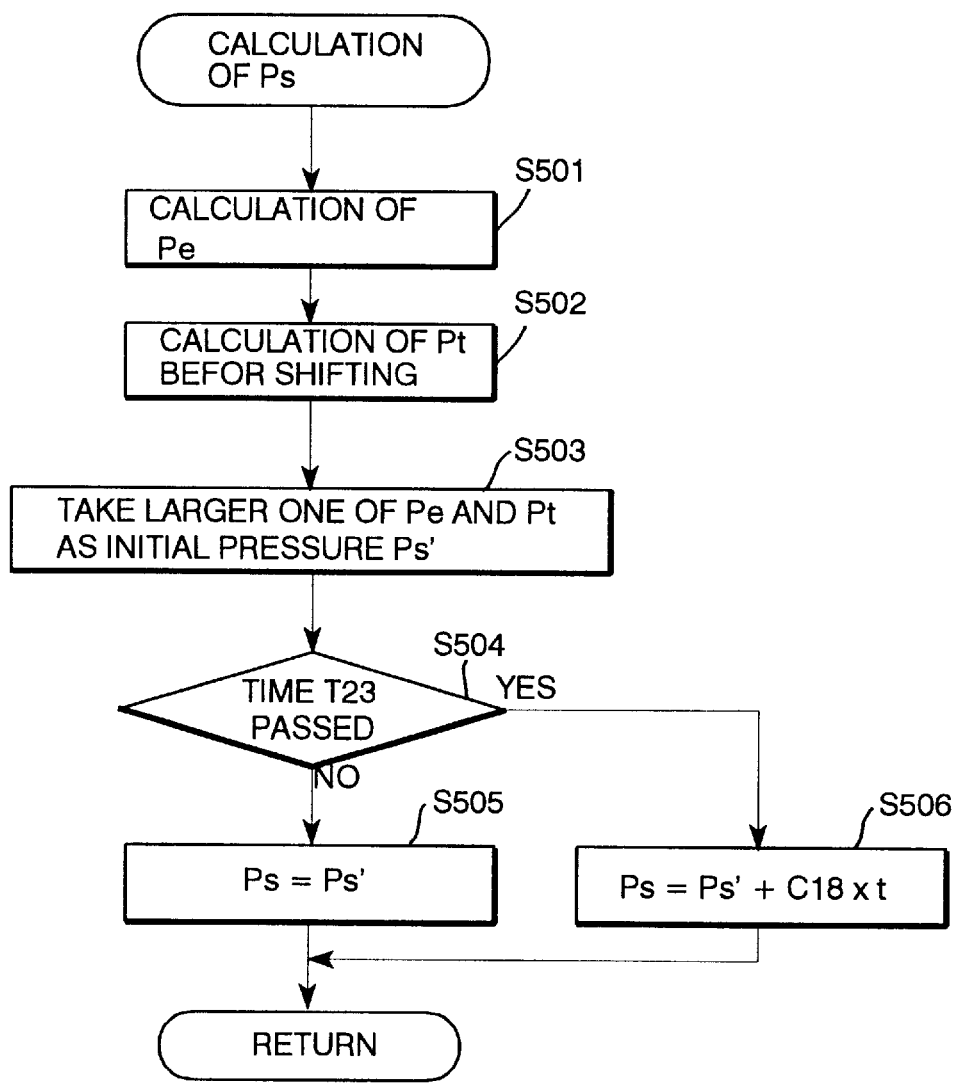
FIG. 113 is a flowchart illustrating a sequence for a calculation of hydraulic pressure during a L - R shift.

Calculation of the pressure Ps made during the low reverse brake pressure supply control by means of the first duty solenoid valve 121 is accomplished in accordance with the sequence routine shown in FIG. 113. In this sequence routine, the calculation is accomplished in the same manner as for the calculation of the pressure Ps for the forward clutch during an R-D manual range shift. Calculations of pressure Pe and Pt corresponding to the engine speed Ne and the throttle opening 0, respectively, both being values immediately prior to the range shift to the R range, are made based on maps at steps S501 and S502, respectively. These maps are the same used for the manual range shift to the drive (D) range shown in FIGS. 104 and 105. At step S503, either one of these pressures Pe and Pt, which is higher than the other, is taken as an initial operating pressure Ps' for the computed operating pressure Ps. A determination is subsequently made at step S504 as to whether or not a specified time T23 has passed from the operation of the manual range shift to the reverse (R) range. Until a lapse of the specified time T23, the computed operating pressure Ps is maintained at the level of initial operating pressure Ps' at step S505. On the other hand, when the specified time T22 is over, at step S506, the computed operating pressure Ps is increased at a fixed rate with the progress of time from the lapse of the specified time T23.

Figure 115:
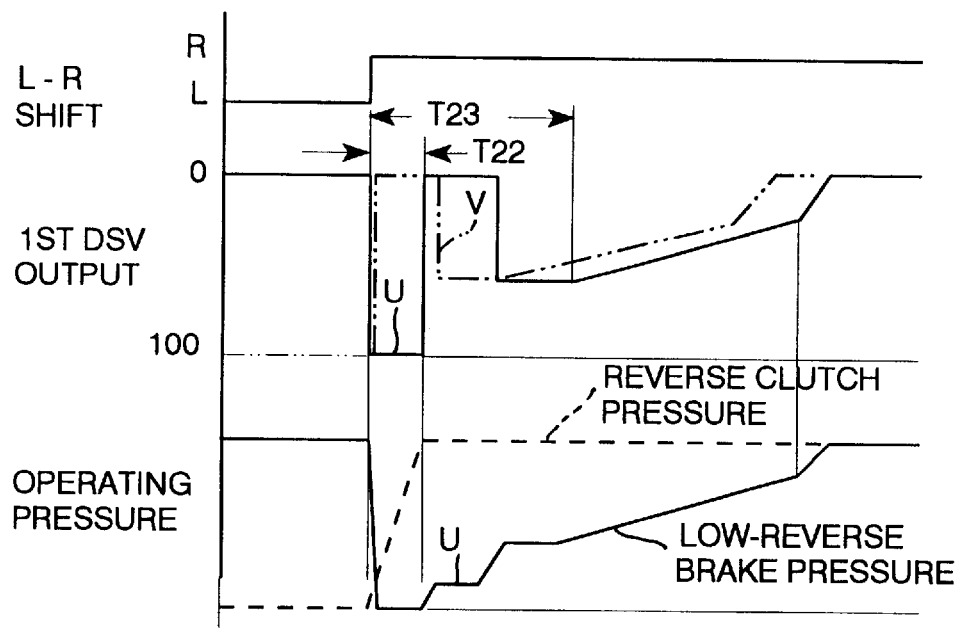
FIG. 115 is a time chart showing changes in various factors during a L - R shift.

With this control, as shown in FIG. 115, the low reverse brake pressure following the operation of the manual range shift to the reverse (R) range increases via the specified leveled transitional pressure, so that, while the low reverse brake 54 has been locked, the reverse clutch 52 locks without an occurrence of a heavy shock.

Figure 114:
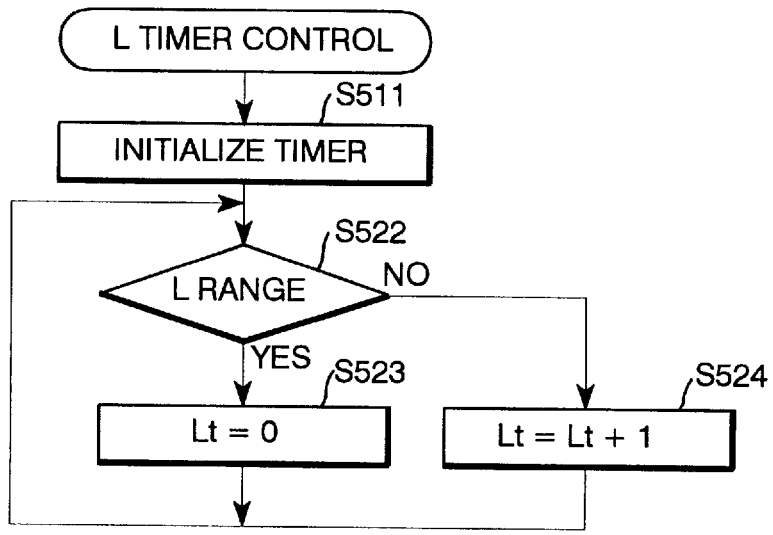
FIG. 114 is a flowchart illustrating a sequence for an L-timer during a L - R shift.

The L-range timer which measures a time progress from the manual range shift operation to a range from the low-speed (L) range operates in accordance with the sequence routine shown in FIG. 114. Following having cleared the L-range timer at step S511, a determination is made at step S512 as to whether or not a current range is the low-speed (L) range. If it is the low-speed (L) range, the counter value Lt is maintained at 0. On the other hand, when a manual range shift actually takes place from the low-speed (L) range to another range, the L-range timer starts to count and indicates a time passing from a time at which the manual range shift commences at step S514.

During a manual range shift from the reverse (R) range to the neutral (N) range, the reverse clutch pressure and low reverse brake pressure are discharged so as to unlock the reverse clutch 52 and low reverse brake 55, respectively. One of these, namely the reverse clutch pressure, is discharged immediately through the operation of the manual shift valve 102. The other, namely the low-reverse brake pressure, is however discharged comparatively slowly with the assistance of operation of the dish plate installed in the low reverse brake 55. Owing to this, if the reverse clutch 52 is unlocked abruptly prior to the low reverse brake 55, there will occur a heavy shock.

Therefore, with the hydraulic control circuit 100, when an R-L manual range shift takes place, a delayed control is executed by the second solenoid valve 1012 to cause a delay in unlocking the reverse clutch 52 and, during the delayed unlocking control, the low reverse brake pressure is discharged from the manual shift valve 102 by the first duty solenoid valve 121. Specifically, in the reverse (R) range, both first and second solenoid valves 111 and 1012 are in their ON states, causing the low reverse valve 1003 to place the spool in the left end position and, thereby, bringing the first duty solenoid valve 221 and third output pressure line 213 leading from the manual shift valve 102 into communication with the low reverse brake pressure line 216 and reverse clutch pressure line 230, respectively, as shown in FIG. 18. The manual range shift to the neutral (N) range causes switching in operating state of the second solenoid valve 112 to the OFF state, forcing the low reverse valve 103 to shift the spool to the right end position so as to cause a joint drain to the low reverse brake pressure line 216 and reverse clutch pressure line 1130. However, through delaying this operation, discharge of the reverse clutch pressure is delayed and, during this delay, the low reverse brake pressure is discharged.

Figure 116:
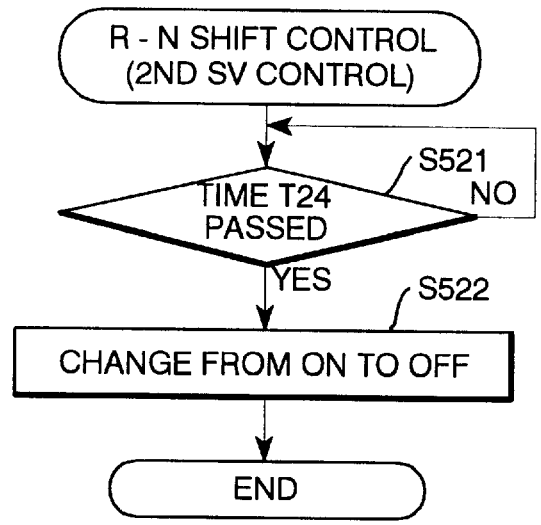
FIG. 116 is a flowchart illustrating a control sequence for the second solenoid valve (SV) during R - N shift.

Control of the second solenoid valve 1012 during the R-N manual range shift is executed in accordance with the sequence routine shown in FIG. 116. This control is performed only to delay switching of the second solenoid valve 112 from ON to OFF by a specified time T24 from an occurrence of the R-N manual range shift through steps S521 and S522.

Figure 118:
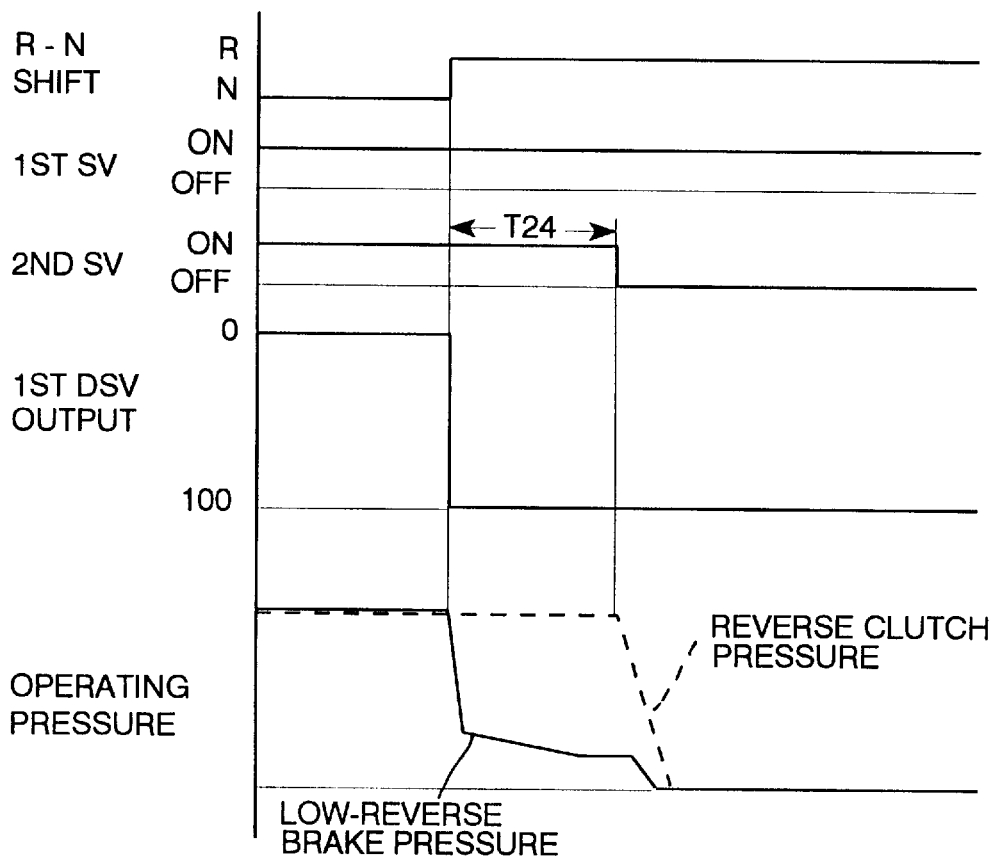

With this delay control, following the manual range shift to the neutral (N) range, the low reverse valve 103 holds the spool in the left end position and leaves the first duty solenoid valve 121 third output pressure line 213 leading from the manual shift valve 212 in communication with the low reverse brake pressure line 2116 and the reverse clutch pressure line 230, respectively, even after the manual range shift. Since even in the neutral (N) range, the line pressure is introduced into the third output pressure line 213 from the manual shift valve 102, it is supplied as the reverse clutch pressure to the pressure chamber of the reverse clutch 52 and discharged when the second solenoid valve 112 is changed to the OFF state upon a lapse of the specified time T24 as shown in FIG. 118.

Figure 117:
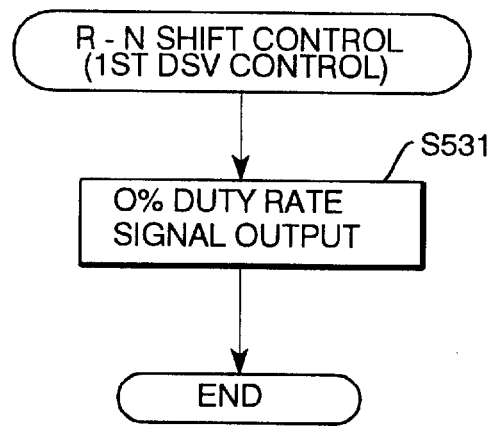
FIG. 117 is a flowchart illustrating a control sequence for the first duty solenoid valve (DSV) during R - N shift.

On the other hand, control is executed for discharge of the low reverse brake pressure through the first duty solenoid valve 121 during the R-N manual range shift in accordance with the sequence routine shown in FIG. 117. This control is performed only by providing a single representative of a duty ratio of 0% at step S531. This control causes discharge of the low reverse brake pressure from the manual shift valve 102 through the first duty solenoid valve 121 which occurs smoothly due to the effect of the dish plate and the second accumulator 142 (see FIG. 18) as shown in FIG. 142.

Since the reverse clutch 52 is unlocked following the smooth discharge of the low reverse pressure, there occurs no shift shock even if the reverse clutch 52 is unlocked abruptly.

When performing an R-N manual range shift, a signal from the inhibitor switch is switched from a reverse (R) signal level to a neural (N) signal level. There occurs a period for which no signal is provided. On the other hand, if a signal from the inhibitor switch comes to a halt, a fail-safe feature is effected, in which fail-safe procedure, all of the solenoid valves operate in the operating pattern for the third gear where they assume OFF. Accordingly, if a signal from the inhibitor switch comes momentarily to a halt, there is a possibility that, during the period of switching from the R signal level to the N signal level, the solenoid pattern for the third gear might temporarily occur. In such a case, in the hydraulic control circuit 100, the low reverse valve 103 shifts its spool temporarily depending upon the timing of switching the solenoid pattern, causing simultaneous discharge of the reverse clutch pressure and low reverse brake pressure which always possibly produce shift shocks.

Figure 119:
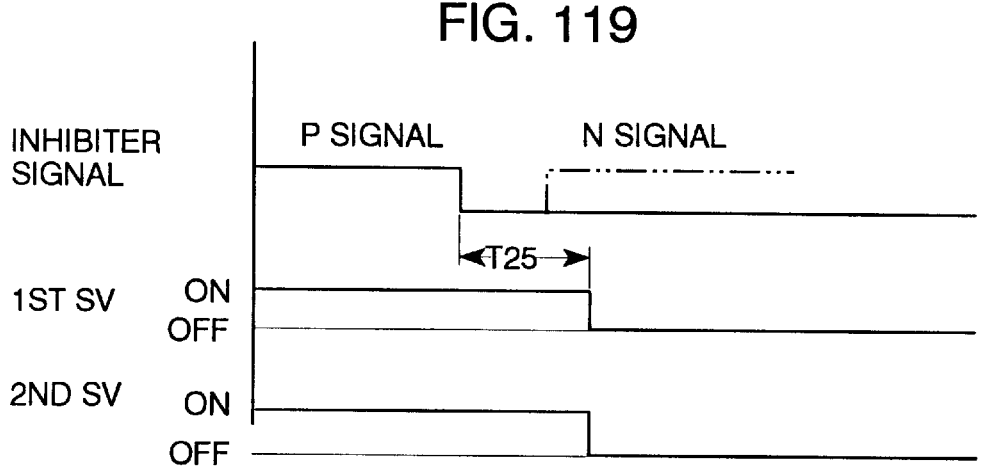

In order to avoid such a shift shock, special control is conducted and executed in accordance with the sequence routine shown in FIG. 119. Even if there is not output an N level signal, the first and second solenoid valves 111 and 112 are held in the ON states until a lapse of a specified time T25 from disappearance of an R level signal, achieving the manual range shift to the neutral (N) range during that period. Further, if there is not yet provided an N level signal even after the lapse of the specified time T25, then, the fail-safe control is effected to create the specific solenoid pattern in which all of the solenoid valves assume OFF.

(6). Lockup Control

As shown in FIGS. 3 and 5, the torque converter 20 is provides with the lockup clutch 26 for mechanically coupling the engine output shaft 1, i.e. the converter input shaft, directly to the turbine shaft 27 together. The lockup control is accomplished by controlling the third duty solenoid valve 123. Specifically, as shown in FIG. 7, when the lockup control valve 106 positions its spool in the left end position as viewed in the figure, the third duty solenoid valve 123 is brought into communication with the front pressure chamber (CAPC) 26b of the lockup clutch 26 through the pressure line 228 downstream therefrom. If the third duty solenoid valve 123 operates to discharge the operating pressure within the front pressure chamber (CRPC) 26b (which is hereafter referred to as "front pressure"), the lockup clutch 26 is placed the torque converter 20 in a locked mode. On the other hand, if it operates to introduce the line pressure as the front pressure into the front pressure chamber (CRPC) 26b of the lockup clutch 26, the lockup clutch 26 is placed in an unlocked or converter mode. Further, if changing the front pressure to an in-between level, the lockup clutch 26 is placed in one of slip modes where the torque converter 20 is allowed to slip. The lockup control is accomplished in these available modes in accordance with operating conditions. In this instance, there are provided two slip mode, namely an acceleration slip mode available for high engine torque and a deceleration slip mode available for low engine torque.

Transition from an acceleration condition to a deceleration condition calls for switching the lockup clutch from the lockup mode or the acceleration slip mode to the deceleration slip mode. In the deceleration slip mode, the feedback control is effected of the front pressure through the third duty solenoid valve 123 such that the difference between the engine speed Ne and turbine speed Nt reaches a target speed difference. However, if the engine torque sharply drops due to transition to the deceleration mode from the lockup mode where the lockup clutch 26 is locked with a great lockup pressure corresponding to high engine torque or from the acceleration slip mode, the lockup clutch 26 experiences a spontaneous increase in locking force too high relative to the input torque due to a delayed response in the feedback control in the deceleration slip mode from which a shift shock occurs.

Figure 120:
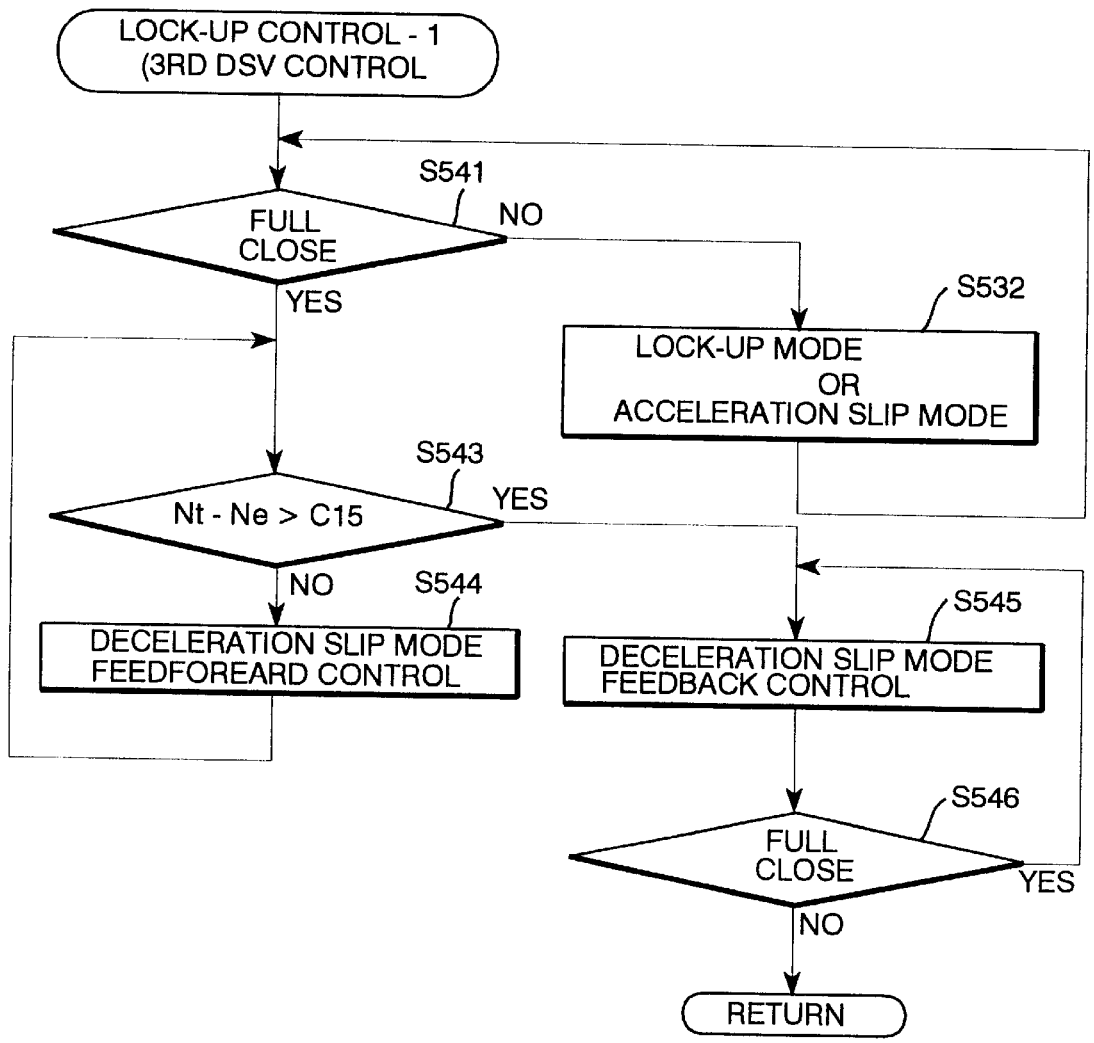

In order to avoid this kind of shift shock, control is executed of the lockup pressure by means of the third duty solenoid valve 123 in accordance with the sequence routine shown in FIG. 120.

Figure 121:
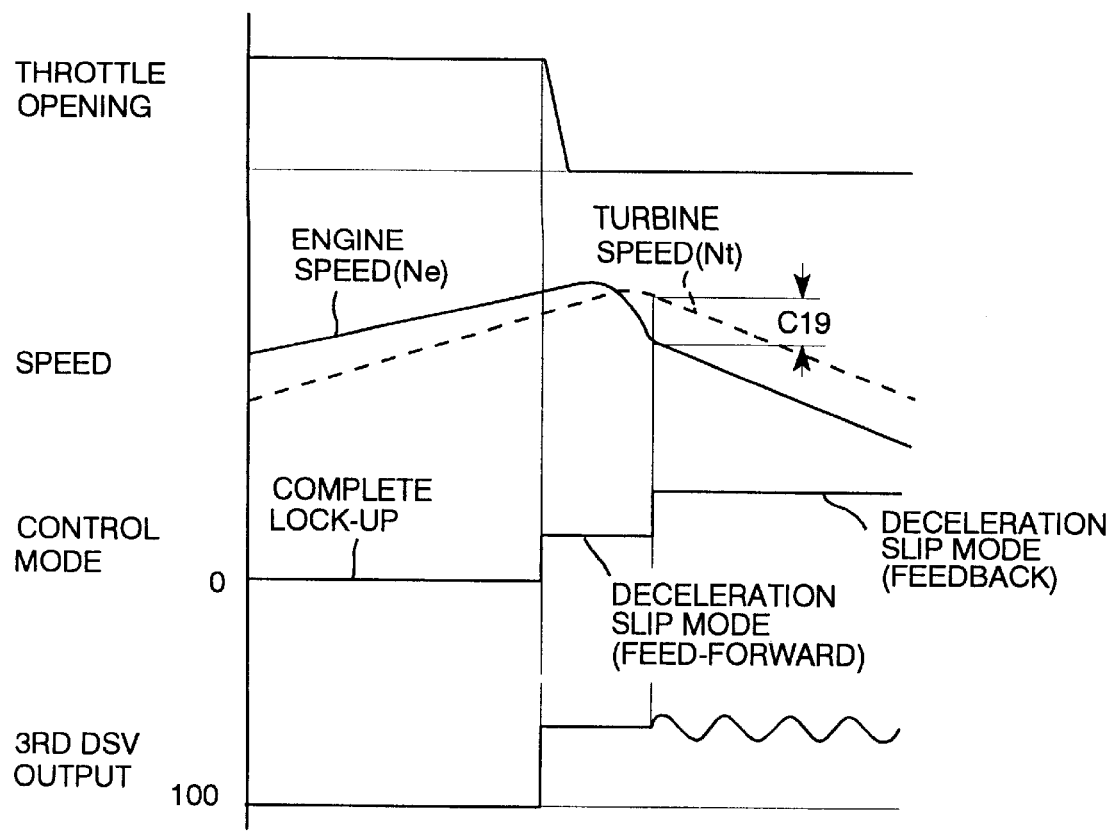

As shown in FIG. 120, at step S541, a determination is made as to whether or not the engine throttle is completely closed. If the engine throttle opens to some extent which indicate the engine is accelerating, the control is executed in the lockup mode or the acceleration slip mode at step S542. If the engine throttle closes completely, a determination is made at step S543 as to whether or not the difference between the turbine speed Nt and engine speed Ne is greater than a specified value C19. In other words, as shown in FIG. 121, through the transition from the acceleration to the deceleration, there occurs a reversal in speed difference from a state where the engine speed Ne is higher than the turbine speed Nt to a reverse state where the engine speed Ne is lower than the turbine speed Nt. That determination is made based on the reversal in speed difference with respect to the specified value Cl 9. Until the speed difference (Nt-Ne) becomes greater than the specified value Cl 9, that is, during a period immediately after the reversal in which the lockup pressure does not sufficiently fall relative to a drop in engine torque due to a delayed response of the feedback control even when the feedback control of the lockup pressure in the deceleration slip mode occurs is commenced as soon as an occurrence of the speed reversal, the feedforward control is executed in the deceleration slip mode at step S544. In this case, the eventual output, i.e. the duty rate of the third duty solenoid valve 123, resulting from the feedforward control is set based on the turbine speed and the transmission gear currently selected such that the higher the turbine speed Nt becomes, the larger the duty rate is so as to provide high lockup pressure, and the faster the transmission is, the larger the duty rate is so as to provide low lockup pressure. Thereafter, if the speed difference (Nt-Ne) becomes greater than the specified value Cl 9, the feedback control is exercised in the deceleration slip mode until another acceleration occurs so as to bring the speed difference (Nt-Ne) in conformity with a target value through steps S545 and S546.

Slip control for the lockup clutch is performed of unlocking front pressure by means of, for instance, a duty solenoid valve such that slippage, or the difference between engine speed (Ne), and turbine speed (Nt) attains a target value. As taught by, for instance, Japanese Patent Publication No.1-39503, the slip controlled may be differed between the acceleration slip mode available for high engine torque and the deceleration slip mode available for low engine torque.

As was previously described in conjunction with FIG. 5, the torque converter 20 comprises the converter casing 21 fastened to the engine output shaft 1, the pump 22, the turbine 23 facing to the pump 22 on one side of the converter casing 21 remote from the engine the stator 25 supported by the transmission casing 11 through the one-way clutch 24 and transmits turbine rotations through turbine shaft 27. The lockup clutch 26 is located within the converter casing 21 and mechanically coupling the engine output shaft 1 and turbine shaft 27 together when the lockup clutch 26 locks against the flat part 21a of the converter casing 21. When the pump 22 is driven by the engine shaft 1, the pump 22 discharges oil with centrifugal force in a direction opposite to pump rotation. The oil stream is redirected by the stator 25 and enters the turbine 23 in a radial direction. The speed ratio Ne of the turbine speed Nr relative to the pump speed, i.e. the engine speed Ne, is less than a specified ratio, the one-way clutch 24, and hence the stator 25, is locked to cause reaction force in the oil stream. Resultingly, the turbine torque is multiplied and then transferred to the turbine 23.

The lockup clutch 26 is urged in a locking direction against the flat part 21a of the converter casing 21 by the hydraulic pressure in the rear pressure chamber 26a and is relaxed by hydraulic pressure in the front pressure chamber 26b. Further, the lockup clutch 26 is placed in slipping conditions by controlling the hydraulic pressure in the front pressure chamber 26b.

The torque converter 20 thus constructed and cooperating with the lockup clutch 26 encounters a problem in, in particular, the deceleration slip mode. During deceleration, the turbine speed Nt is higher than the pump speed, and hence the engine speed Ne. In this condition, the oil stream is directed from the outer periphery of the turbine 23 toward the outer periphery of the pump 22 as indicated by an arrow "B" in FIG. 5. This directional oil stream tends to separate the lockup clutch 26 apart from the flat part 21a of the converter casing 21 and, consequently, works as releasing or unlocking force. In order for the lockup clutch 26 to generate slippage against the releasing force, the feedback control has a tendency to provide increased locking pressure supplied into the front pressure chamber 26b of the lockup clutch 26. While the feedback control holds this tendency, if driving conditions demand acceleration and causes a reversal in direction of the oil stream indicated by an arrow "B", the releasing force disappears with the result of instantaneously locking the lockup clutch 26. This behavior is more distinct when acceleration occurs following rapid deceleration where the speed ratio Ne of the turbine speed Nr relative to the engine speed Ne is extremely high, for instance higher than 1.2 and results in a heavy shift shock. In order to eliminate such a problem, the slippage control is executed by means of the third duty solenoid valve 123 in accordance with the sequential routine shown in FIG. 122.

Figure 122:
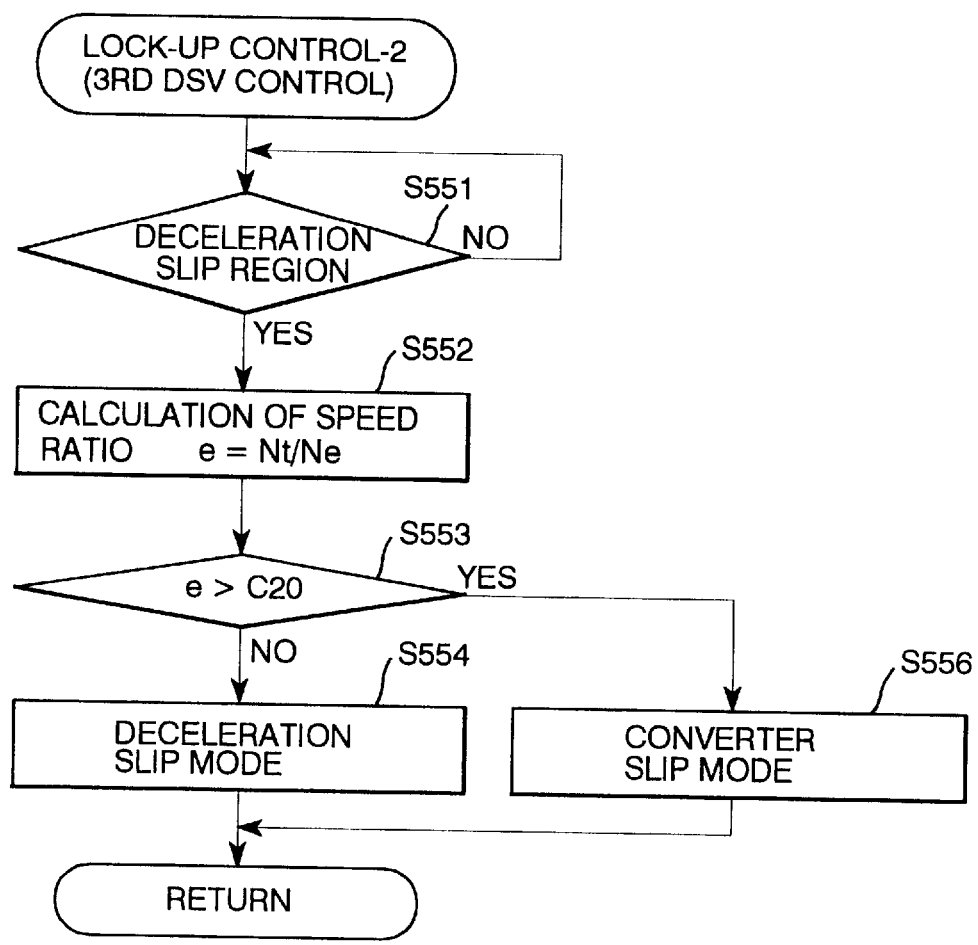

Referring to FIG. 122, when sequence logic commences and control passes to function block at step S551 where a decision is made as to whether or not the driving condition is in a region where the feedback control is required to be executed in the deceleration slip mode. If in the deceleration region, after calculating the speed ratio Ne at step S552, a decision is made at step S553 as to whether or not the speed ratio Ne is greater than a specified ratio C20, for instance 1.2. If the speed ratio Ne is smaller than the specified ratio C20, in other words, the deceleration is gentle, and, as a result, the releasing force is not significant, the feedback control of slippage is continued in the deceleration slip mode at step S554.

On the other hand, while executing the feedback control of slippage in the deceleration slip mode, if the speed ratio Ne becomes larger than the specified ratio C20 resulting from progress of the deceleration and provides an increase in the releasing force, the slip control mode is changed from the deceleration control mode at step S554 to the converter mode interrupted at step S555. Accordingly, even when acceleration occurs following the deceleration, the lockup clutch 26 does not encounter rapid locking with a result of an interruption of the feedback control.

Figure 123:
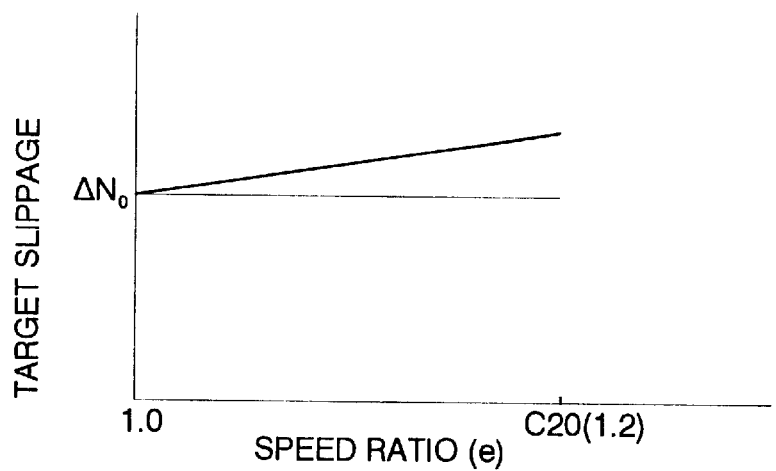
Figure 125:
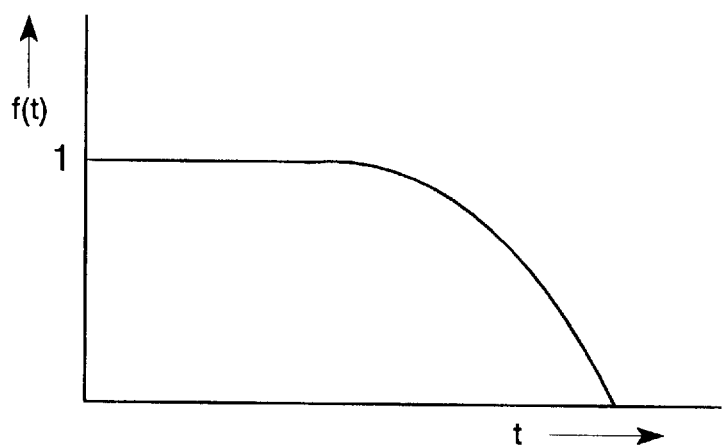
Figure 124:
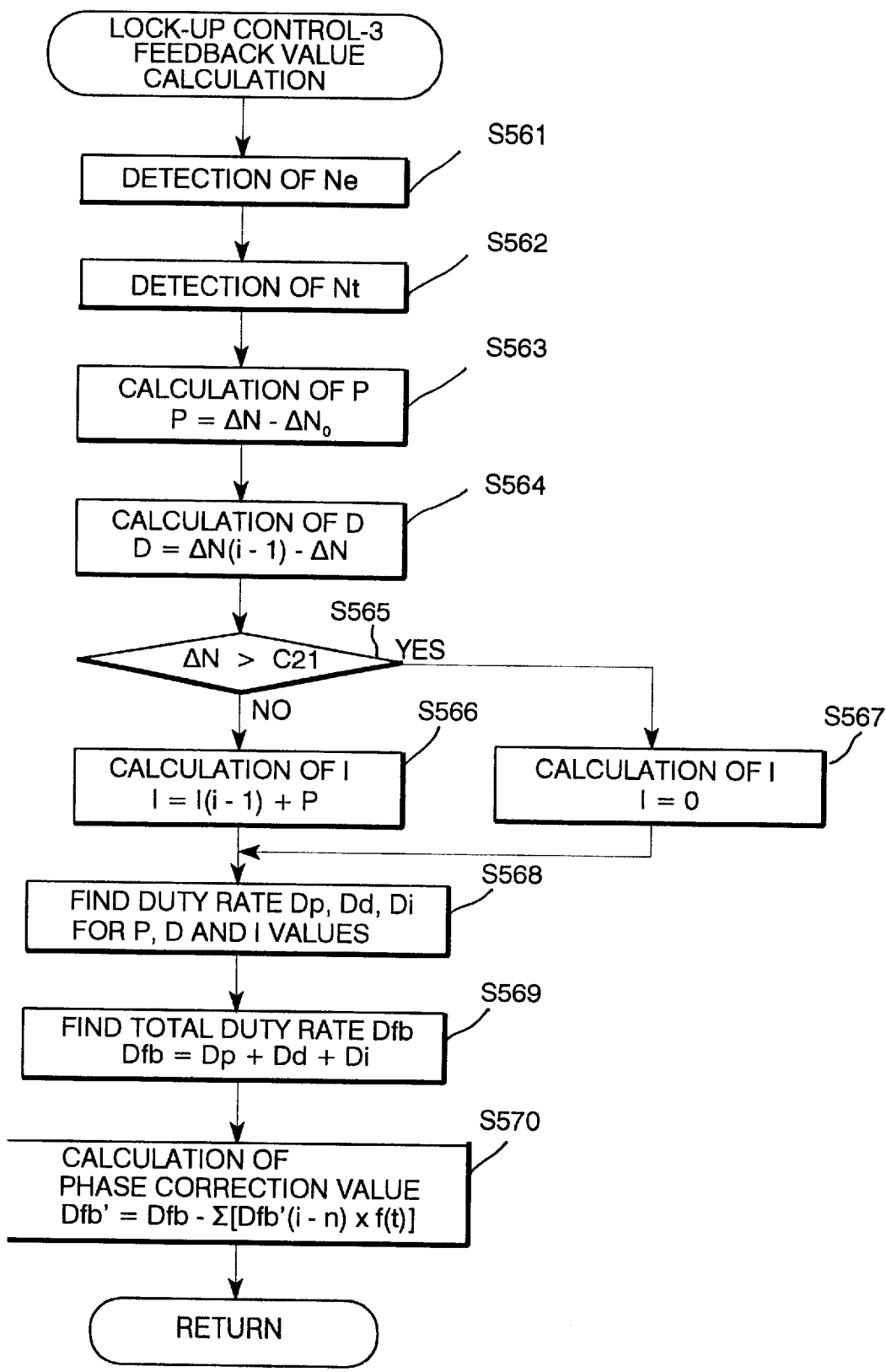

Specifically, as shown in FIG. 123, the target slippage is established to be larger than a specified value ANO as the speed ratio becomes larger between 1.0 and the specified value C20, for instance 1.2. Resultingly, even within a region of speed ratios Ne less than the specified value C20, the lockup pressure is controlled to become smaller as the releasing force becomes large, preventing the lockup clutch from producing a shift shock when acceleration occurs following the deceleration.

When the lockup mode 26 is placed in the slip mode, as was previously described, the feedback control of slippage is performed by controlling the front pressure to the lockup clutch 26 through the third duty solenoid valve 123. Calculation of the feedback control valve is executed in accordance with the sequence routine shown in FIG. 1124. In this sequence, an actual speed difference and a target speed difference are represented by AN and ANO, respectively.

In the control, an engine speed Ne and a turbine speed Nt are detected at steps S561 and S562, respectively. Subsequently, at step S563, a proportional parameter P used in a PID control, which refers to a value proportional to a deviation, is obtained from the following formula:

$$P = AN - AN_o$$

In addition, at step S564, a differential parameter D, which is the differentiated value of the proportional parameter, is obtained from the following Formula:

$$D = AN(i-1) - \Delta N$$

In this instance, (i–I) is a suffix which indicates a cycle one cycle prior to the current cycle.

Subsequently, a determination is made at step S565 as to whether or not the speed difference ΔN is greater than a specified difference C21, in other words, whether or not the lockup clutch is in the unlocked or converter mode. When it is not in the converter mode, at step S566, an integral parameter I is obtained from the following Formula.

$$I = Il(i-1) + P$$

When, in the converter mode, the integral parameter I is cleared at step S567. This is in order to commence the calculation of the integral parameter I when the lockup clutch gets out of the converter mode, i.e. from a time of commencement of the feedback control.

Subsequently, at step S568, the duty rates Dp, Dd and Di which correspond respectively to the proportional, differential and integral parameters P, D and I as feedback control values. At step S569, the total duty rate Dfb of these duty rates is calculated. The total duty rate Dfb, which serves as a feedback control value in the PID feedback control, is used directly in the feedback control, there occur problems such as over control owing to a delay in response of operating pressure and signal detection, which lead to divergence and hunting of hydraulic pressure.

Therefore, at step S570, a phase correction value Dfb' for the total duty rate Dfb is calculated as an eventual feedback value from the following Formula:

$$Dfb'=Dfb-\Sigma[Dfb'(i-1) \times f(t)]$$

Where, the function f(t) is established as a factor such that, as a time t becomes longer, the factor becomes smaller than 1, that is, the older the factor is, the smaller it is, as shown in FIG. 1125. The phase correction value Dfb' is obtained by subtracting from the current total duty rate Dfb the total of the results obtained by multiplying the respective corrective values Dfb'(i–n) obtained in the previous specified number of cycles by this factors, respectively. In this case, since the value which is subtracted from the current total duty rate is weighted more greatly as it becomes latest, compensation can be effectively made for the delay in response of the operating pressure, causing effectively controlled convergence of the speed difference ΔN to the target speed difference $AN_o$.

Generally, a target gear is determined in accordance with scheduled shift pattern established according to driving regions defined by vehicle speed and throttle opening as parameters. When there is a change in the gear determined based on the shift patterns from one to another, a shift command is provided to shift the automatic transmission to the other gear as a target and causes the shift control to create the target gear. In this case, there are instances in which it is not always desirable to shift the automatic transmission into the target gear indicated by the shift command and, in such a case, it sometimes occurs to provide a destination of shifting different from the target gear indicated by the shift command. In other cases, there are instances in which special shift control is made in a specific state.

Figure 126:
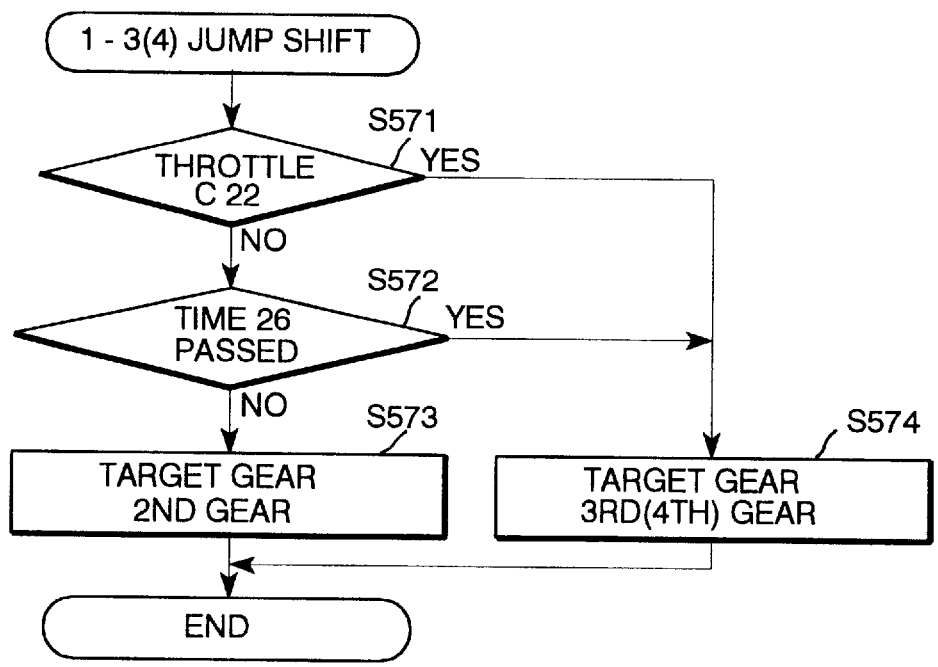

When a shift command is provided for a jump shift from the first gear or the third gear to the fourth gear, control is executed in accordance with the sequence routine shown in FIG. 126. At first, a determination is made at step S571 as to whether or not the throttle opening is smaller than a specified opening C22, for example ⅛ opening. When it is greater than the specified opening C22, another determination is made at step S562 as to whether or not a specified time T26 from the occurrence of the shift command has passed. Until a lapse of the specified time T26, the second gear, which is different from the target gear indicated by a shift command, is established as a target gear, to which the control is directed at step S573.

Figure 127:
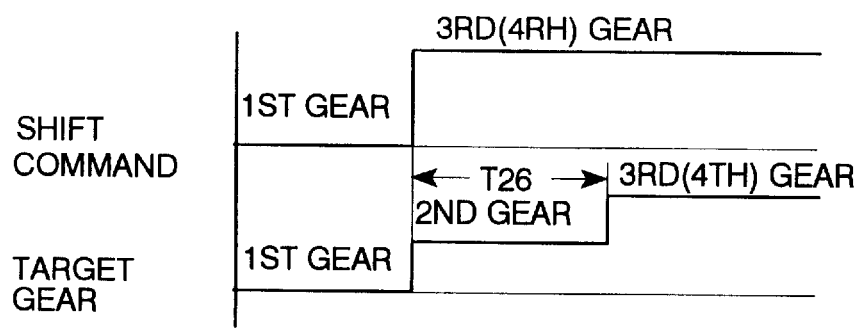

Subsequently, if the specified time T26 has passed, then, at step S574, the control is executed to create the third gear or the fourth gear which is one indicated as the target gear for shifting by the shift command. That is, in the case in which the 1-3 shift command or the 1-4 shift command is provided when the throttle opening is greater than the specified value C22, after leaving the automatic transmission to stay in the second gear for the period of the specified time T26, the third gear or the fourth gear is created as shown in FIG. 127. This is because, particularly in a 1-4 up-shift, while it is essentially necessary to exercise control over unlocking the forward clutch 51 simultaneously with locking the 3-4 clutch 53, nevertheless, because of a structural reason of the hydraulic control circuit 100, there is a need to coordinate the locking and unlocking these clutches 51 and 53 independently but timely which always results in a complicated control. Therefore, when the throttle opening is small, where there is no need to coordinate locking and unlocking, shifting is accomplished in conformity with a shift command. However, in other instances, the jump shift control is prevented.

The prevention of the jump shift from the first gear directly to the third gear is primarily accomplished in order to prevent a reduction in durability of related friction coupling elements due to abrupt engagement of the friction coupling elements.

Figure 128:
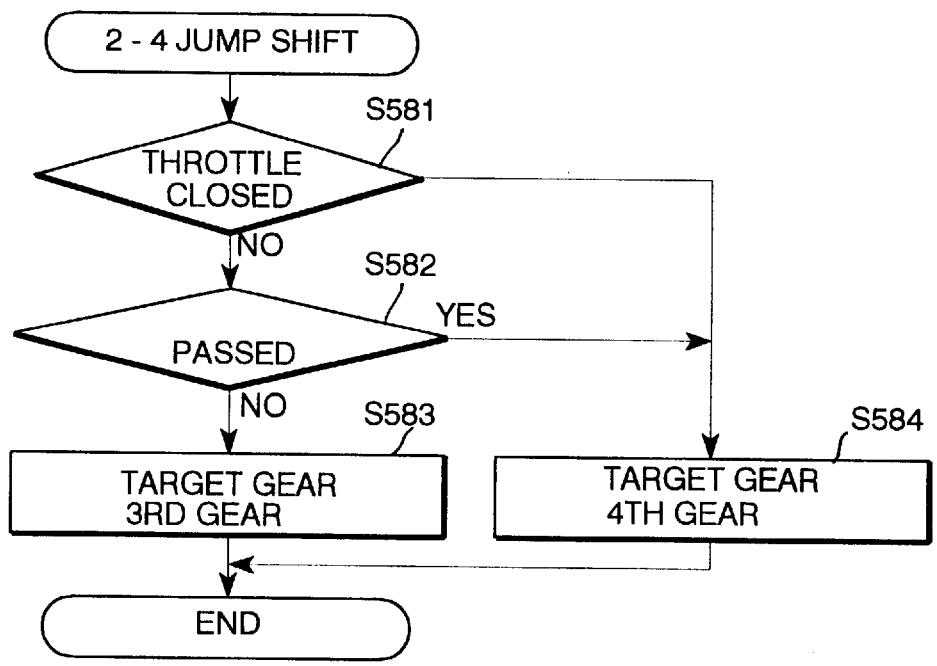
Figure 129:
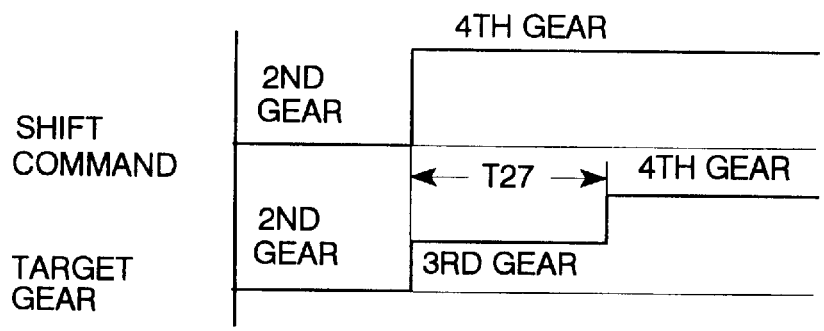

Control in cases where a jump shift command is output for shifting from the second gear to the fourth gear is executed in accordance with the sequence routine shown in FIG. 128, in a similar way to the control for the 1-3 jump shift or the 1-4 jump shift. A determination is made at step S581 as to whether or not the throttle opening is entirely closed. When it is not entirely closed, another determination is made at step S582 as to whether or not a specified time T27 has passed since an occurrence of a shift command. Prior to a lapse of the specified time T27, at step S583, there is established another target gear, namely the third gear, different one indicated by the shift command and shifting to the third gear starts. If the specified time T27 has passed, the control is executed at step S584 so as to provide the fourth gear indicated as the target gear by the shift command. Specifically, while the throttle opening is not entirely closed, when the 2-4 shift command is output, shifting is accomplished to the fourth gear after staying the third gear for the period of the specified time T27 as shown in FIG. 129. The reason for this is that, as with the case of the 1-4 jump shift, since coordinating the timing of locking the 3-4 clutch 53 and unlocking the forward clutch 51 is extremely complicated, in cases other than the case where the throttle opening is entirely closed and there is no need to coordinate the timing, the jump shift is prohibited.

In the case where a shift command for a jump shift from the fourth gear to the second gear or to the first gear is output, the sequence routine shown in FIG. 130 is executed. At first, determinations are made at steps S591 and S592, respectively, as to whether or not the throttle opening is entirely closed and whether or not the vehicle speed is lower than a specified speed C23, respectively. When the throttle opening is not entirely closed, and the vehicle speed is higher than the specified value C23, then, through steps S593 and S594, the control progresses and creates the third gear as a temporary target gear during a period of time from the occurrence of the shift command to a lapse of the specified time T28. When the specified time T28 has passed, the control starts and creates the target gear, namely the second gear or the first gear, indicated by the shift command. With this control, when the 4-2 or 4-1 shift command is output during acceleration or while the vehicle speed is relatively high, shifting stays for a period from the occurrence of the shift command to a lapse of the specified time T28 as shown in FIG. 131.

When a command for a jump shift from the third gear to the first gear is provided, control is accomplished in accordance with the sequence routine shown in FIG. 132. The control is the same as for the 4-1 or 4-2 jump shift. At step S601 and S602, determinations are made as to whether or not the throttle opening is entirely closed and whether or not the vehicle speed is less than a specified speed C24, respectively. If the throttle opening is not entirely closed and the vehicle speed is higher than the specified speed C24, then, the control progress to create the second gear as a temporary target gear during a period of time from the occurrence of the shift command to a lapse of the specified time T29 through steps S603 and S604. When the specified time T29 has passed, the control starts to create the target gear, namely the first gear, indicated by the shift command. With this control, when the 3-1 shift command has been output while the vehicle is accelerating or running at a relatively high speed, shifting stays for a period from the occurrence of the shift command to a lapse of the specified time T29 as shown in FIG. 133.

The prevention of the 3-1 jump shift, as well as the jump shifts for these 4-2 shift and 4-1 shift, is contributory to preventing the associated friction coupling elements from encountering aggravation of durability due to abrupt locking.

Separately from these jump shift commands, there are instances in which a shift command is provided due, for example, a sudden change in throttle opening, immediately following a first shift command. If, while shifting is progressing according to the first shift command, another shift command is output and causes a sudden transition of shifting operation, producing a pronounced shift shock.

In order to avoid such an event, control is accomplished in accordance with the sequence routine shown in FIG. 134.

When a shift command is output at step S611, a measurement is made of the progress of time t from the output of the first shift command at step S612. Subsequently, a determination is made at step S613 as to whether or not a gear shift indicated by the first shift command has been completed. If it has been completed, the control is terminated. Until the completion of the gear shift indicated by the first shift command, a determination is made at step S614 as to whether or not another shift command has been output. Until the second shift command is output, while measuring a lapse of the time t at step S612, the completion of the gear shift indicated by the first shift command is waited at step S613.

If there is provided a second shift command prior to the completion of the primarily commanded gear shift, a determination is made at step S614 as to whether or not the measured time t has exceed the specified time T30. If the specified time T30 has not been exceeded, it is determined that the primarily commanded gear shift has not yet commenced, then, shifting is immediately changed to the secondarily commanded gear shift at step S616 as labelled with a character "W" in FIG. 135. In this way, shifting is controlled well responding to a shift command.

On the other hand, if the second shift command is output prior to the conclusion of the primarily commanded gear shift, upon a lapse of the time t from the output of the first shift command has exceeded the specified time T30, it is determined that the primarily commanded gear shift is already initiated. Then, in such the case, at step S617, the primarily commanded gear shift is immediately terminated and subsequently, the control is immediately changed to cause the secondarily commanded gear shift as labelled with a character "X" in FIG. 135.

With this alternative control, there is no occurrence of a pronounced shift shock due to a sudden transition of control to the secondarily commanded gear shift from the primarily commanded gear shift.

Typically, when the shift lever is operated to the neutral (N) range and subsequently to any one of the forward ranges, namely the drive (D), the second speed (S) and the low speed (L) ranges, during travelling, control tries to establish a gear in conformity with the vehicle speed and the throttle opening at the shift lever operation. This kind of gear shift is performed by selectively activating various solenoid valves of a hydraulic control circuit based on a shift command provided according to driving conditions. If, feedback control is executed of operating pressure for various friction coupling elements on the basis of the difference between actual and target turbine speeds or the difference between changes in actual and target turbine speeds so as to maintain the turbine speed or a change of the turbine speed during shifting a gear. One of this type of control is known from, for instance, Japanese Unexamined Patent Publication No.62-26130.

Further, automatic transmissions of the type having ranges available by manually operating the shift lever possibly encounters an accidental shift to the neutral range during traveling through unexpected shift lever operation. The driver returns the shift lever to one of forward ranges, for instance, the drive (D) range. In such an event where shifting is made from the neutral (N) range to a forward range following the shift from the forward range to the neutral (N) range during traveling, problems occurs. For instance, when the automatic transmission is returned to a forward range, for instance the drive (D) range, the controller tries to create a gear in conformity with the vehicle speed and throttle opening at the time of returning to the drive (D) range. In such case, because the turbine speed is unstable during traveling with the neutral (N) range, the feedback control for locking the friction coupling element, such as the forward clutch, takes a long time and/or fails in timely termination due to the unstable turbine speed which is used as a control parameter when the transmission is returned to the drive range (D). Further, if, in that state, another shift command is provided from changes in driving condition, shift control following the other shift command possibly commences before the completion of shifting caused through the manual shift to the drive (D) range. If such an action occurs during traveling at a high speed, a shift shock is extremely large. In order to eliminate such a problem, control is executed in accordance with the sequence routine shown in FIG. 1136.

In this control, a determination is first made at step S621 as to whether or not the vehicle speed is greater than a specified speed at which such the problem is expected to occur certainly. If the vehicle speed is greater than the specified speed, another determination is made at step S622 as to whether or not an N-D range shift is manually made. If in fact the N-D range shift is made, further determinations are consecutively made through steps S623 and S624 as to whether or not another shift command has been output prior to a lapse of a specified time T31 from the manual operation to the drive (D) range. If the other shift command has been output, shifting to a gear indicated by the other shift command starts after the lapse of the specified time T31 at step S625 as shown in FIG. 137.

With this control, a gear shift following a manual shift to the drive (D) range immediately after an D-N range shift during travelling is initiated only when shifting resulting from the manual shift has been concluded and, consequently, each of the related friction coupling elements has become stabilized, avoiding an occurrence of a heavy shift shock.

During a jump shift from the first or the second gear to the fourth gear, control is made of releasing or unlocking the forward clutch 51 through the third duty solenoid valve 123. Since the third duty solenoid valve 123 is used in the lockup control, the lockup control is interrupted during jump shifts.

Specifically, in the sequence routine shown in FIG. 138, when a shift command indicating a gear shift from the first gear or the second gear to the fourth gear is provided at step S631, then, the lockup control is prevented at step S632. Also, In response to the shift command, the lockup control valve 106 shifts its spool and changes the pressure line 228 downstream from the third duty solenoid valve 123 from communication with the front chamber 26b of the lockup clutch 26 to communication with the forward clutch pressure line 219, causing discharge of the forward clutch pressure.

Resultingly, if the jump shift to the fourth gear is concluded at step S633, the lockup control valve 106 returns the spool to the opposite position, causing the lockup control through the third duty solenoid valve 123 at step S634. Although the forward clutch 51 is unlocked also during the 3-4 up-shift, it is not necessary to interrupt the lockup control through the third duty solenoid valve 123, because the unlocking control is achieved by bringing the forward clutch line 219 merging with the brake release pressure line 221 into communication with the 3-4 shift valve 105 at the drain port through the pressure line 218 via the lockup control valve 106.

(8). Line Pressure Control

In the automatic transmission of this type, the hydraulic control circuit produces locking and unlocking pressure for the friction control elements and supplies the pressure selectively to the friction coupling elements, creating desired gears according to driving conditions. The operating pressure is provided by regulating source pressure discharged from the oil pump to a desired level of line pressure which is appropriately varied according to control circumstances.

While the vehicle is running without shifting gears, the line pressure be at a level sufficient for friction coupling elements to transfer torque without being accompanied by slippage. If the line pressure is unnecessarily high, the oil pump encounters an increased driving loss which reads to abbreviation of fuel efficiency of the engine. In order to transfer accurate input torque to each of the friction coupling elements, ling pressure is established so as to provide and transfer input torque certainly and to each friction coupling element. For this purpose, as described in, for instance, Japanese Unexamined Patent Publication No. 62-124343, the input torque for the friction coupling element is precisely calculated based on turbine torque, i.e. input torque to the transmission, which is obtained from engine torque and a torque ratio of the converter torque, the gear ratio of a gear used and a torque shearing ratio of the friction coupling element. It is, however, not always satisfactory to establish the line pressure on the basis of the turbine torque. For example, if the acceleration pedal is quickly depressed, because the rise in line pressure is accompanied by a time delay in response due to a time necessary to calculate the turbine torque, it is difficult to raise the line pressure in conformity with a rise in the turbine torque. Resultingly, there occurs a spontaneous lack of input torque to the friction coupling element. Further, if, while the acceleration pedal is depressed during a halt, a manual shift is made from the neutral (N) range to the drive (D) range, it is necessitate to lock friction coupling elements which are rotating relatively to each other at a high speed under the condition where the turbine torque, and hence the line pressure, is still at a low level. This results in a long locking time. In addition, in driving conditions where the vehicle is running with low engine load, while components of the automatic transmission are rotating at high speeds, only low torque is input to the automatic transmission. Consequently, the line pressure is insufficiently raised, resulting in insufficient lubrication of the respective rotating components.

Effecting the lockup clutch needs a specified level of operating pressure. If the turbine torque, and hence the line pressure, is ar a low level, the lockup clutch experiences unstable operation due to insufficient operating pressure. This problem is significant in a hydraulic control circuit in which the line pressure is used as source pressure to develop the operating pressure through a duty solenoid valve and regulate it in feedback control in order to effect the lockup clutch slip control. In sufficient line pressure results in aggravation of precise control for lockup clutch slippage.

Controller 300 establishes appropriate line pressure even in the condition where it is insufficient to calculate the line pressure on the basis of turbine torque only and responds to changes in driving conditions.

Line pressure control is accomplished through the linear solenoid valve 131 controlled by the controller 300 in accordance with the sequence routine shown in FIG. 139. First of all, calculations are made at steps S641 through S643, respectively, to obtain line pressure P1, P2 and P3 corresponding to turbine torque Tt, throttle opening A and vehicle speed V, respectively. Specifically, the turbine torque Tt is calculated on the basis of engine output and a converter torque ratio which are obtained from the throttle opening $\gamma$, engine speed Ne and turbine speed Nt, which are detected by the sensors 302, 303 and 304, respectively, and data of the engine output characteristic and data of the characteristic of torque converter torque ratio stored in the controller. Hydraulic pressure P1' corresponding to the turbine torque Tt is found from a map as shown in FIG. 140. Further, hydraulic pressure P2' and P3' corresponding to the throttle opening $\gamma$ and vehicle speed V are found from maps shown in FIGS. 141 and 142, respectively. By multiplying each of these hydraulic pressure P1', P2' and P3' by a factor C25 determined according to selected range and gear, line pressure P1, P2 and P3 are obtained.

Subsequently, at step S644, line pressure P4 is obtained depending upon execution or interruption of the lockup control, which needs to be at a relatively high level P4' during execution and a relatively low level P4" during interruption. At step S645, the highest one among these line pressure P1-P4 is selected as target line pressure $P_o$ for ordinary driving. The linear solenoid valve 131 is controlled with a control signal representing the target line pressure $P_o$.

With this line pressure control, in the cases, for example, where the acceleration pedal is quickly depressed during ordinary driving or where a shift is made from the neutral (N) range to the drive (D) range during idling, the line pressure P2 determined on the basis of throttle opening $\gamma$ is the highest and employed as the target line pressure $P_o$. Resultingly, it is eliminated to experience a spontaneous lack of torque transferred to the friction coupling element due to a delay in response of a rise in line pressure occurring in the case where the target line pressure is established after the calculation of turbine torque when the acceleration pedal is quickly depressed or it is realized to lock the friction coupling element quickly even when an N-D range shift is made during idling.

In driving conditions where the vehicle is running at a high speed with low load, the line pressure L3 determined on the basis of the vehicle speed V is the highest and employed as the target line pressure $P_o$. This provides a sufficient lubrication effect for the transmission component. Further, during execution of the lockup control, the high level of line pressure P4" is employed as the target line pressure, which provides a sufficiently high and stable line pressure as the source pressure for the third duty solenoid valve 123, resulting in precise slip control of the lockup clutch 26 through the feedback control.

In driving conditions other than the above described driving conditions, the line pressure L1 corresponding to the turbine torque is employed as the target line pressure $P_o$, resulting in guaranteed transmission of torque to the friction coupling element and suppression of a driving loss of the oil pump, and hence aggravation of fuel efficiency.

With, in particular, the sequence described above, because the control adopts only the selection of the highest line pressure $P_o$ as the target line pressure among the line pressure P1–P4 which can be coincidentally determined according to driving conditions, the line pressure is provided in well response to a driving condition. As shown in FIG. 143, when, for example, a driving condition changes from a condition where the line pressure P1 corresponding to turbine torque Tr becomes the highest to a condition where the line pressure P2 corresponding to throttle opening γ becomes the highest, the line pressure continuously changes from one P1 to the other P2 as indicated by an arrow "C".

Regions of driving conditions where the respective line pressure P1 - P4 become the highest are established as shown by way of example in FIG. 144. That is, in this example, driving conditions where the line pressure P1 demonstrates to be the highest is defined by a region of low speed and high throttle labelled with a character X1; driving conditions where the line pressure P3 demonstrates to be the highest is defined by a region of high speed and low throttle labelled with a character X3; driving conditions where the line pressure P4 demonstrates to be the highest is defined by a region where the lockup control is conducted; and driving conditions where the line pressure P2 demonstrates to be the highest is defined by a region other than the above.

During a shift from the neutral (N) range or the park (P) range to any one of the drive (D) range, the second-speed (S) range and the low-speed (L) range, line pressure control is accomplished in order to lock the friction coupling elements. This line pressure control is accomplished in accordance with the sequence routine shown in FIG. 145. First of all, a determination is made at step S651 as to whether or not a specified time T32 has passed from the shift operation. If the specified time T32 has passed, the line pressure control applied to ordinary driving described above is executed.

On the other hand, until a lapse of the specified time T32 from the N-D shift operation, line pressure P5 and P6 corresponding respectively to an engine speed Ne and throttle opening A upon the shift operation are obtained from maps shown in FIGS. 146 and 147, respectively, at steps S652 and S653, In this instance, while the line pressure P5 may fundamentally be acceptable as a target line pressure, nevertheless, in instances where an N-D shift operation is made with depressing on the acceleration pedal during idling, the line pressure P5 is not always sufficient to lock positively the friction coupling element. For this reason, either one of the line pressure P5 and P6 which is higher than the other is employed as the target line pressure $P_o$ at step S654.

Line pressure for shifts other the N-D range shift is controlled using a lined pressure as the target line pressure $P_o$ found from the same map as shown in FIG. 140.

(9). Torque Down Control

During gear shifting, in order for the gear shift to take place quickly and smoothly, torque down control in which the engine torque is temporarily dropped down is executed.

Torque down control during an up-shift is accomplished in accordance with the sequence routines shown in FIG. 148. At step S661, a determination is made as to whether or not the turbine speed change dNt is lowered below a specified value C26 by which commencement of the gear shift is determined. If it is lowered below the specified value C26, the torque down control is immediately commenced as labelled with a character "Y" FIG. 149 at step S662. Subsequently, another determination is made at step S663 as to whether or not the turbine speed Nt has dropped lower than a speed which is higher than a turbine speed $Nt_o$ at conclusion of the up-shift by only a specified value C27. If it is lower than the speed ($Nt_o$+C27), then, at step S664, the torque down control is terminated upon the speed drop to the speed ($Nt_o$+C27).

In this instance, the specified value C27 is established such that it becomes larger as the turbine speed Nt prior to a gear shift increases so as to terminate the torque down control early, thereby preventing a delay in termination of the torque down control. Owing to the upshift torque down control, as shown in FIG. 149, the torque down is accomplished during the period of an inertia phase during a gear shift, reducing the turbine speed quickly.

The amount of torque dropped down during an upshift is established according to throttle opening to which the magnitude of a shift shock corresponds and increased as throttle opening becomes large. There are differences depending upon types of gear shifts. For example, the amount of torque dropped down is set to be great during a 1-2 up-shift which provides a great change in gear ratio and, however, to be small during a 3-4 up-shift which provides less change in gear ratio.

Torque down control for down-shifts is accomplished in accordance with the sequence routine shown in FIG. 150. Specifically, at step 671, a determination is made as to whether or not the turbine speed Nt has raised greater than a speed which is smaller than the turbine speed $Nt_o$ at conclusion of the down-shift by a specified speed C28. If it is still higher than the speed ($Nt_o$–C24), the torque down control is initiated at step S672 as labelled with a character "Z" in FIG. 151. Subsequently, another determination is made at step S673 as to whether or not the turbine speed change dNt has become smaller than a specified value C29. If it is smaller than the specified value C29, the torque down control is terminated at step S674. On the other hand, if it is not detected that the turbine speed ratio dNt is lower than the specified value C29, the torque down is continued until the turbine speed Nt declines below the specified value C29.

In this instance, the specified speed C28, which is utilized in the determination of torque down control commencement, is established to be large with an increase in the turbine speed Nt prior to the commencement of a dow-shift so as to allow the torque down control to start rather earlier, thereby preventing a delay in response to its commencement. In addition, the specified value C29, which is used in the determination of the torque down control termination, is established at values between the turbine speed changes dNt and $dNt_o$ during and after a down-shift, respectively, as labelled wit a character AX in FIG. 151. In this manner, the torque down control is terminated at a time of transition to ordinary acceleration from gear shifting. In this instance, the specified ratio C29 is established to be greater with an increase in the turbine speed Nt at the commencement of gear shifting, or in other words, it is great to the extent that acceleration in ordinary accelerating driving after a gear shift is great. In addition, it is established to be great for gear shifts, following which there is provided an increase in acceleration.

In this manner, as shown in FIG. 151, while, during the inertia phase in the first half of the gear shift, the turbine speed Nt increases quickly due to relatively high engine torque, there occurs torque down during the torque phase in the second half of the gear shift, reducing shift shocks caused in the friction coupling element upon locking. The amount of torqued down during down-shifts is determined depending upon types of shifting. As was the case with up-shifts, for example, the amount of torque down is large during a 2-1 down-shift which causes a great change in gear ratio and, however, small during a 4-3 down-shift which provides a small change in gear ration. Particularly, during a gear shift for which the one-way clutch 56 must be locked and which tends to produce a significantly heavy shock, a great amount of torque down is provided.

It is to be understood that although the present invention has been described with respect to preferred embodiments thereof, various other embodiments and variants may occur to those skilled in the art, which are within the spirit and scope of the present invention, and such other embodiments and variants are intended to be covered by the following claims.

What is claimed is:

1. A control system for an automatic transmission of the type having a transmission gear mechanism and a plurality of friction coupling elements which are selectively locked and unlocked with hydraulic operating oil to change power transmission paths to place the automatic transmission into desired available gears, first one of said friction coupling elements comprising a cylinder and a piston which is slidable in an interior of said cylinder and capable of variably dividing said interior of said cylinder into a first pressure chamber and a second pressure chamber and being locked when hydraulic operating oil is supplied into only said first pressure chamber and unlocked when hydraulic operating oil is coincidentally supplied into both said first pressure chamber and said second pressure chamber, and second one of said friction coupling elements having a pressure chamber in communication with said second pressure chamber of said first friction coupling element and being locked only when hydraulic operating oil is supplied into said pressure chamber of said second friction coupling element, said control system comprising:

driving condition detection means for detecting driving conditions of a vehicle;

first hydraulic operating oil supply means for supplying hydraulic operating oil to and discharging hydraulic operating oil from said first pressure chamber of said first friction coupling element;

second hydraulic operating oil supply means for supplying hydraulic operating oil to and discharging hydraulic operating oil from both said second pressure chamber of said first friction coupling element and said pressure chamber of said second friction coupling element; and control means for controlling said first hydraulic operating oil supply means and said second hydraulic operating oil supply means according to driving conditions detected by said driving condition detection means and scheduled gear shifts selected according to said driving conditions in such a way that said first hydraulic operating oil supply means increases a pressure level of hydraulic operating oil in said first pressure chamber of said first friction coupling element while keeping hydraulic operating oil in said pressure chamber of said second friction coupling element at a first specified pressure level during a first specific gear shift in which said first friction coupling element and said second friction coupling element are coincidentally unlocked and locked, respectively, and decreases a pressure level of hydraulic operating oil in said first pressure chamber of said first friction coupling element while keeping hydraulic operating oil in said pressure chamber of said second friction coupling element at a second specified pressure level during a second specific gear shift in which said first friction coupling element and said second friction coupling element are coincidentally locked and unlocked, respectively, and that said second hydraulic operating oil supply means regulates a pressure level of hydraulic operating oil in said pressure chamber of said second friction coupling element so as to make a period for which said pressure level of hydraulic operating oil in said pressure chamber of said second friction coupling element is kept at said first specified pressure level during said first specific gear shift or at said second specified pressure level during said second specific gear shift longer than a time necessary for said second friction coupling element to be completely locked or unlocked.

2. An automatic transmission control system as defined in claim 1, wherein said hydraulic operating oil supply means comprises a duty solenoid valve disposed in a path leading to said first pressure chamber of said first friction coupling element.

3. An automatic transmission control system as defined in claim 2, wherein said first pressure chamber and said second pressure chamber of said first friction coupling element have approximately a same pressure active area and said piston is ordinarily urged to exert pressure on said first friction coupling element in a direction of unlocking.

4. An automatic transmission control system as defined in claim 3, wherein said first duty solenoid valve and said second duty solenoid valve are operated at approximately a same duty rate during said first specific gear shift.

5. An automatic transmission control system as defined in claim 1, wherein said hydraulic operating oil supply control means comprises oil flow control means for controlling an amount of flow of said hydraulic operating oil supplied to and discharged from said second pressure chamber of said first friction coupling element and said pressure chamber of said second friction coupling element.

6. An automatic transmission control system as defined in claim 5, wherein said hydraulic operating oil control means comprises a duty solenoid valve and an orifice disposed in an upstream oil path from which oil paths leading to said second pressure chamber of said first friction coupling element and said pressure chamber of said second friction coupling element, respectively branch off.

7. A control system for an automatic transmission of the type having a transmission gear mechanism and a plurality of friction coupling elements which are selectively locked and unlocked with hydraulic operating oil to change power transmission paths to place the automatic transmission into desired available gears, first one of said friction coupling elements comprising a cylinder and a piston which is slidable in an interior of said cylinder and capable of variably dividing said interior of said cylinder into a first pressure chamber and a second pressure chamber and being locked when hydraulic operating oil is supplied into only said first pressure chamber and unlocked when hydraulic operating oil is coincidentally supplied into both said first pressure chamber and said second pressure chamber, and second one of said friction coupling elements having a pressure chamber in communication with said second pressure chamber of said first friction coupling element and being locked only when hydraulic operating oil is supplied into said pressure chamber of said second friction coupling element, said control system comprising:

driving condition detection means for detecting driving conditions of a vehicle;

first hydraulic operating oil supply means for supplying hydraulic operating oil to and discharging hydraulic operating oil from said first pressure chamber of said first friction coupling element;

second hydraulic operating oil supply means for supplying hydraulic operating oil to and discharging hydraulic operating oil from both said second pressure chamber of said first friction coupling element and said pressure chamber of said second friction coupling element; and control means for controlling said first hydraulic operating oil supply means and said second hydraulic operating oil supply means according to driving conditions detected by said driving condition detection means and scheduled gear shifts selected according to said driving conditions in such a way that said first hydraulic operating oil supply means regulates a pressure level of hydraulic operating oil in said first pressure chamber of said first friction coupling element so as to keep hydraulic operating oil in said pressure chamber of said second friction coupling element at a first specified pressure level necessary for said second friction coupling element to cause a first specified amount of slippage during a first specific gear shift in which said first friction coupling element and said second friction coupling element are coincidentally unlocked and locked, respectively, and at a second specified pressure level necessary for said second friction coupling element to cause a second specified amount of slippage during a second specific gear shift in which said first friction coupling element and said second friction coupling element are coincidentally locked and unlocked, respectively, and that said second hydraulic operating oil supply means regulates a pressure level of hydraulic operating oil in said pressure chamber of said second friction coupling element so as to make a specified period for which said hydraulic operating oil in said pressure chamber of said second friction coupling element is kept at said first specified pressure level during said first specific gear shift or at said second specified pressure level during said second specific gear shift longer than a time necessary for said second friction coupling element to be completely locked or unlocked.

8. An automatic transmission control system as defined in claim 7, and further comprising a turbine speed monitoring means for monitoring an actual change and a target change in turbine speed of said torque converter, wherein said control means controls said pressure level and said time period on the basis of said actual change and said target change in turbine speed.

9. An automatic transmission control system as defined in claim 7, wherein said first hydraulic operating oil supply means comprises a first duty solenoid valve disposed in a path leading to said first pressure chamber of said first friction coupling element, and said second hydraulic operating oil supply means comprises a second duty solenoid valve disposed in an upstream oil path from which oil paths leading, respectively, to said second pressure chamber of said first friction coupling element and said pressure chamber of said second friction coupling element branch off, wherein said control means controls duty rates provided for said first duty solenoid valve and said second duty solenoid valve, respectively.

10. An automatic transmission control system as defined in claim 9, wherein said second hydraulic operating oil supply means further comprises an orifice in said upstream oil path between a juncture at which said oil paths branch off from said upstream oil path and said second duty solenoid valve.

11. An automatic transmission control system as defined in claim 9, wherein said first friction coupling element comprises a cylinder and a spring loaded piston which is slidably installed in an interior of said servo cylinder and variably divides an interior of said cylinder into two chambers for said first pressure chamber and said second pressure chamber, respectively, and said piston being ordinarily urged to exert pressure on said first friction coupling element in a direction of unlocking, and said first duty solenoid valve and said second duty solenoid valve are operated at approximately a same duty rate during said first specific gear shift.

12. An automatic transmission control system as defined in claim 7, wherein said first friction coupling element comprises a brake locked in a second gear and in a fourth gear and unlocked in a first gear and in a third gear, and said second friction coupling element comprises a clutch locked in said third gear and in said fourth gear and unlocked in said second gear and in said second gear.

13. An automatic transmission control system as defined in claim 12, wherein said first hydraulic operating oil supply means comprises a first duty solenoid valve disposed in a path leading to said first pressure chamber of said first friction coupling element, and said second hydraulic operating oil supply means comprises a second duty solenoid valve disposed in an upstream oil path from which oil paths leading, respectively, to said second pressure chamber of said first friction coupling element and said pressure chamber of said second friction coupling element branch off, wherein said control means controls duty rates provided for said first duty solenoid valve and said second duty solenoid valve, respectively.

14. A control system for an automatic transmission of the type having a transmission gear mechanism, a torque converter disposed an engine and said transmission gear mechanism, and a plurality of friction coupling elements which are selectively locked and unlocked with hydraulic operating oil to change power transmission paths to place the automatic transmission into desired available gears and which include a first friction coupling element comprising a cylinder and a piston slidable in an interior of said cylinder and capable of variably dividing said interior of said cylinder into a first pressure chamber and a second pressure chamber and being locked when hydraulic operating oil is supplied into only said first pressure chamber and unlocked when hydraulic operating oil is coincidentally supplied into both said first pressure chamber and said second pressure chamber, and a second friction coupling element having a pressure chamber in communication with said second pressure chamber of said first friction coupling element and being locked only when hydraulic operating oil is supplied into said pressure chamber of said second friction coupling element, said available gears including a first specific gear which is provided by coincidentally unlocking and locking said first and second friction coupling elements, respectively, and a second specific gear which is provided by coincidentally locking and unlocking said first and second friction coupling elements, respectively, said control system comprising:

driving condition detection means for detecting driving conditions of a vehicle;

first hydraulic operating oil supply means for supplying hydraulic operating oil to and discharging hydraulic operating oil from said first pressure chamber of said first friction coupling element;

second hydraulic operating oil supply means for supplying hydraulic operating oil to and discharging hydraulic operating oil from both said second pressure chamber of said first friction coupling element and said pressure chamber of said second friction coupling element; and control means for controlling said first hydraulic operating oil supply means and said second hydraulic operating oil supply means according to driving conditions detected by said driving condition detection means and scheduled gear shifts selected according to said driving conditions in such a way that said first hydraulic operating oil supply means regulates a pressure level of hydraulic operating oil in said first pressure chamber of said first friction coupling element so as to keep hydraulic operating oil in said pressure chamber of said second friction coupling element at a first specified pressure level necessary for said second friction coupling element to cause a first specified amount of slippage during a shift to said first specific gear and at a second specified pressure level necessary for said second friction coupling element to cause a second specified amount of slippage during a shift to said second specific gear shift and that said second hydraulic operating oil supply means regulates a pressure level of hydraulic operating oil in said pressure chamber of said second friction coupling element so as to make a specified period for which said hydraulic operating oil in said pressure chamber of said second friction coupling element is kept at said first specified pressure level during said shift to said first specific gear shift or at said second specified pressure level during said shift to said second specific gear shift longer than a time necessary for said second friction coupling element to be completely locked or unlocked.

15. An automatic transmission control system as defined in claim 14, and further comprising a turbine speed monitoring means for monitoring an actual change and a target change in turbine speed of said torque converter, wherein said control means controls said pressure level and said time period on the basis of said actual change and said target change in turbine speed.

16. An automatic transmission control system as defined in claim 15, wherein said first friction coupling element comprises a brake locked in a second gear and in a fourth gear and unlocked in a first gear and in a third gear, and said second friction coupling element comprises a clutch locked in said third gear and in said fourth gear and unlocked in said second gear and in said second gear, wherein said first hydraulic operating oil supply means comprises a first duty solenoid valve disposed in a path leading to said first pressure chamber of said first friction coupling element, and said second hydraulic operating oil supply means comprises a second duty solenoid valve disposed in an upstream oil path from which oil paths leading, respectively, to said second pressure chamber of said first friction coupling element and said pressure chamber of said second friction coupling element branch off, and said control means controls duty rates provided for said first duty solenoid valve and said second duty solenoid valve, respectively.

17. An automatic transmission control system as defined in claim 14, wherein said first hydraulic operating oil supply means further comprises an orifice installed in said upstream oil path between a juncture at which said oil paths branch off from said upstream oil path and said second duty solenoid valve.

18. An automatic transmission control system as defined in claim 14, wherein said first friction coupling means comprises a cylinder and a spring loaded piston which is slidably installed in an interior of said servo cylinder and variably divides an interior of said cylinder into two chambers for said first pressure chamber and said second pressure chamber, respectively, and said piston being ordinarily urged to exert pressure on said first friction coupling element in a direction of unlocking, and said first duty solenoid valve and said second duty solenoid valve are operated at approximately a same duty rate during first specific gear shift.

* * * * *